(12) United States Patent
Jeon et al.

(10) Patent No.: US 12,177,788 B2
(45) Date of Patent: Dec. 24, 2024

(54) SCHEDULED UPLINK TRANSMISSION FOR CHANNEL STATE INFORMATION REPORTING

(71) Applicant: Comcast Cable Communications, LLC, Philadelphia, PA (US)

(72) Inventors: Hyoungsuk Jeon, Centreville, VA (US); Esmael Hejazi Dinan, McLean, VA (US); Alireza Babaei, Fairfax, VA (US); Hua Zhou, Vienna, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/453,013

(22) Filed: Aug. 21, 2023

(65) Prior Publication Data

US 2023/0403656 A1 Dec. 14, 2023

Related U.S. Application Data

(63) Continuation of application No. 17/507,219, filed on Oct. 21, 2021, now Pat. No. 11,737,032, which is a
(Continued)

(51) Int. Cl.
| | | |
|---|---|---|
| *H04W 24/10* | (2009.01) |
| *H04W 52/14* | (2009.01) |
| *H04W 52/24* | (2009.01) |
| *H04W 52/32* | (2009.01) |
| *H04W 52/36* | (2009.01) |

(Continued)

(52) U.S. Cl.
CPC ........ *H04W 52/241* (2013.01); *H04W 24/10* (2013.01); *H04W 52/146* (2013.01); *H04W 52/325* (2013.01); *H04W 76/11* (2018.02); *H04W 76/32* (2018.02)

(58) Field of Classification Search
CPC ... H04W 52/241; H04W 76/11; H04W 76/32; H04W 24/10; H04W 52/146; H04W 52/325
See application file for complete search history.

(56) References Cited

U.S. PATENT DOCUMENTS

| | | | |
|---|---|---|---|
| 9,674,727 B2 | 6/2017 | Damnjanovic et al. |
| 9,912,430 B2 | 3/2018 | Sayana et al. |
| | (Continued) | |

FOREIGN PATENT DOCUMENTS

| | | |
|---|---|---|
| EP | 3525516 A1 | 8/2019 |
| KR | 20150047570 A | 5/2015 |
| | (Continued) | |

OTHER PUBLICATIONS

R1-1718337 3GPP TSG RAN WG1 Meeting #90bis, Prague, Czech Republic, Oct. 9-13, 2017, Source: MediaTek, Inc., Title: Remaining details for CSI reporting.
(Continued)

*Primary Examiner* — Dominic E Rego
(74) *Attorney, Agent, or Firm* — Banner & Witcoff, Ltd.

(57) ABSTRACT

Channel state information (CSI) reporting may be used for wireless communications. CSI reporting may be activated or deactivated. During the activation of CSI reporting and based on one or more criteria, a scheduled uplink transmission may be selected.

47 Claims, 43 Drawing Sheets

Related U.S. Application Data continuation of application No. 17/228,404, filed on Apr. 12, 2021, now Pat. No. 11,388,679, which is a continuation of application No. 16/895,879, filed on Jun. 8, 2020, now Pat. No. 10,979,982, which is a continuation of application No. 16/244,917, filed on Jan. 10, 2019, now Pat. No. 10,681,648.

(60) Provisional application No. 62/616,189, filed on Jan. 11, 2018, provisional application No. 62/615,909, filed on Jan. 10, 2018.

(51) Int. Cl.
*H04W 76/11* (2018.01)
*H04W 76/32* (2018.01)

(56) References Cited

U.S. PATENT DOCUMENTS

| | | | |
|---|---|---|---|
| 10,735,074 | B2 | 8/2020 | Kwak et al. |
| 10,904,895 | B2 | 1/2021 | Nayeb Nazar et al. |
| 2008/0037671 | A1 | 2/2008 | Lee et al. |
| 2011/0243278 | A1 | 10/2011 | Cheng |
| 2012/0076017 | A1 | 3/2012 | Luo et al. |
| 2013/0077523 | A1 | 3/2013 | Ko et al. |
| 2013/0195025 | A1 | 8/2013 | Chatterjee et al. |
| 2014/0010126 | A1 | 1/2014 | Sayana et al. |
| 2014/0044083 | A1 | 2/2014 | Kim et al. |
| 2014/0200012 | A1 | 7/2014 | Ito |
| 2014/0226551 | A1 | 8/2014 | Ouchi et al. |
| 2014/0269452 | A1 | 9/2014 | Papasakellariou |
| 2014/0295909 | A1 | 10/2014 | Ouchi et al. |
| 2014/0314012 | A1* | 10/2014 | Tang ............... H04L 5/0057 370/329 |
| 2015/0189574 | A1 | 7/2015 | Ng et al. |
| 2015/0189644 | A1 | 7/2015 | Lorca Hernando |
| 2015/0327107 | A1 | 11/2015 | Kim et al. |
| 2015/0381255 | A1 | 12/2015 | Kuo |
| 2016/0037322 | A1 | 2/2016 | Nguyen et al. |
| 2016/0301515 | A1 | 10/2016 | Ouchi et al. |
| 2018/0019855 | A1 | 1/2018 | Zhang et al. |
| 2018/0020503 | A1 | 1/2018 | Deenoo et al. |
| 2018/0034525 | A1 | 2/2018 | Park et al. |
| 2018/0115357 | A1 | 4/2018 | Park et al. |
| 2018/0124687 | A1 | 5/2018 | Park et al. |
| 2018/0124822 | A1 | 5/2018 | Wang et al. |
| 2018/0132266 | A1 | 5/2018 | Chen et al. |
| 2018/0139787 | A1 | 5/2018 | Islam et al. |
| 2018/0167967 | A1 | 6/2018 | Li |
| 2018/0176937 | A1 | 6/2018 | Chen et al. |
| 2018/0205516 | A1 | 7/2018 | Jung et al. |
| 2018/0206219 | A1 | 7/2018 | Chen et al. |
| 2018/0227805 | A1 | 8/2018 | Jang et al. |
| 2018/0242307 | A1 | 8/2018 | Chen et al. |
| 2018/0249460 | A1 | 8/2018 | Seo et al. |
| 2018/0270713 | A1 | 9/2018 | Park et al. |
| 2018/0278319 | A1 | 9/2018 | Cezanne et al. |
| 2018/0278383 | A1 | 9/2018 | Kim et al. |
| 2018/0310298 | A1 | 10/2018 | Li et al. |
| 2018/0324853 | A1 | 11/2018 | Jeon et al. |
| 2019/0037577 | A1 | 1/2019 | Sun et al. |
| 2019/0103954 | A1 | 4/2019 | Lee et al. |
| 2019/0104477 | A1 | 4/2019 | MolavianJazi et al. |
| 2019/0132882 | A1 | 5/2019 | Li et al. |
| 2019/0141677 | A1 | 5/2019 | Harrison et al. |
| 2019/0141742 | A1 | 5/2019 | Zhou et al. |
| 2019/0149305 | A1* | 5/2019 | Zhou ............... H04L 5/0092 370/330 |
| 2020/0029352 | A1 | 1/2020 | Aiba et al. |
| 2020/0280996 | A1 | 9/2020 | Yang et al. |
| 2021/0167930 | A1 | 6/2021 | Jeon et al. |

FOREIGN PATENT DOCUMENTS

| | | |
|---|---|---|
| WO | 2017136706 A1 | 8/2017 |
| WO | 2017161590 A1 | 9/2017 |
| WO | 2017172535 A1 | 10/2017 |
| WO | 2017196243 A1 | 11/2017 |
| WO | 2018029382 A1 | 2/2018 |
| WO | 2018084544 A1 | 5/2018 |
| WO | 2018144155 A1 | 8/2018 |

OTHER PUBLICATIONS

R1-1718432 3GPP TSG RAN WG1 Meeting #90bis, Prague, Czech Republic, Oct. 9-13, 2017, Source: Ericsson, Title: On remaining details of CSI reporting.

R1-1718442 3GPP TSG RAN WG1 Meeting #90bis, Prague, Czech Republic, Oct. 9-13, 2017, Source: Ericsson, Title: On semi-persistent CSI reporting on PUSCH.

R1-1718443 3GPP TSG RAN WG1 Meeting #90bis, Prague, Czech Republic, Oct. 9-13, 2017, Source: Ericsson, Title: On aperiodic and semi-persistent CSI reporting on PUCCH.

R1-1718481 3GPP TSG RAN WG1 Meeting #90bis, Prague, Czech Republic, Oct. 9-13, 2017, Source: InterDigital, Inc., Title: Remaining issues on CSI reporting.

R1-1718510 3GPP TSG RAN WG1 Meeting #90bis, Prague, Czech Republic, Oct. 9-13, 2017, Source: Nokia, Nokia Shanghai Bell, Title: Remaining details on CSI reporting for Type II and Type I codebook.

R1-1718540 3GPP TSG RAN WG1 Meeting #90bis, Prague, Czech Republic, Oct. 9-13, 2017, Source: Qualcomm Incorporated, Title: On Remaining Issues of CSI Reporting.

R1-1718910 3GPP TSG RAN WG1 Meeting #90bis, Prague, Czech Republic, Oct. 9-13, 2017, Source: ZTE, Sanechips, Title: Summary of CSI measurement.

R1-1719142 3GPP TSG RAN WG1 Meeting #90bis, Prague, Czech Republic, Oct. 9-13, 2017, Source: Ericsson, Title: Offline session notes CSI reporting (AI 7.2.2.2).

R1-1719425 3GPP TSG RAN WG1 Meeting #91, Reno, USA, Nov. 27-Dec. 1, 2017, Source: Huawei, HiSilicon, Title: Remaining issues for CSI reporting.

R1-1719434 3GPP TSG RAN WG1 Meeting #91, Reno, USA, Nov. 27-Dec. 1, 2017, Source: Huawei, HiSilicon, Title: Remaining details of UL power control design.

R1-1719435 3GPP TSG RAN WG1 Meeting #91, Reno, USA, Nov. 27-Dec. 1, 2017, Source: Huawei, HiSilicon, Title: Designs on power headroom calculation and reporting.

R1-1719488 3GPP TSG RAN WG1 Meeting #91, Reno, USA, Nov. 27-Dec. 1, 2017, Source: Mitsubishi Electric, Title: UL transmission power control.

R1-1719532 3GPP TSG RAN WG1 Meeting #91, Reno, USA, Nov. 27-Dec. 1, 2017, Source: ZTE, Sanechips, Title: Remaining details on CSI reporting.

R1-1719547 3GPP TSG RAN WG1 Meeting #91, Reno, USA, Nov. 27-Dec. 1, 2017, Source: ZTE, Sanechips, Title: On NR Power Control Framework.

R1-1719564 3GPP TSG RAN WG1 Meeting #91, Reno, USA, Nov. 27-Dec. 1, 2017, Source: MediaTek Inc., Title: Remaining details for CSI reporting.

R1-1719650 3GPP TSG RAN WG1 Meeting #91, Reno, USA, Nov. 27-Dec. 1, 2017, Source: AT&T, Title: Remaining details on bandwidth parts.

R1-1719651 3GPP TSG RAN WG1 Meeting #91, Reno, USA, Nov. 27-Dec. 1, 2017, Source: AT&T, Title: Remaining details on carrier aggregation.

R1-1719653 3GPP TSG RAN WG1 Meeting #91, Reno, USA, Nov. 27-Dec. 1, 2017, Source: AT&T, Title: Dynamic Power Control and Coverage Impact.

R1-1719696 3GPP TSG RAN WG1 Meeting #91, Reno, USA, Nov. 27-Dec. 1, 2017, Source: Spreadtrum Communications, Title: Remaining issues on CSI feedback.

R1-1719768 3GPP TSG RAN WG1 Meeting #91, Reno, USA, Nov. 27-Dec. 1, 2017, Source: vivo, Title: Remaining details on CSI reporting.

(56) References Cited

OTHER PUBLICATIONS

R1-1719779 3GPP TSG RAN WG1 Meeting #91, Reno, USA, Nov. 27-Dec. 1, 2017, Source: vivo, Title: Remaining issues on NR UL power control.
R1-1719820 3GPP TSG RAN WG1 Meeting #91, Reno, USA, Nov. 27-Dec. 1, 2017, Source: Huawei, HiSilicon, Title: Power control design for SUL and LNC.
R1-1719906 3GPP TSG RAN WG1 Meeting #91, Reno, USA, Nov. 27-Dec. 1, 2017, Source: LG Electronics, Title: Discussions on CSI reporting.
R1-1719932 3GPP TSG RAN WG1 Meeting #91, Reno, USA, Nov. 27-Dec. 1, 2017, Source: LG Electronics, Title: Remaining issues on UL data transmission procedure.
R1-1719944 3GPP TSG RAN WG1 Meeting #91, Reno, USA, Nov. 27-Dec. 1, 2017, Source: LG Electronics, Title: Discussion on UL power control for NR non-CA case.
R1-1719968 3GPP TSG RAN WG1 Meeting #91, Reno, USA, Nov. 27-Dec. 1, 2017, Source: OPPO, Title: On uplink power control for NR.
R1-1719989 3GPP TSG RAN WG1 Meeting #91, Reno, USA, Nov. 27-Dec. 1, 2017, Source: OPPO, Title: Discussion on Remaining Issues for LTE-NR Dual Connectivity.
R1-1720070 3GPP TSG RAN WG1 Meeting #91, Reno, USA, Nov. 27-Dec. 1, 2017, Source: Intel Corporation, Title: Remaining issues on CSI reporting.
R1-1720104 3GPP TSG RAN WG1 Meeting #91, Reno, USA, Nov. 27-Dec. 1, 2017, Source: Intel Corporation, Title: Remaining Details On UL Power Control Framework.
R1-1720105 3GPP TSG RAN WG1 Meeting #91, Reno, USA, Nov. 27-Dec. 1, 2017, Source: Intel Corporation, Title: Remaining aspects on power sharing between LTE and NR.
R1-1720181 3GPP TSG RAN WG1 Meeting #91, Reno, USA, Nov. 27-Dec. 1, 2017, Source: CATT, Title: Remaining details on CSI reporting.
R1-1720215 3GPP TSG RAN WG1 Meeting #91, Reno, USA, Nov. 27-Dec. 1, 2017, Source: CATT, Title: Remaining Aspects of NR Power Control.
R1-1720289 3GPP TSG RAN WG1 Meeting #91, Reno, USA, Nov. 27-Dec. 1, 2017, Source: Samsung, Title: CSI reporting and UCI multiplexing.
R1-1720361 3GPP TSG RAN WG1 Meeting #91, Reno, USA, Nov. 27-Dec. 1, 2017, Source: Samsung, Title: Remaining Issues on UL Power Control.
R1-1720363 3GPP TSG RAN WG1 Meeting #91, Reno, USA, Nov. 27-Dec. 1, 2017, Source: Samsung, Title: On PHR Requirements and Calculation.
R1-1720371 3GPP TSG RAN WG1 Meeting #91, Reno, USA, Nov. 27-Dec. 1, 2017, Source: Panasonic, Title: Discussion on NR power control framework.
R1-1720560 3GPP TSG RAN WG1 Meeting #91, Reno, USA, Nov. 27-Dec. 1, 2017, Source: InterDigital, Inc., Title: Power Control for NR DC.
R1-1720595 3GPP TSG RAN WG1 Meeting #91, Reno, USA, Nov. 27-Dec. 1, 2017, Source: CMCC, Title: Power Control for NR DC.
R1-1720612 3GPP TSG RAN WG1 Meeting #91, Reno, USA, Nov. 27-Dec. 1, 2017, Source: Sharp, APT, Title: Power Control for NR DC.
R1-1720628 3GPP TSG RAN WG1 Meeting #91, Reno, USA, Nov. 27-Dec. 1, 2017, Source: InterDigital, Inc., Title: Remaining issues on CSI reporting.
R1-1720646 3GPP TSG RAN WG1 Meeting #91, Reno, USA, Nov. 27-Dec. 1, 2017, Source: HTC, Title: Remaining issues on UL power control for NR.
R1-1720661 3GPP TSG RAN WG1 Meeting #91, Reno, USA, Nov. 27-Dec. 1, 2017, Source: Qualcomm Incorporated, Title: Remaining Details on CSI Reporting.
R1-1720706 3GPP TSG RAN WG1 Meeting #91, Reno, USA, Nov. 27-Dec. 1, 2017, Source: Qualcomm Incorporated, Title: Remaining Issues on Power Control for NR.
R1-1720711 3GPP TSG RAN WG1 Meeting #91, Reno, USA, Nov. 27-Dec. 1, 2017, Source: InterDigital, Inc., Title: Consideration for UL Power Control Framework.
R1-1720734 3GPP TSG RAN WG1 Meeting #91, Reno, USA, Nov. 27-Dec. 1, 2017, Source: Ericsson, Title: On remaining details of CSI reporting.
R1-1720746 3GPP TSG RAN WG1 Meeting #91, Reno, USA, Nov. 27-Dec. 1, 2017, Source: Ericsson, Title: On semi-persistent CSI reporting on PUSCH.
R1-1720802 3GPP TSG RAN WG1 Meeting #91, Reno, USA, Nov. 27-Dec. 1, 2017, Source: NTT Docomo, Inc., Title: Remaining Issues on CSI reporting.
R1-1720832 3GPP TSG RAN WG1 Meeting #91, Reno, USA, Nov. 27-Dec. 1, 2017, Source: NTT Docomo, Inc., Title: Remaining details on LTE-NR power sharing.
R1-1720889 3GPP TSG RAN WG1 Meeting #91, Reno, USA, Nov. 27-Dec. 1, 2017, Source: Nokia, Nokia Shanghai Bell, Title: Remaining details on CSI reporting.
May 13, 2019—European Search Report—19151142.7.
Huawei et al: "Independent and joint control of CSI-RS transmission and CSI reporting for NR MIMO", Jan. 16, 2017.
Huawei Hisilicon: "Independent and joint control of CSI-RS transmission and CSI reporting for NR MIMO", Nov. 13, 2016.
Mar. 25, 2019—European Search Report—EP 19150331.7.
Jan. 1, 2018—3GPP Standard; 3GPP TS 38.331—3rd Generation Partnership Project; Technical Specification Group Radio Access Network; NR; Radio Resource Control (RRC) Protocol specific (Release 15).
Sep. 17, 2017—3GPP TSG-RAN WG1 NR Ad Hoc #3—Ericsson "On semi-persistent CSI reporting on PUSCH".
3GPP TS 36.211 V14.4.0 (Sep. 2017), Technical Specification, 3rd Generation Partnership Project; Technical Specification Group Radio Access Network; Evolved Universal Terrestrial Radio Access (E-UTRA); Physical Channels and Modulation (Release 14).
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).
3GPP TS 36.212 V14.4.0 (Sep. 2017), Technical Specification, 3rd Generation Partnership Project; Technical Specification Group Radio Access Network; Evolved Universal Terrestrial Radio Access (E-UTRA); Multiplexing and Channel Coding (Release 14).
3GPP TS 36.213 V14.4.0 (Sep. 2017), Technical Specification, 3rd Generation Partnership Project; Technical Specification Group Radio Access Network; Evolved Universal Terrestrial Radio Access (E-UTRA); Physical Layer Procedures (Release 14).
3GPP TS 36.300 V14.4.0 (Sep. 2017), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14).
3GPP TS 36.321 V14.4.0 (Sep. 2017), Technical Specification, 3rd Generation Partnership Project; Technical Specification Group Radio Access Network; Evolved Universal Terrestrial Radio Access (E-UTRA); Medium Access Control (MAC) protocol Specification (Release 14).
3GPP TS 38.212 V15.0.0 (Dec. 2017), Technical Specification, 3rd Generation Partnership Project; Technical Specification Group Radio Access Network; NT; Multiplexing and Channel Coding (Release 15).
3GPP TS 38.213 V2.0.0 (Dec. 2017), Technical Specification, 3rd Generation Partnership Project; Technical Specification Group Radio Access Network; NR; Physical Layer Procedures for Control (Release 15).
3GPP TS 38.300 V2.0.0 (Dec. 2017), Technical Specification, 3rd Generation Partnership Project; Technical Specification Group Radio Access Network; NR; NR and NG-RAN Overall Description; Stage 2 (Release 15).
3GPP TS 38.321 V2.0.0 (Dec. 2017), Technical Specification, 3rd Generation Partnership Project; Technical Specification Group Radio Access Network; NR; Medium Access Control (MAC) Protocol Specification (Release 15).

(56) References Cited

OTHER PUBLICATIONS

3GPP TS 38.331 V15.0.0 (Dec. 2017), Technical Specification, 3rd Generation Partnership Project; Technical Specification Group Radio Access Network; NR; Radio Resource Control (RRC) Protocol Specification (Release 15).
3GPP TSG RAN WG1 Meeting #90bis, Prague, Czech Republic, Oct. 9-13, 2017, Title: RAN1 Chairman's Notes.
3GPP TS 38.213 V1.2.1 (Dec. 2017), Technical Specification, 3rd Generation Partnership Project; Technical Specification Group Radio Access Network; NR; Physical Layer Procedures for Control (Release 15).
3GPP TS 38.214 V1.2.1 (Dec. 2017), Technical Specification, 3rd Generation Partnership Project; Technical Specification Group Radio Access Network; NR; Physical Layer Procedures for Data (Release 15).
R2-180xxxx 3GPP TSG RAN WG2 Meeting #101, Sanya, China, Apr. 16-20, 2018, Source: Nokia, Nokia Shanghai Bell, Title: Running MAC CR for euCA.
R1-1803571 3GPP TSG RAN WG1 Meeting #92bis, Sanya, China, Apr. 16-20, 2018, Source: MCC Support, Title: Final Report of 3GPP TSG RAN WG1 #92 v1.0.0.
R1-1721510 3GPP TSG RAN WG1 Meeting #91, Reno, USA, Nov. 27-Dec. 1, 2017, Source: NTT Docomo, Inc., Title: Offline summary for AI 7.3.3.4 UL data transmission procedure.
R1-1709907 3GPP TSG-RAN WG1 NR Ad Hoc, Qingdao, China, Jun. 27-30, 2017, Source: Xinwei, Title: Discussion on Beam Failure Recovery.
R1-1709929 3GPP TSG-RAN WG1 NR Ad Hoc, Qingdao, China, Jun. 27-30, 2017, Source: Huawei, HiSilicon, Title: General views on beam failure recovery.
R1-1710058 3GPP TSG-RAN WG1 NR Ad Hoc, Qingdao, China, Jun. 27-30, 2017, Source: CATT, Title: Considerations on DL beam failure and recovery.
R1-1710283 3GPP TSG-RAN WG1 NR Ad Hoc, Qingdao, China, Jun. 27-30, 2017, Source: LG Electronics, Title: Discussion on beam failure recovery.
R1-1710400 3GPP TSG-RAN WG1 NR Ad Hoc, Qingdao, China, Jun. 27-30, 2017, Source: vivo, Title: Beam failure recovery procedure.
R1-1710596 3GPP TSG-RAN WG1 NR Ad Hoc, Qingdao, China, Jun. 27-30, 2017, Source: Lenovo, Motorola Mobility, Title: Discussion of beam recovery procedure.
R1-1710810 3GPP TSG-RAN WG1 NR Ad Hoc, Qingdao, China, Jun. 27-30, 2017, Source: MediaTek Inc., Title: Mechanism for flexible beam failure recovery.
R1-1710926 3GPP TSG-RAN WG1 NR Ad Hoc, Qingdao, China, Jun. 27-30, 2017, Source: InterDigital, Inc., Title: On Remaining Details of Beam Failure Recovery.
R1-1711017 3GPP TSG-RAN WG1 NR Ad Hoc, Qingdao, China, Jun. 27-30, 2017, Source: Ericsson, Title: Mechanism to recover from beam failure.
R1-1711291 3GPP TSG-RAN WG1 NR Ad Hoc, Qingdao, China, Jun. 27-30, 2017, Source: Nokia, Alcatel-Lucent Shanghai Bell, Title: Beam Recovery.
R1-1712153 3GPP TSG RAN WG1 Meeting #90, Prague, Czech Republic, Aug. 21-25, 2017, Source: Huawei, HiSilicon, Title: Overview of bandwidth part.
R1-1713204 3GPP TSG RAN WG1 Meeting #90, Prague, Czech Republic, Aug. 21-25, 2017, Source: LG Electronics, Title: Further remaining details on wider bandwidth operation.
R1-1713978 3GPP TSG RAN WG1 Meeting #90, Prague, Czech Republic, Aug. 21-25, 2017, Source: MediaTek Inc., Title: Further Details on Bandwidth Part Operation in NR.
R1-1715439 3GPP TSG RAN WG1 Meeting NR Ad Hoc, Nagoya, Japan, Sep. 18-21, 2017, Source: ZTE, Sanechips, Title: Remaining details on CSI reporting.
R1-1715858 3GPP TSG RAN WG1 Meeting NR Ad Hoc, Nagoya, Japan, Sep. 18-21, 2017, Source: LG Electronics, Title: Discussions on CSI reporting.
R1-1715939 3GPP TSG RAN WG1 Meeting NR Ad Hoc, Nagoya, Japan, Sep. 18-21, 2017, Source: Samsung, Title: CSI reporting and UCI multiplexing.
R1-1716349 3GPP TSG RAN WG1 Meeting NR Ad Hoc, Nagoya, Japan, Sep. 18-21, 2017, Source: Ericsson, Title: On CSI reporting.
R1-1716357 3GPP TSG RAN WG1 Meeting NR Ad Hoc, Nagoya, Japan, Sep. 18-21, 2017, Source: Ericsson, Title: On semi-persistent CSI reporting on PUSCH.
R1-1716901 3GPP TSG RAN WG1 Meeting NR Ad Hoc, Nagoya, Japan, Sep. 18-21, 2017, Source: Samsung, Ericsson, Huawei, HiSilicon, ZTE, Sanechips, Mediatek, NTT Docomo, Nokia, Nokia Shanghai Bell, KDDI, Vodafone, CEWiT, IITH, IITM, Tejas Networks, Verizon, Deutsche Telekom, Softbank, CHTTL, NEC, WILUS, Sharp, China Unicom, ITL, KRRI, CMCC, ASTRI, KT Corporation, BT, Sprint, LG Electronics, AT&T, Title: WF for Open Issues on CSI Reporting.
R1-1717300 3GPP TSG RAN WG1 Meeting #90bis, Prague, Czech Republic, Oct. 9-13, 2017, Source: Huawei, HiSilicon, Title: Details of CSI reporting on PUCCH/PUSCH.
R1-1717367 3GPP TSG RAN WG1 Meeting #90bis, Prague, Czech Republic, Oct. 9-13, 2017, Source: Intel Corporation, Title: Remaining issues on CSI reporting.
R1-1717423 3GPP TSG RAN WG1 Meeting #90bis, Prague, Czech Republic, Oct. 9-13, 2017, Source: ZTE, Sanechips, Title: Remaining details on CSI reporting.
R1-1717471 3GPP TSG RAN WG1 Meeting #90bis, Prague, Czech Republic, Oct. 9-13, 2017, Source: vivo, Title: Discussion on CSI reporting.
R1-1717604 3GPP TSG RAN WG1 Meeting #90bis, Prague, Czech Republic, Oct. 9-13, 2017, Source: Samsung, Title: CSI reporting and UCI multiplexing.
R1-1717811 3GPP TSG RAN WG1 Meeting #90bis, Prague, Czech Republic, Oct. 9-13, 2017, Source: CATT, Title: Remaining issues on CSI reporting.
R1-1717940 3GPP TSG RAN WG1 Meeting #90bis, Prague, Czech Republic, Oct. 9-13, 2017, Source: LG Electronics, Title: Discussions on CSI reporting.
R1-1718191 3GPP TSG RAN WG1 Meeting #90bis, Prague, Czech Republic, Oct. 9-13, 2017, Source: NTT Docomo, Inc., Title: Remaining Issues on Feedback Design for CSI Type I and Type II.
R1-1700035 3GPP TSG RAN WG1 NR Ad Hoc, Spokane, USA, Jan. 16-20, 2017, Source: Huawei, HiSilicon, Title: Further Consideration on two-step RACH.
R1-1700105 3GPP TSG RAN WG1 NR Ad Hoc, Spokane, USA, Jan. 16-20, 2017, Source: ZTE, ZTE Microelectronics, Title: 2-step Random Access Procedure.
R1-1700172 3GPP TSG RAN WG1 NR Ad Hoc, Spokane, USA, Jan. 16-20, 2017, Source: MediaTek Inc., Title: On 2-step random access procedure and physical channel in NR.
R1-1700186 3GPP TSG RAN WG1 NR Ad Hoc, Spokane, USA, Jan. 16-20, 2017, Source: CATT, Title: Further considerations on a 2-step RA Procedure.
R1-1700300 3GPP TSG RAN WG1 NR Ad Hoc, Spokane, USA, Jan. 16-20, 2017, Source: Ericsson, Title: NR two-step random access procedure.
R1-1700311 3GPP TSG RAN WG1 NR Ad Hoc, Spokane, USA, Jan. 16-20, 2017, Source: AT&T, Title: 2-Step RA Procedure for NR.
R1-1700426 3GPP TSG RAN WG1 NR Ad Hoc, Spokane, USA, Jan. 16-20, 2017, Source: ITRI, Title: Discussion on 2-step RA procedure issues.
R1-1700464 3GPP TSG RAN WG1 NR Ad Hoc, Spokane, USA, Jan. 16-20, 2017, Source: LG Electronics, Title: Discussion on 2 step RACH.
R1-1700577 3GPP TSG RAN WG1 NR Ad Hoc, Spokane, USA, Jan. 16-20, 2017, Source: ETRI, Title: On 2-step RA procedure for NR.
R1-1700587 3GPP TSG RAN WG1 NR Ad Hoc, Spokane, USA, Jan. 16-20, 2017, Source: HTC, Title: Design considerations for 2-step RACH.
R1-1700652 3GPP TSG RAN WG1 NR Ad Hoc, Spokane, USA, Jan. 16-20, 2017, Source: Nokia, Alcatel-Lucent Shanghai Bell, Title: On 2-step Random Access Procedure.

(56) References Cited

OTHER PUBLICATIONS

R1-1700668 3GPP TSG RAN WG1 NR Ad Hoc, Spokane, USA, Jan. 16-20, 2017, Source: Sony, Title: Discussions on 2 Steps RACH Procedure.
R1-1700703 3GPP TSG RAN WG1 NR Ad Hoc, Spokane, USA, Jan. 16-20, 2017, Source: InterDigital Communications, Title: 2-step random access procedure.
R1-1700792 3GPP TSG RAN WG1 NR Ad Hoc, Spokane, USA, Jan. 16-20, 2017, Source: Qualcomm Incorporated, Title: 2-step RACH procedure consideration.
R1-1700880 3GPP TSG RAN WG1 NR Ad Hoc, Spokane, USA, Jan. 16-20, 2017, Source: Motorola Mobility, Title: Physical channel design for 2-step RACH.
R1-1700892 3GPP TSG RAN WG1 NR Ad Hoc, Spokane, USA, Jan. 16-20, 2017, Source: Samsung, Title: NR 2-step random access procedure.
R1-1701275 3GPP TSG RAN WG1 NR Ad Hoc, Spokane, USA, Jan. 16-20, 2017, Source: ZTE, ZTE Microelectronics, MediaTek, Title: WF on 2-Step RACH.
R1-1703139 3GPP TSG RAN WG1 Meeting #88, Athens, Greece, Feb. 13-17, 2017, Source: Sony, Title: Wake Up Radio for NR.
R1-1704282 3GPP TSG RAN WG1 Meeting #88bis, Spokane, USA, Apr. 3-7, 2017, Source: Huawei, HiSilicon, Title: Considerations on 'wake-up signal' for eFeMTC.
R1-1704290 3GPP TSG RAN WG1 Meeting #88bis, Spokane, USA, Apr. 3-7, 2017, Source: Huawei, HiSilicon, Title: On 'wake-up signal' for paging and connected-mode DRX.
R1-1704531 3GPP TSG RAN WG1 Meeting #88bis, Spokane, USA, Apr. 3-7, 2017, Source: CATT, Title: UE Wakeup Mechanism and On-Demand Access for efeMTC UE Power Saving.
R1-1704532 3GPP TSG RAN WG1 Meeting #88bis, Spokane, USA, Apr. 3-7, 2017, Source: CATT, Title: UE Wakeup Mechanism and On-Demand Access for fNB-IoT UE Power Saving.
R1-1704693 3GPP TSG RAN WG1 Meeting #88bis, Spokane, USA, Apr. 3-7, 2017, Source: Intel Corporation, Title: DL Power Consumption Reduction for efeMTC.
R1-1704698 3GPP TSG RAN WG1 Meeting #88bis, Spokane, USA, Apr. 3-7, 2017, Source: Intel Corporation, Title: DL Power Consumption Reduction for feNB-IoT.
R1-1704845 3GPP TSG RAN WG1 Meeting #88bis, Spokane, USA, Apr. 3-7, 2017, Source: LG Electronics, Title: UE power consumption reduction by new physical channel in MTC.
R1-1704847 3GPP TSG RAN WG1 Meeting #88bis, Spokane, USA, Apr. 3-7, 2017, Source: LG Electronics, Title: UE power consumption reduction by new physical channel in NB-IoT.
R1-1705012 3GPP TSG RAN WG1 Meeting #88bis, Spokane, USA, Apr. 3-7, 2017, Source: Qualcomm Incorporated, Title: Efficient monitoring of DL control channels.
R1-1705017 3GPP TSG RAN WG1 Meeting #88bis, Spokane, USA, Apr. 3-7, 2017, Source: Qualcomm Incorporated, Title: Efficient monitoring of DL control channels.
R1-1705038 3GPP TSG RAN WG1 Meeting #88bis, Spokane, USA, Apr. 3-7, 2017, Source: Nokia, Alcatel-Lucent Shanghai Bell, Title: Signalling for efficient decoding of physical channels.
R1-1705043 3GPP TSG RAN WG1 Meeting #88bis, Spokane, USA, Apr. 3-7, 2017, Source: Nokia, Alcatel-Lucent Shanghai Bell, Title: Signalling for efficient decoding of physical channels.
R1-1705182 3GPP TSG RAN WG1 Meeting #88bis, Spokane, USA, Apr. 3-7, 2017, Source: Ericsson, Title: Power consumption reduction for paging and connected-mode DRX.
R1-1705192 3GPP TSG RAN WG1 Meeting #88bis, Spokane, USA, Apr. 3-7, 2017, Source: Ericsson, Title: Power consumption reduction for paging and connected-mode DRX.
R1-1705204 3GPP TSG RAN WG1 Meeting #88bis, Spokane, USA, Apr. 3-7, 2017, Source: Sony, Title: MTC UE Power Consumption Reduction in Idle Mode Paging.
R1-1705305 3GPP TSG RAN WG1 Meeting #88bis, Spokane, USA, Apr. 3-7, 2017, Source: Samsung, Title: Power consumption reduction for paging and connected-mode DRX for eMTC.
R1-1705309 3GPP TSG RAN WG1 Meeting #88bis, Spokane, USA, Apr. 3-7, 2017, Source: Samsung, Title: Power consumption reduction for paging and connected-mode DRX for NB-IOT.
R1-1705494 3GPP TSG RAN WG1 Meeting #88bis, Spokane, USA, Apr. 3-7, 2017, Source: ZTE, ZTE Microelectronics, Title: Power consumption reduction for physical channels for MTC.
R1-1705495 3GPP TSG RAN WG1 Meeting #88bis, Spokane, USA, Apr. 3-7, 2017, Source: ZTE, ZTE Microelectronics, Title: Power consumption reduction for physical channels for NB-IoT.
R1-1706882 3GPP TSG RAN WG1 Meeting #89, Hangzhou, P.R. China, May 15-19, 2017, Source: Ericsson, Title: Downlink channel power efficiency for MTC.
R1-1707018 3GPP TSG RAN WG1 Meeting #89, Hangzhou, P.R. China, May 15-19, 2017, Source: Huawei, HiSilicon, Title: On 'wake-up signal' for eFeMTC.
R1-1707101 3GPP TSG RAN WG1 Meeting #89, Hangzhou, P.R. China, May 15-19, 2017, Source: ZTE, Title: Power consumption reduction for physical channels for MTC.
R1-1707315 3GPP TSG RAN WG1 Meeting #89, Hangzhou, P.R. China, May 15-19, 2017, Source: Intel Corporation, Title: Analysis of impact of Wake-up signaling on power consumption and resource efficiency for efeMTC.
R1-1707455 3GPP TSG RAN WG1 Meeting #89, Hangzhou, P.R. China, May 15-19, 2017, Source: CATT, Title: UE Wakeup Mechanism and On-Demand Access for efeMTC UE Power Saving.
R1-1707568 3GPP TSG RAN WG1 Meeting #89, Hangzhou, P.R. China, May 15-19, 2017, Source: LG Electronics, Title: UE power consumption reduction by new physical signal/channel in MTC.
R1-1707862 3GPP TSG RAN WG1 Meeting #89, Hangzhou, P.R. China, May 15-19, 2017, Source: Nokia, Alcatel-Lucent Shanghai Bell, Title: Signalling for efficient decoding of physical channels.
R1-1708311 3GPP TSG RAN WG1 Meeting #89, Hangzhou, P.R. China, May 15-19, 2017, Source: Sierra Wireless, Title: Idle Mode Power Efficiency Reduction.
R1-1708796 3GPP TSG RAN WG1 Meeting #89, Hangzhou, P.R. China, May 15-19, 2017, Source: Qualcomm Incorporated, Title: Efficient monitoring of DL control channels.
R1-1712106 3GPP TSG RAN WG1 Meeting #90, Prague, Czech Republic, Aug. 21-25, 2017, Source: Huawei, HiSilicon, Title: On power-saving signal for eFeMTC.
R1-1804405 3GPP TSG RAN WG1 Meeting #92, Sanya, China, Apr. 16-20, 2018, Source: Samsung, Title: Potential physical layer procedures for NR-U.
R1-1808272 3GPP TSG RAN WG1 Meeting #94, Gothenburg, Sweden, Aug. 20-24, 2018, Source: MediaTek Inc., Title: On downlink transmission detection in NR-U.
R1-1808319 3GPP TSG RAN WG1 Meeting #94, Gothenburg, Sweden, Aug. 20-24, 2018, Source: ZTE, Title: Considerations on DL reference signals and channels design for NR-U.
R1-1720903 3GPP TSG RAN WG1 Meeting #91, Reno, USA, Nov. 27-Dec. 1, 2017, Source: ASUSTek, Title: Power control on SRS for beam management.
R1-1720915 3GPP TSG RAN WG1 Meeting #91, Reno, USA, Nov. 27-Dec. 1, 2017, Source: China Telecom, Title: Discussion on Power Offset for SUL.
R1-1720928 3GPP TSG RAN WG1 Meeting #91, Reno, USA, Nov. 27-Dec. 1, 2017, Source: Motorola Mobility, Lenovo, Title: On non-CA NR UL power control.
R1-1721027 3GPP TSG RAN WG1 Meeting #91, Reno, USA, Nov. 27-Dec. 1, 2017, Source: Ericsson, Title: On Carrier aggregation related aspects.
R1-1721028 3GPP TSG RAN WG1 Meeting #91, Reno, USA, Nov. 27-Dec. 1, 2017, Source: Ericsson, Title: Remaining issues for NR power control framework.
R1-1721030 3GPP TSG RAN WG1 Meeting #91, Reno, USA, Nov. 27-Dec. 1, 2017, Source: Ericsson, Title: Power headroom reporting.
R1-1721031 3GPP TSG RAN WG1 Meeting #91, Reno, USA, Nov. 27-Dec. 1, 2017, Source: Ericsson, Title: Remaining issues of closed loop power control in NR.
R1-1721032 3GPP TSG RAN WG1 Meeting #91, Reno, USA, Nov. 27-Dec. 1, 2017, Source: Ericsson, Title: Remaining issues of PUSCH power control.

(56) References Cited

OTHER PUBLICATIONS

R1-1721033 3GPP TSG RAN WG1 Meeting #91, Reno, USA, Nov. 27-Dec. 1, 2017, Source: Ericsson, Title: Remaining issues of PUCCH power control.
R1-1721034 3GPP TSG RAN WG1 Meeting #91, Reno, USA, Nov. 27-Dec. 1, 2017, Source: Ericsson, Title: Remaining issues of SRS power control.
R1-1721038 3GPP TSG RAN WG1 Meeting #91, Reno, USA, Nov. 27-Dec. 1, 2017, Source: Nokia, Nokia Shanghai Bell, Title: Remaining details on NR power control framework.
3GPP TS 38.212 V1.2.1 (Dec. 2017), Technical Specification, 3rd Generation Partnership Project; Technical Specification Group Radio Access Network; NR; Multiplexing and Channel Coding (Release 15).
R1-1721371 3GPP TSG RAN WG1 Meeting #91, Reno, USA, Nov. 27-Dec. 1, 2017, Source: ZTE, Sanechips, Title: Summary of remaining issues on CSI measurement.
R1-1721451 3GPP TSG RAN WG1 Meeting #91, Reno, USA, Nov. 27-Dec. 1, 2017, Source: Ericsson, Title: Summary of views on CSI reporting.
R1-1800879 3GPP TSG RAN WG1 NR Ad Hoc, Vancouver, Canada, Jan. 22-26, 2018, Source: Qualcomm Incorporated, Title: Remaining Issues on BWP.
R1-1803301 3GPP TSG RAN WG1 Meeting #92, Athens, Greece, Feb. 26-Mar. 2, 2018, Source: Ericsson, Title: Summary of CSI reporting v3.
R2-1706680 3GPP TSG-RAN WG2 NR Ad Hoc, Qingdao, China, Jun. 27-30, 2017, Source: AT&T, Title: Beam Failure Recovery Mechanism and RLF.
R2-1713170 3GPP TSG RAN WG2 Meeting #100, Reno, USA, Nov. 27-Dec. 1, 2017, Source: Nokia (rapporteur), Title: Report of [99bis#32][LTE/euCA] Faster activation for Scells (Nokia).
R2-1714289 3GPP TSG RAN WG2 Meeting #100, Reno, USA, Nov. 27-Dec. 1, 2017, Source: Nokia, Nokia Shanghai Bell, Title: Running CR for euCA Stage-2.
R2-1801432 3GPP TSG RAN WG2 NR Ad Hoc, Vancouver, Canada, Jan. 22-26, 2018, Source: Qualcomm Incorporated, Title: Dormant BWP for fast SCell activation.
R2-1802756 3GPP TSG RAN WG2 Meeting #101, Athens, Greece, Feb. 26-Mar. 2, 2018, Source: Nokia, Nokia Shanghai Bell, Title: Remaining details on temporary CQI reporting during activation.
R2-1803564 3GPP TSG RAN WG2 Meeting #101, Athens, Greece, Feb. 26-Mar. 2, 2018, Source: Qualcomm Incorporated, Title: Dormant BWP for fast SCell activation.
R2-1806774 3GPP TSG RAN WG2 Meeting #102, Busan, Korea, May 21-25, 2018, Source: Nokia, Nokia Shanghai Bell, Title: Finalization of dormant Scell state.
R2-1806924 3GPP TSG RAN WG2 Meeting #102, Busan, Korea, May 21-25, 2018, Source: Qualcomm Incorporated, Title: SCell Dormant State Transitions based on New Timers & MAC-CEs.
R2-1807481 3GPP TSG RAN WG2 Meeting #102, Busan, Korea, May 21-25, 2018, Source: Huawei, HiSilicon, Title: Remaining issues of temporary CQI reporting.
R2-1808570 3GPP TSG RAN WG2 Meeting #102, Busan, Korea, May 21-25, 2018, Source: Qualcomm Incorporated, Title: Dormant BWP for fast SCell activation.
R2-1808809 3GPP TSG RAN WG2 Meeting #102, Busan, Korea, May 21-25, 2018, Source: Ericsson, Title: CR on Dormat SCell state transition MAC CE.
R2-1810063 3GPP TSG RAN WG2 NR Ad Hoc, Busan, Korea, Jul. 2-6, 2018, Source: Ericsson, Title: Dormant SCell state in NR.
3GPP TSG-RAN WG2 NR Ad Hoc, Qingdao, China, Jun. 27-30, 2017, Source: RAN2 Chairman (Intel), Title: Chairman Notes.
3GPP TS 38.211 V2.0.0 (Dec. 2017), Technical Specification, 3rd Generation Partnership Project; Technical Specification Group Radio Access Network; NR; Physical Channels and Modulation (Release 15).
3GPP TS 38.214 V2.0.0 (Dec. 2017), Technical Specification, 3rd Generation Partnership Project; Technical Specification Group Radio Access Network; NR; Physical Layer Procedures for Data (Release 15).
3GPP TS 38.331 V1.0.0 (Dec. 2017), Technical Specification, 3rd Generation Partnership Project; Technical Specification Group Radio Access Network; NR; Radio Resource Control (RRC) Protocol Specification (Release 15).
RP-181344 3GPP TSG RAN Meeting #80, La Jolla, USA, Jun. 11-14, 2018, Source: Ericsson, Nokia, Nokia Shanghai Bell, Huawei, Title: New WID on MR-DC enhancements (NR_MRDC_Enh).
3GPP TS 38.331 V0.4.0 (Dec. 2017), Technical Specification, 3rd Generation Partnership Project; Technical Specification Group Radio Access Network; NR; Radio Resource Control (RRC) Protocol Specification (Release 15).
R1-18xxxx 3GPP TSG RAN WG1 Meeting #95, Spokane, USA, Nov. 12-16, 2018, Source: OPPO, Title: Summary of RAN1#95 Tdocs on UCI enhancements for URLLC.
3GPP TS 38.213 V15.2.0 (Jun. 2018), Technical Specification, 3rd Generation Partnership Project; Technical Specification Group Radio Access Network; NR; Physical layer procedures for control (Release 15).
3GPP TS 38.321 V15.2.0 (Jun. 2018), Technical Specification, 3rd Generation Partnership Project; Technical Specification Group Radio Access Network; NR; Medium Access Control (MAC) protocol specification (Release 15).
3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15).
Lagent, et al., "New Radio Beam-Based Access to Unlicensed Spectrum: Design Challenges and Solutions," InterDigital Communications, Inc., Melville, New York, USA, Sep. 27, 2018.
R1-1701260 3GPP TSG RAN WG1 NR Ad Hoc, Spokane, USA, Jan. 16-20, 2017, Source: ZTE, ZTE Microelectronics, Title: WF on 2-step RACH.
R1-1613547 3GPP TSG RAN WG1 Metting #87, Reno, USA, Nov. 14-18, 2016, Source: Nokia, InterDigital, Title: Way Forward on Two-Step RACH Fallback.
R1-1613548 3GPP TSG RAN WG1 Metting #87, Reno, USA, Nov. 14-18, 2016, Source: Nokia, Title: Way Forward on Two-Step RACH Procedure.
R1-1613685 3GPP TSG RAN WG1 Metting #87, Reno, USA, Nov. 14-18, 2016, Source: Nokia, ASB, MediaTek, Ericson, Title: Way Forward on Two-Step RACH Procedure.
R1-1611274 3GPP TSG RAN WG1 Metting #87, Reno, USA, Nov. 14-18, 2016, Source: ZTE Corporation, ZTE Microelectronics, Title: On 2-Step RACH Procedure in NR.
R1-1611694 3GPP TSG RAN WG1 Metting #87, Reno, USA, Nov. 14-18, 2016, Source: Huawei, HiSilicon, Title: Considerations on NR RACH Preamble and Channel Design.
R1-1612033 3GPP TSG RAN WG1 Metting #87, Reno, USA, Nov. 14-18, 2016, Source: Qualcomm Incorporated, Title: 2 step and 4 step RACH.
R1-1612068 3GPP TSG RAN WG1 Metting #87, Reno, USA, Nov. 14-18, 2016, Source: Qualcomm Incorporated, Title: UE Power Evaluation for DRX with Wake-Up Signaling.
R1-1612142 3GPP TSG RAN WG1 Metting #87, Reno, USA, Nov. 14-18, 2016, Source: MediaTek Inc., Title: Considerations on 2-step RACH physical channel design.
R1-1612218 3GPP TSG RAN WG1 Metting #87, Reno, USA, Nov. 14-18, 2016, Source: ETRI, Title: On 2-step RACH procedure for high speed train scenario for NR.
R1-1612299 3GPP TSG RAN WG1 Metting #87, Reno, USA, Nov. 14-18, 2016, Source: Nokia, Alcatel-Lucent Shanghai Bell, Title: Random access principles for new radio.
R1-1808612 3GPP TSG RAN WG1 Meeting #94, Gothenburg, Sweden, Aug. 20-24, 2018, Source: Apple Inc., Title: On DL Signals and Channels for NR-U.
R1-1808683 3GPP TSG RAN WG1 Meeting #94, Gothenburg, Sweden, Aug. 20-24, 2018, Source: Intel Corporation, Title: Enhancements to NR DL signals and channels for unlicensed operation.

(56) References Cited

OTHER PUBLICATIONS

R1-1809477 3GPP TSG RAN WG1 Meeting #94, Gothenburg, Sweden, Aug. 20-24, 2018, Source: Qualcomm Incorporated, Title: DL signals and channels for NR-U.
R1-1810154 3GPP TSG RAN WG1 Meeting #94bis, Chengdu, China, Oct. 8-12, 2018, Source: Huawei, HiSilicon, Title: Power consumption reduction based on time/frequency/antenna adaptation.
R1-1810338 3GPP TSG RAN WG1 Meeting #94bis, Chengdu, China, Oct. 8-12, 2018, Source: ZTE, Title: Consideration on UE adaptation to the traffic and UE power consumption characteristics.
R1-1810413 3GPP TSG RAN WG1 Meeting #94bis, Chengdu, China, Oct. 8-12, 2018, Source: vivo, Title: Techniques on UE adaptation to the traffic and UE power consumption characteristics.
R1-1810448 3GPP TSG RAN WG1 Meeting #94bis, Chengdu, China, Oct. 8-12, 2018, Source: MediaTek Inc., Title: UE adaptation to the traffic and UE power consumption characteristics.
R1-1810468 3GPP TSG RAN WG1 Meeting #94bis, Chengdu, China, Oct. 8-12, 2018, Source: Panasonic, Title: Discussion on UE traffic adaptation and power consumption characteristics.
R1-1810562 3GPP TSG RAN WG1 Meeting #94bis, Chengdu, China, Oct. 8-12, 2018, Source: CATT, Title: UE Power Saving Scheme with Multi-dimensional Adaptation.
R1-1810795 3GPP TSG RAN WG1 Meeting #94bis, Chengdu, China, Oct. 8-12, 2018, Source: Intel Corporation, Title: UE Adaptation to the traffic and UE power consumption characteristics.
R1-1810892 3GPP TSG RAN WG1 Meeting #94bis, Chengdu, China, Oct. 8-12, 2018, Source: Samsung, Title: Discussion on UE adaptation schemes.
R1-1811050 3GPP TSG RAN WG1 Meeting #94bis, Chengdu, China, Oct. 8-12, 2018, Source: CMCC, Title: Considerations for UE power saving.
R1-1811127 3GPP TSG RAN WG1 Meeting #94bis, Chengdu, China, Oct. 8-12, 2018, Source: Apple Inc., Title: Network-indication based Approaches for UE Power Saving.
R1-1812232 3GPP TSG RAN WG1 Meeting #95, Spokane, USA, Nov. 12-16, 2018, Source: Huawei, HiSilicon, Title: Design of power saving signal.
R1-1812331 3GPP TSG RAN WG1 Meeting #95, Spokane, USA, Nov. 12-16, 2018, Source: vivo, Title: Discussion on triggering adaptation of UE power consumption characteristics.
R1-1812362 3GPP TSG RAN WG1 Meeting #95, Spokane, USA, Nov. 12-16, 2018, Source: MediaTek Inc., Title: Triggering adaptation for UE power saving.
R1-1812422 3GPP TSG RAN WG1 Meeting #95, Spokane, USA, Nov. 12-16, 2018, Source: ZTE, Title: Considerations on triggering for UE power saving.
R1-1812514 3GPP TSG RAN WG1 Meeting #95, Spokane, USA, Nov. 12-16, 2018, Source: Intel Corporation, Title: Triggering UE adaptation to power consumption characteristics.
R1-1812591 3GPP TSG RAN WG1 Meeting #95, Spokane, USA, Nov. 12-16, 2018, Source: LG Electronics, Title: Discussion on power saving for CA operation.
R1-1812642 3GPP TSG RAN WG1 Meeting #95, Spokane, USA, Nov. 12-16, 2018, Source: CATT, Title: UE Power saving schemes with power saving signal/channel/procedures.
R1-1812750 3GPP TSG RAN WG1 Meeting #95, Spokane, USA, Nov. 12-16, 2018, Source: Sony, Title: Conditions and procedures for adaptation of power consumption characteristics.
R1-1812825 3GPP TSG RAN WG1 Meeting #95, Spokane, USA, Nov. 12-16, 2018, Source: OPPO, Title: Triggering Adaptation of UE Power Consumption Characteristics.
R1-1812890 3GPP TSG RAN WG1 Meeting #95, Spokane, USA, Nov. 12-16, 2018, Source: CMCC, Title: Considerations on power saving signal design.
R1-1812926 3GPP TSG RAN WG1 Meeting #95, Spokane, USA, Nov. 12-16, 2018, Source: Apple Inc., Title: Power Saving Techniques based on Explicit Indication.
R1-1813012 3GPP TSG RAN WG1 Meeting #95, Spokane, USA, Nov. 12-16, 2018, Source: Samsung, Title: Triggering adaptation schemes.
R1-1813076 3GPP TSG RAN WG1 Meeting #95, Spokane, USA, Nov. 12-16, 2018, Source: Spreadtrum Communications, Title: Discussion on triggering adaptation for UE power saving.
R1-1813183 3GPP TSG RAN WG1 Meeting #95, Spokane, USA, Nov. 12-16, 2018, Source: Ericsson, Title: Triggers of NR UE power saving.
R1-1813244 3GPP TSG RAN WG1 Meeting #95, Spokane, USA, Nov. 12-16, 2018, Source: InterDigital, Inc., Title: Discussion on Triggering of Power Mode Adaptation.
R1-1813448 3GPP TSG RAN WG1 Meeting #95, Spokane, USA, Nov. 12-16, 2018, Source: Qualcomm Incorporated, Title: Triggering Adaptation of UE Power Consumption Characteristics.
R1-1813495 3GPP TSG RAN WG1 Meeting #95, Spokane, USA, Nov. 12-16, 2018, Source: Panasonic, Title: Discussion on UE traffic adaptation procedures.
R1-1813516 3GPP TSG RAN WG1 Meeting #95, Spokane, USA, Nov. 12-16, 2018, Source: ASUSTek, Title: Triggering adaptation of UE power consumption.
R1-1813621 3GPP TSG RAN WG1 Meeting #95, Spokane, USA, Nov. 12-16, 2018, Source: Nokia, Nokia Shanghai Bell, Title: On UE Power Saving Triggering Mechanisms.
R1-1813625 3GPP TSG RAN WG1 Meeting #95, Spokane, USA, Nov. 12-16, 2018, Source: Convida Wireless, Title: Triggering Adaptation of UE Power Consumption Characteristics.
R2-1700019 3GPP TSG RAN WG2 NR Ad Hoc, Spokane, USA, Jan. 17-19, 2017, Source: Samsung, Title: Random Access in NR-Flexible UE Bandwidth Aspects.
R2-1700023 3GPP TSG RAN WG2 NR Ad Hoc, Spokane, USA, Jan. 17-19, 2017, Source: ASUSTek, Title: Consideration on use cases of 2-step RACH procedure.
R2-1700024 3GPP TSG RAN WG2 NR Ad Hoc, Spokane, USA, Jan. 17-19, 2017, Source: ASUSTek, Title: Consideration on fallback of 2-step RACH procedure.
R2-1700089 3GPP TSG RAN WG2 NR Ad Hoc, Spokane, USA, Jan. 17-19, 2017, Source: Huawei, HiSilicon, Title: Considerations on RACH procedure in NR.
R2-1700103 3GPP TSG RAN WG2 NR Ad Hoc, Spokane, USA, Jan. 17-19, 2017, Source: National Instruments, Title: Considerations on the Random-Access Procedure in Massive MIMO NR.
R2-1700137 3GPP TSG RAN WG2 NR Ad Hoc, Spokane, USA, Jan. 17-19, 2017, Source: Sony, Title: 2-step RACH to 4-step RACH fallback.
R2-1700155 3GPP TSG RAN WG2 NR Ad Hoc, Spokane, USA, Jan. 17-19, 2017, Source: ZTE, ZTE Microelectronics, Title: Consideration on the two-step RACH in NR.
R2-1700202 3GPP TSG RAN WG2 NR Ad Hoc, Spokane, USA, Jan. 17-19, 2017, Source: CATT, Title: Design principles for random access procedure in NR.
R2-1700203 3GPP TSG RAN WG2 NR Ad Hoc, Spokane, USA, Jan. 17-19, 2017, Source: CATT, Title: Random access procedure in NR.
R2-1700204 3GPP TSG RAN WG2 NR Ad Hoc, Spokane, USA, Jan. 17-19, 2017, Source: CATT, Title: Impact of NR physical layer design on RA.
R2-1700205 3GPP TSG RAN WG2 NR Ad Hoc, Spokane, USA, Jan. 17-19, 2017, Source: CATT, Title: Consideration on 2-step RA.
R2-1700237 3GPP TSG RAN WG2 NR Ad Hoc, Spokane, USA, Jan. 17-19, 2017, Source: InterDigital Communications, Title: 2-Step Random Access Procedure in NR.
R2-1700335 3GPP TSG RAN WG2 NR Ad Hoc, Spokane, USA, Jan. 17-19, 2017, Source: Intel Corporation, Title: Further considerations of random access in NR.
R2-1700355 3GPP TSG RAN WG2 NR Ad Hoc, Spokane, USA, Jan. 17-19, 2017, Source: ASUSTek, Title: Discussion on latency of random access in NR.
R2-1700356 3GPP TSG RAN WG2 NR Ad Hoc, Spokane, USA, Jan. 17-19, 2017, Source: ASUSTek, MediaTek Inc., Title: Consideration on use cases of 2-step RACH procedure.

(56) References Cited

OTHER PUBLICATIONS

R2-1700357 3GPP TSG RAN WG2 NR Ad Hoc, Spokane, USA, Jan. 17-19, 2017, Source: Samsung, Title: Consideration on 2-step RACH.

R2-1700619 3GPP TSG RAN WG2 NR Ad Hoc, Spokane, USA, Jan. 17-19, 2017, Source: NTT Docomo, Inc., Title: Remaining RAN2 aspects on random access procedure for NR.

R2-1814940 3GPP TSG RAN WG2 Meeting #103bis, Chengdu, China, Oct. 8-12, 2018, Source: Nokia, Nokia Shanghai Bell, Title: Correction to preamble power ramping.

R2-1815281 3GPP TSG RAN WG2 Meeting #103bis, Chengdu, China, Oct. 8-12, 2018, Source: LG Electronics Inc., Title: Remaining issue with Power Ramping Counter.

RP-181463 3GPP TSG RAN Meeting #80, La Jolla, USA, Jun. 11-14, 2018, Source: CATT, CMCC, vivo, CATR, Qualcomm, MediaTek, Title: New SID: Study on UE Power Saving in NR.

R1-1709016 3GPP TSG RAN WG1 Meeting #89, Hangzhou, China, May 15-19, 2017, Source: InterDigital Inc., Title: Control Channels Monitoring with Multiple CORESETs.

R1-1714117 3GPP TSG RAN WG1 Meeting #90, Prague, Czech Republic, Aug. 21-25, 2017, Source: InterDigital Inc., Title: Remaining details of BWP.

R2-1802001 3GPP TSG RAN WG2 Meeting #101, Athens, Greece, Feb. 26-Mar. 2, 2018, Source: vivo, Title: Restart Scell inactive timer due to configuration grant.

R1-142925 3GPP TSG RAN WG1 Meeting #78, Dresden, Germany, Aug. 18-22, 2014, Source: Fujitsu, Title: Discussion of on/off transitions and related procedures.

Oct. 18, 2019—European Extended Search Report—EP 19187310.8.

Jan. 17, 2020—European Extended Search Report—EP 19198650.4.

Mar. 24, 2020—European Office Action—EP 19151142.7.

Jul. 7, 2022—EP Search Report—EP App. No. 22165557.4.

\* cited by examiner

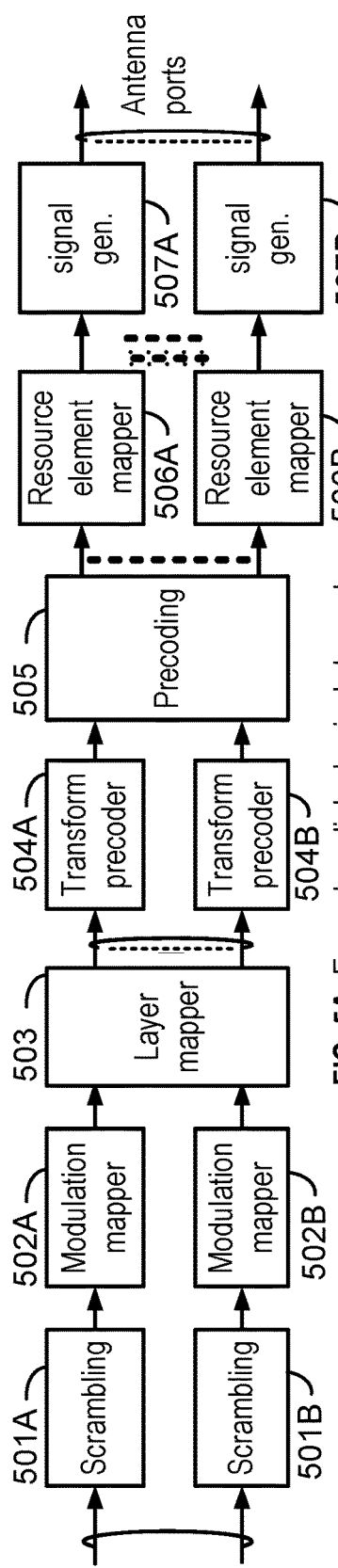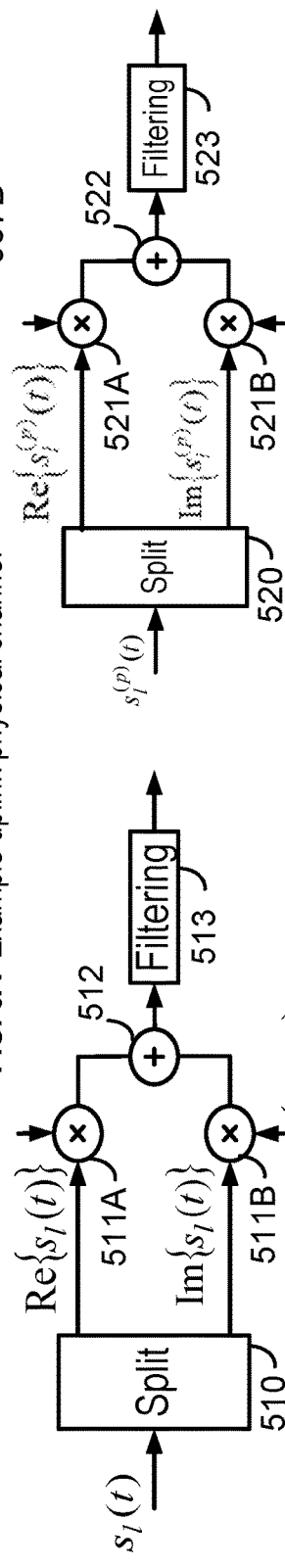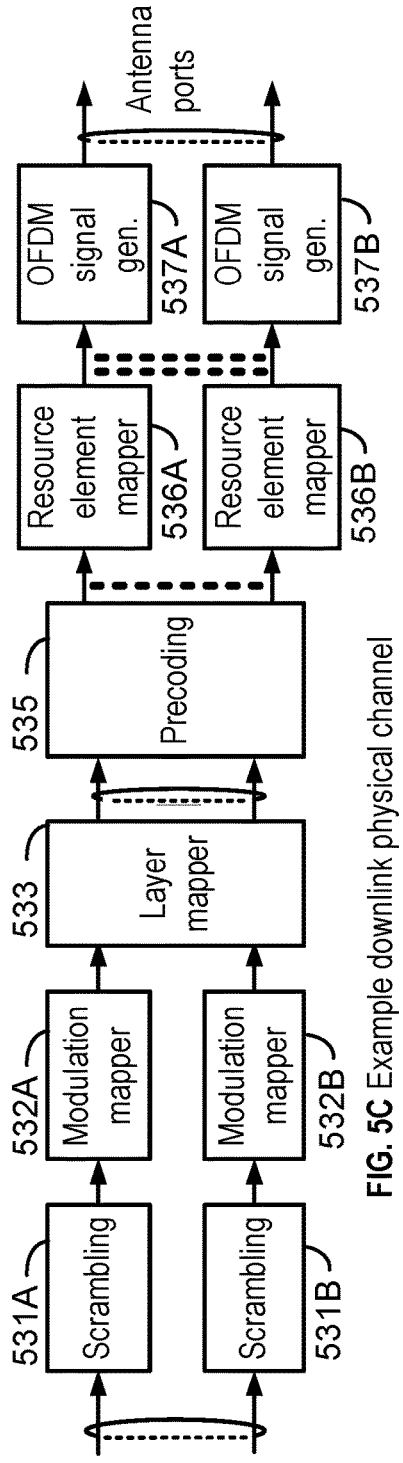
FIG. 5A Example uplink physical channel
FIG. 5B Example uplink modulation
FIG. 5C Example downlink physical channel
FIG. 5D Example downlink modulation

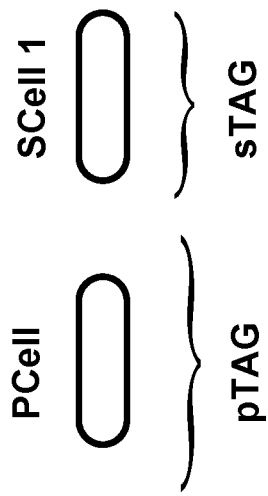
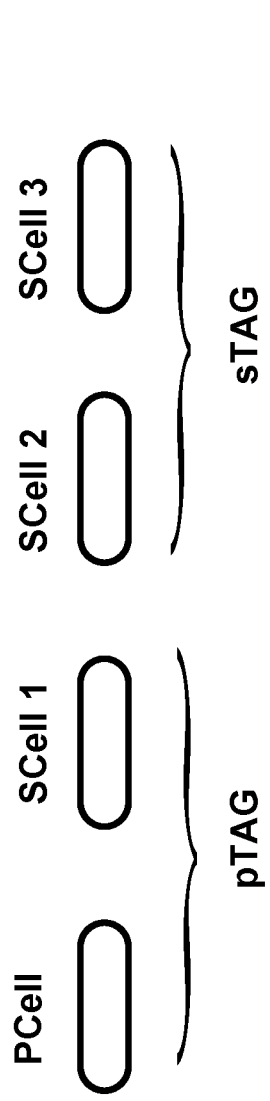
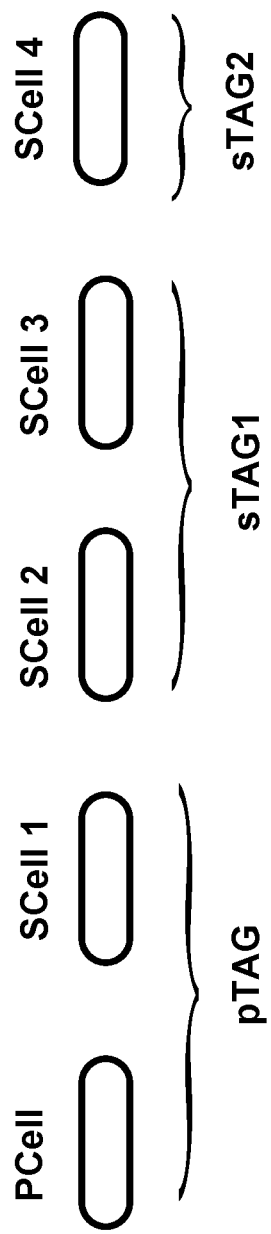
FIG. 8

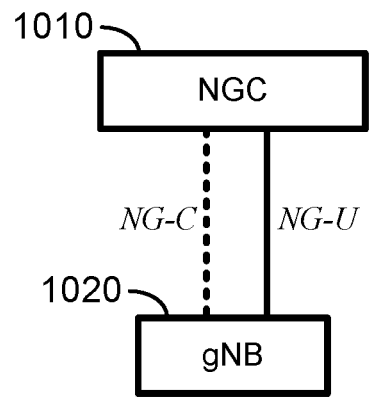
FIG. 10A gNB connected to NGC
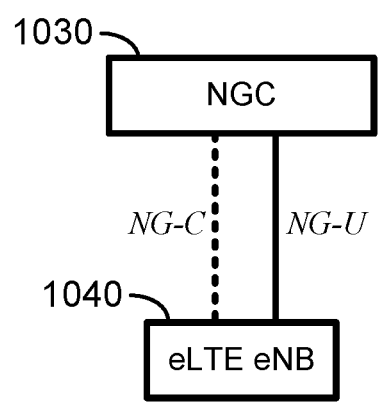
FIG. 10B eLTE eNB connected to NGC

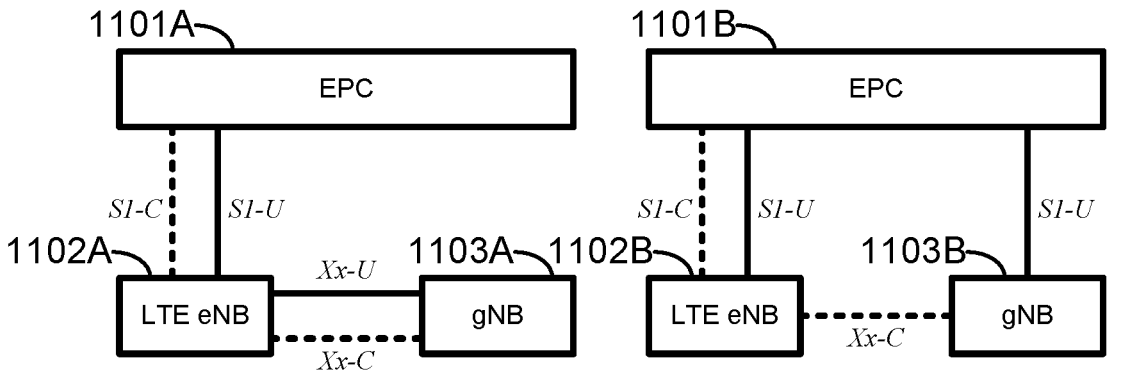

FIG. 11A LTE eNB connected to EPC with non-standalone gNB.
gNB user plane connected to EPC via LTE eNB.

FIG. 11B LTE eNB connected to EPC with non-standalone gNB.
gNB user plane connected to EPC directly.

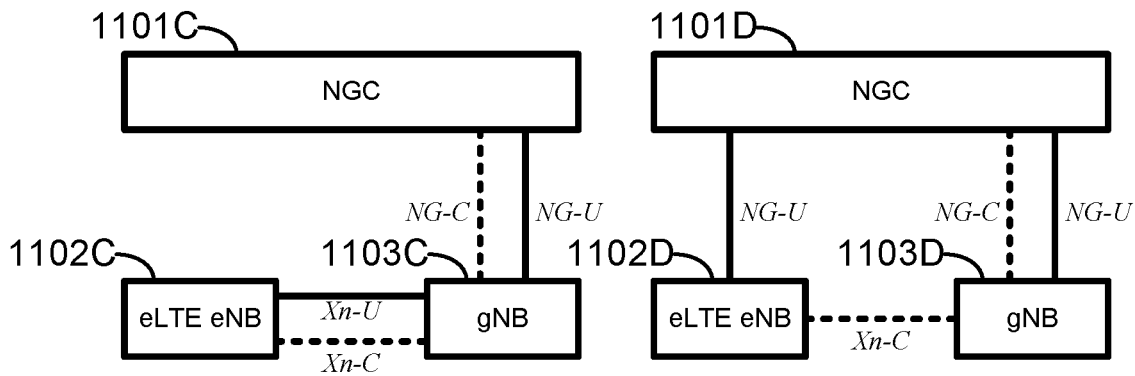

FIG. 11C gNB connected to NGC with non-standalone eLTE eNB.
eLTE eNB user plane connected to NGC via gNB.

FIG. 11D gNB connected to NGC with non-standalone eLTE eNB.
eLTE eNB user plane connected to NGC directly.

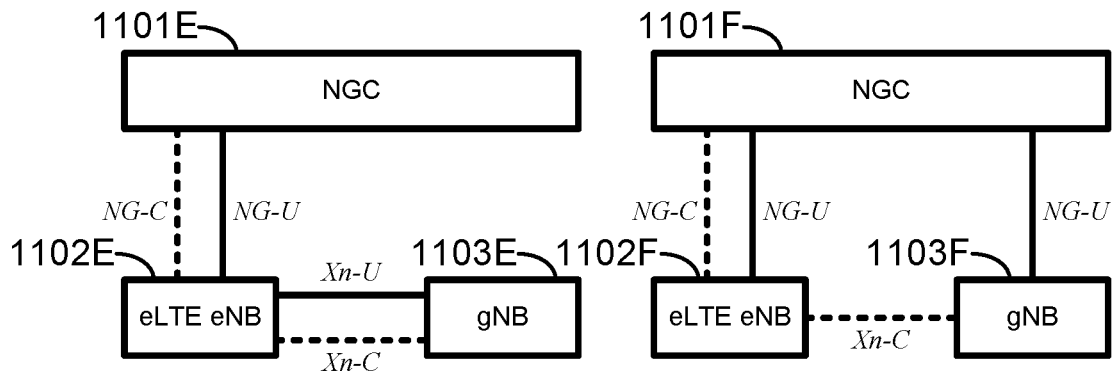

FIG. 11E eLTE eNB connected to NGC with non-standalone gNB.
gNB user plane connected to NGC via eLTE eNB.

FIG. 11F eLTE eNB connected to NGC with non-standalone gNB.
gNB user plane connected to NGC directly.

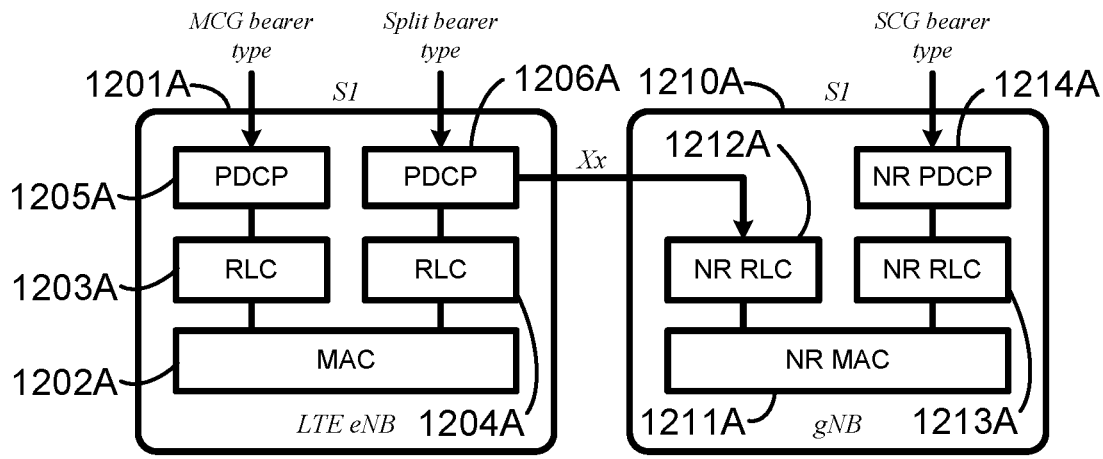
FIG. 12A Radio protocol architecture for split bearer and SCG bearer. LTE eNB connected to EPC with non-standalone gNB.
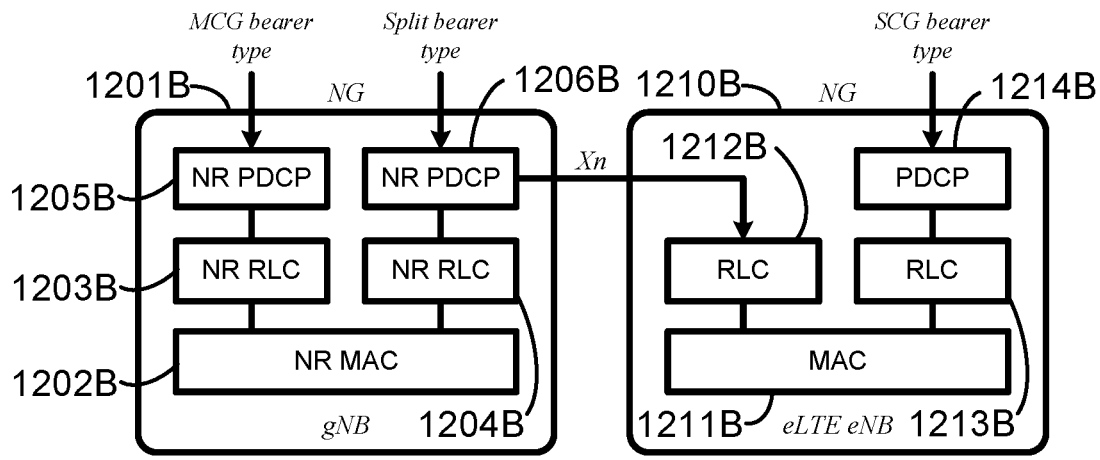
FIG. 12B Radio protocol architecture for split bearer and SCG bearer. gNB connected to NGC with non-standalone eLTE eNB.
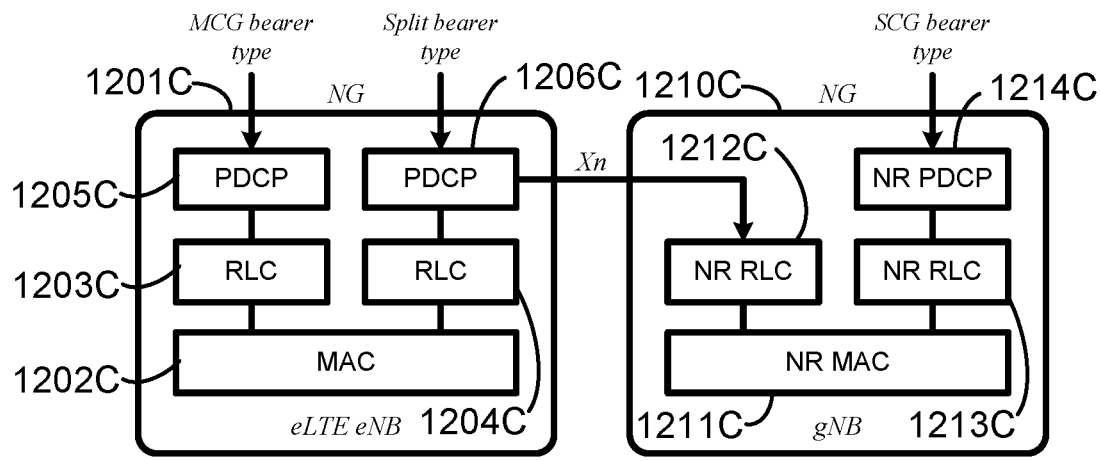
FIG. 12C Radio protocol architecture for split bearer and SCG bearer. eLTE eNB connected to NGC with non-standalone gNB.

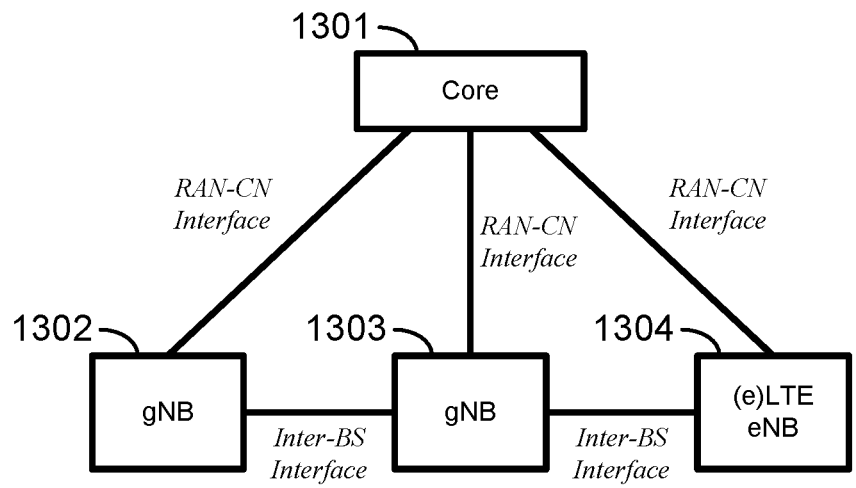
FIG. 13A Non-centralized deployment
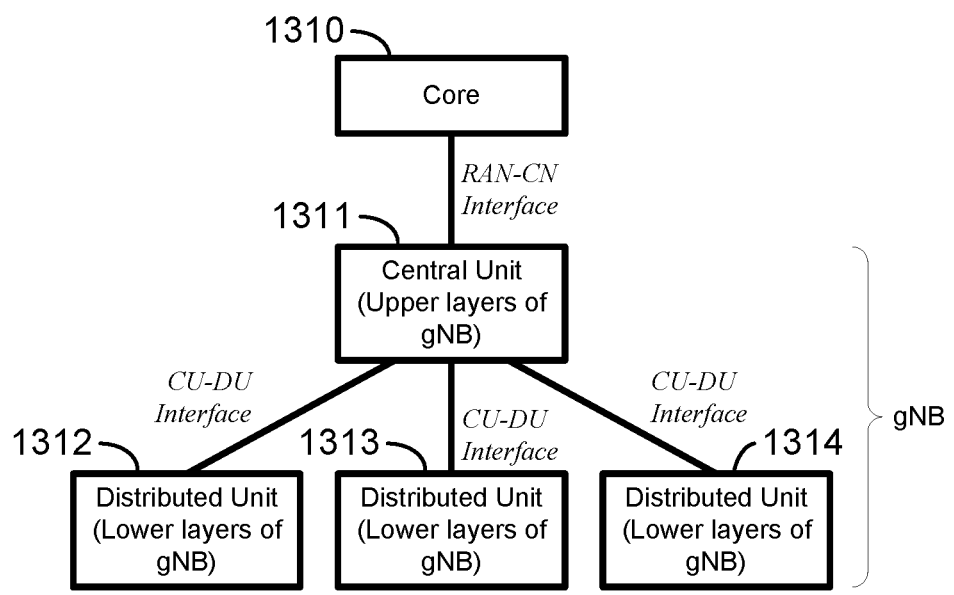
FIG. 13B Centralized deployment

| Example DCI format | Example Usage |
|---|---|
| 0 | Uplink scheduling grant |
| 4 | Uplink scheduling grant with spatial multiplexing |
| 6-0A, 6-0B | Uplink scheduling grant for eMTC devices |
| 1C | Special purpose compact assignment |
| 1A | Contiguous allocation only |
| 1B | Codebook-based beamforming using CRS |
| 1D | MU-MIMO using CRS |
| 1 | Flexible allocations |
| 2A | Open-loop spatial multiplexing using CRS |
| 2B | Dual-layer transmission using DM-RS (TM8) |
| 2C | Multi-layer transmission using DM-RS (TM9) |
| 2D | Multi-layer transmission using DM-RS (TM9) |
| 2 | Closed-loop spatial multiplexing using CRS |
| 6-1A, 6-1B | Downlink scheduling grants for eMTC devices |
| 3, 3A | Power control commands |
| 5 | Sidelink operation |
| 6-2 | Paging/direct indication for eMTC devices |

FIG. 15

| Example DCI format | Example Usage |
|---|---|
| 0_0 | For scheduling of PUSCH in one cell |
| 0_1 | |
| 1_0 | For scheduling of PDSCH in one cell |
| 1_1 | |
| 2_0 | For notifying the slot format |
| 2_1 | For notifying the PRB(s) and OFDM symbol(s) where UE may assume no transmission is intended for the UE |
| 2_2 | For the transmission of TPC commands for PUCCH and PUSCH |
| 2_3 | For the transmission of a group of TPC commands for SRS transmissions by one or more UEs. Along with a TPC command, a SRS request may also be transmitted |

FIG. 16

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | Reporting on PUCCH: the UE receives a selection command<br>Reporting on PUSCH: DCI | DCI |
| Semi-Persistent CSI-RS | Not Supported | Reporting on PUCCH: the UE receives a selection command<br>Reporting on PUSCH: DCI | DCI |
| Aperiodic CSI-RS | Not Supported | Not Supported | DCI |

FIG. 17

| Carrier bandwidth part (by # of PRBs) | Subband Size (by # of PRBs) |
|---|---|
| < 24 | N/A |
| 24 – 72 | 4, 8 |
| 73 – 144 | 8, 16 |
| 145 – 275 | 16, 32 |

FIG. 18

| |
|---|
| Priority 0:<br>Part 2 wideband CSI for CSI reports 1 to $N_{Rep}$ |
| Priority 1:<br>Part 2 subband CSI of even subbands for CSI report 1 |
| Priority 2:<br>Part 2 subband CSI of odd subbands for CSI report 1 |
| Priority 3:<br>Part 2 subband CSI of even subbands for CSI report 2 |
| Priority 4:<br>Part 2 subband CSI of odd subbands for CSI report 2 |
| ⋮ |
| Priority $2N_{Rep}-1$:<br>Part 2 subband CSI of even subbands for CSI report $N_{Rep}$ |
| Priority $2N_{Rep}$:<br>Part 2 subband CSI of odd subbands for CSI report $N_{Rep}$ |

FIG. 19

| TPC Command Field | Accumulated $\delta_{PUSCH,c}$ [dB] | Absolute $\delta_{PUSCH,c}$ [dB] |
|---|---|---|
| 0 | -1 | -4 |
| 1 | 0 | -1 |
| 2 | 1 | 1 |
| 3 | 3 | 4 |

FIG. 21

| TPC Command Field | Accumulated $\delta_{PUSCH,f,c}$ [dB] |
|---|---|
| 0 | -1 |
| 1 | 0 |
| 2 | 1 |
| 3 | 3 |

FIG. 22

|  | 1st DCI format | 2nd DCI format | 3rd DCI format |
|---|---|---|---|
| TPC command for scheduled PUSCH | set to '00' | N/A | N/A |
| Cyclic shift DM RS | set to '000' if present | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

FIG. 24A

|  | 4th DCI format | 5th DCI format |
|---|---|---|
| TPC command for scheduled PUSCH | set to '00' | N/A |
| Cyclic shift DM RS | set to '000' if present | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

FIG. 24B

|  | 6th DCI format | 7th DCI format |
|---|---|---|
| HARQ process number | set to '000' | FDD: set to '000'<br>TDD: set to '0000' |
| Redundancy version | set to '00' | set to '00' |
| TPC command for scheduled PUSCH | set to '00' | N/A |
| TPC command for scheduled PUCCH | N/A | set to '00' |

FIG. 25A

|  | 8th DCI format | 9th DCI format |
|---|---|---|
| HARQ process number | set to '000' | FDD: set to '000'<br>TDD: set to '0000' |
| Redundancy version | set to '00' | set to '00' |
| Repetition number | set to '00' | set to '00' |
| Modulation and coding scheme | set to '1111' | set to '1111' |
| TPC command for scheduled PUSCH | set to '00' | N/A |
| Resource block assignment | Set to all '1's | Set to all '1's |

FIG. 25B

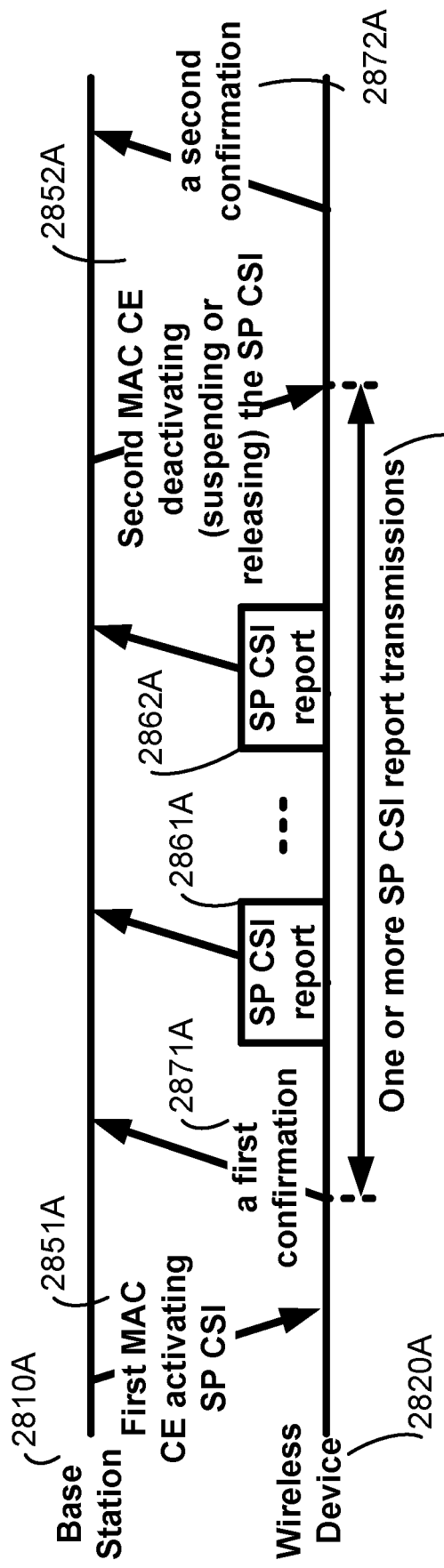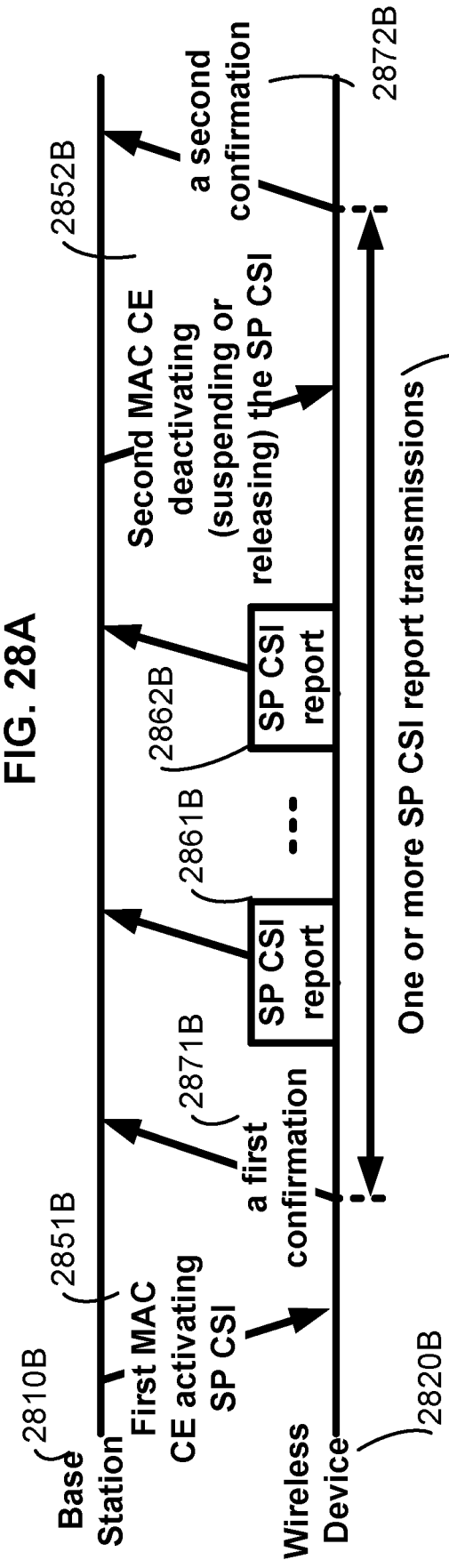
FIG. 28A
FIG. 28B

3200A

3200B

3200C

SCHEDULED UPLINK TRANSMISSION FOR CHANNEL STATE INFORMATION REPORTING

CROSS-REFERENCE TO RELATED APPLICATIONS

This application is a continuation of U.S. application Ser. No. 17/507,219, filed Oct. 21, 2021, now U.S. Pat. No. 11,737,032, which is a continuation of U.S. application Ser. No. 17/228,404, filed Apr. 12, 2021, now U.S. Pat. No. 11,388,679, which is a continuation of U.S. application Ser. No. 16/895,879, filed Jun. 8, 2020, now U.S. Pat. No. 10,979,982, which is a continuation of U.S. application Ser. No. 16/244,917, filed on Jan. 10, 2019, now U.S. Pat. No. 10,681,648, which claims the benefit of U.S. Provisional Application No. 62/615,909, filed on Jan. 10, 2018, and U.S. Provisional Application No. 62/616,189, filed on Jan. 11, 2018, the disclosures of which are hereby incorporated by reference in their entirety.

BACKGROUND

In wireless communications, wireless devices may have limited resources, such as power required, for example, for various transmissions. A base station may determine that one or more wireless devices should report channel state information which may require additional power to transmit. It is desired to improve wireless communications without adversely increasing signaling overhead and/or decreasing spectral efficiency.

SUMMARY

The following summary presents a simplified summary of certain features. The summary is not an extensive overview and is not intended to identify key or critical elements.

Systems, apparatuses, and methods are described for controlling a transmission power of one or more wireless devices. A base station may send, to a wireless device, one or more radio resource control messages comprising power control parameters and/or other wireless resources. The base station may send, to the wireless device, activation or deactivation of a channel state information (CSI) report. The wireless device may adjust, based on one or more of the activation or deactivation, at least one value associated with a transmission power of an uplink channel transmission. The at least one value may comprise one or more correction values associated with the transmission power of the uplink channel transmission. At least one of an uplink data channel or a semi-persistent (SP) CSI report may be dropped. A transmission power of at least one of an uplink data channel or an SP CSI report may be adjusted (e.g., scaled down).

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A, FIG. 5B, FIG. 5C and FIG. 5D show examples for uplink and downlink signal transmission.

FIG. 8 shows example timing advance group (TAG) configurations.

FIG. 10A and FIG. 10B show examples for interfaces between a 5G core network and base stations.

FIG. 11A, FIG. 11B, FIG. 11C, FIG. 11D, FIG. 11E, and FIG. 11F show examples for architectures of tight interworking between a 5G RAN and a long term evolution (LTE) radio access network (RAN).

FIG. 12A, FIG. 12B, and FIG. 12C show examples for radio protocol structures of tight interworking bearers.

FIG. 13A and FIG. 13B show examples for gNodeB (gNB) deployment.

FIG. 15 shows an example of one or more downlink control information (DCI) formats.

FIG. 16 shows an example of one or more DCI formats.

FIG. 17 shows an example of channel state information reference signal (CSI-RS) configurations.

FIG. 18 shows example subband sizes.

FIG. 19 shows an example priority order associated with one or more CSI reports.

FIG. 21 shows an example parameter of a TPC command.

FIG. 22 shows an example parameter of a TPC command

FIG. 24A and FIG. 24B show examples of a validation of SP CSI activation or SP CSI deactivation.

FIG. 25A and FIG. 25B show examples of a validation of SP CSI activation or SP CSI deactivation.

FIG. 28A and FIG. 28B show examples of a window for physical downlink control channel (PDCCH) monitoring for SP CSI and SP CSI report transmission.

DETAILED DESCRIPTION

Figure 1:
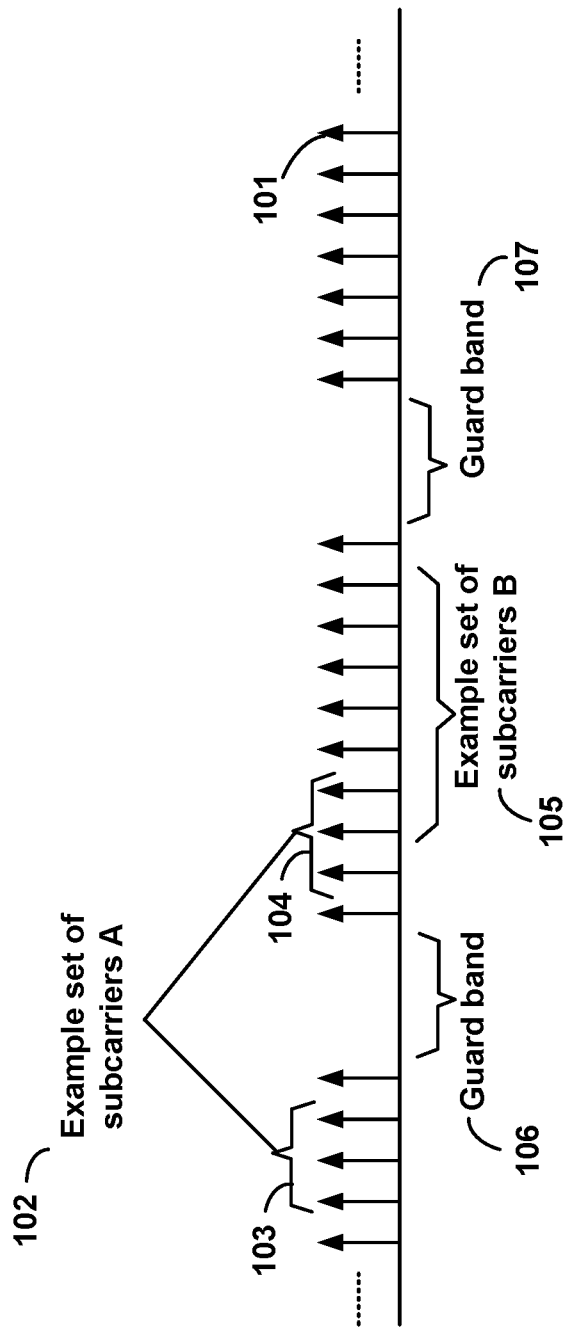
FIG. 1 shows example sets of orthogonal frequency division multiplexing (OFDM) subcarriers.

The accompanying drawings, which form a part hereof, show examples of the disclosure. It is to be understood that the examples shown in the drawings and/or discussed herein are non-exclusive and that there are other examples of how the disclosure may be practiced.

The features described herein may enable operation of carrier aggregation and may be used in the technical field of multicarrier communication systems. The features described herein may relate to power control in multicarrier communication systems.

The following acronyms are used throughout the present disclosure, provided below for convenience although other acronyms may be introduced in the detailed description:

5G 5th generation wireless systems
ASIC application-specific integrated circuit
BPSK binary phase shift keying
CA carrier aggregation
CC component carrier
CDMA code division multiple access
CP cyclic prefix
CPLD complex programmable logic devices
CRC cyclic redundancy check bits
CSI channel state information
CSS common search space
CU central unit
DC dual connectivity
DCI downlink control information
DL downlink
DU distributed unit
EPC evolved packet core
E-UTRAN evolved-universal terrestrial radio access network
FDD frequency division multiplexing
FPGA field programmable gate arrays
Fs-C Fs-control plane
Fs-U Fs-user plane
gNB next generation node B
HARQ hybrid automatic repeat request
HDL hardware description languages
LTE long term evolution
MAC media access control
MAC-CE media access control-control element
MCG master cell group
MIB master information block
MME mobility management entity
NAS non-access stratum
NG CP next generation control plane core
NGC next generation core
NG-C NG-control plane
NG-U NG-user plane
NR MAC new radio MAC
NR PDCP new radio PDCP
NR PHY new radio physical
NR RLC new radio RLC
NR RRC new radio RRC
NR new radio
NSSAI network slice selection assistance information
OFDM orthogonal frequency division multiplexing
PCC primary component carrier
PCell primary cell
PDCCH physical downlink control channel
PDCP packet data convergence protocol
PDSCH physical downlink shared channel
PDU packet data unit
PHY physical
PLMN public land mobile network
PSCell primary secondary cell
pTAG primary timing advance group
PUCCH physical uplink control channel
PUSCH physical uplink shared channel
QAM quadrature amplitude modulation
QPSK quadrature phase shift keying
RA random access
RB resource blocks
RBG resource block groups
RLC radio link control
RRC radio resource control
SCC secondary component carrier
SCell secondary cell
SCells secondary cells
SCG secondary cell group
SC-OFDM single carrier-OFDM
SDU service data unit
SFN system frame number
S-GW serving gateway
SIB system information block
SRB signaling radio bearer
sTAG secondary timing advance group
TA timing advance
TAG timing advance group
TAI tracking area identifier
TAT time alignment timer
TB transport block
TDD time division duplexing
TDMA time division multiple access
TTI transmission time interval
UE user equipment
UL uplink
UPGW user plane gateway
URLLC ultra-reliable low-latency communications
VHDL VHSIC hardware description language
Xn-C Xn-control plane
Xn-U
Xx-C
Xx-U
Xn-user plane
Xx-control plane
Xx-user plane Examples may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be used for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 shows example sets of OFDM subcarriers. As shown in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is shown as an example, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As shown in FIG. 1, guard band 106 is between subcarriers 103 and subcarriers 104. The example set of subcarriers A 102 includes subcarriers 103 and subcarriers 104. FIG. 1 also shows an example set of subcarriers B 105. As shown, there is no guard band between any two subcarriers in the example set of subcarriers B 105. Carriers in a multicarrier OFDM communication system may be contiguous carriers, non-contiguous carriers, or a combination of both contiguous and non-contiguous carrier.

Figure 2:
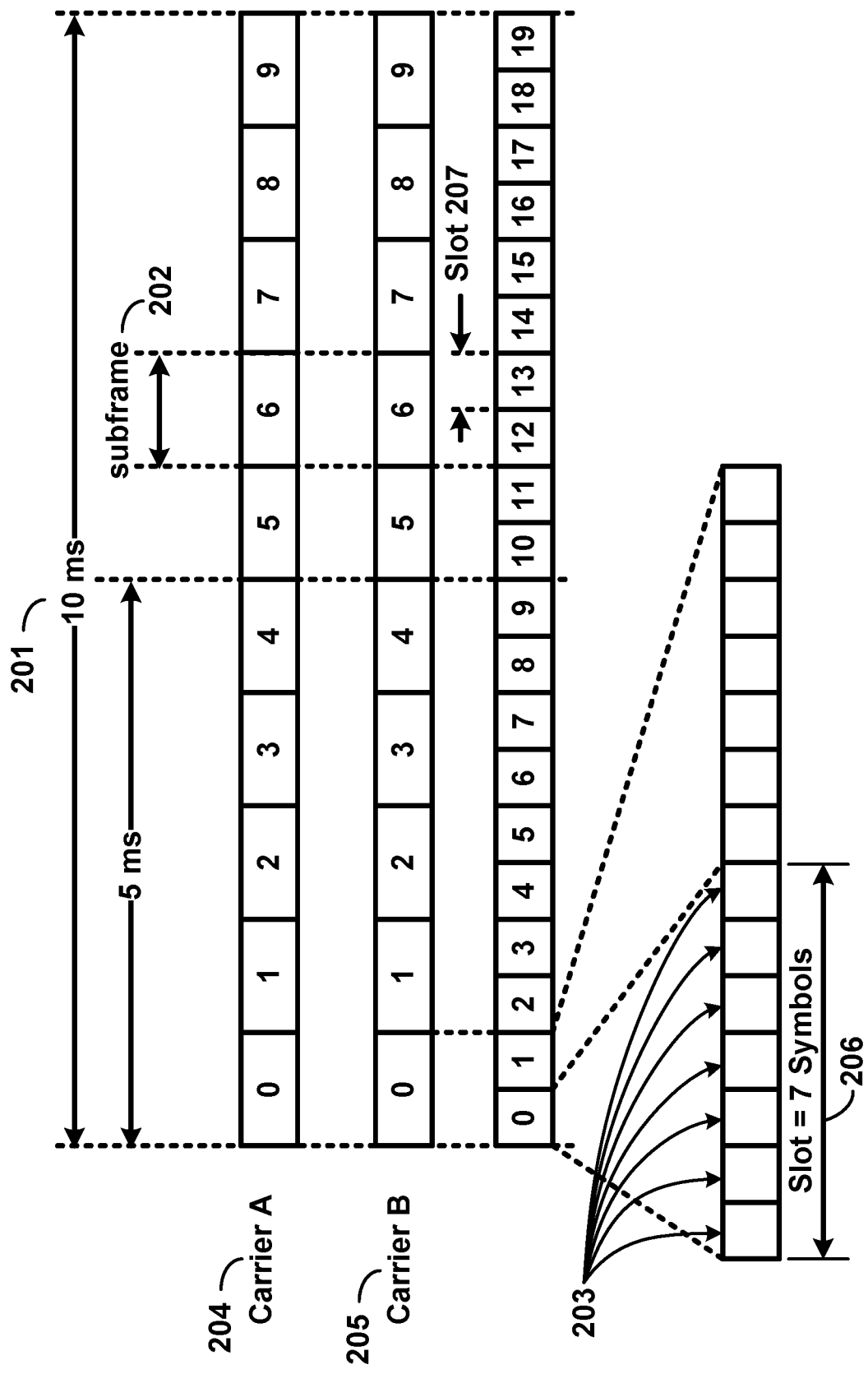
FIG. 2 shows example transmission time and reception time for two carriers in a carrier group.

FIG. 2 shows an example timing arrangement with transmission time and reception time for two carriers. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 milliseconds (msec). Other frame durations, for example, in the range of 1 to 100 msec may also be supported. Each 10 msec radio frame 201 may be divided into ten equally sized subframes 202. Other subframe durations such as including 0.5 msec, 1 msec, 2 msec, and 5 msec may also be supported. Subframe(s) may comprise two or more slots (e.g., slots 206 and 207). For the example of FDD, 10 subframes may be available for downlink transmission and 10 subframes may be available for uplink transmissions in each 10 msec interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may include all downlink, all uplink, or a downlink part and an uplink part, and/or alike. Slot aggregation may be supported, for example, data transmission may be scheduled to span one or multiple slots. For example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
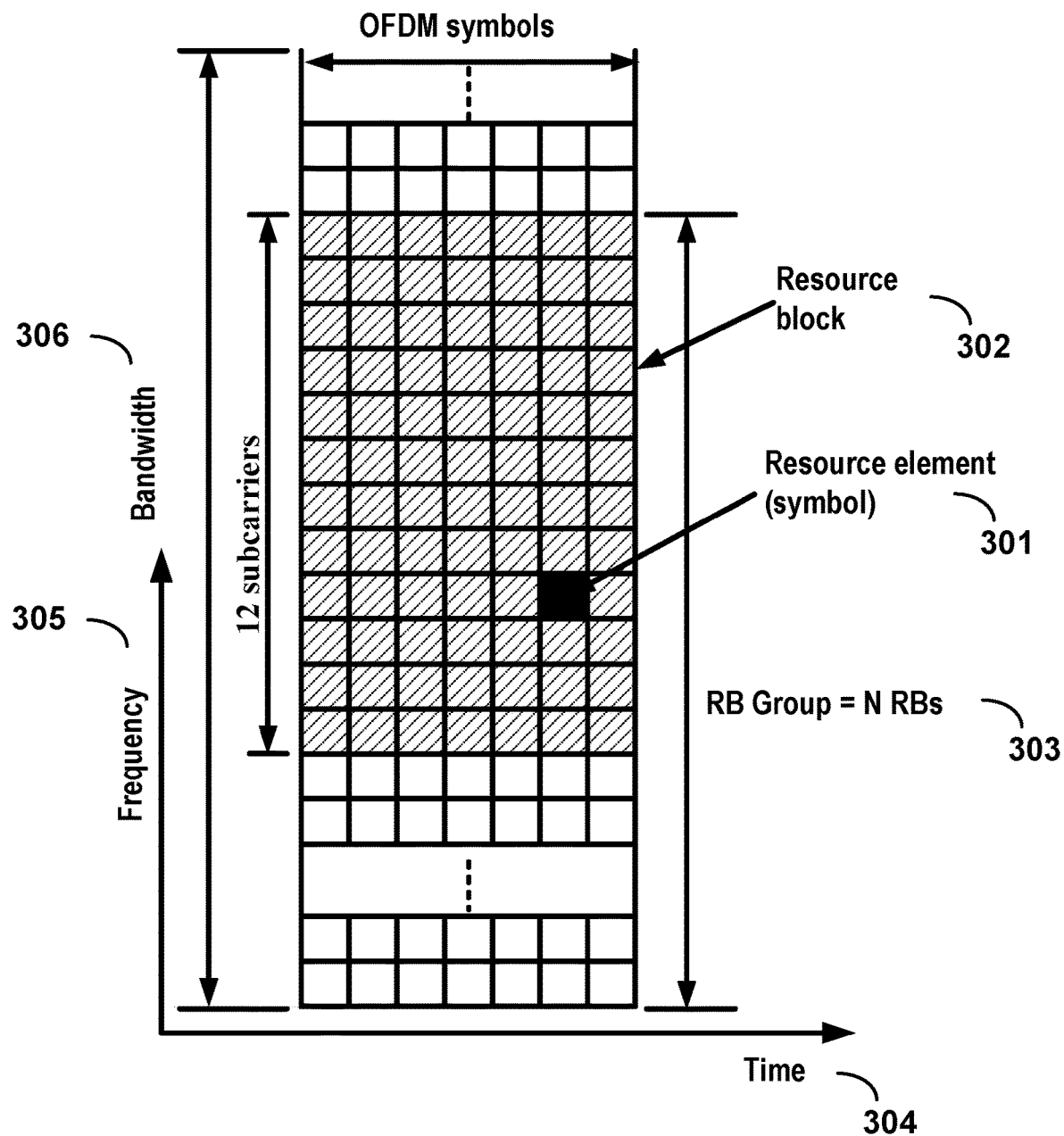
FIG. 3 shows example OFDM radio resources.

FIG. 3 shows an example of OFDM radio resources. The resource grid structure in time 304 and frequency 305 is shown in FIG. 3. The quantity of downlink subcarriers or RBs may depend, at least in part, on the downlink transmission bandwidth 306 configured in the cell. The smallest radio resource unit may be called a resource element (e.g., 301). Resource elements may be grouped into resource blocks (e.g., 302). Resource blocks may be grouped into larger radio resources called Resource Block Groups (RBG) (e.g., 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. A resource block may correspond to one slot in the time domain and 180 kHz in the frequency domain (for 15 kHz subcarrier bandwidth and 12 subcarriers).

Multiple numerologies may be supported. A numerology may be derived by scaling a basic subcarrier spacing by an integer N. Scalable numerology may allow at least from 15 kHz to 480 kHz subcarrier spacing. The numerology with 15 kHz and scaled numerology with different subcarrier spacing with the same CP overhead may align at a symbol boundary every 1 msec in a NR carrier.

Figure 4:
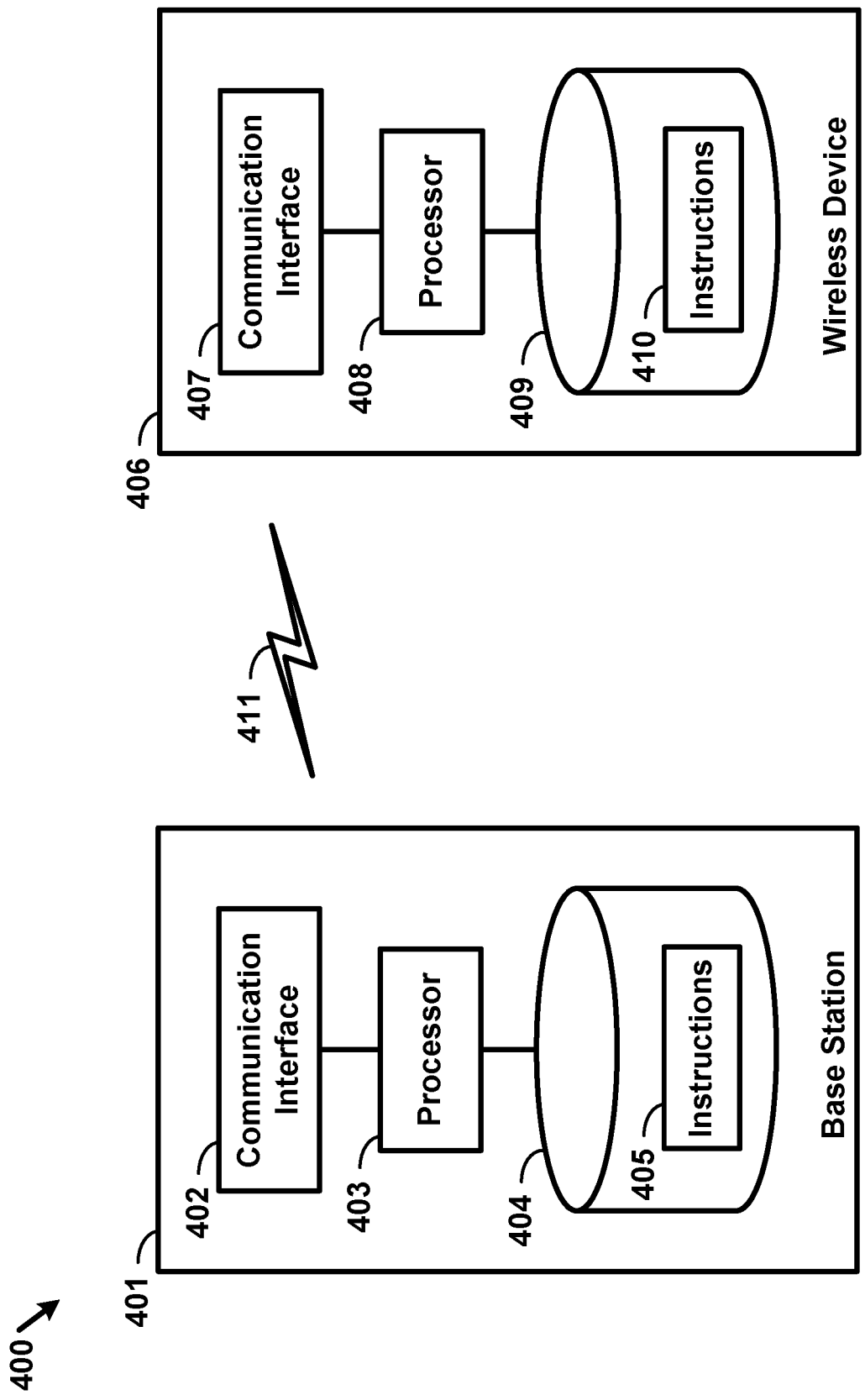
FIG. 4 shows hardware elements of a base station and a wireless device.

FIG. 4 shows hardware elements of a base station 401 and a wireless device 406. A communication network 400 may include at least one base station 401 and at least one wireless device 406. The base station 401 may include at least one communication interface 402, one or more processors 403, and at least one set of program code instructions 405 stored in non-transitory memory 404 and executable by the one or more processors 403. The wireless device 406 may include at least one communication interface 407, one or more processors 408, and at least one set of program code instructions 410 stored in non-transitory memory 409 and executable by the one or more processors 408. A communication interface 402 in the base station 401 may be configured to engage in communication with a communication interface 407 in the wireless device 406, such as via a communication path that includes at least one wireless link 411. The wireless link 411 may be a bi-directional link. The communication interface 407 in the wireless device 406 may also be configured to engage in communication with the communication interface 402 in the base station 401. The base station 401 and the wireless device 406 may be configured to send and receive data over the wireless link 411 using multiple frequency carriers. Base stations, wireless devices, and other communication devices may include structure and operations of transceiver(s). Transceivers, which may comprise both a transmitter and receiver, may be employed in devices such as wireless devices, base stations, relay nodes, and/or the like. Examples for radio technology implemented in the communication interfaces 402, 407 and the wireless link 411 are shown in FIG. 1, FIG. 2, FIG. 3, FIG. 5, and associated text. The communication network 400 may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network 400, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

The communications network 400 may comprise Radio Access Network (RAN) architecture. The RAN architecture may comprise one or more RAN nodes that may be a next generation Node B (gNB) (e.g., 401) providing New Radio (NR) user plane and control plane protocol terminations towards a first wireless device (e.g. 406). A RAN node may be a next generation evolved Node B (ng-eNB), providing Evolved UMTS Terrestrial Radio Access (E-UTRA) user plane and control plane protocol terminations towards a second wireless device. The first wireless device may communicate with a gNB over a Uu interface. The second wireless device may communicate with a ng-eNB over a Uu interface. Base station 401 may comprise one or more of a gNB, ng-eNB, and/or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_I-NACTIVE state, distribution function for Non-Access Stratum (NAS) messages, RAN sharing, and dual connectivity or tight interworking between NR and E-UTRA.

One or more gNB s and/or one or more ng-eNB s may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, for example, packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/ or Session Management Function (SMF) selection An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or a non-operational state. Configured may also refer to specific settings in a device that effect the operational characteristics of the device whether the device is in an operational or a non-operational state. The hardware, software, firmware, registers, memory values, and/or the like may be "configured" within a device, whether the device is in an operational or a nonoperational state, to provide the device with specific characteristics. Terms such as "a control message to cause in a device" may mean that a control message has parameters that may be used to configure specific characteristics in the device, whether the device is in an operational or a non-operational state.

A network (e.g., a 5G network) may include a multitude of base stations, providing a user plane NR PDCP/NR RLC/NR MAC/NR PHY and control plane (e.g., NR RRC) protocol terminations towards the wireless device. The base station(s) may be interconnected with other base station(s) (e.g., employing an Xn interface). The base stations may also be connected employing, for example, an NG interface to an NGC. FIG. 10A and FIG. 10B show examples for interfaces between a 5G core network (e.g., NGC) and base stations (e.g., gNB and eLTE eNB). For example, the base stations may be interconnected to the NGC control plane (e.g., NG CP) employing the NG-C interface and to the NGC user plane (e.g., UPGW) employing the NG-U interface. The NG interface may support a many-to-many relation between 5G core networks and base stations.

A base station may include many sectors, for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g., TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC); in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC); in the uplink, the carrier corresponding to an SCell may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or cell index may also identify the downlink carrier or uplink carrier of the cell (depending on the context in which it is used). The cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, reference to a first physical cell ID for a first downlink carrier may indicate that the first physical cell ID is for a cell comprising the first downlink carrier. The same concept may apply to, for example, carrier activation. Reference to a first carrier that is activated may equally mean that the cell comprising the first carrier is activated.

A device may be configured to operate as needed by freely combining any of the example features described herein. The disclosed mechanisms may be performed if certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. If the one or more criteria are met, various example embodiments may be satisfied. Therefore, it may be possible to implement examples that selectively implement disclosed protocols.

A base station may communicate with a variety of wireless devices. Wireless devices may support multiple technologies, and/or multiple releases of the same technology. Wireless devices may have some specific capability(ies) depending on its wireless device category and/or capability(ies). A base station may comprise multiple sectors. Reference to a base station communicating with a plurality of wireless devices may indicate that a base station may communicate with a subset of the total wireless devices in a coverage area. A plurality of wireless devices of a given LTE or 5G release, with a given capability and in a given sector of the base station, may be used. The plurality of wireless devices may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

A base station may transmit (e.g., to a wireless device) one or more messages (e.g. RRC messages) that may comprise a plurality of configuration parameters for one or more cells. One or more cells may comprise at least one primary cell and at least one secondary cell. An RRC message may be broadcasted or unicasted to the wireless device. Configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). The other SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may send its radio access capability information which may be static. A base station may request what capabilities for a wireless device to report based on band information. If allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

If CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. If adding a new SCell, dedicated RRC signaling may be employed to send all required system information of the SCell. In connected mode, wireless devices may not need to acquire broadcasted system information directly from the SCells.

An RRC connection reconfiguration procedure may be used to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be used to establish (or reestablish, resume) an RRC connection. An RRC connection establishment procedure may comprise SRB1 establishment. The RRC connection establishment procedure may be used to transfer the initial NAS dedicated information message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure, for example, after successful security activation. A measurement report message may be employed to transmit measurement results.

FIG. 5A, FIG. 5B, FIG. 5C, and FIG. 5D show examples of architecture for uplink and downlink signal transmission. FIG. 5A shows an example for an uplink physical channel. The baseband signal representing the physical uplink shared channel may perform the following processes, which may be performed by the structures described below. These structures and corresponding functions are shown as examples, and it is anticipated that other mechanisms may be implemented in various examples. The structures and corresponding functions may comprise, for example, one or more scrambling devices 501A and 501B configured to perform scrambling of coded bits in each of the codewords to be transmitted on a physical channel; one or more modulation mappers 502A and 502B configured to perform modulation of scrambled bits to generate complex-valued symbols; a layer mapper 503 configured to perform mapping of the complex-valued modulation symbols onto one or several transmission layers; one or more transform precoders 504A and 504B to generate complex-valued symbols; a precoding device 505 configured to perform precoding of the complex-valued symbols; one or more resource element mappers 506A and 506B configured to perform mapping of precoded complex-valued symbols to resource elements; one or more signal generators 507A and 507B configured to perform the generation of a complex-valued time-domain DFTS-OFDM/SC-FDMA signal for each antenna port; and/or the like.

FIG. 5B shows an example for performing modulation and up-conversion to the carrier frequency of the complex-valued DFTS-OFDM/SC-FDMA baseband signal, for example, for each antenna port and/or for the complex-valued physical random access channel (PRACH) baseband signal. For example, the baseband signal, represented as $s_1(t)$, may be split, by a signal splitter 510, into real and imaginary components, $Re\{s_1(t)\}$ and $Im\{s_1(t)\}$, respectively. The real component may be modulated by a modulator 511A, and the imaginary component may be modulated by a modulator 511B. The output signal of the modulator 511A and the output signal of the modulator 511B may be mixed by a mixer 512. The output signal of the mixer 512 may be input to a filtering device 513, and filtering may be employed by the filtering device 513 prior to transmission.

FIG. 5C shows an example structure for downlink transmissions. The baseband signal representing a downlink physical channel may perform the following processes, which may be performed by structures described below. These structures and corresponding functions are shown as examples, and it is anticipated that other mechanisms may be implemented in various examples. The structures and corresponding functions may comprise, for example, one or more scrambling devices 531A and 531B configured to perform scrambling of coded bits in each of the codewords to be transmitted on a physical channel; one or more modulation mappers 532A and 532B configured to perform modulation of scrambled bits to generate complex-valued modulation symbols; a layer mapper 533 configured to perform mapping of the complex-valued modulation symbols onto one or several transmission layers; a precoding device 535 configured to perform precoding of the complex-valued modulation symbols on each layer for transmission on the antenna ports; one or more resource element mappers 536A and 536B configured to perform mapping of complex-valued modulation symbols for each antenna port to resource elements; one or more OFDM signal generators 537A and 537B configured to perform the generation of complex-valued time-domain OFDM signal for each antenna port; and/or the like.

FIG. 5D shows an example structure for modulation and up-conversion to the carrier frequency of the complex-valued OFDM baseband signal for each antenna port. For example, the baseband signal, represented as $s_1^{(p)}(t)$, may be split, by a signal splitter 520, into real and imaginary components, $\text{Re}\{s_1^{(p)}(t)\}$ and $\text{Im}\{s_1^{(p)}(t)\}$, respectively. The real component may be modulated by a modulator 521A, and the imaginary component may be modulated by a modulator 521B. The output signal of the modulator 521A and the output signal of the modulator 521B may be mixed by a mixer 522. The output signal of the mixer 522 may be input to a filtering device 523, and filtering may be employed by the filtering device 523 prior to transmission.

Figure 6:
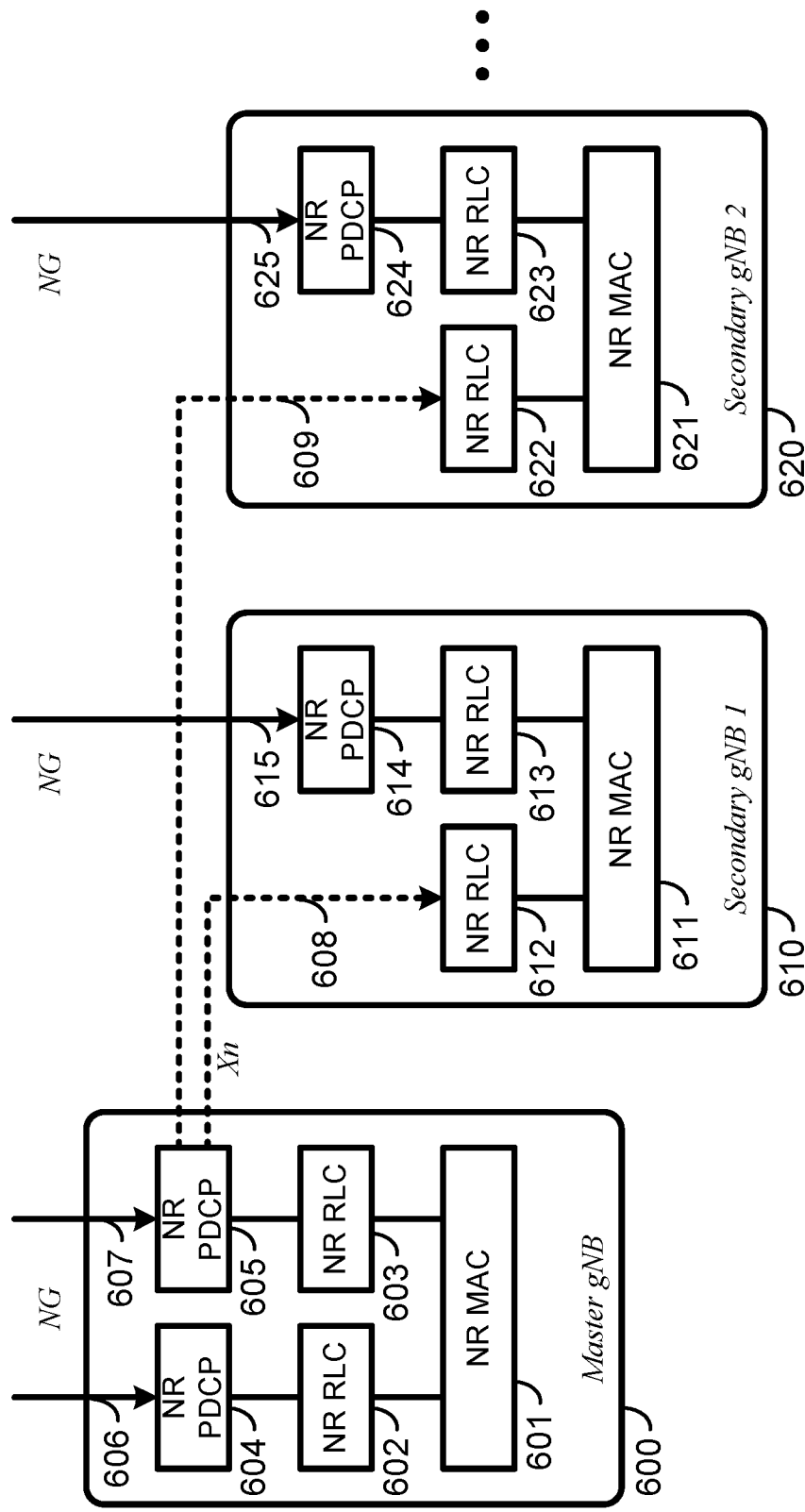
FIG. 6 shows an example protocol structure with multi-connectivity.
Figure 7:
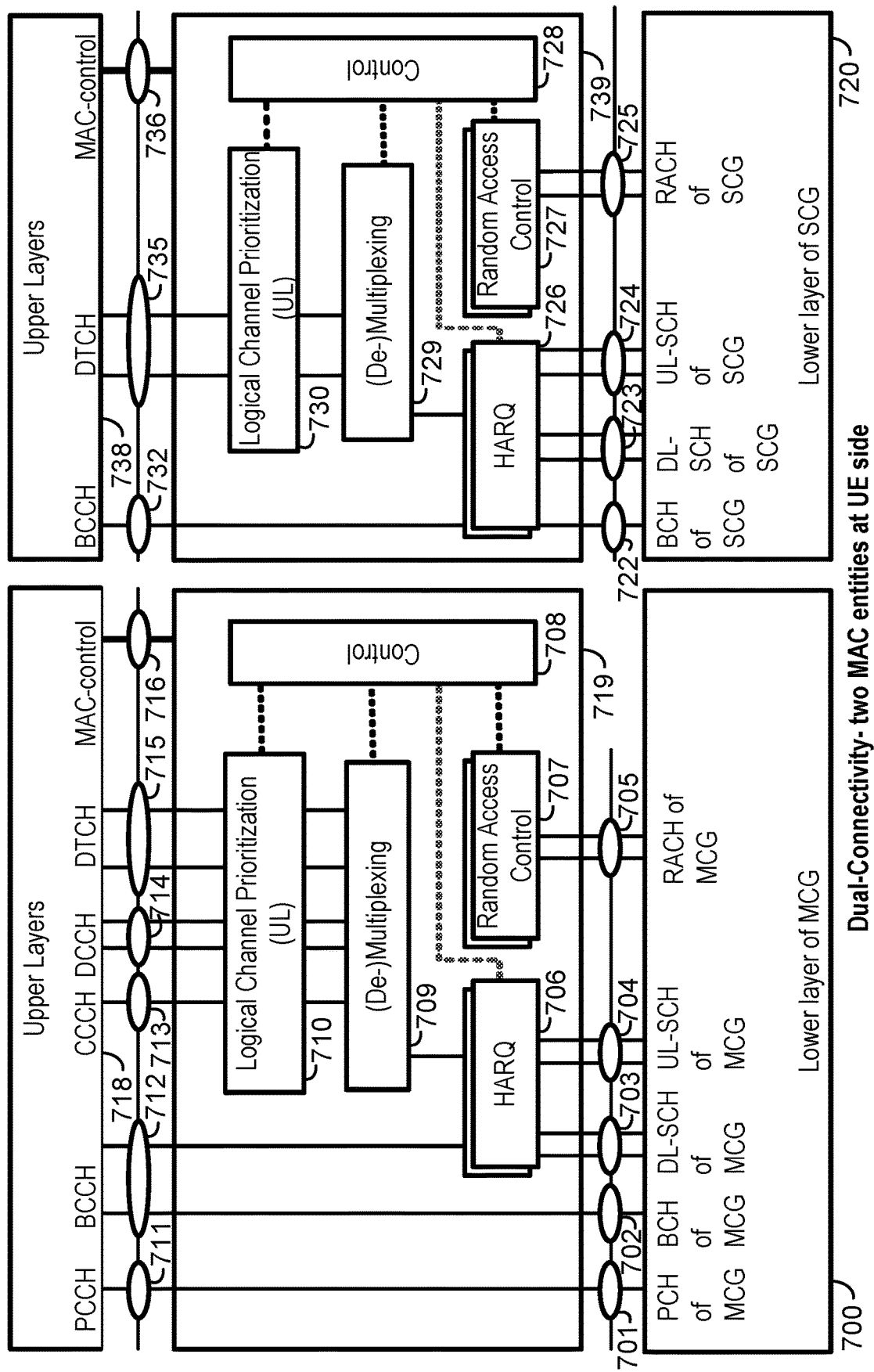
FIG. 7 shows an example protocol structure with carrier aggregation (CA) and dual connectivity (DC).

FIG. 6 and FIG. 7 show examples for protocol structures with CA and multi-connectivity. NR may support multi-connectivity operation, whereby a multiple receiver/transmitter (RX/TX) wireless device in RRC_CONNECTED may be configured to utilize radio resources provided by multiple schedulers located in multiple gNBs connected via a non-ideal or ideal backhaul over the Xn interface. gNBs involved in multi-connectivity for a certain wireless device may assume two different roles: a gNB may either act as a master gNB (e.g., 600) or as a secondary gNB (e.g., 610 or 620). In multi-connectivity, a wireless device may be connected to one master gNB (e.g., 600) and one or more secondary gNBs (e.g., 610 and/or 620). Any one or more of the Master gNB 600 and/or the secondary gNBs 610 and 620 may be a Next Generation (NG) NodeB. The master gNB 600 may comprise protocol layers NR MAC 601, NR RLC 602 and 603, and NR PDCP 604 and 605. The secondary gNB may comprise protocol layers NR MAC 611, NR RLC 612 and 613, and NR PDCP 614. The secondary gNB may comprise protocol layers NR MAC 621, NR RLC 622 and 623, and NR PDCP 624. The master gNB 600 may communicate via an interface 606 and/or via an interface 607, the secondary gNB 610 may communicate via an interface 615, and the secondary gNB 620 may communicate via an interface 625. The master gNB 600 may also communicate with the secondary gNB 610 and the secondary gNB 620 via interfaces 608 and 609, respectively, which may include Xn interfaces. For example, the master gNB 600 may communicate via the interface 608, at layer NR PDCP 605, and with the secondary gNB 610 at layer NR RLC 612. The master gNB 600 may communicate via the interface 609, at layer NR PDCP 605, and with the secondary gNB 620 at layer NR RLC 622.

FIG. 7 shows an example structure for the UE side MAC entities, for example, if a Master Cell Group (MCG) and a Secondary Cell Group (SCG) are configured. Media Broadcast Multicast Service (MBMS) reception may be included but is not shown in this figure for simplicity.

In multi-connectivity, the radio protocol architecture that a particular bearer uses may depend on how the bearer is set up. As an example, three alternatives may exist, an MCG bearer, an SCG bearer, and a split bearer, such as shown in FIG. 6. NR RRC may be located in a master gNB and SRBs may be configured as a MCG bearer type and may use the radio resources of the master gNB. Multi-connectivity may have at least one bearer configured to use radio resources provided by the secondary gNB. Multi-connectivity may or may not be configured or implemented.

For multi-connectivity, the wireless device may be configured with multiple NR MAC entities: e.g., one NR MAC entity for a master gNB, and other NR MAC entities for secondary gNBs. In multi-connectivity, the configured set of serving cells for a wireless device may comprise two subsets: e.g., the Master Cell Group (MCG) including the serving cells of the master gNB, and the Secondary Cell Groups (SCGs) including the serving cells of the secondary gNBs.

At least one cell in a SCG may have a configured UL component carrier (CC) and one of the UL CCs, for example, named PSCell (or PCell of SCG, or sometimes called PCell), may be configured with PUCCH resources. If the SCG is configured, there may be at least one SCG bearer or one split bearer. If a physical layer problem or a random access problem on a PSCell occurs or is detected, if the maximum number of NR RLC retransmissions has been reached associated with the SCG, or if an access problem on a PSCell during a SCG addition or a SCG change occurs or is detected, then an RRC connection re-establishment procedure may not be triggered, UL transmissions towards cells of the SCG may be stopped, a master gNB may be informed by the wireless device of a SCG failure type, and for a split bearer the DL data transfer over the master gNB may be maintained. The NR RLC Acknowledge Mode (AM) bearer may be configured for the split bearer. Like the PCell, a PSCell may not be de-activated. The PSCell may be changed with an SCG change (e.g., with a security key change and a RACH procedure). A direct bearer type may change between a split bearer and an SCG bearer, or a simultaneous configuration of an SCG and a split bearer may or may not be supported.

A master gNB and secondary gNBs may interact for multi-connectivity. The master gNB may maintain the RRM measurement configuration of the wireless device, and the master gNB may, (e.g., based on received measurement reports, and/or based on traffic conditions and/or bearer types), decide to ask a secondary gNB to provide additional resources (e.g., serving cells) for a wireless device. If a request from the master gNB is received, a secondary gNB may create a container that may result in the configuration of additional serving cells for the wireless device (or the secondary gNB decide that it has no resource available to do so). For wireless device capability coordination, the master gNB may provide some or all of the Active Set (AS) configuration and the wireless device capabilities to the secondary gNB. The master gNB and the secondary gNB may exchange information about a wireless device configuration, such as by employing NR RRC containers (e.g., inter-node messages) carried in Xn messages. The secondary gNB may initiate a reconfiguration of its existing serving cells (e.g., PUCCH towards the secondary gNB). The secondary gNB may decide which cell is the PSCell within the SCG. The master gNB may or may not change the content of the NR RRC configuration provided by the secondary gNB. In an SCG addition and an SCG SCell addition, the master gNB may provide the latest measurement results for the SCG cell(s). Both a master gNB and a secondary gNBs may know the system frame number (SFN) and subframe offset of each other by operations, administration, and maintenance (OAM) (e.g., for the purpose of discontinuous reception (DRX) alignment and identification of a measurement gap). If adding a new SCG SCell, dedicated NR RRC signaling may be used for sending required system information of the cell for CA, except, for example, for the SFN acquired from an MIB of the PSCell of an SCG.

FIG. 7 shows an example of dual-connectivity (DC) for two MAC entities at a wireless device side. A first MAC entity may comprise a lower layer of an MCG 700, an upper layer of an MCG 718, and one or more intermediate layers of an MCG 719. The lower layer of the MCG 700 may comprise, for example, a paging channel (PCH) 701, a broadcast channel (BCH) 702, a downlink shared channel (DL-SCH) 703, an uplink shared channel (UL-SCH) 704, and a random access channel (RACH) 705. The one or more intermediate layers of the MCG 719 may comprise, for example, one or more hybrid automatic repeat request (HARQ) processes 706, one or more random access control processes 707, multiplexing and/or de-multiplexing processes 709, logical channel prioritization on the uplink processes 710, and a control processes 708 providing control for the above processes in the one or more intermediate layers of the MCG 719. The upper layer of the MCG 718 may comprise, for example, a paging control channel (PCCH) 711, a broadcast control channel (BCCH) 712, a common control channel (CCCH) 713, a dedicated control channel (DCCH) 714, a dedicated traffic channel (DTCH) 715, and a MAC control 716.

A second MAC entity may comprise a lower layer of an SCG 720, an upper layer of an SCG 738, and one or more intermediate layers of an SCG 739. The lower layer of the SCG 720 may comprise, for example, a BCH 722, a DL-SCH 723, an UL-SCH 724, and a RACH 725. The one or more intermediate layers of the SCG 739 may comprise, for example, one or more HARQ processes 726, one or more random access control processes 727, multiplexing and/or de-multiplexing processes 729, logical channel prioritization on the uplink processes 730, and a control processes 728 providing control for the above processes in the one or more intermediate layers of the SCG 739. The upper layer of the SCG 738 may comprise, for example, a BCCH 732, a DCCH 714, a DTCH 735, and a MAC control 736.

Serving cells may be grouped in a TA group (TAG). Serving cells in one TAG may use the same timing reference. For a given TAG, a wireless device may use at least one downlink carrier as a timing reference. For a given TAG, a wireless device may synchronize uplink subframe and frame transmission timing of uplink carriers belonging to the same TAG. Serving cells having an uplink to which the same TA applies may correspond to serving cells hosted by the same receiver. A wireless device supporting multiple TAs may support two or more TA groups. One TA group may include the PCell and may be called a primary TAG (pTAG). In a multiple TAG configuration, at least one TA group may not include the PCell and may be called a secondary TAG (sTAG). Carriers within the same TA group may use the same TA value and/or the same timing reference. If DC is configured, cells belonging to a cell group (e.g., MCG or SCG) may be grouped into multiple TAGs including a pTAG and one or more sTAGs.

FIG. 8 shows example TAG configurations. In Example 1, a pTAG comprises a PCell, and an sTAG comprises an SCell1. In Example 2, a pTAG comprises a PCell and an SCell1, and an sTAG comprises an SCell2 and an SCell3. In Example 3, a pTAG comprises a PCell and an SCell1, and an sTAG1 comprises an SCell2 and an SCell3, and an sTAG2 comprises a SCell4. Up to four TAGs may be supported in a cell group (MCG or SCG), and other example TAG configurations may also be provided. In various examples, structures and operations are described for use with a pTAG and an sTAG. Some of the examples may be used for configurations with multiple sTAGs.

An eNB may initiate an RA procedure, via a PDCCH order, for an activated SCell. The PDCCH order may be sent on a scheduling cell of this SCell. If cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
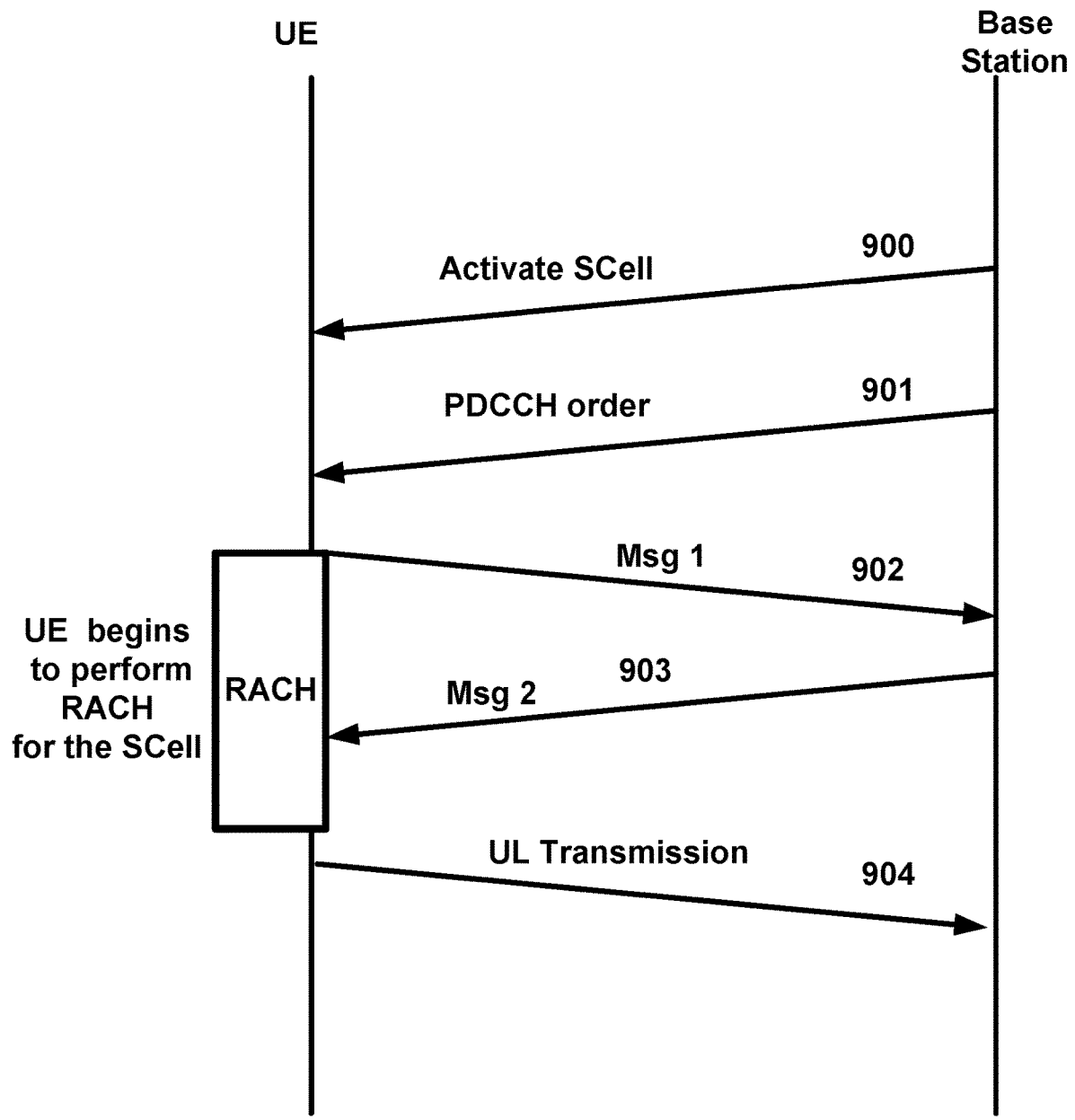
FIG. 9 shows example message flow in a random access process in a secondary TAG.

FIG. 9 shows an example of random access processes, and a corresponding message flow, in a secondary TAG. A base station, such as an eNB, may transmit an activation command 900 to a wireless device, such as a UE. The activation command 900 may be transmitted to activate an SCell. The base station may also transmit a PDCCH order 901 to the wireless device, which may be transmitted, for example, after the activation command 900. The wireless device may begin to perform a RACH process for the SCell, which may be initiated, for example, after receiving the PDCCH order 901. A wireless device may transmit to the base station (e.g., as part of a RACH process) a preamble 902 (e.g., Msg1), such as a random access preamble (RAP). The preamble 902 may be transmitted after or in response to the PDCCH order 901. The wireless device may transmit the preamble 902 via an SCell belonging to an sTAG. Preamble transmission for SCells may be controlled by a network using PDCCH format 1A. The base station may send a random access response (RAR) 903 (e.g., Msg2 message) to the wireless device. The RAR 903 may be after or in response to the preamble 902 transmission via the SCell. The RAR 903 may be addressed to a random access radio network temporary identifier (RA-RNTI) in a PCell common search space (CSS). If the wireless device receives the RAR 903, the RACH process may conclude. The RACH process may conclude, for example, after or in response to the wireless device receiving the RAR 903 from the base station. After the RACH process, the wireless device may transmit an uplink transmission 904. The uplink transmission 904 may comprise uplink packets transmitted via the same SCell used for the preamble 902 transmission.

Timing alignment (e.g., initial timing alignment) for communications between the wireless device and the base station may be performed through a random access procedure, such as described above regarding FIG. 9. The random access procedure may involve a wireless device, such as a UE, transmitting a random access preamble and a base station, such as an eNB, responding with an initial TA command $N_{TA}$ (amount of timing advance) within a random access response window. The start of the random access preamble may be aligned with the start of a corresponding uplink subframe at the wireless device assuming $N_{TA}=0$. The eNB may estimate the uplink timing from the random access preamble transmitted by the wireless device. The TA command may be derived by the eNB based on the estimation of the difference between the desired UL timing and the actual UL timing. The wireless device may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. If an eNB performs an SCell addition configuration, the related TAG configuration may be configured for the SCell. An eNB may modify the TAG configuration of an SCell by removing (e.g., releasing) the SCell and adding (e.g., configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In some examples, it may not be possible to change the TAG associated with an SCell, but rather, the SCell may need to be removed and a new SCell may need to be added with another TAG. For example, if there is a need to move an SCell from an sTAG to a pTAG, at least one RRC message, such as at least one RRC reconfiguration message, may be sent to the wireless device. The at least one RRC message may be sent to the wireless device to reconfigure TAG configurations, for example, by releasing the SCell and configuring the SCell as a part of the pTAG. If, for example, an SCell is added or configured without a TAG index, the SCell may be explicitly assigned to the pTAG. The PCell may not change its TA group and may be a member of the pTAG.

The purpose of an RRC connection reconfiguration procedure may be to modify an RRC connection, (e.g., to establish, modify and/or release RBs, to perform handover, to setup, modify, and/or release measurements, to add, modify, and/or release SCells). If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

In LTE Release-10 and Release-11 CA, a PUCCH transmission is only transmitted on a PCell (e.g., a PSCell) to an eNB. In LTE-Release 12 and earlier, a wireless device may transmit PUCCH information on one cell (e.g., a PCell or a PSCell) to a given eNB. As the number of CA capable wireless devices increases, and as the number of aggregated carriers increase, the number of PUCCHs and the PUCCH payload size may increase. Accommodating the PUCCH transmissions on the PCell may lead to a high PUCCH load on the PCell. A PUCCH on an SCell may be used to offload the PUCCH resource from the PCell. More than one PUCCH may be configured. For example, a PUCCH on a PCell may be configured and another PUCCH on an SCell may be configured. One, two, or more cells may be configured with PUCCH resources for transmitting CSI, acknowledgment (ACK), and/or non-acknowledgment (NACK) to a base station. Cells may be grouped into multiple PUCCH groups, and one or more cell within a group may be configured with a PUCCH. One SCell may belong to one PUCCH group. SCells with a configured PUCCH transmitted to a base station may be called a PUCCH SCell, and a cell group with a common PUCCH resource transmitted to the same base station may be called a PUCCH group.

A MAC entity may have a configurable timer, for example, timeAlignmentTimer, per TAG. The timeAlignmentTimer may be used to control how long the MAC entity considers the serving cells belonging to the associated TAG to be uplink time aligned. If a Timing Advance Command MAC control element is received, the MAC entity may apply the Timing Advance Command for the indicated TAG; and/or the MAC entity may start or restart the timeAlignmentTimer associated with a TAG that may be indicated by the Timing Advance Command MAC control element. If a Timing Advance Command is received in a Random Access Response message for a serving cell belonging to a TAG, the MAC entity may apply the Timing Advance Command for this TAG and/or start or restart the timeAlignmentTimer associated with this TAG. Additionally or alternatively, if the Random Access Preamble is not selected by the MAC entity, the MAC entity may apply the Timing Advance Command for this TAG and/or start or restart the timeAlignmentTimer associated with this TAG. If the timeAlignmentTimer associated with this TAG is not running, the Timing Advance Command for this TAG may be applied, and the timeAlignmentTimer associated with this TAG may be started. If the contention resolution is not successful, a timeAlignmentTimer associated with this TAG may be stopped. If the contention resolution is successful, the MAC entity may ignore the received Timing Advance Command. The MAC entity may determine whether the contention resolution is successful or whether the contention resolution is not successful.

A timer may be considered to be running after it is started, until it is stopped, or until it expires; otherwise it may be considered to not be running. A timer can be started if it is not running or restarted if it is running. For example, a timer may be started or restarted from its initial value.

Features described herein may enable operation of multi-carrier communications. Features may comprise a non-transitory tangible computer readable media comprising instructions executable by one or more processors to cause operation of multi-carrier communications. The features may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The devices herein may include processors, memory, interfaces, and/or the like. Features may comprise communication networks comprising devices such as base stations, wireless devices (or user equipment: UE), servers, switches, antennas, and/or the like.

FIG. 10A and FIG. 10B show examples for interfaces between a 5G core network (e.g., NGC) and base stations (e.g., gNB and eLTE eNB). A base station, such as a gNB 1020, may be interconnected to an NGC 1010 control plane employing an NG-C interface. The base station, for example, the gNB 1020, may also be interconnected to an NGC 1010 user plane (e.g., UPGW) employing an NG-U interface. As another example, a base station, such as an eLTE eNB 1040, may be interconnected to an NGC 1030 control plane employing an NG-C interface. The base station, for example, the eLTE eNB 1040, may also be interconnected to an NGC 1030 user plane (e.g., UPGW) employing an NG-U interface. An NG interface may support a many-to-many relation between 5G core networks and base stations.

FIG. 11A, FIG. 11B, FIG. 11C, FIG. 11D, FIG. 11E, and FIG. 11F are examples for architectures of tight interworking between a 5G RAN and an LTE RAN. The tight interworking may enable a multiple receiver/transmitter (RX/TX) wireless device in an RRC_CONNECTED state to be configured to utilize radio resources provided by two schedulers located in two base stations (e.g., an eLTE eNB and a gNB). The two base stations may be connected via a non-ideal or ideal backhaul over the Xx interface between an LTE eNB and a gNB, or over the Xn interface between an eLTE eNB and a gNB. Base stations involved in tight interworking for a certain wireless device may assume different roles. For example, a base station may act as a master base station or a base station may act as a secondary base station. In tight interworking, a wireless device may be connected to both a master base station and a secondary base station. Mechanisms implemented in tight interworking may be extended to cover more than two base stations.

A master base station may be an LTE eNB 1102A or an LTE eNB 1102B, which may be connected to EPC nodes 1101A or 1101B, respectively. This connection to EPC nodes may be, for example, to an MME via the S1-C interface and/or to an S-GW via the S1-U interface. A secondary base station may be a gNB 1103A or a gNB 1103B, either or both of which may be a non-standalone node having a control plane connection via an Xx-C interface to an LTE eNB (e.g., the LTE eNB 1102A or the LTE eNB 1102B). In the tight interworking architecture of FIG. 11A, a user plane for a gNB (e.g., the gNB 1103A) may be connected to an S-GW (e.g., the EPC 1101A) through an LTE eNB (e.g., the LTE eNB 1102A), via an Xx-U interface between the LTE eNB and the gNB, and via an S1-U interface between the LTE eNB and the S-GW. In the architecture of FIG. 11B, a user plane for a gNB (e.g., the gNB 1103B) may be connected directly to an S-GW (e.g., the EPC 1101B) via an S1-U interface between the gNB and the S-GW.

A master base station may be a gNB 1103C or a gNB 1103D, which may be connected to NGC nodes 1101C or 1101D, respectively. This connection to NGC nodes may be, for example, to a control plane core node via the NG-C interface and/or to a user plane core node via the NG-U interface. A secondary base station may be an eLTE eNB 1102C or an eLTE eNB 1102D, either or both of which may be a non-standalone node having a control plane connection via an Xn-C interface to a gNB (e.g., the gNB 1103C or the gNB 1103D). In the tight interworking architecture of FIG. 11C, a user plane for an eLTE eNB (e.g., the eLTE eNB 1102C) may be connected to a user plane core node (e.g., the NGC 1101C) through a gNB (e.g., the gNB 1103C), via an Xn-U interface between the eLTE eNB and the gNB, and via an NG-U interface between the gNB and the user plane core node. In the architecture of FIG. 11D, a user plane for an eLTE eNB (e.g., the eLTE eNB 1102D) may be connected directly to a user plane core node (e.g., the NGC 1101D) via an NG-U interface between the eLTE eNB and the user plane core node.

A master base station may be an eLTE eNB 1102E or an eLTE eNB 1102F, which may be connected to NGC nodes 1101E or 1101F, respectively. This connection to NGC nodes may be, for example, to a control plane core node via the NG-C interface and/or to a user plane core node via the NG-U interface. A secondary base station may be a gNB 1103E or a gNB 1103F, either or both of which may be a non-standalone node having a control plane connection via an Xn-C interface to an eLTE eNB (e.g., the eLTE eNB 1102E or the eLTE eNB 1102F). In the tight interworking architecture of FIG. 11E, a user plane for a gNB (e.g., the gNB 1103E) may be connected to a user plane core node (e.g., the NGC 1101E) through an eLTE eNB (e.g., the eLTE eNB 1102E), via an Xn-U interface between the eLTE eNB and the gNB, and via an NG-U interface between the eLTE eNB and the user plane core node. In the architecture of FIG. 11F, a user plane for a gNB (e.g., the gNB 1103F) may be connected directly to a user plane core node (e.g., the NGC 1101F) via an NG-U interface between the gNB and the user plane core node.

FIG. 12A, FIG. 12B, and FIG. 12C are examples for radio protocol structures of tight interworking bearers.

An LTE eNB 1201A may be an S1 master base station, and a gNB 1210A may be an S1 secondary base station. An example for a radio protocol architecture for a split bearer and an SCG bearer is shown. The LTE eNB 1201A may be connected to an EPC with a non-standalone gNB 1210A, via an Xx interface between the PDCP 1206A and an NR RLC 1212A. The LTE eNB 1201A may include protocol layers MAC 1202A, RLC 1203A and RLC 1204A, and PDCP 1205A and PDCP 1206A. An MCG bearer type may interface with the PDCP 1205A, and a split bearer type may interface with the PDCP 1206A. The gNB 1210A may include protocol layers NR MAC 1211A, NR RLC 1212A and NR RLC 1213A, and NR PDCP 1214A. An SCG bearer type may interface with the NR PDCP 1214A.

A gNB 1201B may be an NG master base station, and an eLTE eNB 1210B may be an NG secondary base station. An example for a radio protocol architecture for a split bearer and an SCG bearer is shown. The gNB 1201B may be connected to an NGC with a non-standalone eLTE eNB 1210B, via an Xn interface between the NR PDCP 1206B and an RLC 1212B. The gNB 1201B may include protocol layers NR MAC 1202B, NR RLC 1203B and NR RLC 1204B, and NR PDCP 1205B and NR PDCP 1206B. An MCG bearer type may interface with the NR PDCP 1205B, and a split bearer type may interface with the NR PDCP 1206B. The eLTE eNB 1210B may include protocol layers MAC 1211B, RLC 1212B and RLC 1213B, and PDCP 1214B. An SCG bearer type may interface with the PDCP 1214B.

An eLTE eNB 1201C may be an NG master base station, and a gNB 1210C may be an NG secondary base station. An example for a radio protocol architecture for a split bearer and an SCG bearer is shown. The eLTE eNB 1201C may be connected to an NGC with a non-standalone gNB 1210C, via an Xn interface between the PDCP 1206C and an NR RLC 1212C. The eLTE eNB 1201C may include protocol layers MAC 1202C, RLC 1203C and RLC 1204C, and PDCP 1205C and PDCP 1206C. An MCG bearer type may interface with the PDCP 1205C, and a split bearer type may interface with the PDCP 1206C. The gNB 1210C may include protocol layers NR MAC 1211C, NR RLC 1212C and NR RLC 1213C, and NR PDCP 1214C. An SCG bearer type may interface with the NR PDCP 1214C.

In a 5G network, the radio protocol architecture that a particular bearer uses may depend on how the bearer is setup. At least three alternatives may exist, for example, an MCG bearer, an SCG bearer, and a split bearer, such as shown in FIG. 12A, FIG. 12B, and FIG. 12C. The NR RRC may be located in a master base station, and the SRBs may be configured as an MCG bearer type and may use the radio resources of the master base station. Tight interworking may have at least one bearer configured to use radio resources provided by the secondary base station. Tight interworking may or may not be configured or implemented.

The wireless device may be configured with two MAC entities: e.g., one MAC entity for a master base station, and one MAC entity for a secondary base station. In tight interworking, the configured set of serving cells for a wireless device may comprise of two subsets: e.g., the Master Cell Group (MCG) including the serving cells of the master base station, and the Secondary Cell Group (SCG) including the serving cells of the secondary base station.

At least one cell in a SCG may have a configured UL CC and one of them, for example, a PSCell (or the PCell of the SCG, which may also be called a PCell), is configured with PUCCH resources. If the SCG is configured, there may be at least one SCG bearer or one split bearer. If one or more of a physical layer problem or a random access problem is detected on a PSCell, if the maximum number of (NR) RLC retransmissions associated with the SCG has been reached, and/or if an access problem on a PSCell during an SCG addition or during an SCG change is detected, then: an RRC connection re-establishment procedure may not be triggered, UL transmissions towards cells of the SCG may be stopped, a master base station may be informed by the wireless device of a SCG failure type, and/or for a split bearer the DL data transfer over the master base station may be maintained. The RLC AM bearer may be configured for the split bearer. Like the PCell, a PSCell may not be de-activated. A PSCell may be changed with an SCG change, for example, with security key change and a RACH procedure. A direct bearer type change, between a split bearer and an SCG bearer, may not be supported. Simultaneous configuration of an SCG and a split bearer may not be supported.

A master base station and a secondary base station may interact. The master base station may maintain the RRM measurement configuration of the wireless device. The master base station may determine to ask a secondary base station to provide additional resources (e.g., serving cells) for a wireless device. This determination may be based on, for example, received measurement reports, traffic conditions, and/or bearer types. If a request from the master base station is received, a secondary base station may create a container that may result in the configuration of additional serving cells for the wireless device, or the secondary base station may determine that it has no resource available to do so. The master base station may provide at least part of the AS configuration and the wireless device capabilities to the secondary base station, for example, for wireless device capability coordination. The master base station and the secondary base station may exchange information about a wireless device configuration such as by using RRC containers (e.g., inter-node messages) carried in Xn or Xx messages. The secondary base station may initiate a reconfiguration of its existing serving cells (e.g., PUCCH towards the secondary base station). The secondary base station may determine which cell is the PSCell within the SCG. The master base station may not change the content of the RRC configuration provided by the secondary base station. If an SCG is added and/or an SCG SCell is added, the master base station may provide the latest measurement results for the SCG cell(s). Either or both of a master base station and a secondary base station may know the SFN and subframe offset of each other by OAM, (e.g., for the purpose of DRX alignment and identification of a measurement gap). If a new SCG SCell is added, dedicated RRC signaling may be used for sending required system information of the cell, such as for CA, except, for example, for the SFN acquired from an MIB of the PSCell of an SCG.

FIG. 13A and FIG. 13B show examples for gNB deployment. A core 1301 and a core 1310 may interface with other nodes via RAN-CN interfaces. In a non-centralized deployment example, the full protocol stack (e.g., NR RRC, NR PDCP, NR RLC, NR MAC, and NR PHY) may be supported at one node, such as a gNB 1302, a gNB 1303, and/or an eLTE eNB or LTE eNB 1304. These nodes (e.g., the gNB 1302, the gNB 1303, and the eLTE eNB or LTE eNB 1304) may interface with one of more of each other via a respective inter-BS interface. In a centralized deployment example, upper layers of a gNB may be located in a Central Unit (CU) 1311, and lower layers of the gNB may be located in Distributed Units (DU) 1312, 1313, and 1314. The CU-DU interface (e.g., Fs interface) connecting CU 1311 and DUs 1312, 1313, and 1314 may be ideal or non-ideal. The Fs-C may provide a control plane connection over the Fs interface, and the Fs-U may provide a user plane connection over the Fs interface. In the centralized deployment, different functional split options between the CU 1311 and the DUs 1312, 1313, and 1314 may be possible by locating different protocol layers (e.g., RAN functions) in the CU 1311 and in the DU 1312, 1313, and 1314. The functional split may support flexibility to move the RAN functions between the CU 1311 and the DUs 1312, 1313, and 1314 depending on service requirements and/or network environments. The functional split option may change during operation (e.g., after the Fs interface setup procedure), or the functional split option may change only in the Fs setup procedure (e.g., the functional split option may be static during operation after Fs setup procedure).

Figure 14:
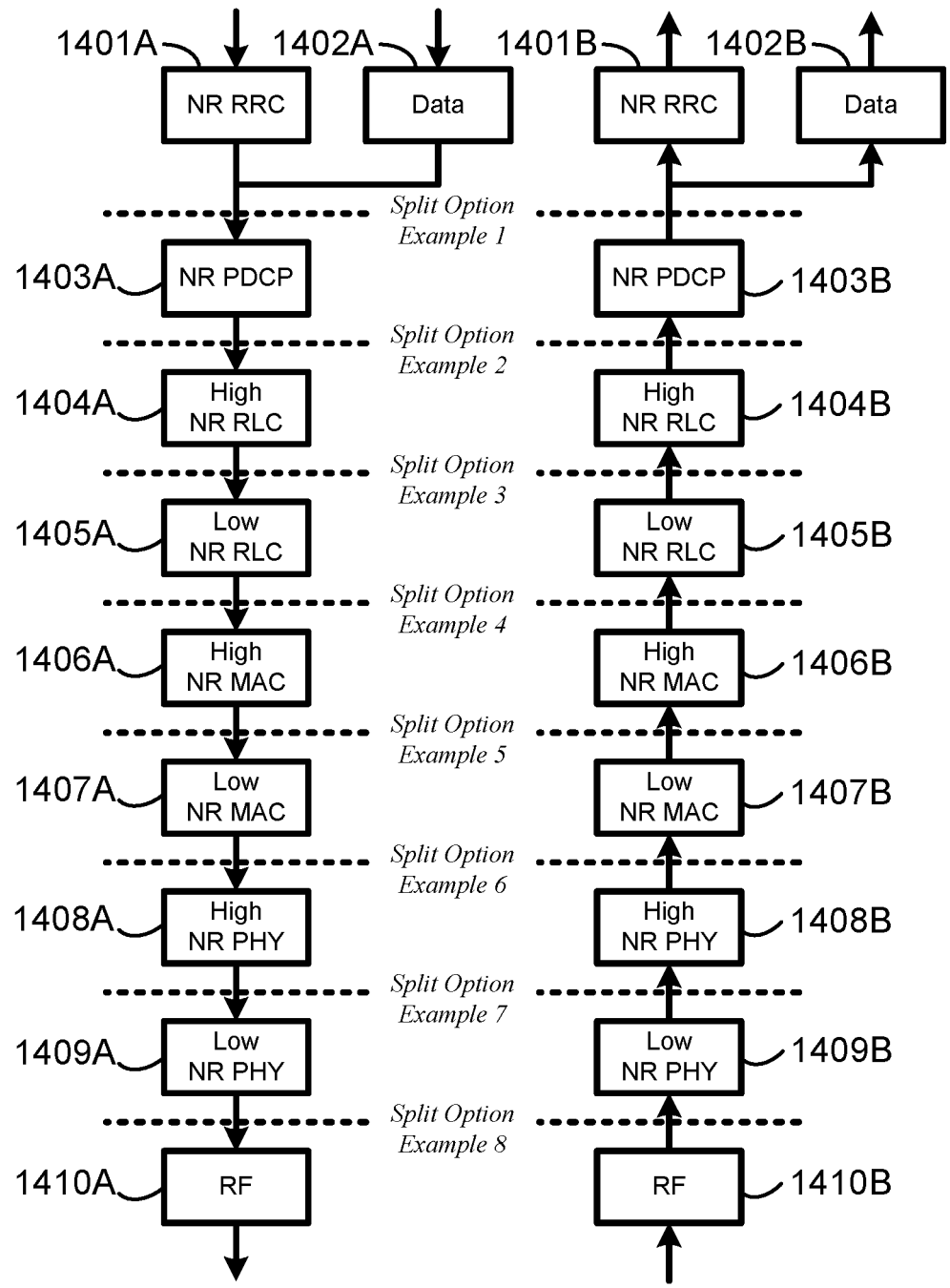
FIG. 14 shows functional split option examples of a centralized gNB deployment.

FIG. 14 shows examples for different functional split options of a centralized gNB deployment. Element numerals that are followed by "A" or "B" designations in FIG. 14 may represent the same elements in different traffic flows, for example, either receiving data (e.g., data 1402A) or sending data (e.g., 1402B). In the split option example 1, an NR RRC 1401 may be in a CU, and an NR PDCP 1403, an NR RLC (e.g., comprising a High NR RLC 1404 and/or a Low NR RLC 1405), an NR MAC (e.g., comprising a High NR MAC 1406 and/or a Low NR MAC 1407), an NR PHY (e.g., comprising a High NR PHY 1408 and/or a LOW NR PHY 1409), and an RF 1410 may be in a DU. In the split option example 2, the NR RRC 1401 and the NR PDCP 1403 may be in a CU, and the NR RLC, the NR MAC, the NR PHY, and the RF 1410 may be in a DU. In the split option example 3, the NR RRC 1401, the NR PDCP 1403, and a partial function of the NR RLC (e.g., the High NR RLC 1404) may be in a CU, and the other partial function of the NR RLC (e.g., the Low NR RLC 1405), the NR MAC, the NR PHY, and the RF 1410 may be in a DU. In the split option example 4, the NR RRC 1401, the NR PDCP 1403, and the NR RLC may be in a CU, and the NR MAC, the NR PHY, and the RF 1410 may be in a DU. In the split option example 5, the NR RRC 1401, the NR PDCP 1403, the NR RLC, and a partial function of the NR MAC (e.g., the High NR MAC 1406) may be in a CU, and the other partial function of the NR MAC (e.g., the Low NR MAC 1407), the NR PHY, and the RF 1410 may be in a DU. In the split option example 6, the NR RRC 1401, the NR PDCP 1403, the NR RLC, and the NR MAC may be in CU, and the NR PHY and the RF 1410 may be in a DU. In the split option example 7, the NR RRC 1401, the NR PDCP 1403, the NR RLC, the NR MAC, and a partial function of the NR PHY (e.g., the High NR PHY 1408) may be in a CU, and the other partial function of the NR PHY (e.g., the Low NR PHY 1409) and the RF 1410 may be in a DU. In the split option example 8, the NR RRC 1401, the NR PDCP 1403, the NR RLC, the NR MAC, and the NR PHY may be in a CU, and the RF 1410 may be in a DU.

The functional split may be configured per CU, per DU, per wireless device, per bearer, per slice, and/or with other granularities. In a per CU split, a CU may have a fixed split, and DUs may be configured to match the split option of the CU. In a per DU split, each DU may be configured with a different split, and a CU may provide different split options for different DUs. In a per wireless device split, a gNB (e.g., a CU and a DU) may provide different split options for different wireless devices. In a per bearer split, different split options may be utilized for different bearer types. In a per slice splice, different split options may be applied for different slices.

A new radio access network (new RAN) may support different network slices, which may allow differentiated treatment customized to support different service requirements with end to end scope. The new RAN may provide a differentiated handling of traffic for different network slices that may be pre-configured, and the new RAN may allow a single RAN node to support multiple slices. The new RAN may support selection of a RAN part for a given network slice, for example, by one or more slice ID(s) or NSSAI(s) provided by a wireless device or provided by an NGC (e.g., an NG CP). The slice ID(s) or NSSAI(s) may identify one or more of pre-configured network slices in a PLMN. For an initial attach, a wireless device may provide a slice ID and/or an NSSAI, and a RAN node (e.g., a gNB) may use the slice ID or the NSSAI for routing an initial NAS signaling to an NGC control plane function (e.g., an NG CP). If a wireless device does not provide any slice ID or NSSAI, a RAN node may send a NAS signaling to a default NGC control plane function. For subsequent accesses, the wireless device may provide a temporary ID for a slice identification, which may be assigned by the NGC control plane function, to enable a RAN node to route the NAS message to a relevant NGC control plane function. The new RAN may support resource isolation between slices. If the RAN resource isolation is implemented, shortage of shared resources in one slice does not cause a break in a service level agreement for another slice.

The amount of data traffic carried over networks is expected to increase for many years to come. The number of users and/or devices is increasing and each user/device accesses an increasing number and variety of services, for example, video delivery, large files, and images. This requires not only high capacity in the network, but also provisioning very high data rates to meet customers' expectations on interactivity and responsiveness. More spectrum may be required for network operators to meet the increasing demand. Considering user expectations of high data rates along with seamless mobility, it is beneficial that more spectrum be made available for deploying macro cells as well as small cells for communication systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, if present, may be an effective complement to licensed spectrum for network operators, for example, to help address the traffic explosion in some examples, such as hotspot areas. Licensed Assisted Access (LAA) offers an alternative for operators to make use of unlicensed spectrum, for example, if managing one radio network, offering new possibilities for optimizing the network's efficiency.

Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

Discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access, for example, via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices, time synchronization of wireless devices, and frequency synchronization of wireless devices.

DL LAA design may employ subframe boundary alignment according to LTE-A carrier aggregation timing relationships across serving cells aggregated by CA. This may not indicate that the eNB transmissions may start only at the subframe boundary. LAA may support transmitting PDSCH if not all OFDM symbols are available for transmission in a subframe according to LBT. Delivery of necessary control information for the PDSCH may also be supported.

LBT procedures may be employed for fair and friendly coexistence of LAA with other operators and technologies operating in unlicensed spectrum. LBT procedures on a node attempting to transmit on a carrier in unlicensed spectrum may require the node to perform a clear channel assessment to determine if the channel is free for use. An LBT procedure may involve at least energy detection to determine if the channel is being used. For example, regulatory requirements in some regions, for example, in Europe, specify an energy detection threshold such that if a node receives energy greater than this threshold, the node assumes that the channel is not free. Nodes may follow such regulatory requirements. A node may optionally use a lower threshold for energy detection than that specified by regulatory requirements. LAA may employ a mechanism to adaptively change the energy detection threshold, for example, LAA may employ a mechanism to adaptively change (e.g., lower or increase) the energy detection threshold from an upper bound. Adaptation mechanism may not preclude static or semi-static setting of the threshold. A Category 4 LBT mechanism or other type of LBT mechanisms may be implemented.

Various example LBT mechanisms may be implemented. For some signals, in some implementation scenarios, in some situations, and/or in some frequencies, no LBT procedure may performed by the transmitting entity. Category 2 (e.g., LBT without random back-off) may be implemented. The duration of time that the channel is sensed to be idle before the transmitting entity transmits may be deterministic. Category 3 (e.g., LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle, for example, before the transmitting entity transmits on the channel. Category 4 (e.g., LBT with random back-off with a contention window of variable size) may be implemented. The transmitting entity may draw a random number N within a contention window. The size of contention window may be specified by the minimum and maximum value of N. The transmitting entity may vary the size of the contention window if drawing the random number N. The random number N may be used in the LBT procedure to determine the duration of time that the channel is sensed to be idle, for example, before the transmitting entity transmits on the channel.

LAA may employ uplink LBT at the wireless device. The UL LBT scheme may be different from the DL LBT scheme, for example, by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

LAA may use uplink LBT at the wireless device. The UL LBT scheme may be different from the DL LBT scheme, for example, by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

A DL transmission burst may be a continuous transmission from a DL transmitting node, for example, with no transmission immediately before or after from the same node on the same CC. An UL transmission burst from a wireless device perspective may be a continuous transmission from a wireless device, for example, with no transmission immediately before or after from the same wireless device on the same CC. A UL transmission burst may be defined from a wireless device perspective or from a base station perspective. If a base station is operating DL and UL LAA over the same unlicensed carrier, DL transmission burst(s) and UL transmission burst(s) on LAA may be scheduled in a TDM manner over the same unlicensed carrier. An instant in time may be part of a DL transmission burst or part of an UL transmission burst.

A wireless device may use at least one wireless device (e.g., UE) procedure for receiving control information described herein for a MCG and a SCG (e.g., if the wireless device is configured with an SCG). The terms 'secondary cell,' 'secondary cells,' 'serving cell,' 'serving cells' may refer to secondary cell, secondary cells, serving cell, and/or serving cells belonging to the MCG, respectively, for example, if the at least one procedure is used for MCG. The terms 'secondary cell,' 'secondary cells,' 'serving cell,' 'serving cells' may refer to secondary cell, secondary cells (which may or may not include a PSCell), serving cell, and/or serving cells belonging to the SCG, respectively, for example, if the at least one procedure is used for SCG. The term 'primary cell' associated with the SCG may refer to the PSCell of the SCG.

A wireless device that is configured for operation in bandwidth parts (BWPs) of a cell may be configured, by one or more higher layers for the cell, with a set of one or more BWPs (e.g., which may be up to four BWPs or any other number of BWPs). The set of one or more BWPs may comprise a set of one or more DL BWPs for receptions by the wireless device (DL BWP set) in a DL bandwidth by at least one parameter DL-BWP for the cell and may comprise a set of one or more UL BWPs (e.g., which may be up to four BWPs or any other number of BWPs) for transmissions by the wireless device (UL BWP set) in an UL bandwidth by at least one parameter UL-BWP for the cell.

An initial active DL BWP may be defined by at least one of a location and number of contiguous PRBs, a subcarrier spacing, and/or a cyclic prefix, for the control resource set for Type0-PDCCH common search space. For operation on the primary cell, a wireless device may be provided, by one or more higher layer parameters, with an initial UL BWP. The initial UL BWP may be for a random access procedure. The wireless device may be configured with an initial BWP for a random access procedure on a supplementary (or secondary) uplink carrier on the primary cell, for example, if the wireless device is configured with the supplementary (or secondary) uplink carrier.

For unpaired spectrum operation, a wireless device may expect that a center frequency for a DL BWP may be the same as a center frequency for a UL BWP. For example, for a DL BWP or a UL BWP in a set of one or more DL BWPs or one or more UL BWPs, respectively, the wireless device may be configured, for a cell, with one or more parameters indicating at least one of the following: a subcarrier spacing (e.g., provided by a higher layer parameter DL-BWP-mu or UL-BWP-mu); a cyclic prefix (e.g., provided by a higher layer parameter DL-BWP-CP or UL-BWP-CP); a number of contiguous PRBs (e.g., provided by a higher layer parameter DL-BWP-BW and/or UL-BWP-BW); an index in the set of one or more DL BWPs and/or one or more UL BWPs (e.g., provided by respective higher layer parameters DL-BWP-index and UL-BWP-index for a paired spectrum operation) or a link between a DL BWP and an UL BWP from the set of configured DL BWPs and UL BWPs (e.g., provided by higher layer parameter BWP-pair-index for an unpaired spectrum operation); a DCI (e.g., DCI 1_0 and/or DCI 1_1) detection to a PDSCH reception timing by higher layer parameter DL-data-time-domain, a PDSCH reception to a HARQ-ACK transmission timing value by higher layer parameter DL-data-DL-acknowledgement, a DCI (e.g., DCI 0_0 and/or DCI 0_1) detection to a PUSCH transmission timing value by higher layer parameter UL-data-time-domain; and/or an offset of the first PRB of the DL bandwidth or the UL bandwidth, respectively, relative to the first PRB of a bandwidth by higher layer parameter DL-BWP-loc or UL-BWP-loc. For the downlink of the primary cell, the first PRB of the bandwidth may be the first RPB of the SS/PBCH block used by the wireless device for an initial cell selection. For the uplink of the primary cell for a paired spectrum operation, the first PRB of the bandwidth may be the first PRB of the UL bandwidth indicated by SystemInformationBlockType1. For the uplink of the primary cell for unpaired, the first PRB of the bandwidth may be the first PRB of the SS/PBCH block used by the wireless device for an initial cell selection. For a secondary cell or carrier, the first PRB of the DL bandwidth (or of the UL bandwidth) may be indicated to the wireless device by the higher layer configuration for the secondary cell or carrier.

For a DL BWP in a set of one or more DL BWPs on the primary cell, a wireless device may be configured with one or more control resource sets for at least one type of common search space and for at least one wireless-device-specific search space (e.g., a UE-specific search space). For example, the wireless device may not be configured without a common search space on the PCell, or on the PSCell, in the active DL BWP. For a UL BWP in a set of one or more UL BWPs, the wireless device may be configured with one or more resource sets for one or more PUCCH transmissions.

A wireless device may receive a PDCCH and/or PDSCH in a DL BWP based on a configured subcarrier spacing and CP length for the DL BWP. The wireless device may transmit a PUCCH and/or PUSCH in a UL BWP based on a configured subcarrier spacing and CP length for the UL BWP.

If a DCI (e.g., DCI format 1_1) comprises a BWP indicator field, the BWP indicator field value may indicate an active DL BWP, from the configured DL BWP set, for one or more DL receptions. If a DCI (e.g., DCI format 0_1) comprises a BWP indicator field, the BWP indicator field value may indicate an active UL BWP, from the configured UL BWP set, for one or more UL transmissions.

For the primary cell, a wireless device may be provided, by a higher layer parameter, with Default-DL-BWP that may indicate a default DL BWP among the configured DL BWPs.

If a wireless device is not provided with a default DL BWP (e.g., the Default-DL-BWP), the default DL BWP may be the initial active DL BWP.

A wireless device may be provided, by a higher layer parameter, with BWP-InactivityTimer that may indicate a timer value for the primary cell. The wireless device may start the timer, for example, if the wireless device detects a DCI (e.g., DCI format 1_1) indicating an active DL BWP, other than the default DL BWP, for a paired spectrum operation or if the wireless device detects a DCI (e.g., DCI format 1_1 or DCI format 0_1) indicating an active DL BWP or UL BWP, other than the default DL BWP or UL BWP, for an unpaired spectrum operation. The wireless device may increment the timer value in increments of a first value (e.g., the first value may be 1 millisecond) for carrier frequencies smaller than or equal to 6 GHz or in increments of a second value (e.g., the second value may be 0.5 milliseconds) for carrier frequencies larger than 6 GHz, for example, if the wireless device does not detect a DCI (e.g., DCI format 1_1) for a paired spectrum operation or if the wireless device does not detect a DCI (e.g., DCI format 1_1 or DCI format 0_1) for an unpaired spectrum operation during the interval of each increment. The timer may expire, for example, if the timer value is equal to the BWP-InactivityTimer value. The wireless device may switch to the default DL BWP from an active DL BWP, for example, if the timer expires.

One or more procedures of a wireless device on a secondary cell (e.g., one or more wireless device procedures on a secondary cell) may be the same or similar to one or more procedures on a primary cell, for example, if the wireless device is configured for the secondary cell with a higher layer parameter (e.g., Default-DL-BWP) indicating a default DL BWP among the configured DL BWPs and/or the wireless device is configured with a higher layer parameter (e.g., BWP-InactivityTimer) indicating a timer value. The one or more procedures of the wireless device on the secondary cell may be similar to one or more procedures on the primary cell, but the one or more procedures of the wireless device on the secondary cell may use the timer value for the secondary cell and the default DL BWP for the secondary cell.

If a wireless device is configured by a higher layer parameter (e.g., Active-BWP-DL-SCell) that may indicate a first active DL BWP and/or by a higher layer parameter (e.g., Active-BWP-UL-SCell) that may indicate a first active UL BWP on a secondary cell or carrier, the wireless device may use the indicated DL BWP and the indicated UL BWP on the secondary cell as the respective first active DL BWP and first active UL BWP on the secondary cell or carrier.

For a paired spectrum operation, a wireless device may not transmit an HARQ-ACK, for example, if the wireless device changes its active UL BWP between a time of a detection of a DCI (e.g., DCI format 1_1) and a time of a corresponding HARQ-ACK transmission. A wireless device may monitor a PDCCH, for example, while the wireless device performs measurements over a bandwidth that may not be within the DL BWP for the wireless device.

A base station may transmit a DCI to a wireless device to provide the wireless device with DL and/or UL transmission information. The DL and/or UL transmission information may indicate at least one of the following: scheduling of a PUSCH, scheduling of a PDSCH, a slot (mini-slot, and/or subframe) format, TPC commands for a PUSCH, PUCCH, and/or SRS transmission. The DCI may comprise at least one of: a carrier indicator, an identifier for DCI formats, one or more downlink scheduling assignments, one or more uplink scheduling grants, one or more power-control commands (TPCs), one or more slot format indicators, and/or one or more pre-emption indications.

The DL and/or UL transmission information may comprise one or more parameters (or fields) indicating at least one of the following: frequency domain and/or time domain resource assignment(s), frequency hopping flag, modulation and coding scheme (MCS), new data indicator (NDI), redundancy version (RV), HARQ process number, TPC command for a PUSCH and/or PUCCH, UL/SUL indicator, bandwidth part (BWP) indicator, VRB-to-PRB mapping, a downlink assignment index, n-th downlink assignment index (where n>0), SRS resource indicator, precoding information and number of layers, antenna ports, CSI request, CBG transmission information, PTRS-DMRS association, beta-offset indicator, DMRS sequence initialization, PUCCH resource indicator, PDSCH-to-HARQ_feeback timing indicator, PRB bundling size indicator, a rate matching indicator, ZP CSI-RS trigger, a transmission configuration indication, an SRS request, CBG flushing out information, one or more Identifiers for DCI formats, one or more slot format indicators, one or more pre-emption indications, one or more TPC command numbers, one or more block numbers, one or more identifiers for DCI formats, PDSCH resource indication, a transport format, HARQ information, control information related to multiple antenna schemes, a command for power control of the PUCCH (e.g., used for transmission of ACK/NACK in response to downlink scheduling assignments), HARQ related information, a power control command of the PUSCH, and/or any combination thereof.

The DCI may have one or more formats or types. Message sizes of the one or more formats may be the same. Message sizes of the one or more formats may be different. A plurality of DCIs having the same message format (and/or size) may comprise the same control information. A plurality of DCIs having the same message format (and/or size) may comprise the different control information. A plurality of DCIs having different message formats (and/or sizes) may comprise the same control information. A plurality of DCIs having different message formats (and/or sizes) may comprise the different control information. For example, supporting spatial multiplexing with noncontiguous allocation of RBs in the frequency domain may require a larger size of scheduling message in comparison with an uplink grant for frequency-contiguous allocation. The DCI may be categorized into different DCI formats. Each DCI format may correspond to a certain message size and/or usage.

FIG. 15 shows an example of one or more DCI formats. Any other DCI format for any other use, or combinations of uses, may be implemented.

FIG. 16 shows an example of one or more DCI formats. DCI format 0_0 may be used for scheduling of a PUSCH in one cell. For example, the DCI format 0_0 may comprise one or more fields indicating at least one of the following: identifier for DCI formats (e.g., 1 bit); frequency domain resource assignment (e.g., N bits—variable with UL BWP N_RB); time domain resource assignment (e.g., X bits—the bitwidth may be associated with the row indexes in pusch_allocationList in RRC); frequency hopping flag (e.g., 1 bit); modulation and coding scheme (e.g., 5 bits); new data indicator (e.g., 1 bit); redundancy version (e.g., 2 bits); HARQ process number (e.g., 4 bits); TPC command for scheduled PUSCH (e.g., 2 bits); and/or UL/SUL indicator (e.g., 0 bit for wireless devices not configured with SUL in the cell, and 1 bit for wireless devices configured with SUL in the cell); zeros may be appended to format 0_0 until the payload size equals that of format 1_0, for example, if the number of information bits in format 0_0 is less than the payload size of format 1_0 for scheduling the same serving cell.

DCI format 0_1 may be used for the scheduling of a PUSCH in one cell. The DCI format 0_1 may comprise one or more fields indicating at least one of the following: carrier indicator (e.g., 0 or 3 bits); identifier for DCI formats (e.g., 1 bit); bandwidth part indicator (e.g., 0, 1 or 2 bits—the bitwidth for this field may be determined based on the higher layer parameter BandwidthPart-Config for the PUSCH); frequency domain resource assignment (e.g., the bitwidth may be variable with a resource allocation type; time domain resource assignment (e.g., X bits—the bitwidth may be associated with the row indexes in pusch_allocationList in RRC); VRB-to-PRB mapping (e.g., 0 or 1 bit; for example, applicable to resource allocation type 1 (e.g., 0 bit) if only resource allocation type 0 is configured and 1 bit otherwise); frequency hopping flag (e.g., 0 or 1 bit; for example, applicable to resource allocation type 1 (e.g., 0 bit) if only resource allocation type 0 is configured and 1 bit otherwise); modulation and coding scheme (e.g., 5 bits); new data indicator (e.g., 1 bit); redundancy version (e.g., 2 bits); HARQ process number (e.g., 4 bits); 1st downlink assignment index (e.g., 1 bit for semi-static HARQ-ACK codebook, and 2 bits for dynamic HARQ-ACK codebook with single HARQ-ACK codebook); 2nd downlink assignment index (e.g., 2 bits for dynamic HARQ-ACK codebook with two HARQ-ACK sub-codebooks, and 0 bit otherwise); TPC command for a scheduled PUSCH (e.g., 2 bits); SRS resource indicator (e.g., variable bits that may be determined by RRC_Parameter_SRS-SetUse); precoding information and number of layers (e.g., 0, 2, 3, 4, 5, or 6 bits); antenna ports (e.g., 2, 3, 4, or 5 bits); SRS request (e.g., 2 bits); CSI request (e.g., 0, 1, 2, 3, 4, 5, or 6 bits determined by higher layer parameter ReportTriggerSize); CBG transmission information (e.g., 0, 2, 4, 6, or 8 bits determined by higher layer parameter maxCodeBlockGroupsPerTransportBlock for PUSCH); PTRS-DMRS association (e.g., 0 or 2 bits); beta_offset indicator (e.g., 0 bit if the higher layer parameter dynamic in uci-on-PUSCH is not configured; otherwise 2 bits); DMRS sequence initialization (e.g., 0 or 1 bit); and/or UL/SUL indicator (e.g., 0 bit for wireless devices not configured with SUL in the cell, and 1 bit for wireless devices configured with SUL in the cell).

DCI format 1_0 may be used for the scheduling of a PDSCH in one DL cell. The DCI format 1_0 may comprise one or more fields indicating at least one of the following: an identifier for DCI formats (e.g., 1 bit); frequency domain resource assignment (e.g., variable with DL BWP N_RB); time domain resource assignment (e.g., X bits—The bitwidth may be associated with the row indexes in pusch_allocationList in RRC); VRB-to-PRB mapping (e.g., 1 bit); modulation and coding scheme (e.g., 5 bits); new data indicator (e.g., 1 bit); redundancy version (e.g., 2 bits); HARQ process number (e.g., 4 bits); downlink assignment index (e.g., 2 bits); TPC command for a scheduled PUCCH (e.g., 2 bits); PUCCH resource indicator (e.g., 2 or 3 bits); or PDSCH-to-HARQ_feedback timing indicator (e.g., 3 bits). The DCI format 1_0 may comprise one or more different fields, one or more different bitwidths, and/or one or more different values for one or more fields, for example, if the DCI format 1_0 is with CRC scrambled by different types of RNTI.

DCI format 1_1 may be used for the scheduling of a PDSCH in one cell. The DCI format 1_1 may comprise one or more fields indicating at least one of the following: carrier indicator (e.g., 0 or 3 bits); identifier for DCI formats (e.g., 1 bit); bandwidth part indicator (e.g., 0, 1 or 2 bits; the bitwidth for this field may be determined according to the higher layer parameter BandwidthPart-Config for the PDSCH); frequency domain resource assignment (e.g., variable bits with a resource allocation type); time domain resource assignment (e.g., 1, 2, 3, or 4 bits—the bitwidth may be associated with the row indexes in pusch_allocationList in RRC); VRB-to-PRB mapping (e.g., applicable to resource allocation type 1 (e.g., 0 bit) if only resource allocation type 0 is configured, and 1 bit otherwise); PRB bundling size indicator (e.g., 0 bit if the higher layer parameter PRB_bundling=OFF or 1 bit if the higher layer parameter PRB_bundling=ON); rate matching indicator (0, 1, or 2 bits); and/or ZP CSI-RS trigger (0, 1, or 2 bits). The DCI format 1_1 may comprise one or more other fields (e.g., one or more additional fields). For example, for transport block 1, the DCI format 1_1 may comprise modulation and coding scheme (e.g., 5 bits), new data indicator (e.g., 1 bit), redundancy version (e.g., 2 bits). For transport block 2, the DCI format 1_1 may comprise modulation and coding scheme (e.g., 5 bits), new data indicator (e.g., 1 bit), redundancy version (e.g., 2 bits).

The DCI format 1_1 may comprise HARQ process number (e.g., 4 bits); downlink assignment index (e.g., 0, 2, or 4 bits); TPC command for scheduled PUCCH (e.g., 2 bits); PUCCH resource indicator (e.g., 2 or 3 bits); PDSCH-to-HARQ_feedback timing indicator (e.g., 0, 1, 2, or 3 bits); antenna port(s) (e.g., 1, 2, 3, 4, 5, or 6 bits—the number of CDM groups without data of values 1, 2, and 3 may refer to CDM groups {0}, {0, 1}, and {0, 1, 2} respectively); transmission configuration indication (e.g., 0 or 3 bits); SRS request (e.g., 2 or 3 bits); CBG transmission information (e.g., 0, 2, 4, 6, or 8 bits); CBG flushing out information (e.g., 0 or 1 bit); and/or DMRS sequence initialization (e.g., 1 bit).

DCI format 2_0 may be used for notifying the slot format. The DCI format 2_0 may comprise one or more fields indicating at least one of the following: an identifier for DCI formats (e.g., 1 bit); and/or one or more slot format indicator (e.g., slot format indicator 1, slot format indicator 2, . . . , slot format indicator N). The size of DCI format 2_0 may be configurable by higher layers. For example, the bit size of the slot format indicator field may be determined by an RRC message.

DCI format 2_1 may be used for notifying the PRB(s) and OFDM symbol(s) where a wireless device may assume no transmission is intended for the wireless device. The DCI format 2_1 may comprise one or more fields indicating at least one of the following: an identifier for DCI formats (e.g., 1 bit); and/or one or more pre-emption indication (e.g., pre-emption indication 1, pre-emption indication 2, . . . , pre-emption indication N). The size of DCI format 2_1 may be configurable by higher layers, and a pre-emption indication may be 14 bits.

DCI format 2_2 may be used for the transmission of TPC commands for PUCCH and PUSCH. The DCI format 2_2 may comprise one or more fields indicating at least one of the following: an identifier for DCI formats (e.g., 1 bit); and/or one or more TPC command numbers (e.g., TPC command number 1, TPC command number 2, . . . , TPC command number N) The index to the TPC command number for a cell may be determined by one or more parameters provided by higher layers, and a TPC command number may be 2 bits.

DCI format 2_3 may be used for the transmission of a group of TPC commands for SRS transmissions by one or more wireless devices. Along with a TPC command, an SRS request may also be transmitted. The DCI format 2_3 may comprise one or more fields indicating at least one of the following: an identifier for DCI formats (e.g., 1 bit); and/or one or more block numbers (e.g., block number 1, block number 2, . . . , block number B) The starting position of a block may be determined by the parameter startingBitOf-Format2_3 provided by higher layers for the wireless device configured with the block. For a UL without PUCCH and PUSCH or a UL on which the SRS power control is not tied with PUSCH power control, one block may be configured for the wireless device by higher layers, with the following fields defined for the block: an SRS request (e.g., 0 or 2 bits), and/or TPC command number (e.g., 2 bits).

One or more DCI formats for downlink scheduling may be organized into different groups based on the presence or absence of one or more fields. The one or more fields may vary between DCI formats. For example, the one or more fields may indicate at least one of: resource information (e.g., carrier indicator, RB allocation, etc.); HARQ process number; MCS, NDI, and a first RV (e.g., RV for the first TB); MCS, NDI, and a second RV (e.g., RV for the second TB); MIMO related information (e.g., at least one of: PMI, precoding information, transport block swap flag, power offset between PDSCH and reference signal, reference-signal scrambling sequence, number of layers, and/or antenna ports for the transmission); PDSCH resource-element mapping and QCI; downlink assignment index (DAI); TPC for PUCCH; SRS request for triggering SRS transmission; ACK/NACK offset; DCI format indication used to distinguish one or more DCI formats from each other (e.g., between DCI 0 and DCI 1A); any combination thereof; and/or padding.

One or more DCI formats for uplink scheduling may be organized into different groups with the presence or absence of one or more fields. The one or more fields may vary between DCI formats. For example, the one or more fields may indicate at least one of: resource information (e.g., carrier indicator, resource allocation type, RB allocation, etc.); MCS and a first NDI (e.g., NDI for the first TB); MCS and a second NDI (e.g., NDI for the second TB); Phase rotation of the uplink DM-RS; precoding information; CSI request for requesting an aperiodic CSI report; SRS request used to trigger aperiodic SRS transmission based on one or more settings semi-statically configured, predefined, and/or preconfigured; uplink index/DAI; TPC for PUSCH; DCI format indication used to distinguish one or more DCI formats from each other (e.g., between DCI 0 and DCI 1A); any combination thereof; and/or padding.

A wireless device may monitor for one or more PDCCHs to detect one or more DCIs. The one or more PDCCHs may be associated with a common search space (CSS) and/or a device-specific search space (e.g., UE-specific search space (USS)). A wireless device may monitor for one or more PDCCHs comprising one or more DCI formats. A power consumption at a wireless device may increase as the number of DCI formats used for PDCCH monitoring increases. Monitoring for a PDCCH associated with a limited number of DCI formats may save power consumption. For example, a first DCI format may be used for an eMTC wireless device. If a type of a wireless device is not eMTC, the wireless device may not monitor for a PDCCH at least with the first DCI, for example, to save power consumption.

A base station may transmit one or more PDCCHs in different control resource sets, for example, to support wide bandwidth operation (e.g., in an NR system). A base station may transmit one or more RRC messages comprising configuration parameters of one or more control resource sets. The one or more control resource sets may comprise at least one of: a first OFDM symbol (e.g., CORESET_StartSymbol); a number of consecutive OFDM symbols (e.g., CORESET_NumSymbol); a set of resource blocks (e.g., CORESET_RBSet); a CCE-to-REG mapping (e.g., CORESET_mapping); and/or a REG bundle size for interleaved CCE-to-REG mapping (e.g., CORESET_REG_bundle). A wireless device may monitor for a PDCCH to detect at least one DCI, for example, based on configured control resource sets.

A wireless device may monitor for at least one set of one or more PDCCH candidates, in one or more control resource sets, on at least one active DL BWP on one or more activated serving cells according to corresponding search spaces. The monitoring may imply and/or comprise decoding of at least one of the one or more PDCCH candidates according to the monitored DCI formats.

A wireless device may be configured by higher layer parameter SSB-periodicity-serving-cell a periodicity of half frames for transmission of SS/PBCH blocks in a serving cell. A wireless device may receive a PDCCH by excluding REs corresponding to SS/PBCH block indexes indicated by SSB-transmitted-SIB1, for example, if the wireless device has received SSB-transmitted-SIB1 and has not received SSB-transmitted and if REs for the PDCCH reception overlap with REs corresponding to SS/PBCH block indexes indicated by SSB-transmitted-SIB 1. A wireless device may receive a PDCCH by excluding REs corresponding to SS/PBCH block indexes indicated by SSB-transmitted, for example, if the wireless device has received SSB-transmitted and if REs for the PDCCH reception overlap with REs corresponding to SS/PBCH block indexes indicated by SSB-transmitted.

A wireless device may transmit, in a device capability parameter (e.g., UE-NR-Capability), an indication for a number of PDCCH candidates that the wireless device may monitor per slot (mini-slot, and/or subframe), for example, if the wireless device is configured for carrier aggregation operation over more than one or more cells. The wireless device may transmit the indication, for example, based on a carrier aggregation capability for a wireless device being larger than a threshold. The device capability parameter may comprise one or more parameters indicating the carrier aggregation capability. A wireless device may not be configured with a number of PDCCH candidates to monitor per slot (mini-slot, and/or subframe) that is larger than a second threshold (e.g., the second threshold may indicate a maximum number), for example, if the wireless device is configured for carrier aggregation operation over more than one cell.

A base station may configure a wireless device with one or more time and frequency resources that may be used to report a channel state information (CSI). The CSI may comprise at least one of Channel Quality Indicator (CQI), precoding matrix indicator (PMI), CSI-RS resource indicator (CRI), strongest layer indication (SLI), rank indication (RI) and/or L1-RSRP.

For CQI, PMI, CRI, SLI, RI, and/or L1-RSRP, a wireless device may be configured by higher layers with at least one of $N \geq 1$ ReportConfig Reporting Settings, $M \geq 1$ ResourceConfig Resource Settings, and/or at least one MeasConfig measurement setting containing $L \geq 1$ Links. The at least one MeasConfig may comprise at least one of: a list of one or more reporting configurations (ReportConfigList), a list of one or more resource configurations (ResourceConfigList), a list of one or more link configurations (MeasLinkConfigList) and/or a list of one or more trigger states (ReportTrigger).

A reporting setting (e.g., ReportConfig) may be associated with at least one DL BWP (e.g., the at least one DL BWP may be indicated by a higher layer parameter, for example, bandwidthPartId). The reporting setting may comprise one or more reported parameter(s) for at least one CSI reporting band: CSI Type (I or II) if reported, at least one codebook configuration comprising codebook subset restriction, time-domain behavior, frequency granularity for CQI and PMI, measurement restriction configurations, the strongest layer indicator (SLI), the reported L1-RSRP parameter(s), CRI, and/or SSB Resource Indicator (SSBRI). The ReportConfig may comprise a ReportConfigID to identify the ReportConfig, a ReportConfigType to indicate the time domain behavior of the report (either aperiodic, semi-persistent, or periodic), a ReportQuantity to indicate the CSI-related or L1-RSRP-related quantities to report, and/or a ReportFreqConfiguration to indicate the reporting granularity in the frequency domain. For periodic/semi-persistent reporting, a ReportConfig may comprise a ReportSlotConfig to indicate at least the periodicity and a slot offset. For aperiodic reporting, a ReportConfig may comprise an AperiodicReportSlotOffset to indicate at least a set of allowed values of the timing offset for aperiodic reporting (e.g., a particular value may be indicated in DCI). The ReportFreqConfiguration may comprise one or more parameters to enable at least one configuration of at least subband or wideband PMI and CQI reporting. The ReportConfig may comprise MeasRestrictionConfig-time-channel to indicate at least parameters to enable at least one configuration of time domain measurement restriction for a channel. The ReportConfig may comprise MeasRestrictionConfig-time-interference to indicate one or more parameters to enable separate configuration of time domain measurement restriction for interference. The ReportConfig may comprise CodebookConfig, which may comprise one or more configuration parameters for Type-I or Type II CSI comprising codebook subset restriction.

A Resource Setting (e.g., ResourceConfig) may comprise at least one configuration of S≥1 CSI-RS Resource Sets (e.g., a higher layer parameter ResourceSetConfig), with Resource Set comprising one or more CSI-RS resources (e.g., higher layer parameters NZP-CSI-RS-ResourceConfigList and CSI-IM-ResourceConfigList) and one or more SS/PBCH Block resources for L1-RSRP computation (e.g., higher layer parameter resource-config-SS-list). The Resource setting may be located in the BWP identified by the higher layer parameter (e.g., BWP-info), and one or more linked Resource Settings of a CSI Report Setting may have the same BWP. For periodic and semi-persistent CSI Resource Settings, S may be 1. At least one of S≥1 CSI-RS Resource Sets may comprise one or more CSI-RS resources (Ks≥1, e.g., higher layer parameter CSI-RS-ResourceConfig), each of which may comprise one or more parameters indicating at least mapping to REs and number of ports and time-domain behavior. The time domain behavior of the one or more CSI-RS resources, which may be part of one or more sets within a CSI-RS resource setting, may be indicated by the higher layer parameter ResourceConfigType and may be aperiodic, periodic, or semi-persistent. At least one of the following may be configured via higher layer signaling for one or more CSI resource settings for channel and interference measurement: one or more CSI-IM resources for interference measurement, one or more non-zero power CSI-RS resources for interference measurement, and/or one or more non-zero power CSI-RS resources for channel measurement.

A Link MeasLinkConfig in the higher layer-configured CSI measurement setting may comprise the CSI reporting setting indication, CSI resource setting indication, and/or a measurement quantity (e.g., MeasQuantity) that may be an indication of the quantity to be measured, which may be either channel measurement or interference measurement. ReportConfigMax may indicate the maximum number of report configurations. ResourceConfigMax may indicate the maximum number of resource configurations. MeasLinkConfigMax may indicate the maximum number of link configurations. ResourceSetMax may indicate the maximum number of resources sets per resource configuration. CSI-RS-ResourcePerSetMax may indicate the maximum number of NZP-CSI-RS resources per NZP-CSI-RS resource set. NZP-CSI-RS-ResourceMax may indicate the maximum number of NZP-CSI-RS resources. CSI-IM-ResourcePerSetMax may indicate the maximum number of CSI-IM resources per CSI-IM resource set. CSI-IM-ResourceMax may indicate the maximum number of CSI-IM resources. AperiodicReportTrigger may comprise one or more trigger states for dynamically selecting one or more aperiodic reporting configurations.

A reporting configuration for CSI may be aperiodic (e.g., using PUSCH), periodic (e.g., using PUCCH) or semi-persistent (e.g., using PUCCH and/or DCI activated PUSCH). The CSI-RS Resources may be periodic, semi-persistent, or aperiodic.

FIG. 17 shows an example of CSI-RS configurations (e.g., a table for triggering/activation of CSI Reporting for possible CSI-RS Configurations). FIG. 17 shows examples of the supported combinations of CSI Reporting configurations and CSI Resource configurations and how the CSI Reporting may be triggered for each CSI-RS configuration. For example, the periodic CSI-RS may configured by higher layers (e.g., RRC). The semi-persistent CSI-RS may be activated and deactivated. The aperiodic CSI-RS may be configured and selected.

A single CQI may be reported for one codeword per CSI report, for example, if a wireless device is configured with the higher layer configured parameter Number-CQI set to '1'. One CQI for each codeword may be reported per CSI report, for example, if a wireless device is configured with the higher layer configured parameter Number-CQI set to '2'. The ReportConfig may comprise the Number-CQI.

A wireless device may determine a CRI from the supported set of CRI values and may report the number in each CRI report, for example, if the wireless device is configured with a CSI-RS resource set and the higher layer parameter CSI-RS-ResourceRep is set to 'OFF'. CRI may not be reported, for example, if the higher layer parameter CSI-RS-ResourceRep is set to 'ON'.

For periodic and/or semi-persistent CSI reporting, the following periodicities (measured in slots) may be configured by the higher layer parameter ReportPeriodicity. For example, ReportPeriodicity may indicate one of values from the set {5, 10, 20, 40, 80, 160, 320}.

A wireless device may not be required to update measurements for more than 64 CSI-RS and/or SSB resources, for example, if the wireless device is configured with the higher layer parameter ReportQuantity set to TRURSRP' and the wireless device is configured with the higher layer parameter group-based-beam-reporting set to 'OFF'. For example, the wireless device may report in a single report nrofReportedRS (higher layer configured) different CRI and/or SSBRI (SSB Resource Indicator) for each report setting. The reported L1-RSRP value may be defined by a 7-bit value in the range [−140, −44] dBm with 1 dB step size, for example, if the higher layer parameter nrofReportedRS is configured to be one. The wireless device may use largest L1-RSRP and differential L1-RSRP based reporting, for example, if the higher layer parameter nrofReportedRS is configured to be larger than one. The largest value of L1-RSRP may use, for example, a 7-bit value and the differential L1-RSRP may use, for example, a 4-bit value. The differential L1-RSRP values may be computed with 2 dB step size with a reference to the largest L1-RSRP value, which may be part of the same L1-RSRP reporting instance.

A wireless device may report in a single reporting instance up to number-of-beams-reporting L1-RSRP and CSI reports, for example, if the wireless device is configured with the higher layer parameter ReportQuantity set to TRURSRP' and the wireless device is configured with the higher layer parameter group-based-beam-reporting set to 'ON.' Up to number-of-beams-reporting, CSI-RS and/or SSB resources may be received simultaneously by the wireless device either with a single spatial domain receive filter or with multiple simultaneous spatial domain receive filters.

For L1-RSRP computation, the wireless device may be configured with CSI-RS resources, SS/PBCH Block resources, or both CSI-RS and SS/PBCH Block resources. For L1-RSRP computation, the wireless device may be configured with CSI-RS resource setting up to 16 CSI-RS resource sets having up to 64 resources within each set. The total number of different CSI-RS resources over all resource sets may be, for example, no more than 128 (or up to any other number).

A wireless device may not report information (e.g., a quantity for the ReportConfig associated with a higher layer parameter ReportQuantity), for example, if the wireless device is configured with a CSI-RS resource and configured with the higher layer parameter ReportQuantity set to 'No Report.' Otherwise, the wireless device may report the information as configured by the ReportQuantity.

The ReportFreqConfiguration in a ReportConfig may indicate the frequency granularity of the CSI Report. For CSI reporting, a wireless device may be configured via higher layer signaling with one out of two possible subband sizes. A subband may be defined as $N_{PRB}^{SB}$ contiguous PRBs and may depend on the total number of PRBs in the carrier bandwidth part based on one or more configurable subband sizes.

FIG. 18 is an example of configurable subband sizes. A CSI reporting setting configuration may define a CSI reporting band as a subset of one or more subbands of the bandwidth part. The ReportFreqConfiguration may indicate one or more of: the CSI-ReportingBand as a contiguous or non-contiguous subset of subbands in the bandwidth part for which CSI may be reported (e.g., the wireless device may not be configured with a CSI reporting band which may comprise one or more subbands where reference signals for channel and interference may not be present.); single CQI or multiple CQI reporting, as configured by the higher layer parameter CQI-FormatIndicator (e.g., if single CQI reporting is configured, a single CQI may be reported for each codeword for the entire CSI reporting band. If multiple CQI reporting is configured, one CQI for each codeword may be reported for each subband in the CSI reporting band.); and/or single PMI or multiple PMI reporting as configured by the higher layer parameter PMI-FormatIndicator (e.g., if single PMI reporting is configured, a single PMI may be reported for the entire CSI reporting band. If multiple PMI reporting is configured with a number of antenna ports that is different from 2 antenna ports, a single wideband indication may be reported for the entire CSI reporting band and one subband indication may be reported for each subband in the CSI reporting band. If multiple PMIs are configured with 2 antenna ports, a PMI may be reported for each subband in the CSI reporting band).

A wireless device may be configured with CSIReportQuantity to report one or more parameters, for example, if the wireless device is configured with higher layer parameter CodebookType set to 'TypeI-SinglePanel' and PMI-FormatIndicator is configured for single PMI reporting. The one or more parameters may comprise at least one of the following: RI/CRI and a PMI comprising a single wideband indication for the entire CSI reporting band; and/or RI/CRI, CQI, and/or a PMI comprising a single wideband indication for the entire CSI reporting band. The CQI may be calculated assuming PDSCH transmission with precoders. The wireless device may assume that one precoder may be randomly selected from the set of $N_p$ precoders for each PRG on PDSCH. The PRG size for CQI calculation may be configured by the higher layer parameter PUSCH-bundlesize-for-CSI.

A wireless device may report CSI, for example, if the wireless device is configured with semi-persistent CSI reporting and if both CSI-IM and non-zero power CSI-RS resources are configured as periodic or semi-persistent. A wireless device may report CSI, for example, if the wireless device is configured with aperiodic CSI reporting and if both CSI-IM and non-zero power CSI-RS resources are configured as periodic, semi-persistent, or aperiodic.

A trigger state configured using the higher layer parameter ReportTrigger may be associated with one or more ReportConfig. One of the one or more ReportConfig may be linked to periodic, semi-persistent, or aperiodic resource setting(s). For example, the resource setting may be for channel measurement for L1-RSRP computation, for example, if one resource setting is configured. A first resource setting may be for channel measurement and a second resource setting may be for interference measurement performed on CSI-IM or on non-zero power CSI-RS, for example, if two resource settings are configured. A first resource setting may be for channel measurement, a second resource setting may be for CSI-IM based interference measurement, and a third resource setting may be for non-zero power CSI-RS based interference measurement, for example, if three resource settings are configured.

For CSI measurement(s), a wireless device may assume a non-zero power CSI-RS port configured for interference measurement corresponding to an interference transmission layer; one or more interference transmission layers on non-zero power CSI-RS ports for interference measurement (taking into account the associated EPRE ratios); and/or other interference signal on REs of non-zero power CSI-RS resource for channel measurement, non-zero power CSI-RS resource for interference measurement, and/or CSI-IM resource for interference measurement.

A wireless device may be configured with higher layer parameter Non-PMI-PortIndication in a ReportConfig, for example, if the wireless device is configured with the higher layer parameter ReportQuantity set to 'CRI/RI/CQI.' r ports may be indicated in the order of layer ordering for rank r and each CSI-RS resource in the CSI resource setting linked to the ReportConfig in a MeasLinkConfig, based on the order of the associated NZP-CSI-RS-ResourceConfigID in the linked CSI resource setting linked for channel measurement.

A wireless device may use the ports indicated for that rank for the selected CSI-RS resource, for example, if the wireless device is configured with the higher layer parameter ReportQuantity set to CRI/RUCQF for calculating the CQI for a rank. The precoder for the indicated ports may be assumed to be the identity matrix.

For Resource Sets configured with the higher layer parameter ResourceConfigType set to 'aperiodic', trigger states for Reporting Setting(s) and/or Resource Set(s) for channel and/or interference measurement on one or more component carriers may be configured using the higher layer parameter AperiodicReportTrigger. For aperiodic CSI report triggering, a single set of one or more CSI triggering states may be higher layer configured. The CSI triggering states may be associated with a candidate DL BWP. A wireless device may not be expected to be triggered with a CSI report for a non-active DL BWP. A trigger state may be initiated using the DCI CSI request field.

No CSI may be requested, for example, if the value of the DCI CSI request field is zero. The wireless device may receive a selection command, via MAC CE, used to map up to $2^{N_{TS}}-1$ trigger states to the codepoints of the DCI CSI request field, for example, if the number of configured CSI triggering states in AperiodicReportTrigger is greater than $2^{N_{TS}}-1$. $N_{TS}$ may be the number of bits in the DCI CSI request field. $N_{TS}$ may be configured by the higher layer parameter ReportTriggerSize and $N_{TS}$ may be one of values from the set $\{0, 1, 2, 3, 4, 5, 6\}$ (e.g., $N_{TS} \in \{0, 1, 2, 3, 4, 5, 6\}$). The DCI CSI request field may directly indicate the triggering state and the wireless device's quasi-colocation assumption, for example, if the number of CSI triggering states in AperiodicReportTrigger is less than or equal to $2^{N_{TS}}-1$. For an aperiodic CSI-RS resource associated with a CSI triggering state, the wireless device may be indicated the quasi co-location configuration of quasi co-location RS source(s) and quasi co-location type(s) through higher layer signaling of QCL-Info-aPerodicReportingTrigger, which may comprise a list of references to TCI-RS-SetConfig's for the aperiodic CSI-RS resources associated with the CSI triggering state. If a TCI-RS-SetConfig in the list is configured with a reference to an RS associated with QCL-TypeD, that RS may be an SS/PBCH block or a CSI-RS resource configured as periodic or semi-persistent.

For a wireless device configured with the higher layer parameter AperiodicReportTrigger, for example, if a resource setting linked to a ReportConfig has multiple aperiodic resource sets and a subset of the aperiodic resource sets is associated with the trigger state, a higher layer configured bitmap ResourceSetBitmap may be configured per trigger state per resource setting to select the CSI-IM/ NZP CSI-RS resource set(s) from the resource setting. The CSI-RS offset may be configured per resource set in the higher layer parameter AperiodicNZP-CSI-RS-Triggering-Offset, for example, if aperiodic CSI-RS is used with aperiodic reporting. The CSI-RS triggering a first offset (e.g., offset X) may be measured in slots.

For semi-persistent reporting on a PUSCH, a set of semi-persistent CSI report settings may be configured by higher layer(s) (e.g., semi-statically configured by RRC). For example, the set of semi-persistent CSI report setting may be configured by Semi-persistent-on-PUSCHReport-Trigger, and the CSI request field in a DCI scrambled with a particular RNTI (e.g., SP-CSI C-RNTI) may activate at least one of the semi-persistent CSI reports.

For semi-persistent reporting on a PUCCH, a set of semi-persistent CSI report settings may be configured by higher layer(s) (e.g., semi-statically configured by RRC). For example, the set of semi-persistent CSI report settings may be configured by reportConfigType with the PUCCH resource for transmitting the CSI report. Semi-persistent reporting on a PUCCH may be activated by an activation command transmitted via a DCI and/or a MAC CE. The activation command may select at least one of the semi-persistent CSI Report settings for use by the wireless device on the PUCCH. The wireless device may (or shall) report the CSI on PUSCH, for example, if the field reportConfigType is not present.

A wireless device may be configured with the higher layer parameter ResourceConfigType set to 'semi-persistent.' If a wireless device receives an activation command via a MAC CE and/or a DCI for CSI-RS resource(s) for channel measurement and CSI-IM/NZP CSI-RS resource(s) for interference measurement associated with configured CSI resource setting(s) in slot n, the corresponding actions and the assumptions, for the wireless device, (including quasi-co-location assumptions provided by a reference to a TCI-RS-SetConfig) on CSI-RS/CSI-IM transmission corresponding to the configured CSI-RS/CSI-IM resource configuration(s) may be used, for example, no later than the minimum requirement (e.g., defined in NR specifications). If a wireless device receives a deactivation command via a MAC CE and/or a DCI for activated CSI-RS/CSI-IM resource(s) associated with configured CSI resource setting(s) in slot n, the corresponding actions and assumption, for the wireless device, on cessation of CSI-RS/CSI-IM transmission corresponding to the deactivated CSI-RS/CSI-IM resource(s) may be used, for example, no later than the minimum requirement (e.g., defined in NR specifications). The wireless device may assume that the CSI-RS resource(s) for channel measurement and the CSI-IM/NZP CSI-RS resource(s) for interference measurement are spatially quasi co-located.

A wireless device may perform aperiodic CSI reporting using a PUSCH in slot n+Y on a cell c upon successful decoding in slot n of an uplink DCI format for a cell c. Y may be indicated in the decoded uplink DCI. The higher layer parameter AperiodicReportSlotOffset may comprise the allowed values for Y for a given Reporting Setting. $Y_{i,j}$ may be defined as the ith allowed value for Report Setting j (j=0, . . . , $N_{Rep}-1$), for example, if $N_{Rep} \geq 1$ reports are scheduled. The ith codepoint of the DCI field may correspond to the allowed value $Y_i = \max_j Y_{i,j}$. An aperiodic CSI report carried on the PUSCH may support wideband, partial band, and/or sub-band frequency granularities. An aperiodic CSI report carried on the PUSCH may support Type I and Type II CSI.

A wireless device may perform semi-persistent CSI reporting on the PUSCH upon a successful decoding of an uplink DCI format. The uplink DCI format may comprise one or more CSI Reporting Setting Indications. The associated CSI Measurement Links and CSI Resource Settings may be configured by higher layer(s). Semi-persistent CSI reporting on the PUSCH may support Type I and Type II CSI with wideband, partial band, and/or sub-band frequency granularities. The PUSCH resources and MCS may be allocated semi-persistently by an uplink DCI.

CSI reporting on PUSCH may be multiplexed with uplink data on PUSCH. CSI reporting on PUSCH may be performed without any multiplexing with uplink data from the wireless device.

Type I CSI feedback may be supported for CSI Reporting on a PUSCH. Type I subband CSI may be supported for CSI Reporting on the PUSCH. Type II CSI may be supported for CSI Reporting on the PUSCH. For Type I CSI feedback on the PUSCH, a CSI report may comprise at least two parts, Part 1 and Part2. For example, Part 1 may comprise RI/CRI and CQI for the first codeword. Part 2 may comprise PMI and may comprise the CQI for the second codeword, for example, if RI>4.

For Type II CSI feedback on the PUSCH, a CSI report may comprise at least two parts, Part 1 and Part 2. Part 1 may be used to identify the number of information bits in Part 2. Part 1 may be transmitted in its entirety before Part 2. Part 1 may have a fixed payload size and may comprise RI, CQI, and an indication of the number of non-zero wideband amplitude coefficients per layer for the Type II CSI. The fields of Part 1—RI, CQI, and the indication of the number of non-zero wideband amplitude coefficients for each layer—may be separately encoded. Part 2 may comprise the PMI of the Type II CSI. Part 1 and Part 2 may be separately encoded. A Type II CSI report that may be carried on the PUSCH may be computed independently from any Type II CSI report that may be carried on the Long PUCCH.

The CSI feedback may comprise at least one part, for example, if the higher layer parameter ReportQuantity is configured with one of the values 'CRI/RSRP' or 'SSBRI/RSRP.'

The wireless device may omit a portion of the Part 2 CSI, for example, if CSI reporting on the PUSCH comprises two parts. Omission of Part 2 CSI may be based on a priority order.

FIG. 19 shows an example priority order associated with one or more CSI reports. $N_{Rep}$ may be the number of CSI reports in one slot. Priority 0 may be the highest priority and priority $2N_{Rep}$ (and/or $2N_{Rep}-1$) may be the lowest priority, and the CSI report numbers may correspond to the order of the associated ReportConfigID. If Part 2 CSI information for a particular priority level is omitted, the wireless device may omit one or more (or all) pieces of the information at that priority level.

Part 2 CSI may be omitted, for example, if a CSI is multiplexed with a UL-SCH on a PUSCH and if the UCI code rate for transmitting one or more of Part 2 is greater than a threshold code rate $c_T$. For example, $$c_T = \frac{c_{MCS}}{\beta_{offset}^{CSI-2}}.$$

$c_{MCS}$ may be a target PUSCH code rate and $\beta_{offset}^{CSI-2}$ offset may be the CSI offset value. Part 2 CSI may be omitted level by level beginning with the lowest priority level until the lowest priority level may be reached, which may cause the UCI code rate to be less than or equal to $c_T$.

A wireless device may be semi-statically configured by higher layer(s) to perform periodic CSI Reporting on the PUCCH. A wireless device may be configured by higher layer(s) for one or more periodic CSI Reports corresponding to one or more higher-layer-configured CSI Reporting Setting Indications. The associated CSI Measurement Links and CSI Resource Settings may be configured by higher layer(s). Periodic CSI reporting on the short and the long PUCCH may support wideband and partial band frequency granularities. Periodic CSI reporting on the PUCCH may support Type I CSI.

A wireless device may perform semi-persistent CSI reporting on the PUCCH upon a successful decoding of a selection command transmitted via a MAC CE and/or a DCI. The selection command may comprise one or more CSI reporting setting indications. The associated CSI measurement links and CSI resource settings may be configured (e.g., semi-statically configured by RRC). Semi-persistent CSI reporting on the PUCCH may support Type I CSI. Semi-persistent CSI reporting on the short PUCCH may support Type I CSI with wideband and partial band frequency granularities. Semi-persistent CSI reporting on the long PUCCH may support Type I subband CSI and Type I CSI with wideband and partial band frequency granularities.

Periodic CSI reporting on the short and long PUCCH may support wideband and partial band frequency granularities. Periodic CSI reporting on the PUCCH may support Type I CSI. The CSI payload carried by the short PUCCH and long PUCCH may be identical to each other, irrespective of RI/CRI, for example, if the short and long PUCCH carry Type I CSI with wideband and partial band frequency granularity. For Type I CSI sub-band reporting on the long PUCCH, the payload may be split into at least two parts. The first part may comprise RI/CRI and/or CQI for the first codeword. The second part may comprise PMI and/or the CQI for the second codeword, for example, if RI>4.

A periodic report (e.g., a periodic CSI report) carried on the long PUCCH may support Type II CSI feedback (e.g., Part 1 of Type II CSI feedback). A semi-persistent report (e.g., a semi-persistent CSI report) carried on the Long PUCCH may support Type II CSI feedback (e.g., Part 1 of Type II CSI feedback). Supporting Type II CSI reporting on the Long PUCCH may be a device capability (e.g., a UE capability). A Type II CSI report (e.g., Part 1) carried on the Long PUCCH may be calculated independently (e.g., regardless of one of Type II CSI reports carried on the PUSCH).

A base station may transmit one or more RRC messages comprising one or more CSI configuration parameters. The one or more CSI configuration parameters may comprise at least one of: one or more CSI-RS resource settings; one or more CSI reporting settings; and/or one or more CSI measurement settings.

A CSI-RS resource setting may comprise one or more CSI-RS resource sets. There may be at least one CSI-RS resource set for a periodic CSI-RS and/or a SP CSI-RS.

A CSI-RS resource set may comprise parameters indicating at least one of: a CSI-RS type (e.g., periodic, aperiodic, semi-persistent); one or more CSI-RS resources comprising at least one of CSI-RS resource configuration identity, number of CSI-RS ports, at least one CSI RS configuration (e.g., symbol and RE locations in a mini-slot, slot, and/or subframe), and/or at least one CSI-RS mini-slot, slot or subframe configuration (e.g., mini-slot, slot or subframe location, offset and periodicity in radio mini-slot, slot, subframe, or frame); at least one CSI-RS power parameter; at least one CSI-RS sequence parameter; at least one CDM type parameter; at least one frequency density; at least one transmission comb; and/or at least one QCL parameter.

A CSI-RS transmission may be periodic, aperiodic, or semi-persistent. For a periodic transmission, the configured CSI-RS may be transmitted using a configured periodicity in time domain. For an aperiodic transmission, the configured CSI-RS may be transmitted in a particular time slot or subframe (e.g., the time slot or subframe may be dedicated and/or scheduled dynamically via UL grants). For a semi-persistent transmission, one or more configured CSI-RS may be transmitted semi-persistently, for example, if activated by a CSI activation MAC CE or DCI. The transmission of the one or more configured CSI-RS may be stopped, for example, if deactivated by a CSI deactivation MAC CE or DCI. The transmission of the one or more configured CSI-RS may be stopped, for example, if a particular timer (if configured) expires. The timer (e.g., a CSI activation timer) may start, for example, after or in response to receiving the CSI activation MAC CE or DCI.

A CSI reporting setting may comprise at least one of: at least one report configuration identifier; at least one report type; one or more reported CSI parameter(s); one or more CSI Type (I or II); one or more codebook configuration parameters; a report quantity indicator indicating CSI-related or L1-RSRP-related quantities to report; one or more parameters indicating time-domain behavior; frequency granularity for CQI and PMI; and/or measurement restriction configurations. The report type may indicate a time domain behavior of the report (aperiodic, semi-persistent, or periodic). Each of the one or more CSI reporting settings may further comprise at least one of: one periodicity parameter; one duration parameter; and/or one offset (e.g., in unit of slots), for example, if the report type is a periodic or semi-persistent report. The periodicity parameter may indicate the periodicity of a CSI report. The duration parameter may indicate the duration of a CSI report transmission. The offset parameter may indicate a value of a timing offset of a CSI report from a reference time.

A CSI measurement setting may comprise one or more links comprising one or more link parameters. The one or more link parameters may comprise at least one of: one CSI reporting setting indication; CSI-RS resource setting indication; and/or one or more measurement parameters.

A base station may trigger a CSI reporting by transmitting an RRC message, a MAC CE, and/or a DCI. A wireless device may transmit one or more semi-persistent (SP) CSI report on a PUCCH, with a transmission periodicity, for example, after or in response to receiving a MAC CE (or a DCI) activating a SP CSI reporting. A wireless device may transmit one or more SP CSI report on a PUSCH, for example, after or in response to receiving a MAC CE (or a DCI) activating a SP CSI reporting.

Figure 20:
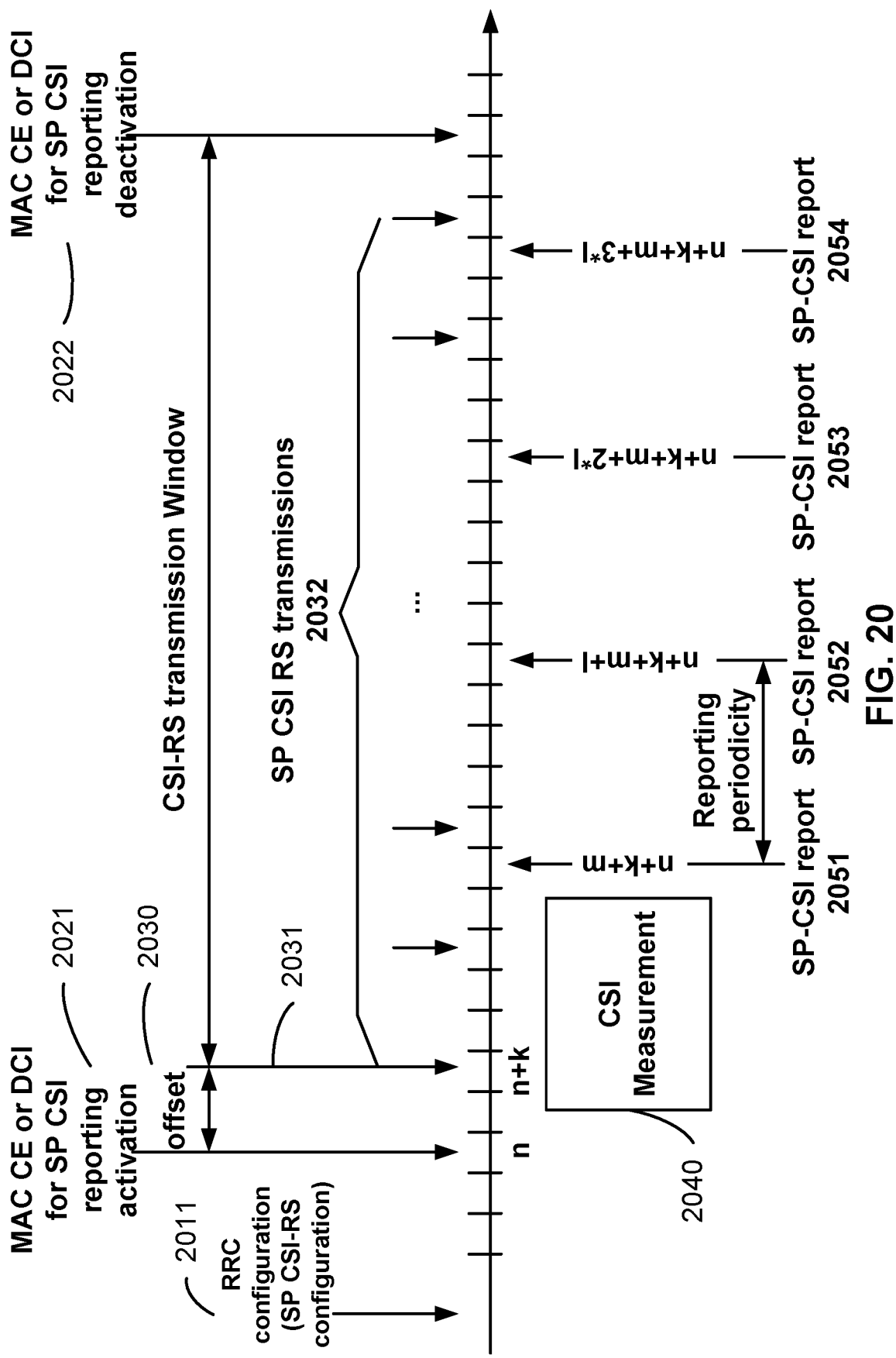
FIG. 20 shows an example semi-persistent channel state information (SP CSI) configuration with a message activating SP CSI and a message deactivating SP CSI.

FIG. 20 shows an example of SP CSI configuration with a message activating SP CSI and a message deactivating SP CSI. A base station may transmit, to a wireless device, an RRC configuration message 2011. Based on the RRC configuration message, for example, SP CSI-RS configuration and/or SP CSI report settings may be configured for the wireless device. The base station may transmit, to the wireless device and in a slot (mini-slot, or subframe) n, an indication of activating SP CSI 2021 (e.g., a MAC CE or DCI for activating SP CSI reporting). The base station may configure an offset k 2030 between the indication of activating SP CSI 2021 and the first transmission of CSI-RS. The base station may transmit, to the wireless device, the value of the offset k 2030. The offset k 2030 may be k number of TTIs (e.g., k mini-slots, slots, or subframes). The wireless device may monitor for one or more CSI-RS transmissions (e.g., the first CSI-RS transmission 2031 and one or more subsequent CSI-RS transmissions 2032). The base station may start transmitting one or more SP CSI-RSs 2031, 2032, for example, after transmitting the indication of activating SP CSI 2021 in the slot (mini-slot, or subframe) n. For example, the base station may transmit the first SP CSI-RS 2031 in a TTI (mini-slot, slot, or subframe) n+k with the offset k 2030. k may be predefined (e.g., k=0) and/or may be semi-statically configured by an RRC message. The wireless device may transmit SP CSI reports (e.g., SP-CSI reports 2051, 2052, 2053, 2054) in TTIs (mini-slot, slot, or subframe) n+k+m, n+k+m+l, n+k+m+2*l, n+k+m+3*l, etc., with a periodicity of l TTIs (mini-slots, slots, or subframes). The wireless device may stop transmitting SP CSI reporting, for example, after or in response to receiving an indication of deactivating SP CSI 2022 (e.g., a MAC CE or DCI for deactivating SP CSI reporting).

One or more power control mechanisms may be used for transmitting one or more wireless signals. Some example parameters may be used for the one or more power control mechanisms. One or more example power control processes may be implemented in technologies such as LTE, LTE Advanced, New Radio (e.g., 5G), and/or any other technologies. A radio technology may have its own specific parameters. Various power control mechanisms may be similarly or differently implemented in different radio systems. For example, a radio system may enhance physical layer power control mechanisms, for example, if some layer 2 parameters are taken into account.

For a downlink power control, a base station (or other devices) may determine the Energy Per Resource Element (EPRE). The term resource element energy may denote the energy prior to CP insertion. The term resource element energy may denote the average energy taken over all constellation points for the modulation scheme used. For an uplink power control, a wireless device and/or a base station (or other devices) may determine the average power over an SC-FDMA symbol in which the physical channel may be transmitted.

A wireless device may follow the procedures for PUSCH and SRS, for example, if the wireless device is configured with an LAA SCell for uplink transmissions. It may be assumed that a frame structure type 1 for the LAA SCell is used unless stated otherwise.

For a PUSCH, the transmit power $\hat{P}_{PUSCH,c}(i)$, may be first scaled by the ratio of the number of antennas ports with a non-zero PUSCH transmission to the number of configured antenna ports for the transmission scheme. The resulting scaled power may be split equally across the antenna ports on which the non-zero PUSCH is transmitted. For a PUCCH or SRS, the transmit power $\hat{P}_{PUCCH}(i)$, or $\hat{P}_{SRS,c}(i)$ may be split equally across the configured antenna ports for the PUCCH or SRS. $\hat{P}_{PUSCH,c}(i)$ $\hat{P}_{PUCCH}(i)$, and $\hat{P}_{SRS,c}(i)$ may be the linear values of $P_{PUSCH,c}(i)$ $P_{PUCCH}(i)$, and $P_{SRS,c}(i)$, respectively. $P_{PUSCH,f,c}(i)$ $P_{PUCCH,f,c}(i)$, and $P_{SRS,f,c}(i)$ may be the transmit power of a PUSCH, PUCCH, SRS on carrier f of a cell c, respectively. $\hat{P}_{PUSCH,f,c}(i)$ $\hat{P}_{PUCCH,f,c}(i)$, and $\hat{P}_{SRS,f,c}(i)$ may be the linear values of $P_{PUSCH,f,c}(i)$ $P_{PUCCH,f,c}(i)$, and $P_{SRS,f,c}(i)$, respectively. $P_{PUSCH,c}(i) P_{PUCCH}(i)$, and $P_{SRS,c}(i)$ may be interchangeable with $P_{PUSCH,f,c}(i) P_{PUCCH,f,c}(i)$, and $P_{SRS,f,c}(i)$, respectively, for example, if the cell c has a single carrier and/or if no confusion exists on a carrier index. $\hat{P}_{PUSCH,c}(i) \hat{P}_{PUCCH,c}(i)$, and $\hat{P}_{SRS,c}(i)$ may be interchangeable with $\hat{P}_{PUSCH,f,c}(i)$ $\hat{P}_{PUCCH,f,c}(i)$, and $\hat{P}_{SRS,f,c}(i)$, respectively, for example, if the cell c has a single carrier and/or if no confusion exists on a carrier index. A cell wide overload indicator (OI) and a High Interference Indicator (HII) to control UL interference may be parameters in a specification (e.g., in LTE and/or NR technologies specifications).

A wireless device may follow the procedures for both MCG and SCG, for example, if the wireless device is configured with an SCG. If the procedures are used for an MCG, the terms 'secondary cell,' 'secondary cells,' 'serving cell,' 'serving cells' may refer to secondary cell, secondary cells, serving cell, serving cells belonging to the MCG, respectively. The term 'primary cell' may refer to the PCell of the MCG. If the procedures are used for an SCG, the terms 'secondary cell,' 'secondary cells,' 'serving cell,' 'serving cells' may refer to secondary cell, secondary cells (not including PSCell), serving cell, serving cells belonging to the SCG, respectively. The term 'primary cell' may refer to the PSCell of the SCG.

A wireless device may follow the procedures for a primary PUCCH group, a secondary PUCCH group, or both the primary PUCCH group and the secondary PUCCH group, for example, if the wireless device is configured with a PUCCH-SCell. If the procedures are used for a primary PUCCH group, the terms 'secondary cell,' 'secondary cells,' 'serving cell,' 'serving cells' may refer to secondary cell, secondary cells, serving cell, serving cells belonging to the primary PUCCH group, respectively. If the procedures are used for a secondary PUCCH group, the terms 'secondary cell,' 'secondary cells,' 'serving cell,' 'serving cells' may refer to secondary cell, secondary cells, serving cell, serving cells belonging to the secondary PUCCH group, respectively.

A wireless device's transmit power $P_{PUSCH,c}(i)$ for a PUSCH transmission in subframe (TTI, slot, and/or mini-slot) i for the serving cell c may be given by $$P_{PUSCH,c}(i) = \min \begin{cases} P_{CMAX,c}(i), \\ 10 \log_{10}(M_{PUSCH,c}(i)) + P_{O\_PUSCH,c}(j) + \\ \alpha_c(j) \cdot PL_c + \Delta_{TF,c}(i) + f_c(i) \end{cases} [dBm],$$

for example, if the wireless device transmits the PUSCH without a simultaneous PUCCH on a carrier f of the serving cell c.

A wireless device's transmit power $P_{PUSCH,c}(i)$ for a PUSCH transmission in subframe (TTI, slot, and/or mini-slot) i for the serving cell c may be given by $$P_{PUSCH,c}(i) = \min \begin{cases} 10 \log_{10}(\hat{P}_{CMAX,c}(i) - \hat{P}_{PUCCH}(i)), \\ 10 \log_{10}(M_{PUSCH,c}(i)) + P_{O\_PUSCH,c}(j) + \\ \alpha_c(j) \cdot PL_c + \Delta_{TF,c}(i) + f_c(i) \end{cases} [dBm],$$

for example, if the wireless device transmits the PUSCH simultaneous with a PUCCH on a carrier f of the serving cell c and/or the PUSCH transmission at least partially overlaps with the PUCCH transmission.

A wireless device may assume that the wireless device's transmit power $P_{PUSCH,c}(i)$ for the PUSCH transmission in subframe (TTI, slot, and/or mini-slot) i for the serving cell c may be computed by $$P_{PUSCH,c}(i) = \min\{P_{CMAX,c}(i), P_{O\_PUSCH,c}(1) + \alpha_c(1) \cdot PL_c + f_c(i)\}[dBm],$$

for example, if the wireless device is not transmitting PUSCH for the serving cell c, for the accumulation of TPC command received with a DCI (e.g., DCI format 3/3A and/or format 2_2) for the PUSCH.

One or more example parameters for $P_{PUSCH,c}(i)$ are described below.

$P_{CMAX,c}(i)$ may be the configured transmit power, of the wireless device, in a subframe (TTI, slot, and/or mini-slot) i for a serving cell c, and $\hat{P}_{CMAX,c}(i)$ may be the linear value of $P_{CMAX,c}(i)$. The wireless device may assume $P_{CMAX,c}(i)$, for example, if the wireless device transmits a PUCCH without a PUSCH in the subframe (TTI, slot, and/or mini-slot) i for the serving cell c, for the accumulation of a TPC command received with a DCI format (e.g., DCI format 3/3A and/or format 2_2) for the PUSCH. The wireless device may determine $P_{CMAX,c}(i)$ assuming MPR=0 dB, A-MPR=0 dB, P-MPR=0 dB and $\Delta T_C$=0 dB, for example, if the wireless device does not transmit a PUCCH and a PUSCH in a subframe (TTI, slot, and/or mini-slot) i for the serving cell c, for the accumulation of TPC command received with a DCI format (e.g., DCI format 3/3A or format 2_2) for the PUSCH. The MPR, A-MPR, P-MPR and $\Delta T_C$ may be pre-defined in a specification (e.g., in LTE, NR, and/or any other technologies specifications). $\hat{P}_{PUCCH}(i)$ may be the linear value of $P_{PUCCH}(i)$.

$M_{PUSCH,c}(i)$ may be the bandwidth of the PUSCH resource assignment expressed in a number of resource blocks valid for a subframe (TTI, slot, and/or mini-slot) i and a serving cell c. $M_{PUSCH,c}(i)$ may be provided by an uplink grant transmitted by the base station.

If, for example, the wireless device is configured with a higher layer parameter (e.g., UplinkPowerControlDedicated) for a serving cell c and if, for example, a subframe (TTI, slot, and/or mini-slot) i belongs to an uplink power control subframe (TTI, slot, and/or mini-slot) set 2 as indicated by the higher layer parameter (e.g., tpc-SubframeSet), if j=0, the wireless device may set $P_{O\_PUSCH,c}(0) = P_{O\_UE\_PUSCH,c,2}(0) + P_{O\_NOMINAL\_PUSCH,c,2}(0)$, where j=0 may be used for PUSCH (re)transmissions corresponding to a semi-persistent (configured and/or grant-free) grant. $P_{O\_UE\_PUSCH,c,2}(0)$ and $P_{O\_NOMINAL\_PUSCH,c,2}(0)$ may be the parameters provided by higher layers, for example, p0-UE-PUSCH-Persistent-SubframeSet2 and p0-NominalPUSCH-Persistent-SubframeSet2, for each serving cell c.

if j=1, the wireless device may set $P_{O\_PUSCH,c}(1) = P_{O\_UE\_PUSCH,c,2}(1) + P_{O\_NOMINAL\_PUSCH,c,2}(1)$, where j=1 may be used for PUSCH (re)transmissions corresponding to a dynamic scheduled grant. $P_{O\_UE\_PUSCH,c,2}(1)$ and $P_{O\_NOMINAL\_PUSCH,c,2}(1)$ may be the parameters provided by higher layers, for example, p0-UE-PUSCH-SubframeSet2 and p0-NominalPUSCH-SubframeSet2 respectively, for the serving cell c.

if j=2, the wireless device may set $P_{O\_PUSCH,c}(2) = P_{O\_UE\_PUSCH,c}(2) \quad P_{O\_NOMINAL\_PUSCH,c}(2)$ where $P_{O\_UE\_PUSCH,c}(2) = 0$ and $P_{O\_NOMINAL\_PUSCH,c}(2) = P_{O\_PRE} + \Delta_{PREAMBLE\_Msg3}$, where the parameter preambleInitialReceivedTargetPower ($P_{O\_PRE}$) and $\Delta_{PREAMBLE\_Msg3}$ may be signaled from higher layers for the serving cell c, where j=2 may be used for PUSCH (re)transmissions corresponding to the random access response grant. Otherwise, $P_{O\_PUSCH,c}(j)$ may be a parameter comprising the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for the serving cell c. For PUSCH (re)transmissions corresponding to a semi-persistent (configured and/or grant-free) grant, for example, j=0; for PUSCH (re)transmissions corresponding to a dynamic scheduled grant, for example, j=1; and for PUSCH (re)transmissions corresponding to the random access response grant, for example, j=2. $P_{O\_UE\_PUSCH,c}(2) = 0$ and $P_{O\_NOMINAL\_PUSCH,c}(2) = P_{O\_PRE} + \Delta_{PREAMBLE\_Msg3}$, where the parameter preambleInitialReceivedTargetPower ($P_{O\_PRE}$) and $\Delta_{PREAMBLE\_Msg3}$ may be signaled from higher layers for serving cell c.

If, for example, the wireless device is configured with a higher layer parameter (e.g., UplinkPowerControlDedicated) for serving cell c, and if, for example, a subframe (TTI, slot, and/or mini-slot) i belongs to an uplink power control subframe (TTI, slot, and/or mini-slot) set 2 as indicated by the higher layer parameter (e.g., tpc-Subframe-Set), For j=0 or 1, the wireless device may set $\alpha_c(j)=\alpha_{c,2} \in \alpha_{c,2}$ may be the parameter alpha-SubframeSet2 provided by higher layers for each serving cell c.

For j=2, the wireless device may set $\alpha_c(j)=1$. Otherwise, for j=0 or 1, $\alpha_c \in \{0, 0.4, 0.5, 0.6, 0.7, 0.8, 0.9, 1\}$ may be a 3-bit parameter provided by higher layers for the serving cell c. For j=2, the wireless device may set $\alpha_c(j)=1$.

$PL_c$ may be the downlink path loss estimate calculated in the wireless device for the serving cell c (e.g., in dB) and $PL_c$=referenceSignalPower—higher layer filtered RSRP, where referenceSignalPower may be provided by higher layers and RSRP may be defined for the reference serving cell, and the higher layer filter configuration may be defined for the reference serving cell. For the uplink of the primary cell, the primary cell may be used as the reference serving cell for determining referenceSignalPower and higher layer filtered RSRP, for example, if the serving cell c belongs to a TAG containing the primary cell. For the uplink of the secondary cell, the serving cell configured by the higher layer parameter pathlossReferenceLinking may be used as the reference serving cell for determining referenceSignalPower and higher layer filtered RSRP. For the uplink of the PSCell, the PSCell may be used as the reference serving cell for determining referenceSignalPower and higher layer filtered RSRP, for example, if the serving cell c belongs to a TAG containing the PSCell. For the uplink of the secondary cell other than PSCell, the serving cell configured by the higher layer parameter pathlossReferenceLinking may be used as the reference serving cell for determining referenceSignalPower and higher layer filtered RSRP, for example, if the serving cell c belongs to a TAG containing the PSCell. Serving cell c may be used as the reference serving cell for determining referenceSignalPower and higher layer filtered RSRP, for example, if the serving cell c belongs to a TAG not containing the primary cell or PSCell. The downlink path loss may be calculated by measuring one or more reference signals (e.g., CSI-RS s and/or synchronization signals transmitted from the base station).

A wireless device may set $\Delta_{TF,c}(i)=10 \log_{10}((2^{BPRE \cdot K_s}-1) \cdot \beta_{offset}^{PUSCH})$ for $K_s=1.25$ and 0 for $K_s=0$ where $K_s$ may be given by the parameter (e.g., deltaMCS-Enabled) provided by higher layers for each serving cell c. BPRE and $\beta_{offset}^{PUSCH}$, for each serving cell c, may be computed as below. $K_s=0$ may be for transmission mode 2.

BPRE=$O_{CQI}/N_{RE}$ may be for control data (e.g., periodic/aperiodic CSI, and/or SP CSI) sent via a PUSCH without UL-SCH data and $$\sum_{r=0}^{C-1} K_r/N_{RE}$$

for other cases. C may be the number of code blocks, $K_r$ may be the size for code block r, $O_{CQI}$ may be the number of CQI/PMI bits including CRC bits and $N_{RE}$ may be the number of resource elements determined as $N_{RE}=M_{sc}^{PUSCH-initial} \cdot N_{synb}^{PUSCH-initial}$, where C, $K_r$, $M_{sc}^{PUSCH-initial}$ and $N_{synb}^{PUSCH-initial}$ may be pre-defined in a specification (e.g., the LTE, NR, and/or any other technology specifications).

$\beta_{offset}^{PUSCH}=\beta_{offset}^{CQI}$, which may be for control data (e.g., periodic/aperiodic CSI, and/or SP CSI) sent via a PUSCH without UL-SCH data and 1 for other cases.

$\delta_{PUSCH,c}$ may be a correction value (e.g., one or more correction values described herein), which may be a TPC command, and/or may be included in a PDCCH/EPDCCH with a DCI format (e.g., DCI format 0/0A/0B/4/4A/4B in LTE and/or DCI format 0_0/0_1 in NR) or in an MPDCCH with a DCI format (e.g., 6-0A) for a serving cell c or jointly coded with other TPC commands in a PDCCH/MPDCCH with a DCI format (e.g., DCI format 3/3A in LTE and/or DCI format 2_2 in NR) of which CRC parity bits may be scrambled with a group RNTI (e.g., TPC-PUSCH-RNTI). The current PUSCH power control adjustment state for serving cell c may be given by $f_{c,2}(i)$, and the wireless device may use instead of $f_{c,2}(i)$ to determine $P_{PUSCH,c}(i)$, for example, if the wireless device is configured with a higher layer parameter (e.g., UplinkPowerControlDedicated) for the serving cell c and if a subframe (TTI, slot, and/or mini-slot) i belongs to an uplink power control subframe (e.g., TTI, slot, and/or mini-slot) set 2 as indicated by the higher layer parameter (e.g., tpc-SubframeSet). Otherwise, the current PUSCH power control adjustment state for the serving cell C may be given by $f_c(i)$ $f_{c,2}(i)$ and $f_c(i)$ may be defined by:

$f_c(i)=f_c(i-1)+\delta_{PUSCH,c}(i-K_{PUSCH})$ and $f_{c,2}(i)=f_{c,2}(i-1)+\delta_{PUSCH,c}(i-K_{PUSCH})$, for example, if accumulation may be enabled based on the parameter (e.g., Accumulation-enabled) provided by higher layers and/or if the TPC command $\delta_{PUSCH,c}$ may be included in a PDCCH/EPDCCH with a DCI format (e.g., DCI format 0 in LTE and/or DCI format 0_0 in NR) or in an MPDCCH with a DCI format (e.g., DCI format 6-0A) for the serving cell c where the CRC may be scrambled by the Temporary C-RNTI. $\delta_{PUSCH,c}(i-K_{PUSCH})$ may be signaled on a PDCCH/EPDCCH with a DCI format (e.g., DCI format 0/0A/0B/4/4A/4B in LTE and/or DCI format 0_0/0_1 in NR) or an MPDCCH with a DCI format (e.g., 6-0A) or a PDCCH/MPDCCH with a DCI format (e.g., DCI format 3/3A in LTE and/or DCI format 2_2 in NR) on subframe (TTI, slot, and/or mini-slot) $i-K_{PUSCH}$, and where $f_c(0)$ may be the first value after reset of accumulation.

For a wireless device (e.g., a band-limited (BL)/coverage enhancement (CE)CE wireless device configured with CEModeA), a subframe (TTI, slot, and/or mini-slot) $i-K_{PUSCH}$ may be the last subframe (TTI, slot, and/or mini-slot) in which the MPDCCH with a DCI format (e.g., 6-0A) or MPDCCH with a DCI format (e.g., 3/3A) may be transmitted.

The value of $K_{PUSCH}$ may be, for FDD or FDD-TDD and serving cell frame structure type 1, $K_{PUSCH}=4$; for TDD, if the wireless device is configured with more than one serving cell and the TDD UL/DL configuration of at least two configured serving cells are not the same, or if the wireless device is configured with the parameter (e.g., EIMTA-Main-ConfigServCell) for at least one serving cell, or for FDD-TDD and serving cell frame structure type 2, the "TDD UL/DL configuration" may refer to the UL-reference UL/DL configuration for the serving cell c;

for a TDD UL/DL configurations (e.g., configuration 1-6 in LTE), $K_{PUSCH}$ may be given in a predefined table in a specification (e.g., LTE and/or NR specifications); for a TDD UL/DL configuration (e.g., configuration 0 in LTE), for example, if the PUSCH transmission in a first subframe (TTI, slot, and/or mini-slot) or a second subframe (TTI, slot, and/or mini-slot) (e.g., 7) may be scheduled with a PDCCH/EPDCCH of a DCI format (e.g., or an MPDCCH of a DCI format (e.g., DCI format 6-0A in LTE), in which the least significant bit (LSB) of the UL index may be set to 1, $K_{PUSCH}=7$, and for all other PUSCH transmissions, $K_{PUSCH}$ may be given in a predefined table (e.g., in LTE and/or NR specifications);

for TDD UL/DL configurations 0-5 and a wireless device configured with higher layer parameter symPUSCH-UpPts for the serving cell c, $K_{PUSCH}$ may be predefined (e.g., in LTE and/or NR specifications);

for TDD UL/DL configuration 6 and a wireless device configured with higher layer parameter symPUSCH-UpPts for the serving cell c, for example, if the PUSCH transmission in subframe 2 or 7 is scheduled with a PDCCH/EPDCCH of DCI format 0/4 in which the LSB of the UL index is set to 1, $K_{PUSCH}=6$. For all other PUSCH transmissions, $K_{PUSCH}$ may be predefined (e.g., in LTE and/or NR specifications); for a serving cell with frame structure type 3; for an uplink DCI format (e.g., DCI format in LTE), with PUSCH trigger A set to 0, $K_{PUSCH}$ may be equal to k+l, where k and l may be pre-defined in a specification (e.g., in LTE and/or NR technologies specifications); for an uplink DCI format (e.g., DCI format 0A/0B/4A/4B in LTE), with PUSCH trigger A set to 1 and upon the detection of PDCCH with DCI CRC scrambled by CC-RNTI and with 'PUSCH trigger B' field set to '1', $K_{PUSCH}$ may equal to p+k+l, where p, k and l may be pre-defined in a specification (e.g., in LTE and/or NR technologies specifications). For example, if a wireless device detected multiple TPC commands in subframe (TTI, slot, and/or mini-slot) i−$K_{PUSCH}$, the wireless device may use the TPC command in the PDCCH/EPDCCH with a DCI format (e.g., DCI format 0A/0B/4A/4B in LTE), which may schedule a PUSCH transmission in a subframe (TTI, slot, and/or mini-slot) i.

For a serving cell c and a wireless device (e.g., a non-BL/CE wireless device), the wireless device may attempt to decode a PDCCH/EPDCCH of a DCI format (e.g., DCI format in LTE) with the wireless device's C-RNTI or a DCI format (e.g., DCI format 0 in LTE and/or DCI format 0_0/0_1 in NR), for SPS (or configured grant type1, and/or configured grant type 2) C-RNTI and a PDCCH of a DCI format (e.g., DCI format 3/3A in LTE and/or DCI format 2_2 in NR) with this wireless device's RNIT (e.g., TPC-PUSCH-RNTI) in every subframe (TTI, slot, and/or mini-slot) except if in DRX or if the serving cell c is deactivated.

For a serving cell c and a wireless device (e.g., a BL/CE wireless device configured with CEModeA), the wireless device may attempt to decode an MPDCCH of a DCI format (e.g., DCI format 6-0A in LTE) with the wireless device's C-RNTI or SPS (OR configured grant type1, and/or configured grant type 2) C-RNTI and an MPDCCH of a DCI format (e.g., DCI format 3/3A in LTE and/or DCI format 2_2 in NR) with this wireless device's RNTI (e.g., TPC-PUSCH-RNTI) in particular downlink subframes (e.g., every BL/CE downlink subframe (TTI, slot, and/or mini-slot)) except if in DRX.

For a wireless device (e.g., a non-BL/CE wireless), the wireless device may use the $\delta_{PUSCH,c}$ provided in a DCI format (e.g., DCI format 0/0A/0B/4/4A/4B in LTE and/or DCI format in NR), for example, if a DCI format (e.g., DCI format 0/0A/0B/4/4A/4B in LTE and/or DCI format 0_0/0_1 in NR) for a serving cell c and a DCI format (e.g., DCI format 3/3A in LTE and/or DCI format 2_2 in NR) are both detected in the same subframe (TTI, slot, and/or mini-slot).

For a wireless device (e.g., a BL/CE wireless device configured with CEModeA), the wireless device may use the $\delta_{PUSCH,c}$ provided in the first DCI format (e.g., 6-0A), for example, if a first DCI format (e.g., 6-0A) for a serving cell c and a second DCI (e.g., DCI format 3/3A) are both detected in the same subframe.

$\delta_{PUSCH,c}$ may be 0 dB for a subframe (TTI, slot, and/or mini-slot), for example, where no TPC command is decoded for a serving cell c or if DRX occurs or i is not an uplink subframe (TTI, slot, and/or mini-slot) in TDD or FDD-TDD and the serving cell c frame structure type 2.

$\delta_{PUSCH,c}$ may be 0 dB, for example, if the subframe (TTI, slot, and/or mini-slot) i is not the first subframe (TTI, slot, and/or mini-slot) scheduled by a PDCCH/EPDCCH of DCI format 0B/4B.

The $\delta_{PUSCH,c}$ dB accumulated values signaled on a PDCCH/EPDCCH with a DCI format (e.g., DCI format 0/0A/0B/4/4A/4B in LTE and/or DCI format 0_0/0_1 in NR) or an MPDCCH with a DCI format (e.g., DCI format 6-0A) may be given in a predefined table. $\delta_{PUSCH,c}$ may be 0 dB, for example, if the PDCCH/EPDCCH with a DCI format (e.g., DCI format 0 in LTE) and/or the MPDCCH with a DCI format (e.g., DCI format 6-0A in LTE) are validated as an SPS (or configured grant Type 2) activation or release PDCCH/EPDCCH/MPDCCH.

The $\delta_{PUSCH,c}$ dB accumulated values signaled on PDCCH/MPDCCH with a DCI format (e.g., DCI format 3/3A) may be one of SET1 given in a predefined table (e.g., shown in FIG. 21) or SET2 given in a predefined table as determined by the parameter (e.g., TPC-Index) provided by higher layers.

Positive TPC commands for a serving cell c may not be accumulated, for example, if the wireless device has reached $P_{CMAX,c}(i)$ for the serving cell c.

Negative TPC commands may not be accumulated, for example, if the wireless device has reached minimum power.

If the wireless device is not configured with a higher layer parameter (e.g., UplinkPowerControlDedicated) for a serving cell c, the wireless device may reset accumulation for the serving cell c, for example, if $P_{O\_UE\_PUSCH,c}$ value is changed by higher layers and/or if the wireless device receives random access response message for the serving cell c.

If the wireless device is configured with a higher layer parameter (e.g., UplinkPowerControlDedicated) for a serving cell c, the wireless may reset accumulation corresponding to $f_c(*)$ for the serving cell c, for example, if $P_{O\_UE\_PUSCHc}$ value has been changed by higher layers, or if the wireless device receives random access response message for the serving cell c. If the wireless device is configured with a higher layer parameter (e.g., UplinkPowerControlDedicated) for a serving cell c, the wireless device may reset accumulation corresponding to $f_{c,2}(*)$ for the serving cell c, for example, if $P_{O\_UE\_PUSCHc,2}$ value has been changed by higher layers.

If the wireless device is configured with higher layer parameter (e.g., UplinkPowerControlDedicated) for a serving cell c and/or if a subframe (TTI, slot, and/or mini-slot) i belongs to an uplink power control subframe (TTI, slot, and/or mini-slot) set 2 as indicated by the higher layer parameter (e.g., tpc-SubframeSet), the wireless device may set $f_c(i)=f_c(i-1)$. If the wireless device is configured with higher layer parameter (e.g., UplinkPowerControlDedicated) for a serving cell c and/or if a subframe (TTI, slot, and/or mini-slot) i does not belong to uplink power control subframe (TTI, slot, and/or mini-slot) set 2 as indicated by (the higher layer parameter (e.g., tpc-SubframeSet), the wireless device may set $f_{c,2}(i)=f_{c,2}(i-1)$.

The wireless device may set $f_c(i)=\delta_{PUSCH,c}(i-K_{PUSCH})$ and $f_{c,2}(i)=\delta_{PUSCH,c}(i-K_{PUSCH})$ for example, if accumulation is not enabled for a serving cell c based on the parameter (e.g., Accumulation-enabled) provided by higher layers. $\delta_{PUSCH,c}$ $(i-K_{PUSCH})$ may be signaled on a PDCCH/EPDCCH with a DCI (e.g., DCI format 0/0A/0B/4/4A/4B) or an MPDCCH with a DCI (e.g., DCI format 6-0A) for the serving cell c on a subframe (TTI, slot, and/or mini-slot) $i-K_{PUSCH}$. For a wireless device (e.g., a BL/CE UE configured with CEModeA), the subframe (TTI, slot, and/or mini-slot) $i-K_{PUSCH}$ may be the last subframe (TTI, slot, and/or mini-slot) in which the MPDCCH with DCI format 6-0A or MPDCCH with DCI format 3/3A may be transmitted.

With respect to the value of $K_{PUSCH}$, for FDD or FDD-TDD and serving cell frame structure type 1, the wireless device may set $K_{PUSCH}=4$. For TDD, if the wireless device is configured with more than one serving cell and the TDD UL/DL configuration of at least two configured serving cells are not the same, or if the wireless device is configured with a particular parameter (e.g., EIMTA-MainConfigServCell) for at least one serving cell, or FDD-TDD and serving cell frame structure type 2, the "TDD UL/DL configuration" may refer to the UL-reference UL/DL configuration for serving cell c.

For one or more TDD UL/DL configurations (e.g., configurations 1-6), $K_{PUSCH}$ may be predefined;

for TDD UL/DL configuration 0, if the PUSCH transmission in subframe (TTI, slot, and/or mini-slot) 2 or 7 is scheduled with a PDCCH/EPDCCH of a DCI (e.g., DCI format 0/4) or an MPDCCH with a DCI (e.g., DCI format 6-0A) in which the LSB of the UL index is set to 1, the wireless device may set $K_{PUSCH}=7$, and for all other PUSCH transmissions, $K_{PUSCH}$ may be predefined.

For an unlicensed band, for example, a serving cell with frame structure type 3 may be configured. For an uplink DCI format (e.g., 0A/4A) with PUSCH trigger A set to 0, $K_{PUSCH}$ may be equal to k+1. k and l may be pre-defined in a specification (e.g., in LTE and/or NR technologies specifications). For an uplink DCI format (e.g., 0B/4B) with PUSCH trigger A set to 0, $K_{PUSCH}$ may be equal to k+l+i' with $i'=mod(n_{HARQ\_ID}^i-n_{HARQ\_ID}, N_{HARQ})$ niHARQ_ID may be HARQ process number in a subframe (TTI, slot, and/or mini-slot) i, and k, l, nHARQ_ID and NHARQ may be pre-defined in a specification (e.g., in LTE and/or NR technologies specifications). For an uplink DCI format (e.g., 0A/4A) with PUSCH trigger A set to 1 and upon the detection of PDCCH with DCI CRC scrambled by CC-RNTI and with 'PUSCH trigger B' field set to '1', $K_{PUSCH}$ may be equal to p+k+l p, k and l may be pre-defined in a specification (e.g., in LTE, NR, and/or any other technologies specifications). For an uplink DCI format (e.g., 0B/4B) with PUSCH trigger A set to 1 and upon the detection of a PDCCH with a DCI CRC scrambled by CC-RNTI and with 'PUSCH trigger B' field set to '1', $K_{PUSCH}$ may be equal to p+k+l+i' with $i'=mod(n_{HARQ\_ID}^i-n_{HARQ\_ID}, N_{HARQ})$ $n_{HARQ\_ID}^i$ may be an HARQ process number in a subframe (TTI, slot, and/or mini-slot) i, and p, k, l, $n_{HARQ\_ID}$ and $N_{HARQ}$ may be pre-defined in a specification (e.g., in LTE and/or NR technologies specifications).

A wireless device may use a TPC command in a PDCCH/EPDCCH with a DCI (e.g., DCI format 0A/0B/4/4A/4B) which may schedule a PUSCH transmission in a subframe (TTI, slot, and/or mini-slot) i, for example, if the wireless device detected multiple TPC commands in subframe (TTI, slot, and/or mini-slot) $i-K_{PUSCH}$.

The $\delta_{PUSCH,c}$ dB absolute values signaled on a PDCCH/EPDCCH with a DCI (e.g., DCI format 0/0A/0B/4/4A/4B) or an MPDCCH with a DCI (e.g., DCI format 6-0A) may be predefined. $\delta_{PUSCH,c}$ may be 0 dB, for example, if the PDCCH/EPDCCH with a DCI (e.g., DCI format 0, DCI format 0_0, DCI format 0_1, DCI format 1_1, DCI format 1_0, DCI format 2_0, DCI format 2_1, DCI format 2_2) or an MPDCCH with DCI format 6-0A may be validated as an SPS (or configured grant type 1, and/or configured grant type 2) activation or release PDCCH/EPDCCH/MPDCCH.

For a wireless device (e.g., a non-BL/CE wireless device), the wireless device may set $f_c(i)=f_c(i-1)$ and $f_{c,2}(i)=f_{c,2}(i-1)$ for a subframe (TTI, slot, and/or mini-slot) where, for example, no PDCCH/EPDCCH with a DCI format (e.g., DCI format 0/0A/0B/4/4A/4B) is decoded for a serving cell c or where, for example, DRX occurs or i is not an uplink subframe (TTI, slot, and/or mini-slot) in TDD or FDD-TDD and serving cell c frame structure type 2.

For a wireless device (e.g., a BL/CE wireless device configured with CEModeA), the wireless device may set $f_c(i)=f_c(i-1)$ and $f_{c,2}(i)=f_{c,2}(i-1)$ for a subframe (TTI, slot, and/or mini-slot) where, for example, no MPDCCH with DCI format 6-0A is decoded for a serving cell c or where, for example, DRX occurs or i is not an uplink subframe (TTI, slot, and/or mini-slot) in TDD.

A wireless device may set $f_c(i)=f_c(i-1)$, for example, if the wireless device is configured with higher layer parameter (e.g., UplinkPowerControlDedicated) for a serving cell c and if a subframe (TTI, slot, and/or mini-slot) i belongs to an uplink power control subframe (TTI, slot, and/or mini-slot) set 2 as indicated by the higher layer parameter (e.g., tpc-SubframeSet). The wireless device may set $f_{c,2}(i)=f_{c,2}(i-1)$, for example, if the wireless device is configured with a higher layer parameter (e.g., UplinkPowerControlDedicated) for a serving cell c and if a subframe (TTI, slot, and/or mini-slot) i does not belong to an uplink power control subframe (TTI, slot, and/or mini-slot) set 2 as indicated by the higher layer parameter tpc-SubframeSet.

For both types of $f_c(*)$ (accumulation or current absolute), the first value may be set as follows:

$f_c(0)$ may be zero, for example, if $P_{O\_UE\_PUSCHc}$ value is changed by higher layers and a serving cell c is the primary cell, or if $P_{O\_UE\_PUSCHc}$ value is received by higher layers and the serving cell c is a Secondary cell; Else, The wireless device may set $f_c(0)=\Delta P_{rampup,c}+\delta_{msg2,c}$ for example, if the wireless device receives the random access response message for a serving cell c $\delta_{msg2,c}$ may be the TPC command indicated in the random access response corresponding to the random access preamble transmitted in the serving cell c, and $$\Delta P_{rampup,c} = \min\left[\left\{\max\left(0,\ P_{CMAX,c} - \begin{pmatrix} 10\log_{10}(M_{PUSCH,c}(0)) \\ +P_{O\_PUSCH,c}(2)+\delta_{msg2} \\ +\alpha_c(2)\cdot PL_c + \Delta_{TF,c}(0) \end{pmatrix}\right)\right\}, \Delta P_{rampuprequested,c}\right]$$

and $\Delta P_{rampuprequested,c}$ may be provided by higher layers and may correspond to the total power ramp-up requested by higher layers from the first to the last preamble in the serving cell c, $M_{PUSCH,c}(0)$ may be the bandwidth of the PUSCH resource assignment expressed in number of resource blocks valid for the subframe (TTI, slot, and/or mini-slot) of first PUSCH transmission in the serving cell c, and ΔTF,c(0) may be the power adjustment of first PUSCH transmission in the serving cell c.

The wireless device may set $f_{c,2}(0)=0$, for example, if $P_{O\_UE\_PUSCH c,2}$ value is received by higher layers for a serving cell c.

The setting of the wireless device transmit power $P_{PUCCH}$ for the physical uplink control channel (PUCCH) transmission in a subframe (TTI, slot, and/or mini-slot) i for a serving cell c may be defined by $$P_{PUCCH}(i) = \min \begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix} [dBm],$$

for example, if the serving cell c is the primary cell, for a first PUCCH format (e.g., 1/1a/1b/2/2a/2b/3).

The setting of the wireless device transmit power $P_{PUCCH}$ for the physical uplink control channel (PUCCH) transmission in a subframe (TTI, slot, and/or mini-slot) i for a serving cell c may be defined by $$P_{PUCCH}(i) = \min \begin{Bmatrix} P_{CMAX,c}(i), \\ P_{0\_PUCCH} + PL_c + 10 \log_{10}(M_{PUCCH,c}(i)) + \\ \Delta_{TF,c}(i) + \Delta_{F\_PUCCH}(F) + g(i) \end{Bmatrix} [dBm],$$

for example, if the serving cell c is the primary cell, for a second PUCCH format (e.g., 4/5).

For the accumulation of TPC command for PUCCH, the wireless device may assume that the wireless device transmit power $P_{PUCCH}$ for PUCCH in a subframe (TTI, slot, and/or mini-slot) i may be computed by $P_{PUCCH}(i) = \min \{P_{CMAX,c}(i), P_{0\_PUCCH} + PL_c + g(i)\}$ [dBm], for example, if the wireless device is not transmitting PUCCH for the primary cell.

$P_{CMAX,c}(i)$ may be the configured wireless device transmit power in subframe (TTI, slot, and/or mini-slot) i for a serving cell c. For the accumulation of TPC command for a PUCCH, the wireless device may compute $P_{CMAX,c}(i)$ assuming MPR=0 dB, A-MPR=0 dB, P-MPR=0 dB and $\Delta T_C=0$ dB, for example, if the wireless device does not transmit a PUCCH and PUSCH in a subframe (TTI, slot, and/or mini-slot) i for the serving cell c. MPR, A-MPR, P-MPR and $\Delta T_C$ may be pre-defined in a specification (e.g., in a LTE, NR, and/or any other technologies specifications).

The parameter $\Delta_{F\_PUCCH}(F)$ be provided by higher layers. A $\Delta_{F\_PUCCH}(F)$ value may correspond to a PUCCH format (F) relative to a PUCCH format (e.g., PUCCH format 1a) The PUCCH format (F) may be pre-defined in a specification (e.g., in LTE, NR, and/or any other technologies specifications).

The value of $\Delta_{TxD}(F')$ may be provided by higher layers, for example, if the wireless device may be configured by higher layers to transmit a PUCCH on two antenna ports. Each PUCCH format F' may be pre-defined in a specification (e.g., in LTE and/or NR technologies specifications); otherwise, the wireless device may set $\Delta_{TxD}(F')=0$.

$h(n_{CQI}, n_{HARQ}, n_{SR})$ may be a PUCCH format dependent value $n_{CQI}$ may correspond to the number of information bits for the channel quality information. The wireless device may set $n_{SR}=1$, for example, if a subframe (TTI, slot, and/or mini-slot) i is configured for SR for the wireless device not having any associated transport block for UL-SCH, otherwise the wireless device may set $n_{SR}=0$. The value of $n_{HARQ}$ may be pre-defined in a specification (e.g., in LTE and/or NR technologies specifications), for example, if the wireless device is configured with more than one serving cell, or the wireless device is configured with one serving cell and transmitting using a PUCCH format (e.g., a PUCCH format 3). Otherwise, $n_{HARQ}$ may be the number of HARQ-ACK bits sent in the subframe (TTI, slot, and/or mini-slot) i.

The wireless device may set $h(n_{CQI}, n_{HARQ}, n_{SR})=0$, for example, for a first PUCCH format (e.g., PUCCH format 1,1a and 1b).

For a second PUCCH format (e.g., PUCCH format 1b) with a channel selection, the wireless device may set $$h(n_{CQI}, n_{HARQ}, n_{SR}) = \frac{(n_{HARQ} - 1)}{2},$$

for example, if the wireless device is configured with more than one serving cell. Otherwise, for example, $h(n_{CQI}, n_{HARQ}, n_{SR})=0$.

The wireless device may set $$h(n_{CQI}, n_{HARQ}, n_{SR}) = \begin{cases} 10 \log_{10}\left(\frac{n_{CQI}}{4}\right) & \text{if } n_{CQI} \geq 4 \\ 0 & \text{otherwise} \end{cases},$$

for example, for a third PUCCH format (e.g., PUCCH format 2, 2a, 2b) and a normal cyclic prefix.

The wireless device may set $$h(n_{CQI}, n_{HARQ}, n_{SR}) = \begin{cases} 10 \log_{10}\left(\frac{n_{CQI} + n_{HARQ}}{4}\right) & \text{if } n_{CQI} + n_{HARQ} \geq 4 \\ 0 & \text{otherwise} \end{cases},$$

for example, for a fourth PUCCH format (e.g., PUCCH format 2) and an extended cyclic prefix.

For a fifth PUCCH format (e.g., PUCCH format 3) and if a wireless device transmits HARQ-ACK/SR without periodic CSI, the wireless device may set $$h(n_{CQI}, n_{HARQ}, n_{SR}) = \frac{(n_{HARQ} + n_{SR} - 1)}{3},$$

for example, if the wireless device is configured by higher layers to transmit PUCCH format 3 on two antenna ports, or if the wireless device transmits more than a number of bits (e.g., 11 bits) of HARQ-ACK/SR. Otherwise, the wireless device may set $$h(n_{CQI}, n_{HARQ}, n_{SR}) = \frac{n_{HARQ} + n_{SR} - 1}{2}.$$

For a sixth PUCCH format (e.g., PUCCH format 3) and if a wireless device transmits HARQ-ACK/SR and periodic CSI, the wireless device may set $$h(n_{CQI}, n_{HARQ}, n_{SR}) = \frac{n_{HARQ} + n_{SR} + n_{CQI} - 1}{3},$$

for example, if the wireless device is configured by higher layers to transmit a PUCCH format (e.g., PUCCH format 3)

on two antenna ports, or if the wireless device transmits more than a number of bits (e.g., 11 bits) of HARQ-ACK/SR and CSI; Otherwise, for example, the wireless device may set $$h(n_{CQI}, n_{HARQ}, n_{SR}) = \frac{n_{HARQ} + n_{SR} + n_{CQI} - 1}{2}.$$

For a seventh PUCCH format (e.g., PUCCH format 4), for example, $M_{PUCCH,c}(i)$ may be the bandwidth of the PUCCH format 4 expressed in number of resource blocks valid for a subframe (TTI, slot, and/or mini-slot) i and a serving cell c. For PUCCH format 5, for example, the wireless device may set $M_{PUCCH,c}(i)=1$.

The wireless device may set $\Delta_{TF,c}A(i)=10 \log_{10}(2^{1.25 \cdot BPRE(i)}-1)$. The wireless device may set $B_{PRE}(i)=O_{UCI}(i)/N_{RE}(i)$. $O_{UCI}(i)$ may be the number of HARQ-ACK/SR/RI/CQI/PMI bits comprising CRC bits transmitted on PUCCH format 4/5 in subframe (TTI, slot, and/or mini-slot) i. The wireless device may set $N_{RE}(i)=M_{PUCCH,c}(i) \cdot N_{sc}^{RB} \cdot N_{symb}^{PUCCH}$ for PUCCH format 4 and $N_{RE}(i)=N_{sc}^{RB} \cdot N_{symb}^{PUCCH}/2$ for PUCCH format 5. The wireless device may set $N_{symb}^{PUCCH}=2 \cdot (N_{symb}^{UL}-1)-1$, for example, if shortened PUCCH format 4 and/or shortened PUCCH format 5 is used in subframe (TTI, slot, and/or mini-slot) i. Otherwise, for example, $N_{symb}^{PUCCH}=2 \cdot (N_{symb}^{UL}-1)$.

$P_{O\_PUCCH}$ may be a parameter computed as the sum of a parameter $P_{O\_NOMINAL\_PUCCH}$ provided by higher layers and a parameter $P_{O\_UE\_PUCCH}$ provided by higher layers.

$\delta_{PUCCH}$ may be a device specific correction value (e.g., a UE-specific correction value), may be a TPC command, included in a PDCCH with a DCI format (e.g., DCI format 1A/1B/1D/1/2A/2/2B/2C/2D) for the primary cell, or included in an MPDCCH (e.g., with DCI format 6-1A), or included in an EPDCCH (e.g., with DCI format 1A/1B/1D/1/2A/2/2B/2C/2D) for the primary cell, or sent jointly coded with other device specific PUCCH correction values on a PDCCH/MPDCCH (e.g., with DCI format 3/3A in LTE and/or DCI format 2_2 in NR) of which CRC parity bits may be scrambled with a group RNTI (e.g., TPC-PUCCH-RNTI).

For a wireless device (e.g., a non-BL/CE UE), for example, if the wireless device is not configured for EPDCCH monitoring, the wireless device may attempt to decode a PDCCH of a DCI format (e.g., DCI format 3/3A in LTE and/or DCI format 2_2 in NR) with the wireless device's RNTI (e.g., TPC-PUCCH-RNTI) and one or several PDCCHs of a DCI format (e.g., 1A/1B/1D/1/2A/2/2B/2C/2D) with the wireless device's C-RNTI or SPS (or configured grant type1, and/or configured grant type 2) C-RNTI on every subframe (TTI, slot, and/or mini-slot), except if in DRX.

If, for example, a wireless device is configured for EPDCCH monitoring, the wireless device may attempt to decode, for example, a PDCCH of a DCI format (e.g., DCI format 3/3A in LTE and/or DCI format2_2 in NR) with the wireless device's RNTI (e.g., TPC-PUCCH-RNTI) and one or several PDCCHs of DCI format 1A/1B/1D/1/2A/2/2B/2C/2D with the wireless device's C-RNTI or SPS (or configured grant type1, and/or configured grant type 2) C-RNTI, and one or several EPDCCHs of DCI format 1A/1B/1D/1/2A/2/2B/2C/2D with the wireless device's C-RNTI or SPS (or configured grant type1, and/or configured grant type 2) C-RNTI.

For a wireless device (e.g., a BL/CE wireless device configured with CEModeA), the wireless device may attempt to decode an MPDCCH of a DCI format (e.g., DCI format 3/3A in LTE and/or DCI format 2_2) with the wireless device's RNTI (e.g., TPC-PUCCH-RNTI) and an MPDCCH of DCI format 6-1A with the wireless device's C-RNTI or SPS (or configured grant type1, and/or configured grant type 2) C-RNTI on a particular subframe (e.g., every BL/CE downlink subframe, slot, and/or mini-slot), except if in DRX.

The wireless device may use the $\delta_{PUCCH}$ provided in a PDCCH/EPDCCH/MPDCCH, for example, if the wireless device decodes the PDCCH (e.g., with DCI format 1A/1B/1D/1/2A/2/2B/2C/2D), the EPDCCH (e.g., with DCI format 1A/1B/1D/1/2A/2/2B/2C/2D), or the MPDCCH (e.g., with DCI format 6-1A), for the primary cell, and the corresponding detected RNTI equals the C-RNTI or SPS (or configured grant type1, and/or configured grant type 2) C-RNTI of the wireless device, and the TPC field in the DCI format is not used to determine the PUCCH resource. The wireless device may use the $\delta_{PUCCH}$ provided in that PDCCH/MPDCCH, for example, if the wireless device decodes a PDCCH/MPDCCH with DCI format 3/3A. Otherwise, for example, the wireless device may set $\delta_{PUCCH}=0$ dB.

The wireless device may set $$g(i) = g(i-1) + \sum_{m=0}^{M-1} \delta_{PUCCH}(i-k_m).$$

g(i) may be the current PUCCH power control adjustment state and g(0) may be the first value after reset. For FDD or FDD-TDD and primary cell frame structure type 1, the wireless device may set M=1 and $k_0$=4. For TDD, values of M and $k_m$ may be pre-defined in a specification (e.g., in the LTE and/or NR technologies specifications).

The $\delta_{PUCCH}$ dB values signaled on a PDCCH with a DCI format (e.g., 1A/1B/1D/1/2A/2/2B/2C/2D) or an EPDCCH with a DCI format (e.g., 1A/1B/1D/1/2A/2/2B/2C/2D) or an MPDCCH with a DCI format (e.g., 6-1A) may be given in a predefined table (e.g., as shown in FIG. 22). $\delta_{PUCCH}$ may be 0 dB, for example, if the PDCCH with a DCI format (e.g., 1/1A/2/2A/2B/2C/2D) or the EPDCCH with a DCI format (e.g., 1/1A/2A/2/2B/2C/2D) or the MPDCCH with a DCI format (e.g., 6-1A) may be validated as an SPS (or configured grant type1, and/or configured grant type 2) activation PDCCH/EPDCCH/MPDCCH, or the PDCCH/EPDCCH (e.g., with DCI format 1A) or MPDCCH (e.g., with DCI format 6-1A) may be validated as an SPS (or configured grant type1, and/or configured grant type 2) release PDCCH/EPDCCH/MPDCCH.

The $\delta_{PUCCH}$ dB values signaled on a PDCCH/MPDCCH with a DCI format (e.g., DCI format 3/3A in LTE and/or DCI format 2_2 in NR) may be given in a predefined table (e.g., as shown in FIG. 22 or Table 5.1.2.1-2 in 3GPP TS 36.213 v.14.4.0: "Evolved Universal Terrestrial Radio Access (E-UTRA); Physical layer procedures") as semi-statically configured by higher layers.

The wireless device may set g(0)=0, for example, if $P_{O\_UE\_PUCCH}$ value is changed by higher layers. Otherwise, for example, the wireless device may set $g(0)=\Delta P_{rampup}+\delta_{msg2}$ $\delta_{msg2}$ may be the TPC command indicated in the random access response corresponding to the random access preamble transmitted in the primary cell, and $$\Delta P_{rampup} = \min\left[\left\{\max\left(0, P_{CMAX,c} - \left(\begin{array}{c} P_{0\_PUCCH} + \\ PL_c + h(n_{CQI}, n_{HARQ}, n_{SR}) + \\ \Delta_{F\_PUCCH}(F) + \Delta_{T_xD}(F') \end{array}\right)\right)\right\}, \Delta P_{rampuprequested}\right],$$

for example, if the wireless device is transmitting a PUCCH in a subframe (TTI, slot, and/or mini-slot) i.

Otherwise, for example, the wireless device may set $\Delta P_{rampup}$=min [{max(0, $P_{CMAX,c}$−($P_{0\_PUCCH}$+$PL_c$))}, $\Delta P_{rampuprequested}$], $\Delta P_{puprequested}$ may be provided by higher layers and may correspond to the total power ramp-up requested by higher layers from the first to the last preamble in the primary cell.

Positive TPC commands for the primary cell may not be accumulated, for example, if the wireless device has reached $P_{CMAX,c}(i)$ for the primary cell.

Negative TPC commands may not be accumulated, for example, if the wireless device has reached minimum power.

The wireless device may reset accumulation, for example, if $P_{O\_UE\_PUCCH}$ value is changed by higher layers. The wireless device may reset accumulation, for example, if the wireless device receives a random access response message for the primary cell. The wireless device may reset accumulation g(i)=g(i−1), for example, if i may be not an uplink subframe (TTI, slot, and/or mini-slot) in TDD or FDD-TDD and primary cell frame structure type 2.

For a wireless device (e.g., a BL/CE wireless device configured with CEModeA), k=0, 1, . . . , N−1 may be determined by $P_{PUCCH,c}(i_k)$=$P_{PUCCH,c}(i_0)$ for example, if the PUCCH is transmitted in more than one subframe (TTI, slot, and/or mini-slot) $i_0, i_1, \ldots, i_{N-1}$, where $i_0<i_1<\ldots<i_{N-1}$, the PUCCH transmit power in a subframe (TTI, slot, and/or mini-slot) $i_k$.

For a wireless device (e.g., a BL/CE wireless device configured with CEModeB), the PUCCH transmit power in subframe (TTI, slot, and/or mini-slot) $i_k$ may be determined by $P_{PUCCH,c}(i_k)$=$P_{CMAX,c}(i_0)$.

The setting of the wireless device transmit power $P_{SRS}$ for the SRS transmitted on a subframe (TTI, slot, and/or mini-slot) i for a serving cell c may be defined by: for example, for serving cell c with frame structure type 2, and not configured for PUSCH/PUCCH transmission $P_{SRS,c}(i)$=min{$P_{CMAX,c}(i)$,10 log$_{10}$($M_{SRS,c}$)+ $P_{O\_SRS,c}(m)$+$\alpha_{SRS,c}$·$PL_c$+$f_{SRS,c}(i)$}[dBm];

Otherwise, for example, $P_{SRS}$ may be defined by $P_{SRS,c}(i)$=min{$P_{CMAX,c}(i)$,$P_{SRS\_OFFSET,c}(m)$+ 10 log$_{10}$($M_{SRS,c}$)+$P_{O\_PUSCH,c}(j)$+$\alpha_c(j)$·$PL_c$+$f_c(i)$} [dBm].

$P_{CMAX,c}(i)$ C may be the configured wireless device transmit power in a subframe (TTI, slot, and/or mini-slot) i for a serving cell c. $P_{SRS\_OFFSET,c}(m)$ may be semi-statically configured by higher layers for m=0 and m=1 for the serving cell c. For SRS transmission given trigger type 0, the wireless device may set m=0. For SRS transmission given trigger type 1, the wireless device may set m=1. $M_{SRS,c}$ may be the bandwidth of the SRS transmission in the subframe (TTI, slot, and/or mini-slot) i for the serving cell c expressed in number of resource blocks. $f_c(i)$ may be the current PUSCH power control adjustment state for the serving cell c. $P_{O\_PUSCH,c}(j)$ and $\alpha_c(j)$ may be parameters as pre-defined in a specification (e.g., in LTE, NR, and/or any other technologies specifications) for a subframe (TTI, slot, and/or mini-slot) i, where j=1. $\alpha_{SRS,c}$ may be the higher layer parameter (e.g., alpha-SRS) configured by higher layers for the serving cell c. $P_{O\_SRS,c}(m)$ may be a parameter comprising the sum of a component $P_{O\_NOMINAL\_SRS,c}(m)$ provided from higher layers for m=0 and 1 and a component $P_{O\_UE\_SRS,c}(m)$ provided by higher layers for m=0 and 1 for the serving cell c. For SRS transmission given trigger type 0, the wireless device may set m=0. For SRS transmission given trigger type 1, the wireless device may set m=1.

For serving cell c with frame structure type 2, and not configured for a PUSCH/PUCCH transmission, the current SRS power control adjustment state may be given by $f_{SRS,c}(i)$ and may be defined by: for example, the wireless device may set $f_{SRS,c}(i)$=$f_{SRS,c}(i-1)$+$\delta_{SRS,c}(i-K_{SRS})$, for example, if accumulation is enabled, and $f_{SRS,c}(i)$=$\delta_{SRS,c}(i-K_{SRS})$ for example, if accumulation is not enabled based on a higher layer parameter (e.g., Accumulation-enabled) for example, $\delta_{SRS,c}(i-K_{SRS})$ may be a correction value, and/or may be an SRS TPC command signaled on a PDCCH (e.g., with DCI format 3B in LTE and/or DCI format 2_3 in NR) in the most recent subframe (TTI, slot, and/or mini-slot) $i-K_{SRS}$, where $K_{SRS} \geq 4$. The wireless device may be not expected to receive different SRS TPC command values for the serving cell c in the same subframe (TTI, slot, and/or mini-slot). For a serving cell c with frame structure type 2, and not configured for PUSCH/PUCCH transmission, the wireless device may attempt to decode a PDCCH of a DCI format (e.g., DCI format 3B in LTE and/or DCI format 2_3 in NR) with CRC scrambled by a higher layer parameter (e.g., SRS-TPC-RNTI) in every subframe (TTI, slot, and/or mini-slot), except when in DRX or where the serving cell c is deactivated. The wireless device may set $\delta_{SRS,c}$=0 dB for a subframe (TTI, slot, and/or mini-slot), for example, where no TPC command in a PDCCH with a DCI format (e.g., DCI format 3B in LTE and/or DCI format 2_3 in NR) is decoded for a serving cell c or where DRX occurs or i is not an uplink/special subframe (TTI, slot, and/or mini-slot) in TDD or FDD-TDD and serving cell c frame structure type 2.

The $\delta_{SRS}$ dB values signaled on a PDCCH with a DCI format (e.g., DCI format 3B in LTE and/or DCI format 2_3 in NR) may be predefined, for example, if a higher layer parameter (e.g., fieldTypeFormat3B) indicates a multi-bit (e.g., 2 bits) TPC command. The $\delta_{SRS}$ dB signaled on a PDCCH with a DCI format (e.g., DCI format 3B in LTE and/or DCI format 2_3 in NR) may be predefined, for example, if a higher layer parameter (e.g., fieldTypeFormat3B) indicates 1-bit TPC command.

$f_{SRS,c}(0)$ may be the first value after reset of accumulation, for example, if accumulation is enabled. The wireless device may reset accumulation, for a serving cell c, for example, if $P_{O\_UE\_SRS,c}$ value is changed by higher layers. The wireless device may reset accumulation for the serving cell c, for example, if the wireless device receives random access response message for the serving cell c.

For both types of $f_{SRS,c}(*)$ (accumulation or current absolute), the first value may be set as follows:

The wireless device may set $f_{SRS,c}(0)$=0, for example, if $P_{O\_UE\_SRS,c}$ value is received by higher layers.

The wireless device may set value $f_{SRS,c}(0)$=$\Delta P_{rampup,c}$+ $\delta_{msg2,c}$, for example, if $P_{O\_UE\_SRS,c}$ value is not received by higher layers, and if the wireless device receives the random access response message for a serving cell c. $\delta_{msg2,c}$ may be the TPC command indicated in the random access response corresponding to the random access preamble transmitted in the serving cell c, and $$\Delta P_{rampup,c} = \min\left[\left\{\max\begin{pmatrix}0,\\P_{CMAX,c}-(10\log_{10}(M_{SRS,c}(0))+P_{O\_SRS,c}(m)+\alpha_{SRS,c}\cdot PL_c)\end{pmatrix}\right\},\Delta P_{rampuprequested,c}\right]$$

and $\Delta P_{rampuprequested,c}$ may be provided by higher layers and may correspond to the total power ramp-up requested by higher layers from the first to the last preamble in the serving cell c, $M_{SRS,c}(0)$ may be the bandwidth of the SRS transmission expressed in number of resource blocks valid for the subframe of first SRS transmission in the serving cell c.

For a PUSCH, a wireless device may scale a linear value $\hat{P}_{PUSCH,f,c}$ (i, j, $q_d$, l) of the transmit power $P_{PUSCH,f,c}$ (i, j, $q_d$, l), with parameters in the following, for example, by the ratio of the number of antenna ports with a non-zero PUSCH transmission to the number of configured antenna ports for the transmission scheme. The resulting scaled power may be split across the antenna ports on which the non-zero PUSCH may be transmitted.

A wireless device may determine the PUSCH transmission power $P_{PUSCH,f,c}$(i, j, $q_d$, l) in PUSCH transmission period i as for a PUSCH transmission period i on a carrier f of a serving cell c, and μ may be predefined and/or semi-statically configured by one or more higher layer parameters.

For j=0, the wireless device may set $\alpha_{f,c}(j)=1$. For j=1, $\alpha_{f,c}(1)$ may be provided by a higher layer parameter (e.g., alpha). For j∈$S_J$, a set of $\alpha_{f,c}(j)$ values may be provided by a set of higher layer parameters (e.g., p0-pusch-alpha-set) and a respective index by higher layer parameter p0alphasetindex for a carrier f of a serving cell c, where the size of the set may be J−2 and may be indicated by a higher layer parameter (e.g., num-p0-alpha-sets).

$PL_{f,c}(q_d)$ may be a downlink path-loss estimate (e.g., in dB) calculated by the wireless device using reference signal (RS) resource $q_d$ for a carrier f of a serving cell c. The wireless device may be configured with a number of RS resources by one or more higher layer parameters (e.g., num-pusch-pathlossReference-rs) and a respective set of RS configurations for the number of RS resources may be provided by a higher layer parameter (e.g., pusch-pathloss-Reference-rs) that may comprise one or both of a set of $$P_{PUSCH,f,c}(i, j, q_d, l) = \min\begin{cases}P_{CMAX,f,c}(i),\\P_{O\_PUSCH,f,c}(j)+10\log_{10}\left(2^\mu\cdot M_{RB,f,c}^{PUSCH}(i)\right)+\alpha_{f,c}(q_d)+\Delta_{TF,f,c}(i)+f_{f,c}(i,l)\end{cases}[\text{dBm}],$$

for example, if the wireless device transmits the PUSCH on carrier f of serving cell c using parameter set configuration with index j and PUSCH power control adjustment state with index l.

$P_{CMAX,f,c}(i)$ may be the configured wireless device transmit power for carrier f of serving cell c in a PUSCH transmission period i.

$P_{O\_PUSCH,f,c}(j)$ may be a parameter comprising the sum of a component $P_{O\_NOMINAL\_PUSCH,f,c}(j)$ and a component $P_{O\_UE\_PUSCH,f,c}(j)$, where j∈{0, 1, . . . , J−1}. For a PUSCH (re)transmission corresponding to a random access response grant, j=0, the wireless device may set $P_{O\_UE\_PUSCH,f,c}(0)=0$, and $P_{O\_NOMINAL\_PUSCH,f,c}(0)=P_{O\_PRE}+\Delta_{PREAMBLE\_Msg3}$. The parameter preambleInitialReceived-TargetPower (for $P_{O\_PRE}$) and Delta-preamble-msg3 (for $\Delta_{PREAMBLE\_Msg3}$) may be provided by higher layers for a carrier f of a serving cell c. For a PUSCH (re)transmission corresponding to a grant-free configuration or semi-persistent grant, j=1, $P_{O\_NOMINAL\_PUSCH,f,c}(1)$ may be provided by a higher layer parameter (e.g., p0-nominal-pusch-without-grant), and $P_{O\_UE\_PUSCH,f,c}(1)$ may be provided by a higher layer parameter p0-ue-pusch for a carrier f of the serving cell c. For j∈{2, . . . , J−1}=$S_J$, a $P_{O\_NOMINAL\_PUSCH,f,c}(j)$ value, applicable for all j∈$S_J$, may be provided by a higher layer parameter (e.g., p0-nominal-pusch-withgrant) for each carrier f of the serving cell c, and a set of $P_{O\_UE\_PUSCH,f,c}(j)$ values may be provided by a set of one or more higher layer parameters (e.g., p0-pusch-alpha-set) and a respective index by a higher layer parameter (e.g., p0alphasetindex) for a carrier f of the serving cell c. The size of the set may be J−2 and may be indicated by a higher layer parameter (e.g., num-p0-alpha-sets).

$M_{RB,f,c}^{PUSCH}$ may be the bandwidth of the PUSCH resource assignment expressed in number of resource blocks SS/PBCH block indexes provided by a higher layer parameter (e.g., pusch-pathlossReference-SSB) and a set of CSI-RS configuration indexes provided by a higher layer parameter (e.g., pusch-pathlossReference-CSIRS). The wireless device may identify an RS resource in the set of RS resources that correspond to an SS/PBCH block or to a CSI-RS configuration as provided by a higher layer parameter (e.g., pusch-pathlossreference-index). The wireless device may use the RS resources indicated by a value of an SRI field in one or more DCI formats (e.g., DCI format 0_0 or DCI format 0_1) that may schedule the PUSCH transmission to obtain the downlink path-loss estimate, for example, if the wireless device is configured by a higher layer parameter (e.g., SRS-SpatialRelationInfo) a mapping between a set of SRS resources and a set of RS resources for obtaining a downlink path-loss estimate.

$PL_{f,c}(q_d)$ may be $PL_{f,c}(q_d)$=referenceSignalPower−higher layer filtered RSRP. referenceSignalPower may be provided by higher layers and RSRP may be defined for the reference serving cell and the higher layer filter configuration may be for the reference serving cell. For J=0, referenceSignalPower may be configured by a higher layer parameter (e.g., SS-PBCHBlockPower). For j>0, referenceSignalPower may be configured by a higher layer parameter (e.g., SS-PBCH-BlockPower) or by, if periodic CSI-RS transmission is configured, a higher layer parameter (e.g., Pc-SS) providing an offset of the CSI-RS transmission power relative to the SS/PBCH block transmission power.

The wireless device may set $\Delta_{TF,f,c}(i)$ as $\Delta_{TF,f,c}(i)=10\log_{10}((2^{BPRE\cdot K_s}-1)\cdot\beta_{offset}^{PUSCH}$ for $K_s=1.25$ and $\Delta_{TF,f,c}(i)=0$ for $K_s=0$. $K_s$ may be provided by a higher layer parameter (e.g., deltaMCS-Enabled) provided for a carrier f and serving cell c. The wireless device may set $\Delta_{TF,f,c}(i)=0$, for example, if the PUSCH transmission is performed over more than one layers.

BPRE and $\beta_{offset}^{PUSCH}$, for a carrier f and a serving cell c, may be computed as below. The wireless device may set $$BPRE = \sum_{r=0}^{C-1} K_r/N_{RE}$$

for PUSCH with UL-SCH data and BPRE=$O_{CSI}/N_{RE}$ for CSI (e.g., periodic/aperiodic CSI and/or SP CSI) transmission in a PUSCH without UL-SCH data. C may be the number of code blocks, $K_r$ may be the size for code block r, $O_{CSI}$ may be the number of CSI part 1 bits comprising CRC bits, and $N_{RE}$ may be the number of resource elements determined as $N_{RE}=M_{RB,f,c}^{PUSCH}(i) \cdot N_{symb,f,c}^{PUSCH}(i)$ excluding REs used for DM-RS transmission. $N_{symb,f,c}^{PUSCH}(i)$ may be a number of symbols for a PUSCH transmission period i on a carrier f of a serving cell c and C, $K_r$ may be predefined and/or semi-statically configured. The wireless device may set $\beta_{offset}^{PUSCH}=1$, for example, if the PUSCH comprises UL-SCH data. The wireless device may set $\beta_{offset}^{PUSCH}=\beta_{offset}^{CSI,1}$, for example, if the PUSCH comprises CSI and does not include UL-SCH data.

For the PUSCH power control adjustment state for a carrier f of a serving cell c in a PUSCH transmission period i, $\delta_{PUSCH,f,c}(i-K_{PUSCH}, 1)$ may be a correction value, which may be a TPC command, and may be in a PDCCH with one or more DCI formats (e.g., DCI format 0_0 or DCI format 0_1) that may schedule the PUSCH transmission period i on the carrier f of the serving cell c or jointly coded with other TPC commands in a PDCCH with one or more DCI formats (e.g., DCI format 2_2) having CRC parity bits scrambled by a particular RNTI (e.g., TPC-PUSCH-RNTI) that may be received by the wireless device prior to the PUSCH transmission.

For the PUSCH power control adjustment state for a carrier f of a serving cell c in a PUSCH transmission period i, $f_{c,f}(i, 1)=f_{f,c}(i-1, 1)+\delta_{PUSCH,f,c}(i-K_{PUSCH}, 1)$ may be the PUSCH power control adjustment state for the carrier f of the serving cell c and the PUSCH transmission period i, for example, if accumulation is enabled based on the parameter Accumulation-enabled provided by higher layers. l∈{1, 2} for example, if the wireless device is configured with a higher layer parameter (e.g., num-pusch-pcadjustment-states); otherwise, for example, l=1. For a PUSCH (re) transmission corresponding to a grant-free configuration or semi-persistent grant, the value of l∈{1, 2} may be provided to the wireless device by a higher layer parameter (e.g., PUSCH-closed-loop-index). The wireless device may set $\delta_{PUSCH,f,c}(i-K_{PUSCH}, 1)=0$ dB, for example, if the wireless device may not detect a TPC command for the carrier f of the serving cell c. The respective $\delta_{PUSCH,f,c}$ accumulated values may be predefined, for example, if the PUSCH transmission is based on or in response to a PDCCH decoding with a DCI format (e.g., DCI format 0_0 or DCI format 0_1, or 2_2) having CRC parity bits scrambled by a particular RNTI (e.g., TPC-PUSCH-RNTI).

FIG. 21 shows an example of $\delta_{PUSCH,f,c}$ accumulated values and absolute values. A TPC Command Field (e.g., in DCI format 0_0, DCI format 0_1, or DCI format 2_2, or DCI format 2_3 having CRC parity bits scrambled by a particular RNTI (e.g., TPC-PUSCH-RNTI or TPC-SRS-RNTI)) may be mapped to absolute $\delta_{PUSCH,c}$ value and/or accumulated $\delta_{PUSCH,c}$ value. $f_{f,c}(0,1)$ may be the first value after a reset of accumulation. Positive TPC commands for carrier f of serving cell c may not be accumulated, for example, if the wireless device has reached $P_{CMAX,f,c}(i)$ for the carrier f of the serving cell c. Negative TPC commands for the carrier f of the serving cell c may not be accumulated, for example, if the wireless device has reached minimum power for carrier f of serving cell c. The wireless device may reset accumulation for the carrier f of the serving cell c, for example, if $P_{O\_UE\_PUSCH,f,c}$ value is changed by higher layers, and/or if $\alpha_{f,c}(j)$ value is changed by higher layers.

For the PUSCH power control adjustment state for a carrier f of a serving cell c in a PUSCH transmission period i, $f_{f,c}(i, 1)=\delta_{PUSCH,f,c}(i-K_{PUSCH}, 1)$ may be the PUSCH power control adjustment state for the carrier f of the serving cell c and the PUSCH transmission period i, for example, if the accumulation is not enabled based on a particular parameter (e.g., Accumulation-enabled) provided by higher layers. The respective $\delta_{PUSCH,c}$ absolute values may be predefined (e.g., in FIG. 21), for example, if the PUSCH transmission is based on or in response to a PDCCH decoding with a DCI format (e.g., DCI format 0_0 or DCI format 0_1, or 2_2) having CRC parity bits scrambled by a particular RNTI (e.g., TPC-PUSCH-RNTI). The wireless device may set $f_{f,c}(i, 1)=f_{f,c}(i-1, 1)$ for a PUSCH transmission period, for example, if the wireless device does not detect a DCI format (e.g., DCI format 0_0 or DCI format 0_1, or 2_2) having CRC parity bits scrambled by a particular RNTI (e.g., TPC-PUSCH-RNTI) for carrier f of serving cell c.

For the PUSCH power control adjustment state for a carrier f of a serving cell c in a PUSCH transmission period i, for both types of $f_{f,c}(*)$ (the accumulated or the current absolute values) the first value may be set as follows: The wireless device may set $f_{f,c}(0, 1)=0$, for example, if $P_{O\_UE\_PUSCH,f,c}(j)$ value is changed by higher layers and serving cell c is the primary cell and/or if $P_{O\_UE\_PUSCH,f,c}(j)$ value is received by higher layers and the serving cell c is a secondary cell; Else, the wireless device may set $f_{f,c}(0, 1)=\Delta P_{rampup,f,c}+\delta_{msg2,f,c}$, for example, if the wireless device receives the random access response message for the carrier f of the serving cell c $\delta_{msg2,f,c}$ may be the TPC command indicated in the random access response corresponding to the random access preamble transmitted for the carrier f in the serving cell c, and $$\Delta P_{rampup,f,c} = \min\left[\left\{\max\left(0, P_{CMAX,f,c} - \left(\begin{array}{c}10\log_{10}(2^\mu \cdot M_{RB,f,c}^{PUSCH}(0)) + \\ P_{O\_PUSCH,f,c}(0) + \alpha_{f,c}(0) \cdot PL_c + \\ \Delta_{TF,f,c}(0) + \delta_{msg2,f,c}\end{array}\right)\right)\right\}, \Delta P_{rampuprequested, c}\right].$$

$\Delta P_{rampuprequested,f,c}$ may be provided by higher layers and may correspond to the total power ramp-up requested by higher layers from the first to the last random access preamble for carrier f in the serving cell c. $M_{RB,f,c}^{PUSCH}(0)$ may be the bandwidth of the PUSCH resource assignment expressed in number of resource blocks for the first PUSCH transmission in carrier f of the serving cell c $\Delta_{TF,f,c}(0)$ may be the power adjustment of first PUSCH transmission in the carrier f of the serving cell c.

The wireless device may apply the procedures for MCG and SCG, for example, if the wireless device is configured with an SCG. The term 'serving cell' may refer to serving cell belonging to an MCG, for example, if the procedures are used for the MCG. The term 'serving cell' may refer to serving cell belonging to an SCG, for example, if the procedures are used for the SCG. The term 'primary cell' may refer to the PSCell of the SCG. The wireless device may use the procedures for a primary PUCCH group and a secondary PUCCH group, for example, if the wireless device is configured with a PUCCH-SCell. The term 'serving cell' may refer to a serving cell belonging to the primary PUCCH group, for example, if the procedures are used for the primary PUCCH group. The term 'serving cell' may refer to a serving cell belonging to the secondary PUCCH group, for example, if the procedures are used for the secondary PUCCH group. The term 'primary cell' may refer to the PUCCH-SCell of the secondary PUCCH group.

A wireless device may determine a PUCCH transmission power $P_{PUCCH,f,c}(i, q_u, q_d, l)$ in a PUCCH transmission period i as $$P_{PUSCH,f,c}(i, q_u, q_d, l) = \min \begin{cases} P_{CMAX,f,c}(i), \\ P_{O\_PUSCH,f,c}(q_u) + PL_{f,c}(q_d) + \Delta_{F\_PUCCH}(F) + \Delta_{TF,f,c}(i) + g_{f,c}(i, l) \end{cases}$$

[dBm], for example, if the wireless device transmits the PUCCH on a carrier f in the primary cell c using PUCCH power control adjustment state with index l.

$P_{CMAX,f,c}(i)$ may be the configured wireless device transmit power for a carrier f of a serving cell c in a PUCCH transmission period i.

$P_{O\_PUCCH,f,c}(q_u)$ may be a parameter comprising the sum of a component $P_{O\_NONBNAL\_PUCCH}$, provided by a higher layer parameter (e.g., P0-nominal-PUCCH) for a carrier f of a primary cell c, and a component $P_{O\_UE\_PUCCH}(q_u)$ provided by a higher layer parameter (e.g., P0-PUCCH), where $0 \le q_u < Q_u$. $Q_u$ may be a size for a set of $P_{O\_UE\_PUCCH}$ values provided by a higher layer parameter (e.g., num-p0-pucch). The set of $P_{O\_UE\_PUCCH}$ values may be provided by a higher layer parameter (e.g., p0-pucch-set).

$PL_{f,c}(q_j)$ may be a downlink path-loss estimate (e.g., in dB) calculated by the wireless device for a carrier f of the primary cell c using RS resource $q_d$, where $0 \le q_d < Q_d$. $Q_d$ may be a size for a set of RS resources provided by a higher layer parameter (e.g., num-pucch-pathlossReference-rs). The set of RS resources may be provided by a higher layer parameter (e.g., pucch-pathlossReference-rs). The set of RS resources may comprise one or both of a set of SS/PBCH block indexes provided by a higher layer parameter (e.g., pucch-pathlossReference-SSB) and a set of CSI-RS configuration indexes provided by a higher layer parameter (e.g., pucch-pathlossReference-CSIRS). The wireless device may identify an RS resource in the set of RS resources that corresponds to an SS/PBCH block or to a CSI-RS configuration as provided by a higher layer parameter (e.g., pucch-pathlossreference-index).

The parameter $\Delta_{F\_PUCCH}(F)$ may be provided by a higher layer parameter (e.g., deltaF-pucch-f0) for a first PUCCH format (e.g., PUCCH format 0), deltaF-pucch-f1 for a second PUCCH format (e.g., PUCCH format 1), deltaF-pucch-f2 for a third PUCCH format (e.g., PUCCH format 2), deltaF-pucch-f3 for a fourth PUCCH format (e.g., PUCCH format 3), and deltaF-pucch-f4 for a fifth PUCCH format (e.g., PUCCH format 4). $\Delta_{TF,f,c}(i)$ may be a PUCCH transmission power adjustment component for a carrier f of a primary cell c.

For the PUCCH power control adjustment state for a carrier f of a primary cell c and a PUCCH transmission period i, $\delta_{PUCCH,f,c}(i-K_{PUCCH}, l)$ may be a correction value, which may be a TPC command, and may be in a PDCCH with a DCI format (e.g., DCI format 1_0 or DCI format 1_1) for the carrier f of the primary cell c that the wireless device may detect in PUCCH transmission period $i-K_{PUCCH}$, or jointly coded with one or more TPC commands in a PDCCH with a DCI format (e.g., DCI format 2_2) having CRC parity bits scrambled by a particular RNTI (e.g., TPC-PUCCH-RNTI) and $l \in \{1, 2\}$ as indicated by a higher layer parameter (e.g., num-pucch-pcadjustment-states). The $\delta_{PUCCH,f,c}$ (e.g., in dB) values signaled on a PDCCH with a DCI format (e.g., DCI format 1_0 or DCI format 1_1 or DCI format 2_2) having CRC parity bits scrambled by a particular RNTI (e.g., TPC-PUCCH-RNTI) may be predefined.

FIG. 22 shows an example of $\delta_{PUCCH,f,c}$ dB values. A TPC Command Field in a DCI format (e.g., DCI format 1_0 or DCI format 1_1 or DCI format 2_2) having CRC parity bits scrambled by a particular RNTI (e.g., TPC-PUCCH-RNTI) may be mapped to the accumulated $\delta_{PUCCH,c}$ values. The wireless device may set $\delta_{PUCCH,f,c}(i-K_{PUCCH}, l) = 0$ dB, for example, if the wireless device does not detect a TPC command for a carrier f of the primary cell c.

$g_{f,c}(i, l) = g_{f,c}(i-1, l) + \delta_{PUCCH,f,c}(i-K_{PUCCH}, l)$ may be the current PUCCH power control adjustment state and $g_{f,c}(0, l) = 0$ may be the first value after a reset, for example, for the PUCCH power control adjustment state for a carrier f of a primary cell c and a PUCCH transmission period i. The wireless device may set $g_{f,c}(0, l) = 0$, for example, if $P_{O\_CE\_PCCCH,f,c}$ value is changed by higher layers; Else, for example, the wireless device may set $g_{f,c}(0, l) = \Delta P_{rampup,f,c} + \delta_{msg2,f,c}$ $\delta_{msg2,f,c}$ may be the TPC command indicated in the random access response corresponding to the random access preamble transmitted for the carrier f in the serving cell c. The wireless device may set $\Delta P_{rampup,f,c} = \min[\{\max (0, P_{CMAX,f,c} - (P_{O\_PUCCH,f,c} + PL_c + \Delta_{F\_PUCCH}(F) + \Delta_{TF,f,c} + \delta_{msg2,f,c}))\}, \Delta P_{rampuprequested,f,c}]$, for example, if the wireless device transmits PUCCH; otherwise, for example, the wireless device may set $\Delta P_{rampup,f,c} = \min[\{\max(0, P_{CMAX,f,c} - (P_{O\_PUCCH,f,c} + PL_c))\}, \Delta P_{rampuprequested,f,c}]$. $\Delta P_{rampuprequested,f,c}$ may be provided by higher layers and may correspond to the total power ramp-up requested by higher layers from the first to the last preamble for the carrier f in primary cell c, and $\Delta_{F\_PUCCH}(F)$ may correspond to a first PUCCH format (e.g., PUCCH format 0) or a second PUCCH format (e.g., PUCCH format 1). The $\delta_{PUSCH,c}$ accumulated values may be predefined (e.g., in FIG. 21), for example, if the PUSCH transmission is based on or in response to a PDCCH detection with a DCI format (e.g., DCI format 1_0 or DCI format 1_1). The wireless device may not accumulate positive TPC commands for the carrier f in the primary cell c, for example, if the wireless device has reached $P_{CMAX,c}(i)$ for the carrier f in the primary cell c. The wireless device may not accumulate negative TPC commands for the carrier f in the primary cell c, for example, if the wireless device has reached minimum power for the carrier f in the primary cell c. The wireless device may reset accumulation for the carrier f in the primary cell c, for example, if $P_{O\_UE\_PUCCH,f,c}$ value is changed by higher layers.

For a transmit power control of an SRS, the linear value $\hat{P}_{SRS,f,c}(i, q, l)$ of the transmit power $P_{SRS,f,c}(i, q, l)$ may be split equally across the configured antenna ports for SRS. A wireless device may determine the SRS transmission power $P_{SRS,f,c}(i, q, l)$ in SRS transmission period i as $$P_{SRS,f,c}(i, q_s, l) = \min\begin{cases} P_{CMAX,f,c}(i), \\ P_{O\_SRS,f,c}(q_s) + 10\log_{10}(2^\mu \cdot M_{SRS,f,c}(i)) + \alpha_{SRS,f,c}(q_s) \cdot PL_{f,c}(q_s) + h_{f,c}(i, l) \end{cases} [dBm],$$

for example, if the wireless device transmits the SRS on a carrier f of a serving cell c using SRS power control adjustment state with index l.

$P_{CMAX,f,c}(i)$ may be the configured wireless device transmit power for a carrier f of a serving cell c in an SRS transmission period i. $P_{O\_SRS,f,c}(q)$ may be provided by a higher layer parameter (e.g., p0-srs) for an SRS resource set q, $M_{SRS,f,c}(i)$ may be the SRS bandwidth expressed in number of resource blocks for the SRS transmission period i on the carrier f of the serving cell c and μ may be predefined and/or semi-statically configured. $\alpha_{SRS,f,c}(q_s)$ may be provided by a higher layer parameter (e.g., alpha-srs) for the SRS resource set $q_s$.

$PL_{f,c}(q_s)$ may be a downlink path-loss estimate (e.g., in dB) calculated by the wireless device for a carrier f of a serving cell c and an SRS resource set q, using an RS resource provided by a higher layer parameter (e.g., srs-pathlossReference-rs). The RS resource may be selected from a set of RS resources that may comprise a set of SS/PBCH block indexes provided by a higher layer parameter (e.g., srs-pathlossReference-SSB) and a set of CSI-RS configuration indexes provided by a higher layer parameter (e.g., srs-pathlossReference-CSIRS).

For the SRS power control adjustment state for a carrier f of a serving cell c and an SRS transmission period i, the wireless device may set $h_{f,c}(i, l) = f_{f,c}(i, l)$, for example, if a higher layer parameter (e.g., srs-pcadjustment-state-config) indicate a same power control adjustment state for SRS transmissions and PUSCH transmissions.

For the SRS power control adjustment state for a carrier f of a serving cell c and an SRS transmission period i, the wireless device may set $h_{f,c}(i) = h_{f,c}(i-1) + \delta_{SRS,f,c}(i-K_{SRS})$, for example, if a higher layer parameter (e.g., srs-pcadjustment-state-config) indicates a separate power control adjustment state between SRS transmissions and PUSCH transmissions and/or if the accumulation is enabled based on a particular parameter (e.g., Accumulation-enabled-srs) provided by higher layers. $\delta_{SRS,f,c}(i-K_{SRS})$ may be jointly coded with other TPC commands in a PDCCH with a DCI format (e.g., DCI format 2_3) having CRC parity bits scrambled by a particular RNTI (e.g., TPC-SRS-RNTI) that may be received by the wireless device prior to the SRS transmission and accumulative values of $\delta_{SRS,f,c}(i-K_{SRS})$ may be predefined (e.g., in FIG. 21). The wireless device may set $\delta_{SRS,f,c}(i-K_{SRS}) = 0$ (e.g., in dB), for example, if the wireless device does not detect a TPC command for serving cell c. $h_{f,c}(0)$ may be the first value after a reset of the accumulation. Positive TPC commands for the serving cell c may not be accumulated, for example, if the wireless device has reached $P_{CMAX,f,c}(i)$ for the carrier f of the serving cell c. Negative TPC commands may not be accumulated, for example, if the wireless device has reached minimum power for the carrier f of the serving cell c. A wireless device may reset accumulation for the carrier f of the serving cell c, for example, if $P_{O\_SRS,f,c}$ value is changed by higher layers and/or if $\alpha_{SRS,f,c}$ value is changed by higher layers.

For the SRS power control adjustment state for a carrier f of a serving cell c and an SRS transmission period i, the wireless device may set $h_{f,c}(i) = \delta_{SRS,f,c}(i-K_{SRS})$, for example, if a higher layer parameter (e.g., srs-pcadjustment-state-config) indicates a separate power control adjustment state between SRS transmissions and PUSCH transmissions and/or if the accumulation is not enabled based on a parameter (e.g., Accumulation-enabled-srs) provided by higher layers, jointly coded with other TPC commands in a PDCCH with a DCI format (e.g., DCI format 2_3) having CRC parity bits scrambled by a particular RNTI (e.g., TPC-SRS-RNTI) that may be received by the wireless device prior to the SRS transmission and absolute values of $\delta_{SRS,f,c}(i-K_{SRS})$ may be predefined (e.g., in FIG. 21). The $\delta_{PUSCH,c}$ absolute values may be predefined (e.g., in FIG. 21), for example, if a DCI format (e.g., DCI format 2_3) has CRC scrambled by a particular RNTI (e.g., TPC-SRS-RNTI). The wireless device may set $h_{f,c}(i) = h_{f,c}(i-1)$ for an SRS transmission period i, for example, if the wireless device does not detect a DCI (e.g., DCI format 2_3) having CRC scrambled by a particular RNTI (e.g., TPC-SRS-RNTI) for carrier f of serving cell c.

A base station (e.g., a gNB) may send, to a wireless device (e.g., a UE), a DCI indicating that the wireless device activates SP CSI reporting or a DCI indicating that the wireless device deactivates SP CSI reporting. At least one set of one or more SP CSI report settings for PUSCH or PUCCH may be RRC configured. For example, the base station may send an RRC message that comprises configuration information of the SP CSI report settings for PUSCH and/or configuration information of the SP CSI report settings for PUCCH. A DCI scrambled with a particular RNTI (e.g., SP CSI C-RNTI) and/or transmitted via one or more control channels (e.g., PDCCH) may indicate an activation or deactivation (suspending or releasing) of at least one of the one or more SP CSI reports. For example, a wireless device may receive a PDCCH from a base station and extract, from the received PDCCH, one or more DCIs. The wireless device may determine whether at least one of the one or more DCIs is scrambled with SP CSI C-RNTI. The wireless device may check one or more values of one or more fields of the at least one DCI scrambled with the SP CSI C-RNTI to determine the activation or deactivation (suspending or releasing).

Figure 23:
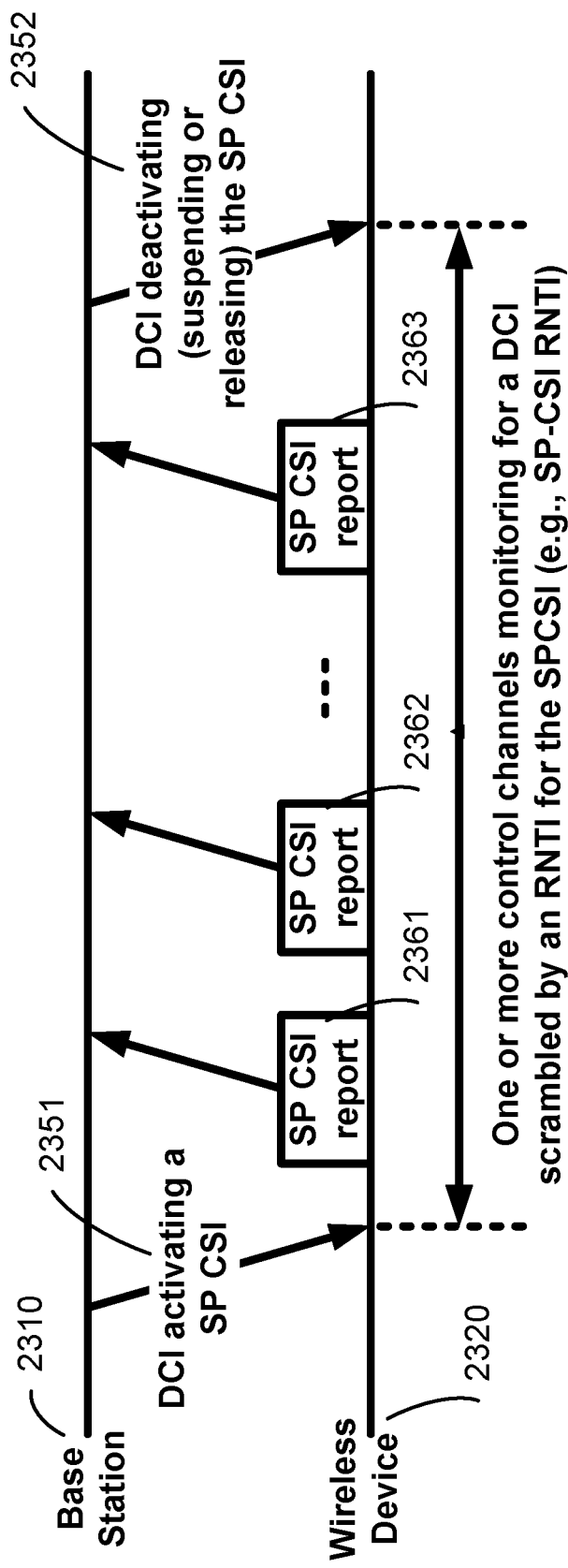
FIG. 23 shows an example of using a DCI for activating and deactivating SP CSI.

FIG. 23 shows an example of using a DCI for activating and deactivating (suspending or releasing) SP CSI reporting. A base station 2310 (e.g., a gNB) may semi-statically configure at least one SP CSI report setting. The DCI 2351 activating or the DCI 2352 deactivating the SP CSI reporting (e.g., SP CSI reports 2361, 2362, 2363) may comprise at least one field indicating the SP CSI reporting.

At least one first DCI (e.g., DCIs 2351, 2352) explicitly indicating an activation or deactivation (suspension or releasing) of SP CSI may be configured (e.g., in an NR system). For example, the base station 2310 may transmit the at least one first DCI via a PDCCH addressed by a first RNTI (e.g., SP CSI RNTI). The at least one first DCI may comprise at least one of the following fields: at least one first field indicating at least one CSI request field; at least one second field indicating at least one SP CSI report that may be RRC configured; and/or at least one third field indicating an activation or deactivation (e.g., suspending or releasing) of the at least one SP CSI report, for example, a first value of the at least one third field may indicate the activation, and a second value of the at least one third field may indicate the deactivation. Based on or in response to receiving the at least one first DCI, a wireless device 2320 (e.g., a UE) may activate or deactivate the at least one SP CSI report.

A wireless device (or a base station) may transmit data (e.g., CSI report) via a recurred resource for a long time, for example, if the SP CSI is erroneously activated (deactivated, suspended, or released). The data transmission via a recurred resource for a long time may cause or generate an undesirable interference. A process for validating the activation and/or deactivation of SP CSI (e.g., SP CSI reporting) for the wireless device 2320 and/or the base station 2310 may be configured (e.g., in an NR system). For example, the wireless device 2320 may validate an SP CSI assignment downlink control channel (e.g., PDCCH, ePDCCH, mPDCCH, etc), on a DCI, for example, if at least one of the following conditions are met: the CRC parity bits obtained for the PDCCH payload are scrambled with a particular RNTI (e.g., SP CSI RNTI) assigned for SP CSI; and/or one or more fields (e.g., a new data indicator (NDI) field) for a DCI format are set to predefined value (e.g., NDI='0').

The wireless device 2320 may receive the DCI 2351 (or DCI 2352) from the base station 2310. The wireless device 2320 may achieve a validation of activation and/or deactivation of SP-CSI by determining that CRC parity bits of the DCI 2351 (or DCI 2352) are scrambled with a particular RNTI (e.g., SP-CSI_RNTI) and by checking if one or more fields for the DCI format of the received DCI are set to the one or more predefined values. The one or more fields may be at least one of the following: a TPC command for PUSCH or PUCCH, a cyclic shift demodulation reference signal (DM RS), a modulation and coding scheme and redundancy version, an HARQ process number, a modulation and coding scheme, a redundancy version, a resource block assignment, a repetition number, or any combination thereof, etc. The one or more predefined values may be one or more values of one or more DCI fields defined (e.g., in NR specifications).

FIG. 24A and FIG. 24B show examples of the one or more fields set to the one or more predefined values for the validation of the activation and/or deactivation (suspending, or releasing) of SP CSI. A first field (e.g., a TPC command for scheduled PUSCH field in FIG. 24A) may be used for the validation of the activation and deactivation (suspending, or releasing). One or more fields of DCI formats shown in FIG. 24A may be example fields for a validation of activation. One or more fields of DCI formats shown in FIG. 24B may be example fields for a validation of deactivation, suspending, or releasing. One or more fields of DCI formats shown in FIG. 24B may be example fields for a validation of activation while one or more fields of DCI formats shown in FIG. 24A may be example fields for a validation of deactivation, suspending, or releasing. One or more fields of the same DCI format may indicate both the validation of activation and the validation of deactivation (suspending or releasing). For example, a first value of the one or more fields of the same DCI format may indicate the validation of activation, and a second value of the one or more fields of the same DCI format may indicate the validation of deactivation.

FIG. 25A and FIG. 25B show examples of the one or more fields set to the one or more predefined values for the validation of the activation and/or deactivation (suspending, or releasing) of SP CSI. At least one first field used for the validation of activation (e.g., the repetition number in FIG. 25B) may not be used for the validation of deactivation. For example, FIG. 25A may be example fields for a validation of deactivation, suspending, or releasing, and FIG. 25B may be example fields for a validation of activation. As shown in FIG. 25B, for example, the "repetition number" field of the $8^{th}$ DCI format and/or $9^{th}$ DCI format may be used as a field for a validation of activation of SP CSI but may not be used as a field for a validation of deactivation of SP CSI.

At least one first field used for the validation of deactivation (suspending or releasing) may not be used for the validation of activation. For example, FIG. 25B may be example fields for a validation of deactivation, suspending, or releasing, and FIG. 25A may be example fields for a validation of activation. The "repetition number" field of the $8^{th}$ DCI format and/or $9^{th}$ DCI format may be used as a field for a validation of deactivation (suspending or releasing) of SP CSI but may not be used as a field for a validation of activation of SP CSI.

The wireless device may determine the received DCI information as a valid SP CSI activation or deactivation (suspending, or releasing), for example, if a validation is successfully performed. The wireless device may activate or deactivate (release, or suspend) SP CSI, for example, based on one or more predefined values of the one or more fields of the received DCI. The wireless device may assume and/or categorize the received DCI as a DCI received with a non-matching CRC, for example, if the validation is not successful.

A wireless device may transmit at least one SP CSI report via a PUSCH or PUCCH, for example, based on or in response to receiving a DCI activating SP CSI. The transmission of the at least one SP CSI report may be based on the SP CSI report setting associated with the at least one SP CSI report. Although the SP CSI report may be transmitted via a data channel (e.g., PUSCH), the transmission of the SP CSI report on the data channel may be different from a transmission of general data (e.g., UL-SCH data) on the data channel. A transmission of control data (e.g., SP CSI report) may be different from a transmission of UL-SCH data, for example, in terms of at least one of the following: the number of bits to be transmitted, the bandwidth of the resource assignment, or one or more open loop power control parameters (e.g., $P_{O\_PUSCH,f,c}(i)$, $P_{O\_PUSCH,c}(j)$, $P_{O\_PUCCH,f,c}(q_u)$, $P_{O\_PUCCH}$, $\alpha_c(j)$, or $\alpha_{f,c}(j)$). The wireless device may adjust or change one or more power control parameters for a transmission of the SP CSI report via a PUSCH or PUCCH. For example, at least one of the one or more power control parameters may not be configured for a data (e.g., UL-SCH and/or multiplexed data of UL-SCH data and control data) transmission but may be configured for an SP CSI transmission.

A correction value (e.g., a TPC command, $\delta_{PUSCH,f,c}(i-K_{PUSCH}, 1)$ or $\delta_{PUSCH,c}(i-K_{PUSCH})$, etc.) may be an adjustment of uplink transmit power value subject to a previous transmission. A base station may transmit a request that may cause the wireless device to increase or decrease an uplink transmit power for an upcoming transmission. For example, the base station may transmit the request by adding the correction value in a DCI and by transmitting the DCI comprising the correction value. The correction value may indicate an incremental power from the current power value. A wireless device may be configured to select, for a transmission of the SP CSI report, one or more values of the one or more power control parameters. The selection of the one or more values for the SP CSI report may change the uplink channel condition. For example, the change of $P_{O\_PUSCH,f,c}(j)$ or $\alpha_{f,c}(j)$ may result in the change of transmit power (e.g., to be higher or lower than the transmit power of the previous transmission).

The wireless device may set the correction value to accommodate the change of uplink channel condition, for example, based on or in response to receiving a DCI indicating an activation or deactivation of SP CSI. For example, the wireless device may set the correction value to a value that may be independently determined regardless of one or more values of the previous transmission.

The wireless device may receive an indication of an SP CSI activation via a first DCI and may receive an indication of an SP CSI deactivation via a second DCI. The first DCI (or second DCI) may comprise a field indicating a TPC command and other fields indicating HARQ process number, redundancy version, modulation and coding scheme, resource block assignment, etc. For the activation (or deactivation) of SP CSI, the one or more fields (e.g., for the TPC command, the HARQ process number, the redundancy version, etc., and/or any combinations thereof) in the first DCI (or the second DCI) may be used for a validation of SP CSI activation (or deactivation). For example, the TPC command, the HARQ process number, the redundancy version, etc. shown in FIG. 24A and FIG. 24B may be used for the validation. The wireless device may set the correction value to a first value, for example, based on or in response to receiving the first DCI indicating an activation of SP CSI. The first value may be independently determined regardless of the value indicated by the TPC command in the first DCI. For example, the first value may be predefined or semi-statically configured. The first value may be, for example, zero or any other value. The wireless device may set the correction value to a second value, for example, based on the received second DCI indicating a deactivation of SP CSI (e.g., SP CSI reporting). The second value may be independently determined regardless of the value indicated by the TPC command in the second DCI. For example, the second value may be predefined or semi-statically configured. The second value may be, for example, zero or any other value. The second value may be equal to, or different from, the first value.

Figure 26:
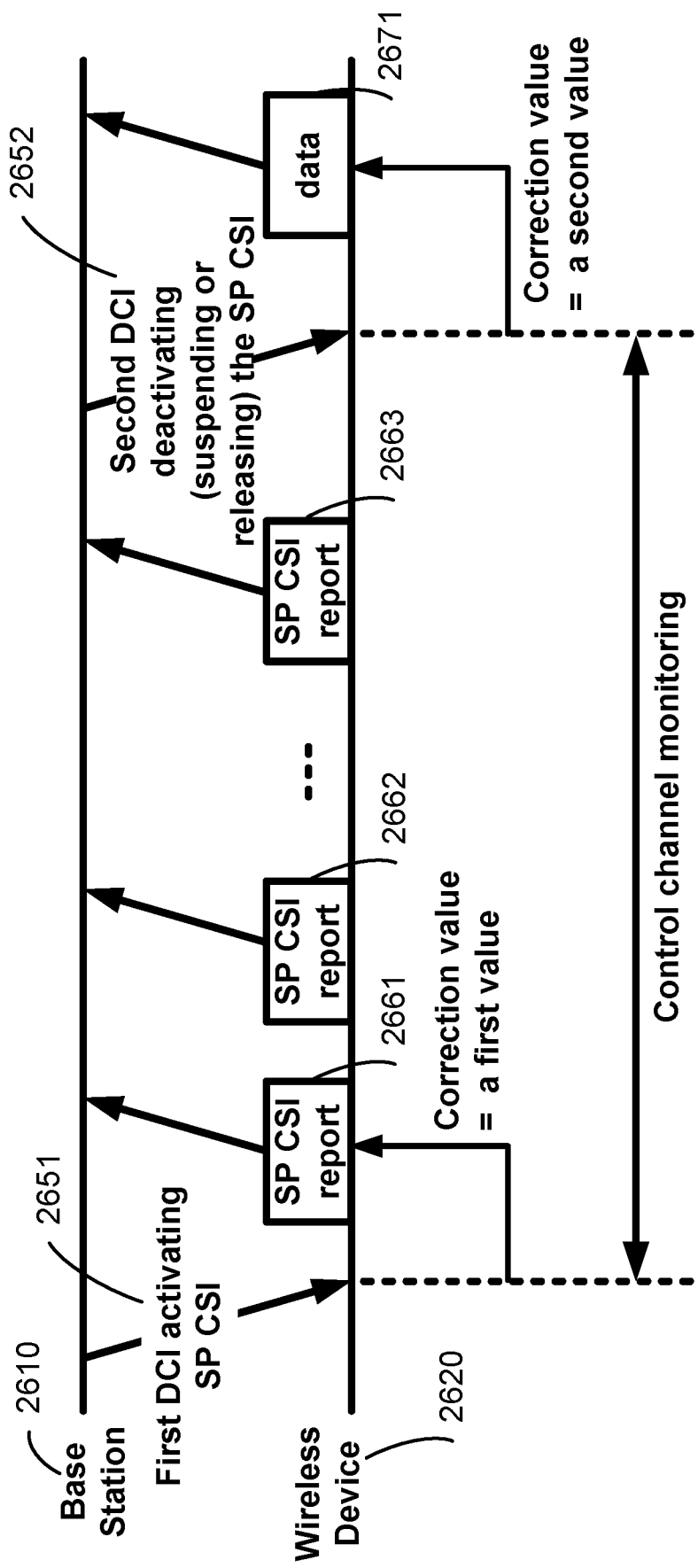
FIG. 26 shows an example of adjusting a correction value after receiving a DCI associated with SP CSI.

FIG. 26 shows an example of adjusting (e.g., changing, setting, initializing, etc.) a correction value after receiving a DCI associated with SP CSI. For example, a wireless device 2620 (e.g., a UE) may set a correction value to a first value for an initial SP CSI report 2661, for example, after or in response to receiving a first DCI 2651 indicating an activation of SP CSI. The first DCI 2651 may indicate at least one setting for SP CSI report(s) (e.g., SP CSI reports 2661, 2662, 2663, etc.). The wireless device 2620 may set the correction value to a second value for a data transmission 2671 other than the SP CSI report, for example, after or in response to receiving a second DCI 2652 indicating a deactivation of SP CSI (e.g., SP CSI reporting). The first and second values may be set to such values that may prevent the wireless device 2620 from underestimate or overestimate the required uplink transmit power, for example, if the uplink channel condition is changed (e.g., after receiving the first DCI 2651 or the second DCI 2652).

The wireless device 2620 may receive, from a base station 2610 (e.g., a gNB), at least one message comprising at least one of: one or more power control parameters for a transmission of at least one SP CSI report; at least one second parameter indicating at least one SP CSI resource setting of the at least one SP CSI report; at least one third parameter indicating at least one SP CSI report setting of the at least one SP CSI report; and/or at least one fourth parameter indicating at least one SP CSI measurement setting of the at least one SP CSI report. The wireless device 2620 may receive the first DCI 2651 indicating an activation of at least one SP CSI report (e.g., activation of SP CSI reporting). The wireless device 2620 may determine a first transmission power for a starting (or initial) transmission (e.g., the transmission of the SP CSI report 2661) of the at least one SP CSI report, for example, after or in response to the first DCI 2651 indicating the activation, at least based on: the one or more power control parameters and/or at least one correction value being set to a predefined value (e.g., zero). The wireless device 2620 may transmit the at least one SP CSI report via a PUSCH using the first transmission power.

The first DCI 2651 may comprise a first TPC command indicating a first value. The first value of the first TPC command may be independently determined regardless of the at least one correction value. The PUSCH may be indicated by the at least one SP CSI resource setting, the at least one SP CSI report setting, and/or the at least one SP CSI measurement setting. The wireless device 2620 may receive the second DCI 2652 indicating a deactivation of at least one SP CSI report (e.g., deactivation of SP CSI reporting). The wireless device 2620 may determine the at least one correction value being set to a predefined value (e.g., zero) for the data 2671 (e.g., UL-SCH data) on PUSCH, for example, after or in response to receiving the second DCI 2652.

One or more MAC CEs may indicate an activation or deactivation of SP CSI. At least one set of one or more SP CSI report settings for PUCCH (or PUSCH) may be RRC configured. For example, at least one of the one or more SP CSI report settings for PUCCH (or PUSCH) may be configured in RRC with one or more PUCCH resources (or PUSCH resources) that may be used for transmitting one or more SP CSI reports. A transmission of the one or more SP CSI reports via the one or more PUCCH resources (or PUSCH resources) may be activated by a MAC CE.

The MAC CE may comprise at least one logical channel ID (LCID) indicating whether the MAC CE is for an activation and/or deactivation of SP CSI. For example, the MAC CE may comprise an LCID assigned to indicate an activation and deactivation with at least one field indicating whether the MAC CE is for an activation or deactivation. For example, two LCIDs (e.g., first and second LCIDs) may be respectively assigned to an activation (e.g., indicated by the first LCID) and deactivation (e.g., indicated by the second LCID). The MAC CE may comprise one or more fields indicating at least one of the following: at least one SP CSI report setting, at least one SP CSI resource setting, or at least one SP CSI measurement setting. The MAC CE may be used to activate or deactivate (release or suspend) the one or more PUCCH resources (or PUSCH resources) scheduled (configured, or granted) for a transmission of the at least one SP CSI report.

A wireless device may, based on at least one SP CSI setting, start measuring SP CSI and transmitting the SP CSI report, for example, after or in response to receiving a first MAC CE indicating an activation of at least one SP CSI report. The at least one SP CSI setting may be associated with the at least one SP CSI report and may comprise at least one of the following: at least one SP CSI report setting, at least one SP CSI resource setting, and/or at least one SP CSI measurement setting. The wireless device may receive a second MAC CE indicating a deactivation of at least one SP CSI report (e.g., deactivation of SP CSI reporting). The wireless device may deactivate a transmission of the at least one SP CSI report, for example, after or in response to receiving the second MAC CE. The wireless device may release (or suspend) one or more downlink assignments of SP CSI and/or one or more PUCCH resources (or PUSCH resources) scheduled (configured, or granted) for the transmission of the at least one SP CSI report, for example, after or in response to receiving the second MAC CE.

The at least one SP CSI setting may be indicated by the first and/or the second MAC CE. For example, the first and/or second MAC CE may comprise at least one selection command indicating at least one CSI reporting setting indication. The first and/or the second MAC CE may comprise one or more indices indicating the at least one SP CSI setting. The one or more indices may comprise at least one of the following: a first index indicating one of at least one SP CSI report setting, a second index indicating one of at least one SP CSI resource setting, or a third index indicating one of at least one SP CSI measurement setting. The at least one SP CSI setting may be semi-statically configured by RRC.

Figure 27:
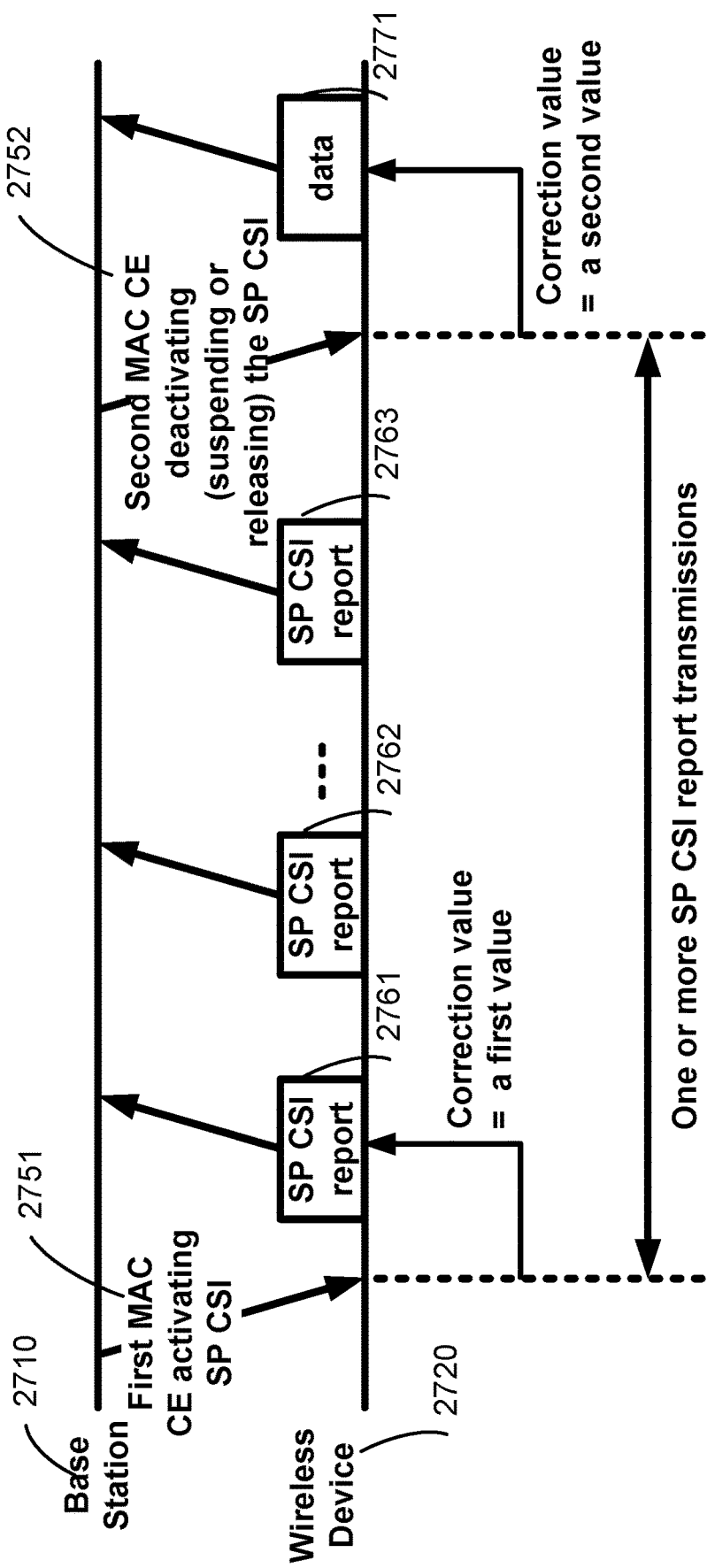
FIG. 27 shows an example of adjusting a correction value after receiving a media access control control element (MAC CE) associated with SP CSI.

FIG. 27 shows an example of adjusting a correction value after or in response to receiving a first MAC CE 2751 activating SP CSI and/or receiving a second MAC CE 2752 deactivating the SP CSI. A base station 2710 (e.g., a gNB) may transmit, to a wireless device 2720 (e.g., a UE), the first MAC CE 2751 activating SP CSI. The base station 2710 may transmit one or more SP CSI-RS (not shown) to the wireless device 2720, for example, after transmitting the first MAC CE 2751. The wireless device 2720 may, based on one or more resource configuration parameters associated with the at least one SP CSI setting, start measuring SP CSI associated with the at least one SP CSI setting and may transmit at least one report 2761, 2762, 2763 of the measured SP CSI, for example, after or in response to receiving the first MAC CE 2751 indicating an activation of at least one SP CSI setting. The measurement of the SP CSI may comprise receiving one or more SP CSI-RS and measuring, based on the one or more SP CSI-RS, the SP CSI. The wireless device 2720 may need to determine a correction value (and/or a TPC command) of an uplink transmit power of the at least one SP CSI report 2761, 2762, 2763 to be transmitted via PUCCH (or PUSCH). The correction value may be transmitted via a DCI (e.g., L1 physical layer) scrambled by a particular RNTI (e.g., SP CSI RNTI) assigned for SP CSI. There may be no TPC command that the wireless device 2720 may use to determine an uplink transmit power for a transmission of the at least one SP CSI report 2761, 2762, 2763 (e.g., an initial transmission 2761 of the at least one SP CSI report after activating the SP CSI), for example, if the wireless device 2720 activates the at least one SP CSI setting. The wireless device 2720 may set the correction value to a first value (e.g., zero) for the transmission of the at least one SP CSI report 2761, 2762, 2763, for example, after or in response to determining that no TPC command has been detected for the transmission. There may be a TPC command that the wireless device 2720 may use to determine an uplink transmit power for a transmission of the at least one SP CSI report 2761, 2762, 2763 (e.g., an initial transmission 2761 of the at least one SP CSI report after activating the SP CSI), for example, if the wireless device 2720 activates the at least one SP CSI setting. For example, the wireless device 2720 may receive, at slot (mini-slot, subframe, or TTI) i-$K_{PUCCH}$, a first DCI (e.g., a DCI comprising an uplink grant and/or a DCI comprising a group TPC command(s), e.g., DCI format 2_2) comprising a field indicating a first TPC command for a transmission at slot (mini-slot, subframe, or TTI) i. The i-$K_{PUCCH}$ may be semi-statically configured by an RRC message, dynamically indicated by a DCI, and/or predefined. The transmission at slot (e.g., mini-slot, subframe, or TTI) i may be scheduled (granted, or configured) for the at least one SP CSI setting. The physical layer may not have information about when the transmission of the at least one SP CSI report over PUCCH (or PUSCH) will be activated by the MAC layer, for example, if the transmission is activated by a MAC CE. The first TPC command transmitted via the first DCI may not be for the transmission of the at least one SP CSI report 2761, 2762, 2763. The wireless device 2720 may ignore the first TPC command received via the first DCI for the transmissions of the at least one SP CSI report 2761, 2762, 2763 (e.g., an initial transmission 2761 of the at least one SP CSI report), for example, after or in response to receiving the MAC CE 2751 indicating an activation of a transmission of the at least one SP CSI report 2761, 2762, 2763 (e.g., activation of SP CSI reporting). The wireless device 2720 may set the correction value to a first value (e.g., zero) that may be predefined and/or semi-statically configured. The wireless device 2720 may set, based on an indication of activating the at least one SP CSI setting, the correction value to the first value (e.g., zero) for an initial transmission (or a first transmission occasion) 2761 of the at least one SP CSI report, for example, after or in response to receiving the first MAC CE 2751.

The correction value may be set to a first value (e.g., zero) after or in response to receiving the first MAC CE 2751. The first value may be independently determined regardless of a value of a TPC command in a received DCI and may be independently determined regardless of the presence or absence of the TPC command. Based on the first value, the wireless device 2720 may determine a transmit power of an initial SP CSI report 2761 that is to be transmitted, to the base station 2710, after receiving the first MAC CE 2751. A transmit power of one or more subsequent SP CSI reports 2762, 2763 may be determined based on the transmit power of the SP CSI report 2761 and/or based on a value of a transmit power parameter of a received DCI.

FIG. 27 also shows an example of adjusting a correction value after or in response to receiving the second MAC CE 2752 deactivating the at least one SP CSI (e.g., deactivating SP CSI reporting). The wireless device 2720 may, based on one or more resource configuration parameters associated with the at least one SP CSI setting, stop measuring SP CSI associated with the at least one SP CSI setting and stop transmitting at least one report of the measured SP CSI, for example, after or in response to receiving the second MAC CE 2752 indicating a deactivation of at least one SP CSI setting. The wireless device 2720 may determine a correction value (or a TPC command) of an uplink transmit power for a PUCCH (e.g., for (control) data transmission via PUCCH), for example, if the at least one SP CSI setting has been deactivated. The correction value may be transmitted via a DCI (e.g., L1 physical layer) scrambled by a particular RNTI (e.g., C RNTI). There may be no TPC command for determining an uplink transmit power of a first transmission 2771 (e.g., an initial transmission or a first transmission occasion) via PUCCH (or PUSCH) after the at least one SP CSI setting is deactivated, for example, if the wireless device 2720 deactivates the at least one SP CSI setting. The wireless device 2720 may set the correction value to a second value (e.g., zero) for the first transmission 2771, for example, after or in response to determining that no TPC command has been detected for the first transmission 2771. There may be a TPC command that the wireless device 2720 may use to determine an uplink transmit power for the first transmission 2771 (e.g., an initial transmission of the at least one report), for example, if the wireless device deactivates the at least one SP CSI setting. For example, the wireless device 2720 may receive, at slot (e.g., mini-slot, subframe, or TTI) i-$K_{PUCCH}$, a first DCI (e.g., a DCI comprising an uplink grant and/or a DCI comprising one or more TPC commands, e.g., format 2_2) comprising a field indicating a first TPC command for a transmission at slot (mini-slot, subframe, or TTI) i. The transmission at slot (e.g., mini-slot, subframe, or TTI) i may be scheduled (granted, or configured) for the at least one SP CSI setting. The first DCI may be scrambled by a first RNTI (e.g., SP CSI RNTI) for the at least one SP CSI setting, and/or the first DCI may be scrambled by a second RNTI (e.g., C RNTI).

The physical layer of the wireless device 2720 may not have information about when the transmission of the at least one report over PUCCH will be deactivated by the MAC layer, for example, if the transmission of the SP CSI report is deactivated by a MAC CE (e.g., the second MAC CE 2752). A first TPC command in a second DCI (e.g., comprising an uplink grant and a TPC command and/or DCI format 2_2 scrambled with a particular RNTI (TPC-PUCCH-RNTI)) that is detected by the wireless device 2720 may not be used for the first transmission 2771. The wireless device 2720 may ignore the first TPC command received via the second DCI for transmitting the first transmission 2771, for example, after or in response to receiving the second MAC CE 2752 indicating a deactivation of a transmission of at least one SP CSI report (e.g., deactivation of SP CSI reporting). The wireless device 2720 may set the correction value to a second value (e.g., zero) that may be predefined and/or semi-statically configured, for example, instead of using the value of the first TPC command of the second DCI. For example, the wireless device 2720 may, based on an indication of deactivating the at least one SP CSI setting, set the correction value to the second value (e.g., zero) for the first transmission 2771, for example, after or in response to receiving the second MAC CE 2752. The correction value may be set to a second value (e.g., zero). The second value may be independently determined regardless of the TPC command in a received DCI and may be independently determined regardless of the presence or absence of the TPC command.

A wireless device (e.g., the wireless device 2720) may receive, from a base station (e.g., the base station 2710), at least one message comprising at least one of: one or more power control parameters for a transmission of at least one SP CSI report; at least one second parameter indicating at least one SP CSI resource setting of the at least one SP CSI report; at least one third parameter indicating at least one SP CSI report setting of the at least one SP CSI report; and/or at least one forth parameter indicating at least one SP CSI measurement setting of the at least one SP CSI report. For example, the wireless device may receive the first MAC CE 2751 indicating an activation of a transmission of at least one SP CSI report (e.g., activation of SP CSI reporting). After receiving the first MAC CE 2751, the wireless device may determine first transmission power for the starting (or initial) transmission 2761 of the at least one SP-CSI report 2761, 2762, 2763 at least based on: the one or more power control parameters and/or at least one correction value being set to a predefined value (e.g., zero). The first transmission power for the starting transmission 2761 may be determined, for example, after or in response to the first MAC CE 2751 indicating the activation. The wireless device may transmit the at least one SP CSI report 2761, 2762, 2763 via a PUCCH (or PUSCH) based on the first transmission power (e.g., the first transmission power may correspond to the transmission power of the PUCCH comprising the at least one SP CSI report 2761, 2762, 2763).

The wireless device may receive the second MAC CE 2752 indicating a deactivation of at least one SP CSI report 2761, 2762, 2763 (e.g., deactivation of SP CSI reporting). The wireless device may determine at least one correction value being set to a predefined value (e.g., zero), for example, after or in response to receiving the second MAC CE 2752.

The physical layer of the wireless device may not have information about when the transmission of the at least one SP CSI report setting over PUCCH will be activated or deactivated by the MAC layer, for example, if the transmission is activated or deactivated by a MAC CE (e.g., due to a retransmission (HARM)). It may be unclear for the physical layer when to start PDCCH monitoring with a first DCI (e.g., indicating an activation or a deactivation of SP CSI) scrambled by a first RNTI (e.g., SP CSI RNTI) and/or with a second DCI (e.g., indicating a PUCCH TPC command) scrambled by a second RNTI (e.g., C-RNTI and/or TPC-PUCCH-RNTI). The first DCI may be associated with the at least one SP CSI report setting (e.g., activation or a deactivation of at least one SP CSI report setting), and the second DCI may not be associated with the at least one SP CSI report setting. The wireless device may start monitoring for a PDCCH to obtain the first DCI, for example, if the at least one SP CSI report setting is activated by a MAC CE (e.g., the first MAC CE 2751). For example, after receiving the first MAC CE 2751, the wireless device may receive one or more PDCCHs and may detect the first DCI comprised in at least one of the one or more PDCCHs. The wireless device may start monitoring for a PDCCH to obtain the second DCI and may not monitor for the PDCCH for the first DCI, for example, if the at least one SP CSI report setting is deactivated by a MAC CE (e.g., the second MAC CE 2752). For example, after receiving the second MAC CE 2752, the wireless device may receive one or more PDCCHs and may detect the second DCI comprised in at least one of the one or more PDCCHs. A base station may transmit the first DCI for adjusting an uplink transmit power of at least one SP CSI report, for example, after or in response to transmitting the first MAC CE 2751 activating the at least one SP CSI report setting associated with the at least one SP CSI report.

If the base station does not have information about whether the wireless device has received the first MAC CE 2751 and/or when the wireless device receives the first MAC CE 2751, the wireless device may be more likely to miss the first DCI. The wireless device may be more likely to miss the first DCI, for example, if the first DCI is transmitted when the wireless device is not prepared to monitor a PDCCH comprising the first DCI. The wireless device may not miss the first DCI, for example, if the base station transmits the first DCI with a delay that may be long enough for the wireless device to prepare the PDCCH monitoring for the first DCI detection. The delay may be a delay between the transmission of the first MAC CE 2751 and the transmission of the PDCCH comprising the first DCI.

The delay may cause a latency problem and/or cause energy saving problem. The wireless device may consume more energy for the PDCCH monitoring, for example, if the wireless device is ready to monitor the PDCCH before the expiration of the delay. To indicate the reception of the MAC CE, the wireless device may transmit a confirmation to the base station, for example, after or in response to receiving a MAC CE indicating an activation or deactivation of a configured SP CSI report setting.

FIG. 28A and FIG. 28B show examples of transmitting one or more confirmation messages indicating reception of a MAC CE activating or deactivating (suspending or releasing) SP CSI. FIG. 28A and FIG. 28B may be similar to each other, except for the different SP CSI report transmission periods (e.g., transmission windows) 2890A, 2890B. A wireless device 2820A, 2820B (e.g., a UE) may start monitoring for the PDCCH comprising the first DCI, for example, after or in response to transmitting a first confirmation message 2871A, 2871B ("first confirmation"). The first confirmation may be transmitted to a base station 2810A, 2810B (e.g., a gNB), for example, after or in response to receiving a first MAC CE 2851A, 2851B activating SP CSI. The base station 2810A, 2810B may transmit, to the wireless device 2820A, 2820B and after receiving the first confirmation, the PDCCH comprising the first DCI. The PDCCH comprising the first DCI may be transmitted one or more times during the one or more SP CSI report transmission periods 2890A, 2890B. The first confirmation may be transmitted, for example, after or in response to receiving the first MAC CE 2851A, 2851B indicating an activation of at least one SP CSI report setting.

The wireless device 2820A, 2820B may transmit, to the base station 2810A, 2810B, a second confirmation message 2872A, 2872B ("a second confirmation"), for example, after or in response to receiving a second MAC CE 2852A, 2852B deactivating the SP CSI. The wireless device 2820A, 2820B may stop the monitoring for the PDCCH comprising the first DCI, for example, after or in response to receiving the second MAC CE 2852A indicating a deactivation of at least one SP CSI report setting (e.g., in FIG. 28A). The wireless device 2820A, 2820B may stop the monitoring for the PDCCH comprising the first DCI, for example, after or in response to transmitting a second confirmation message 2872B (e.g., in FIG. 28B). The second confirmation message 2872B may be transmitted, for example, after or in response to receiving the second MAC CE 2852B. At least one of the first or the second confirmation may be transmitted via a UL MAC PDU (e.g., MAC CE). At least one LCID may be assigned for the first and/or second confirmation.

Figure 29:
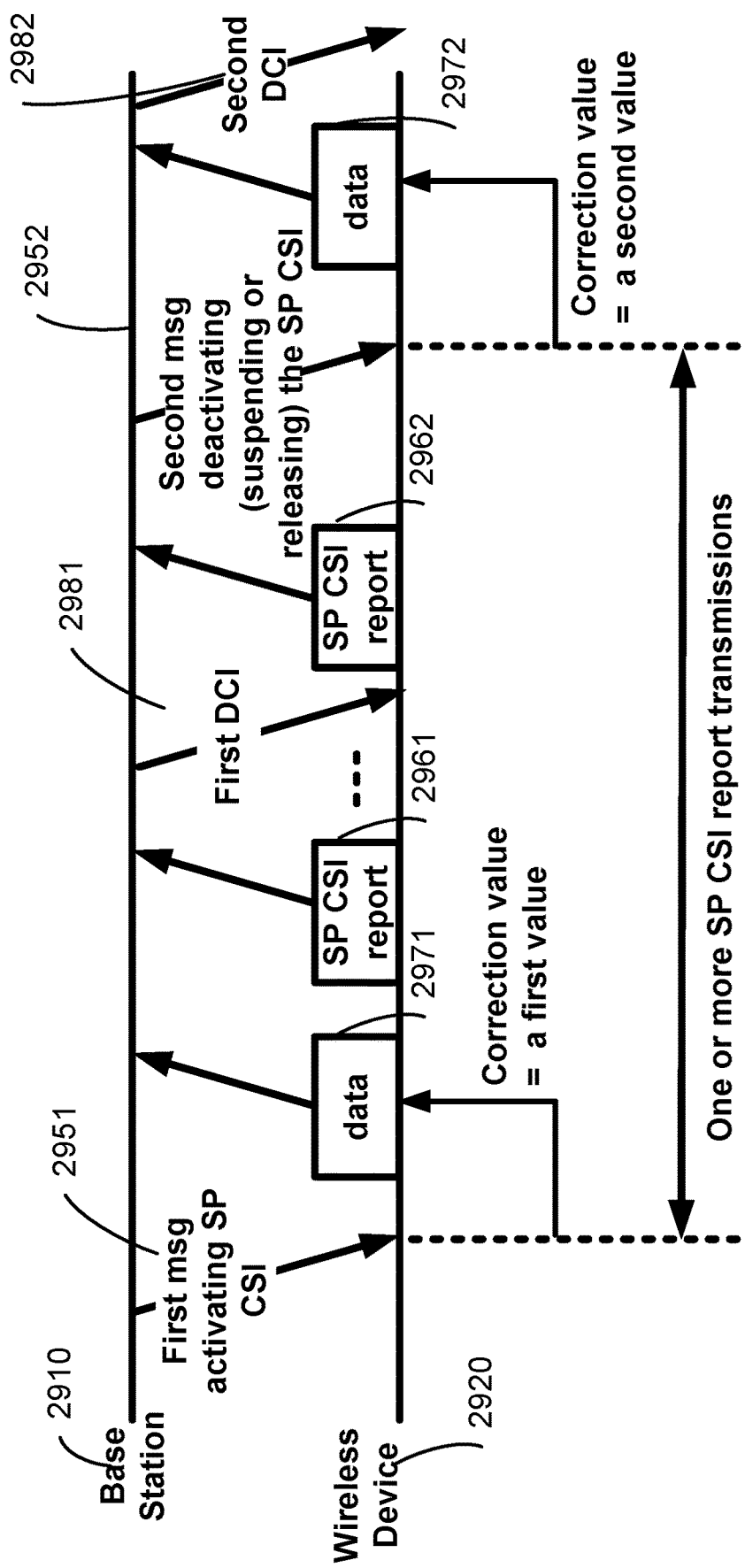
FIG. 29 shows an example SP CSI configuration with a message activating SP CSI and a message deactivating SP CSI.

FIG. 29 shows an example of adjusting a correction value associated with a transmit power determination. A base station 2910 (e.g., a gNB) may establish an RRC connection with a wireless device 2920 (e.g., a UE). For example, the base station 2910 may transmit, to the wireless device 2920, one or more higher layer parameters (e.g., parameters of an RRC layer) to establish the RRC connection. The base station 2910 may transmit, to the wireless device 2920, one or more PDCCHs comprising control information (e.g., one or more DCIs). The wireless device 2920 may transmit, to the base station 2910, uplink data (e.g., UL-SCH data). The uplink data may be mapped to one or more PUSCH resources assigned to the wireless device 2920. The one or more PUSCH resources may be assigned by control information transmitted from the base station 2910.

The wireless device 2920 may transmit, to the base station 2910, one or more PUSCHs comprising uplink data (e.g., UL-SCH data), for example, before receiving a first message 2951 activating SP CSI. The first message 2951 may have at least one of a plurality formats (e.g., a MAC CE, a DCI, etc.). The wireless device 2920 may determine, based on one or more power parameters, transmit power of each PUSCH transmission. As described above, a wireless device's transmit power $P_{PUSCH,c}(i)$ for PUSCH transmission in a subframe (TTI, slot, and/or mini-slot) i for the serving cell c may be given by $$P_{PUSCH,c}(i) = \min \begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases}$$

[dBm], for example, if the wireless device 2920 transmits the PUSCH without a simultaneous PUCCH on a carrier f of the serving cell c. Other equations and/or methods described herein may also be used to determine the wireless device's transmit power.

$P_{O\_PUSCH,c}(j)$ may have different values for data transmissions and SP CSI transmissions on PUSCH. For example, for the transmission of UL-SCH data on PUSCH, $P_{O\_PUSCH,c}(j)$ may have a first value, and for the transmission of an SP CSI on PUSCH, $P_{O\_PUSCH,c}(j)$ may have a second value different from the first value.

A correction value (e.g., $\delta_{PUSCH,c}$) may be provided from the base station 2910. For example, a TPC command in a DCI may indicate the correction value. As described above, the wireless device 2920 may set $f_c(i)=\delta_{PUSCH,c}(i-K_{PUSCH})$ and $f_{c,2}(i)=\delta_{PUSCH,c}(i-K_{PUSCH})$, for example, if accumulation may be not enabled for serving cell c based on the parameter (e.g., Accumulation-enabled) provided by higher layers. $\delta_{PUSCH,c}(i-K_{PUSCH})$ may be signaled on a PDCCH/EPDCCH with a DCI (e.g., DCI format 0/0A/0B/4/4A/4B) or an MPDCCH with a DCI (e.g., DCI format 6-0A) for the serving cell c on a subframe (TTI, slot, and/or mini-slot) $i-K_{PUSCH}$.

As described above, a wireless device (e.g., the wireless device 2920) may set $f_c(i)=f_c(i-1)$, for example, if the wireless device is configured with a higher layer parameter (e.g., UplinkPowerControlDedicated) for the serving cell c and if the subframe (TTI, slot, and/or mini-slot) i belongs to an uplink power control subframe (TTI, slot, and/or mini-slot) set 2 as indicated by the higher layer parameter (e.g., tpc-SubframeSet). The wireless device may set $f_{c,2}(i)=f_{c,2}(i-1)$, for example, if the wireless device is configured with a higher layer parameter (e.g., UplinkPowerControlDedicated) for the serving cell c and if the subframe (TTI, slot, and/or mini-slot) i does not belong to an uplink power control subframe (TTI, slot, and/or mini-slot) set 2 as indicated by the higher layer parameter tpc-SubframeSet.

$f_{c,2}(i)$ and $f_c(i)$ may be defined by: $f_c(i)=f_c(i-1)+\delta_{PUSCH,c}(i-K_{PUSCH})$ and $f_{c,2}(i)=f_{c,2}(i-\delta_{PUSCH,c}(i-K_{PUSCH})$ for example, if accumulation may be enabled based on the parameter (e.g., Accumulation-enabled) provided by higher layers and/or if the TPC command $\delta_{PUSCH,c}$ may be included in a PDCCH/EPDCCH with a DCI format (e.g., DCI format 0 in LTE and/or DCI format 0_0/0_1/2_2 in NR) or in an MPDCCH with a DCI format (e.g., DCI format 6-0A) for the serving cell c, where the CRC may be scrambled by the Temporary C-RNTI. For example, the $f_c(i)$ value for the current transmission of UL-SCH data on a PUSCH may be determined by adding the $\delta_{PUSCH,c}$ value to the $f_c(i-1)$ value (e.g., $f_c(i-1)$ may be the $f_c(i)$ value of the previous transmission of the UL-SCH data on PUSCH).

At least one of the $\delta_{PUSCH,c}$ or the $f_c(i)$ may be changed (e.g., initialized or reset), for example, after or in response to receiving the first message 2951. The wireless device 2920 may transmit the first data 2971 on a PUSCH, for example, after receiving the first message 2951. For the transmit power of the transmission of the first data 2971, the wireless device 2920 may set at least one of the $\delta_{PUSCH,c}$ or the $f_c(i)$ to predefined values (e.g., a first value). For example, $f_c(i)$ may be set to $f_c(0)=0$, and $\delta_{PUSCH,c}$ may be set to the first value (e.g., zero). The $f_c(i)$ value used for the transmission of the data 2971 may be used as the $f_c(i-1)$ value for the first SP CSI report 2961 to calculate the $f_c(i)$ value for the transmit power of the first SP CSI report 2961.

A first DCI 2981 may indicate a change of the $\delta_{PUSCH,c}$ value. For example, a TPC command field in the first DCI 2981 may indicate the changed value for the $\delta_{PUSCH,c}$, which may be used for the transmit power calculation for the transmission of the next SP CSI report 2962. The $f_c(i)$ value used for the transmission of the previous PUSCH transmission (e.g., a data transmission between the SP CSI report 2961 and the SP CSI report 2962) may be used as the $f_c(i-1)$ value for the second SP CSI report 2962 to calculate the $f_c(i)$ value for the transmit power of the second SP CSI report 2962.

At least one of the $\delta_{PUSCH,c}$ or the $f_c(i)$ may be changed (e.g., initialized or reset), for example, after or in response to receiving the second message 2952 deactivating (suspending or releasing) the SP CSI. After receiving the second message 2952, the wireless device 2920 may transmit the data 2972 on a PUSCH. For the transmit power of the transmission of the data 2972, the wireless device 2920 may set at least one of the $\delta_{PUSCH,c}$ or the $f_c(i)$ to predefined values (e.g., a second value). For example, $f_c(i)$ may be set to $f_c(0)=0$, and $\delta_{PUSCH,c}$ may be set to the second value (e.g., zero). The $f_c(i)$ value used for the transmission of the data 2972 may be used as the $f_c(i-1)$ value for an immediately subsequent transmission on a PUSCH to calculate the $f_c(i)$ value for the transmit power of the immediately subsequent transmission on the PUSCH. A second DCI 2982 may change the $\delta_{PUSCH,c}$ value for the immediately subsequent transmission on PUSCH.

Figure 30:
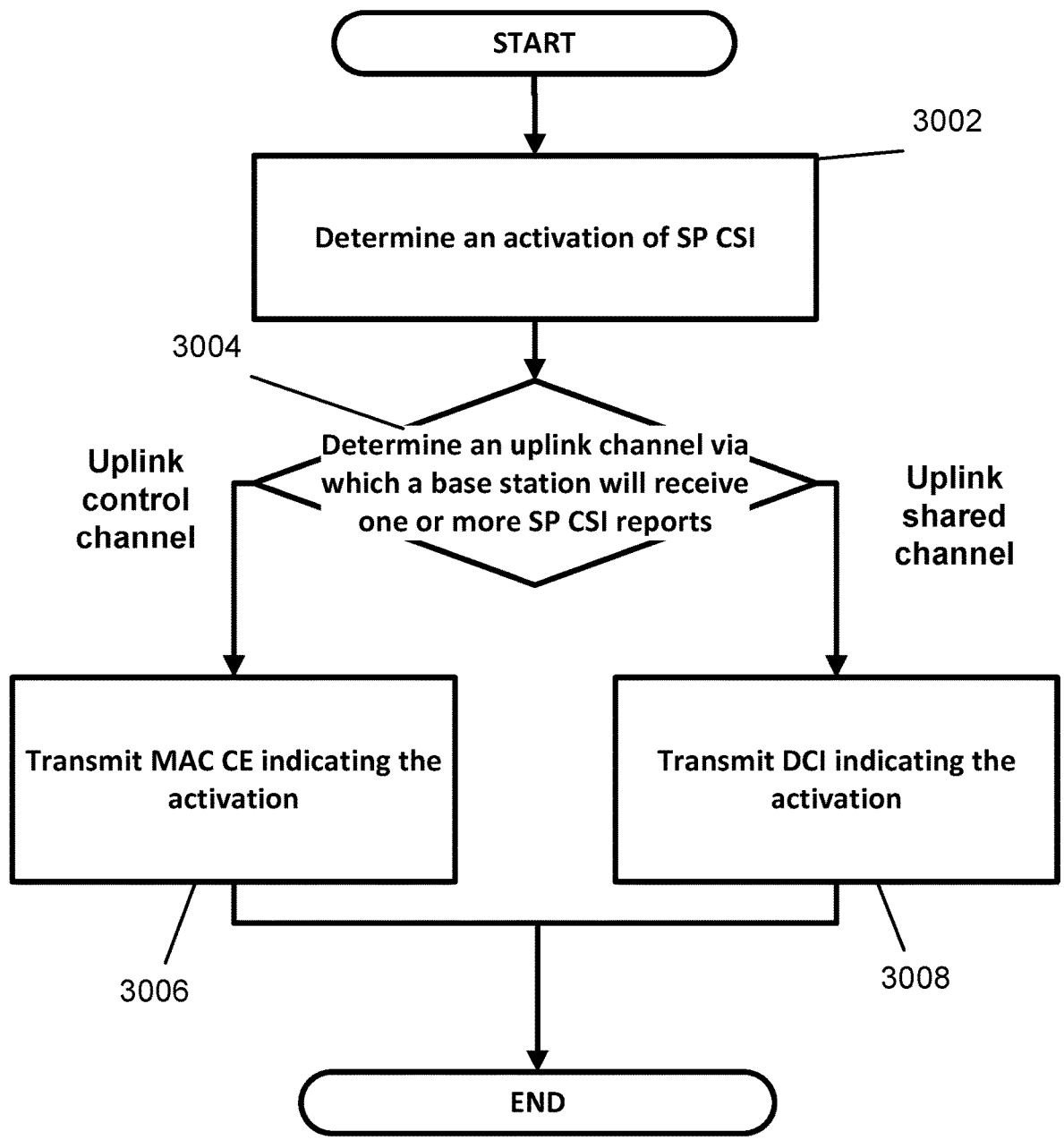
FIG. 30 shows an example of an SP CSI activation procedure that may be performed by a base station.

FIG. 30 shows an example of an SP CSI activation procedure that may be performed by a base station. At step 3002, the base station may determine an activation of SP CSI for one or more wireless devices. For the activation of SP CSI (e.g., activation of SP CSI reporting) for a wireless device, the base station may determine to send, to the wireless device, an indication that the base station will activate the SP CSI, that the base station will send one or more SP CSI-RSs after the activation, and that the base station will receive, from the wireless device, one or more SP CSI reports. The wireless device may generate the one or more SP CSI reports by measuring the one or more SP CSI-RSs. The determination at step 3002 may be based on one or more parameters, factors, and/or conditions. The base station may determine to activate the SP CSI for the wireless device, for example, if a channel condition between the base station and the wireless device is not consistent and/or if the channel monitoring using the SP CSI is preferred.

At step 3004, the base station may determine an uplink channel via which the base station will receive the one or more SP CSI reports. For example, the base station may determine an uplink control channel (e.g., PUCCH), an uplink shared channel (e.g., PUSCH), and/or other channels to receive the one or more SP CSI reports. The determination at step 3004 may be based on one or more parameters, factors, and/or conditions. For example, resource availability may affect the determination between the uplink control channel and the uplink shared channel. The base station may determine to receive the one or more SP CSI reports via an uplink shared channel, for example, if available resources in uplink control channels are scarce. The determination between the uplink control channel and the uplink shared channel may be based on the periodicity of SP CSI report transmissions (e.g., the time interval between two adjacent SP CSI report transmissions). The base station may determine to receive the SP CSI reports via an uplink control channel, for example, if the time interval is longer than a threshold interval (e.g., the wireless device does not use the uplink control channel very frequently to transmit the SP CSI reports because the time interval is long).

At step 3006, the base station may transmit, to the wireless device, a MAC CE indicating the activation of SP CSI (e.g., activation of SP CSI reporting), for example, if the base station determines to receive the one or more SP CSI reports via the uplink control channel. For example, the selection of the MAC CE for the SP CSI activation indication may implicitly indicate that the one or more SP CSI reports should be reported via an uplink control channel. At step 3008, the base station may transmit, to the wireless device, a DCI indicating the activation of SP CSI (e.g., activation of SP CSI reporting), for example, if the base station determines to receive the one or more SP CSI reports via the uplink shared channel. For example, the selection of the DCI for the SP CSI activation indication may implicitly indicate that the one or more SP CSI reports should be reported via an uplink shared channel.

For the deactivation of SP CSI (e.g., deactivation of SP CSI reporting) for the wireless device, the base station may send a same type of message (e.g., a MAC CE) indicating the deactivation of SP CSI, for example, if the base station previous sent the same type of message (e.g., a MAC CE) indicating the activation of SP CSI.

Figure 31:
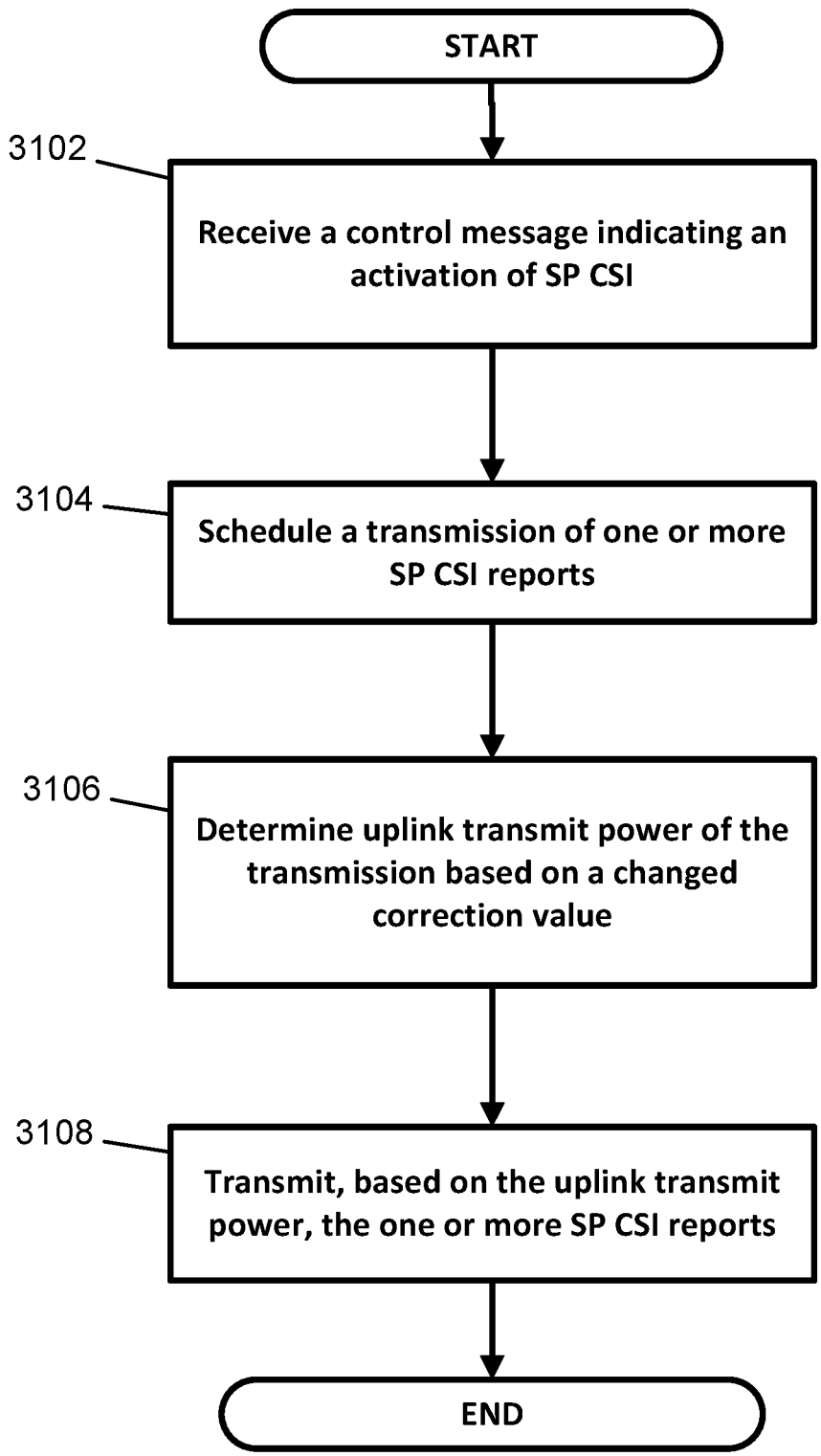
FIG. 31 shows an example of an SP CSI reporting procedure that may be performed by a wireless device.

FIG. 31 shows an example of an SP CSI reporting procedure that may be performed by a wireless device. At step 3102, the wireless device may receive a control message indicating an activation of SP CSI. For example, the wireless device may receive, from a base station, a MAC CE or DCI indicating the activation of SP CSI. The wireless device may receive, from the base station, one or more SP CSI-RSs. The wireless device may measure the one or more SP CSI-RSs. At step 3104, the wireless device may schedule a transmission of one or more SP CSI reports. For example, the wireless device may measure SP CSI-RS s and may generate, based on the measurements, the one or more SP CSI reports. To transmit the one or more SP CSI reports, one or more PUSCH resources may be determined. At step 3106, the wireless device may determine, based on a changed correction value, uplink transmit power of the transmission of the one or more SP CSI reports. For example, the changed correction value may be used to determine the transmit power of the first SP CSI report that is to be transmitted after the SP CSI activation. At step 3108, the wireless device may transmit, based on the uplink transmit power, the one or more SP CSI reports. For example, the wireless device may use the uplink transmit power to set the transmit power for the transmission of the PUSCH comprising the one or more SP CSI reports.

A base station may send, to a wireless device, at least one message comprising configuration parameters to establish a wireless connection (e.g., an RRC connection). One or more of the configuration parameters may be provided via higher layer signaling (e.g., an RRC message). The configuration parameters may comprise information of SP CSI-RS, information of one or more SP CSI reports, etc. The at least one message may comprise one or more uplink power control parameters associated with an uplink channel transmission (e.g., PUCCH, PUSCH, etc.) The one or more power control parameters may be associated with the one or more SP CSI reports, for example, if the one or more SP CSI reports are comprised in (e.g., mapped on) the uplink channel and sent to the base station. The at least one message may comprise an RNTI (e.g., SP-CSI C-RNTI) that is associated with the SP CSI reports. The base station may send a control message indicating an activation of one or more SP CSI reports (e.g., activation of SP CSI reporting). The control message may indicate that the base station will start to send, to the wireless device, one or more SP CSI-RSs via one or more downlink channels (e.g., PDCCH, PDSCH, etc.). The control message may request that the wireless device measure the one or more SP CSI-RS s and that the wireless device send, to the base station and via one or more uplink channels, the one or more SP CSI reports. The control message may comprise a first field and a second field. The first field may indicate a logical channel identifier that indicates whether the control message is used to activate or deactivate one or more SP CSI reports (e.g., activation or deactivation of SP CSI reporting). For example, the first field may indicate that the control message is a message type for SP CSI activation or deactivation. The second field may indicate whether the control message indicates the activation or a deactivation. For example, the second field may have a first value (e.g., one) that indicates the activation of SP CSI reports or may have a second value (e.g., zero) that indicates the deactivation of SP CSI reports. The control message may comprise a DCI scrambled by the RNTI that is associated with the SP CSI reports. The wireless device may receive a PDCCH comprising the DCI from the base station. The wireless device may determine, based on the RNTI and the DCI, the indication of activation. For example, the wireless device may decode, based on the RNTI, the PDCCH and may determine, from the DCI, the indication of activation. The wireless device may validate, based on a plurality of fields in the DCI, the activation. The base station may indicate one or more downlink time-frequency resources (e.g., PDCCH or PDSCH mapped on particular resource elements) in which the one or more SP CSI-RS s are to be sent. The base station may indicate one or more uplink time-frequency resources (e.g., PUCCH or PUSCH mapped on particular resource elements) in which the one or more SP CSI reports are to be sent. The control message may be a DCI, a MAC CE, etc. The wireless device may determine a transmission power for a transmission of at least one of the one or more SP CSI reports. The transmission power may be determined, for example, based on the one or more uplink power control parameters and/or at least one correction value adjusted based on the activation of one or more SP CSI reports. The wireless device may adjust (e.g., change, set, reset, or initialize) the at least one correction value to a first value (e.g., zero), for example, after or in response to receiving the control message. The wireless device may send, to the base station and based on the transmission power, at least one of the one or more SP CSI reports.

The base station may send, to the wireless device, a second control message indicating a deactivation of one or more SP CSI reports (e.g., deactivation of SP CSI reporting). The second control message may be a DCI, a MAC CE, etc. The second control message may comprise a second DCI scrambled by the RNTI that is associated with the SP CSI reports. The second control message may comprise a first field and a second field. The first field may indicate a logical channel identifier that indicates whether the control message is used to activate or deactivate one or more SP CSI reports. For example, the first field may indicate that the second control message is a message type for SP CSI activation or deactivation. The second field may indicate whether the second control message indicates the activation or the deactivation. For example, the second field may have a first value (e.g., one) that indicates the activation of SP CSI reports (e.g., activation of SP CSI reporting) or may have a second value (e.g., zero) that indicates the deactivation of SP CSI reports (e.g., deactivation of SP CSI reporting). The wireless device may receive a second PDCCH comprising the second DCI from the base station. The wireless device may determine, based on the RNTI and the second DCI, the indication of deactivation. For example, the wireless device may decode, based on the RNTI, the second PDCCH and may determine, from the second DCI, the indication of deactivation. The second control message may indicate that the wireless device is no more required to perform the measurement of the SP CSI-RS s and/or the transmission of the SP CSI reports. The wireless device may adjust (e.g., change, set, reset, or initialize) the at least one correction value to a second value (e.g., zero), for example, after or in response to receiving the second control message. The wireless device may schedule a second transmission, of uplink information (e.g., UL SCH data), that is after receiving the second control message. The wireless device may determine, based on the at least one correction value being adjusted to the second value, a second transmission power for the second transmission. The wireless device may send, based on the second transmission power, the uplink information. The base station may send, to the wireless device, a third DCI comprising an uplink grant for a transmission of at least one transport block. The wireless device may determine a third transmission power of the transmission of at least one transport block. The third transmission power may be determined based on the at least one correction value being set to a value (e.g., the first value, the second value, or a third value). The wireless device may send, to the base station and via one or more resources indicated by the uplink grant, the at least one transport block.

A base station may send, to a wireless device, at least one control message. The control message may comprise at least one of a first indication of activating one or more semi-persistent channel state information reports or a second indication of deactivating one or more semi-persistent channel state information reports. The wireless device may adjust, based on at least one of the first indication or the second indication, at least one correction value associated with a transmission power of a transmission of uplink information. The wireless device may determine, based on the adjusted at least one correction value, the transmission power. The wireless device may send, via an uplink channel and based on the transmission power, the uplink information. The uplink information may comprise one or more of: the one or more semi-persistent channel state information reports; or one or more uplink shared channel data. The at least one control message may comprise a first field indicating a logical channel identifier that indicates whether the control message is used to activate or deactivate the one or more semi-persistent channel state information reports. The at least one control message may comprise a second field indicating whether the control message indicates the activating of the one or more semi-persistent channel state information reports. The base station may send, to the wireless device, a radio network temporary identifier associated with the one or more semi-persistent channel state information reports. The wireless device may adjust the at least one correction value (e.g., by setting, based on the first indication, the at least one correction value to a first value or by setting, based on the second indication, the at least one correction value to a second value).

A MAC CE may be transmitted as a part of a MAC PDU. The MAC PDU may be a bit string that may be byte aligned (e.g., one or more of 8 bits) in length. The MAC PDU may comprise at least one of at least one MAC subheader, at least one MAC SDU, or at least one MAC CE.

Figure 32A:
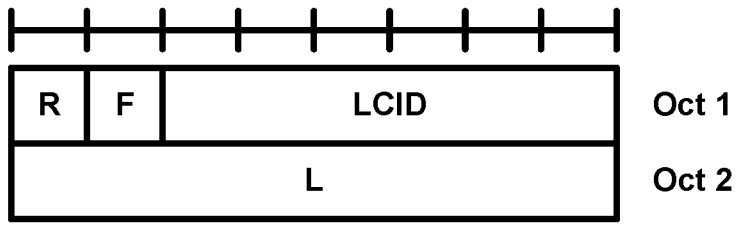
FIG. 32A, FIG. 32B and FIG. 32C show examples of a MAC subheader.
Figure 32B:
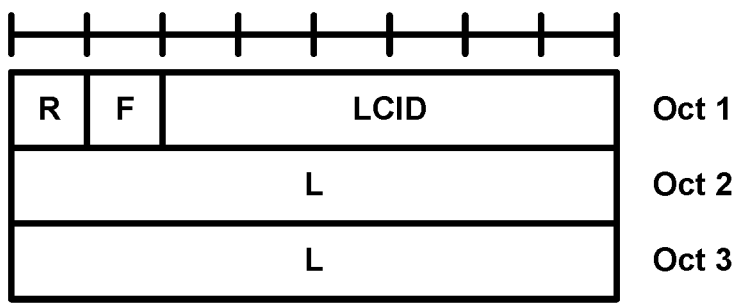
Figure 32C:
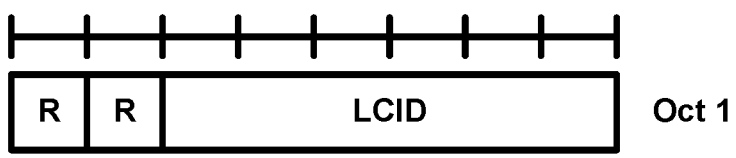

FIG. 32A, FIG. 32B and FIG. 32C show examples of MAC subheaders 3200A, 3200B, 3200C, respectively. The MAC subheader 3200A may be an example of a first type of R/F/LCID/L MAC subheader with 8-bit L field, the MAC subheader 3200B may be an example of a second type of R/F/LCID/L MAC subheader with 16-bit L field, and the MAC subheader 3200C may be an example of R/LCID MAC subheader.

Figure 33A:
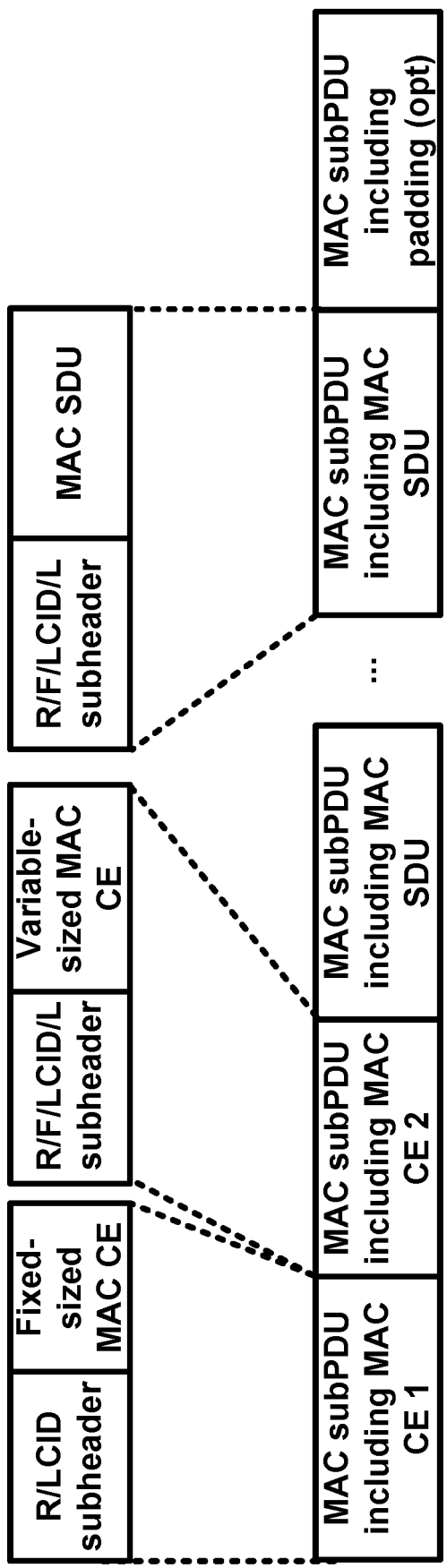
FIG. 33A and FIG. 33B show examples of uplink/downlink (UL/DL) MAC protocol data unit (PDU).
Figure 33B:
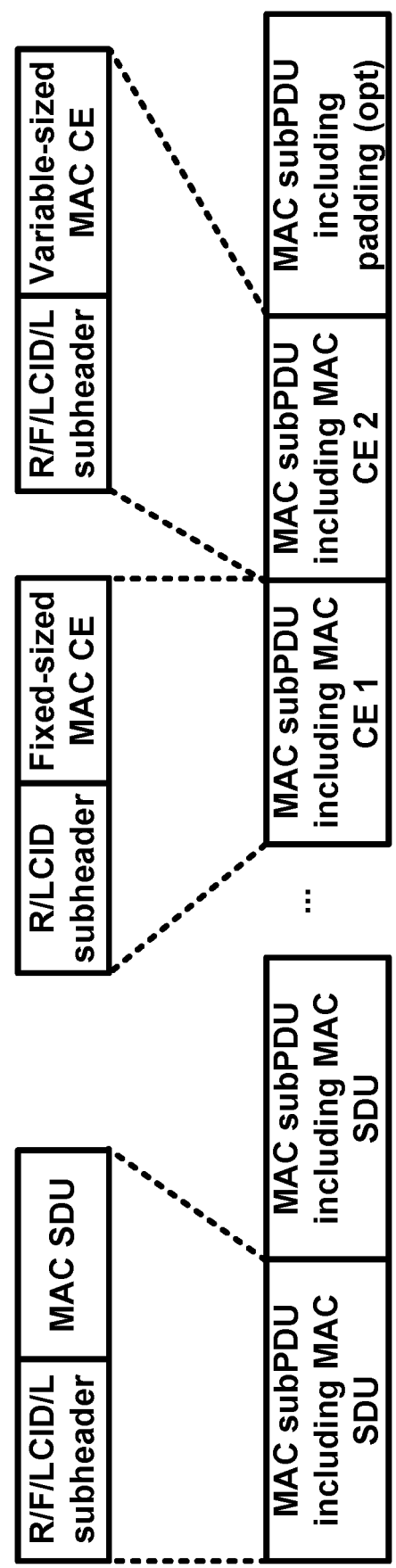

FIG. 33A shows an example of a MAC PDU for a DL MAC PDU, and FIG. 33B shows an example of a MAC PDU for a UL MAC PDU. A bit order of one or more parameter fields within a MAC PDU may be represented with the first and most significant bit (MSB) in the leftmost bit and the last and LSB in the rightmost bit.

A MAC SDU may be a bit string that may be byte aligned (e.g., one or more of 8 bits) in length. The MAC PDU may comprise a MAC SDU from the first bit onward. A MAC CE may be a bit string that may be byte aligned (e.g., one or more of 8 bits) in length. A MAC subheader may be a bit string that may be byte aligned (e.g., one or more of 8 bits) in length. A MAC subheader may be placed in front of the corresponding MAC SDU, MAC CE, or padding. A wireless device may ignore a value of one or more Reserved bits (e.g., "R" fields in FIGS. 32A, 32B, and 32C) in downlink MAC PDUs.

A MAC PDU may comprise one or more MAC subPDUs. At least one of the one or more MAC subPDUs may comprise at least one of the following: a MAC subheader only (including padding); a MAC subheader and a MAC SDU; a MAC subheader and a MAC CE; and/or a MAC subheader and padding.

The MAC SDUs may have variable sizes. A MAC subheader may correspond to either a MAC SDU, a MAC CE, or padding. A MAC subheader for one or more portions of a MAC PDU, except for a fixed-sized MAC CE and padding, may comprise at least four header fields R/F/LCID/L. A MAC subheader for a fixed-sized MAC CE and padding may comprise at least two header fields R/LCID.

One or more MAC CEs may be placed together. One or more DL MAC subPDUs comprising one or more MAC CEs may be placed before a MAC subPDU comprising a MAC SDU and before a MAC subPDU comprising padding (e.g., as shown in FIG. 33A).

One or more UL MAC subPDUs comprising one or more MAC CEs may be placed after one or more (e.g., all) MAC subPDUs comprising a MAC SDU and before a MAC subPDU comprising padding (e.g., as shown in FIG. 33B). The size of padding may be zero.

At least one set of one or more SP CSI report settings for a PUCCH (or PUSCH) may be RRC configured (e.g., by a base station). For example, for a wireless device, at least one of the one or more SP CSI report settings for a PUCCH may be configured in RRC with one or more PUCCH resources for transmitting one or more SP CSI reports. A transmission of the one or more SP CSI reports via the one or more PUCCH resources may be activated by a MAC CE. The MAC CE may comprise at least one logical channel ID (LCID) indicating whether the MAC CE is for an activation and/or deactivation of SP CSI. The MAC CE may comprise an LCID assigned to indicate an activation and/or deactivation with at least one field indicating whether the MAC CE is for an activation and/or deactivation. For example, at least two LCIDs may be respectively assigned to an activation (e.g., that may be indicated by a first LCID) or deactivation (e.g., that may be indicated by a second LCID). The MAC CE may comprise one or more fields indicating at least one of the following: at least one SP CSI report setting, at least one SP CSI resource setting, and/or at least one SP CSI measurement setting. The MAC CE may be used to activate or deactivate (release or suspend) the one or more PUCCH resources (and/or PUSCH resources) scheduled (configured, or granted) for a transmission of the at least one SP CSI report.

The wireless device may start measuring SP CSI and transmit the SP CSI report, based on at least one SP CSI setting, for example, after or in response to receiving a first MAC CE indicating an activation of at least one SP CSI report transmitted via a PUCCH (or PUSCH). The at least one SP CSI setting may be associated with the at least one SP CSI report and may comprise at least one of the following: at least one SP CSI report setting, at least one SP CSI resource setting, and/or at least one SP CSI measurement setting. The wireless device may receive a second MAC CE indicating a deactivation of at least one SP CSI report (e.g., deactivation of SP CSI reporting). The wireless device may deactivate a transmission of at least one SP CSI report, for example, after or in response to receiving the second MAC CE. The wireless device may release (or suspend) one or more downlink assignments of SP CSI and/or one or more PUCCH resources scheduled (configured, or granted) for the transmission of the at least one SP CSI report, for example, after or in response to receiving the second MAC CE.

The at least one SP CSI setting may be indicated by the first and/or the second MAC CE. The first and/or second MAC CE may comprise at least one selection command indicating at least one CSI reporting setting indication. The first and/or the second MAC CE may comprise one or more indices indicating the at least one SP CSI setting. The one or more indices may comprise at least one of the following: a first index indicating one of at least one SP CSI report setting, a second index indicating one of at least one SP CSI resource setting, and/or a third index indicating one of at least one SP CSI measurement setting. The at least one SP CSI setting may be semi-statically configured by RRC.

A base station (e.g., a gNB) may configure a wireless device (e.g., a UE) with at least one SP CSI setting. The base station may transmit, to the wireless device, a DCI scrambled by an RNTI for SP CSI (e.g., SP CSI RNTI), or a MAC CE, that indicates an activation of at least one SP CSI setting (e.g., activation of SP CSI reporting). The wireless device may transmit a first UCI comprising at least one SP CSI report in a first time occupancy of a physical channel (TTI, slot, mini-slot, or subframe) via PUSCH or PUCCH. The at least one SP CSI report may be associated with the at least one SP CSI setting. The first UCI may be transmitted via a PUSCH, for example, if the at least one SP CSI setting is activated by a DCI. The first UCI may be transmitted via a PUCCH, for example, if the at least one SP CSI setting is activated by a MAC CE.

The wireless device may transmit the first UCI without data (e.g. transmit the first UCI without UL-SCH data), for example, if the first UCI, comprising at least one SP CSI report, is transmitted via a PUSCH. The data (e.g., UL-SCH data) may not be transmitted via the PUSCH, for example, if there is no uplink grant for the PUSCH in a second time occupancy of the physical channel (TTI, slot, mini-slot, or subframe) The first time occupancy scheduled to carry at least one SP CSI report may not be overlapped in at least a first portion of the second time occupancy, the second time occupancy may not start within a first time interval (a first value of time, or a first value of time window) after the termination of the first time occupancy, or the first time occupancy may not start within the first time interval after the termination of the second time occupancy. The wireless device may transmit the first UCI with data (e.g. UL-SCH data), for example, if the wireless device have the data with an uplink grant (e.g., dynamic, configured, and/or semi-persistent grant) to transmit via a PUSCH in a third time occupancy of the physical channel (TTI, slot, mini-slot, or subframe). The first time occupancy may be overlapped in at least a first portion of the third time occupancy, the third time occupancy may start within a first time interval after the termination of the first time occupancy, or the first time occupancy may start within the first time interval after the termination of the third time occupancy. The first portion and/or the first time interval may be predefined, for example, in terms of several microseconds or milliseconds, at least one OFDM symbol, one or more OFDM symbols, a portion of one OFDM symbol, and/or one or more TTIs (slots, mini-slot, or subframe).

Figure 34B:
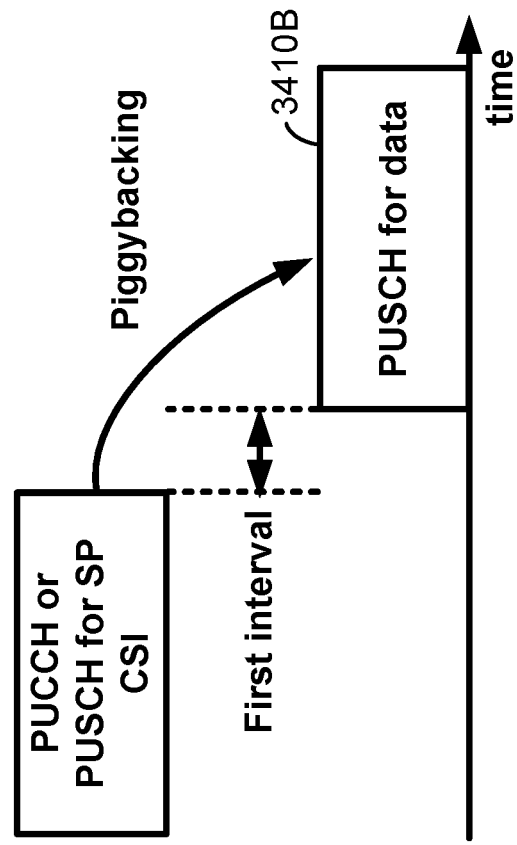
FIG. 34A and FIG. 34B show examples of SP CSI piggybacking on PUSCH data.
Figure 34A:
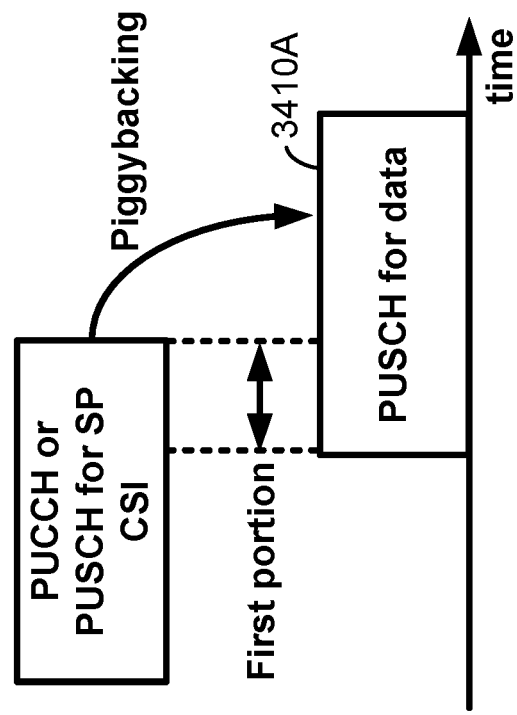

FIG. 34A shows an example of SP CSI piggybacking on a PUSCH 3410A, for example, if an SP CSI transmission schedule is at least partially overlapped in time with a PUSCH data transmission schedule. FIG. 34B shows an example of SP CSI piggybacking on a PUSCH 3410B, for example, if a PUSCH data transmission is scheduled to start within a first interval after a scheduled termination of an SP CSI transmission. A wireless device may transmit a UCI via PUCCH or PUSCH in parallel with data (e.g., UL SCH) via a PUSCH. The UCI may comprise at least one SP CSI report. The wireless device may have a performance loss, for example, if the UCI is transmitted with data in parallel For example, the performance loss may be due to a limited hardware capability. For example, peak-to-average power (PAPR) ratio, inter-modulation distortion (IMD), out-of-band (OOB) leakage, and/or reduction in power capability (cubic metric (CM) problem) may occur or exacerbate the performance loss, for example, if data transmission and UCI transmission are performed in parallel.

A wireless device may transmit a UCI, comprising at least one SP CSI report, through a piggybacking on a PUSCH (e.g., PUSCHs 3410A, 3410B) to reduce or avoid the performance loss. For example, the UCI may be piggybacked on the PUSCH data transmission, for example, if transmissions of the PUSCH and the SP CSI report are scheduled for transmission in parallel. The transmissions of the PUSCH and the SP CSI may be in parallel, for example, if 1) the transmissions of the UCI and data are scheduled on a PUCCH (or a first PUSCH) and a second PUSCH, respectively, and at least a portion of the transmissions of the PUCCH (or the first PUSCH) and the second PUSCH are scheduled to overlap in time (e.g., as shown in FIG. 34A), 2) the transmission of the PUSCH for data is scheduled to start within the first time interval after a scheduled termination of the SP CSI transmission (e.g., as shown in FIG. 34B), or 3) the transmission of the SP CSI is scheduled to start within the first time interval after a scheduled termination of the PUSCH data transmission. The UCI may be piggybacked on the PUSCH for a data transmission, for example, if transmissions of the UCI and data via the PUSCH are scheduled for transmission in parallel. The UCI and data may be scheduled for transmission in parallel, for example, if at least a portion of the transmissions of the UCI and data on the PUSCH are overlapped in time, the transmission of the data on the PUSCH is scheduled within a first time interval after a scheduled termination of the transmission of the UCI, or the transmission of the UCI is scheduled within a first time interval after a scheduled termination of the transmission of the data on the PUSCH. The first portion and/or the first time interval may be predefined, for example, in terms of several microseconds or milliseconds, one or more OFDM symbols, a portion of one OFDM symbol, and/or one or more TTIs (slots, mini-slot, or subframe).

The wireless device may determine, based on a type of UCI, whether and/or when the UCI is piggybacked on the PUSCH for a data transmission. The UCI may comprise ACK/NACK. The ACK/NACK may be configured to be transmitted to a base station in a predetermined time interval. For example, if the wireless device receives data (e.g., via PDCCH and/or PDSCH) in an ith TTI (slot, mini-slot, or subframe), the UCI with ACK/NACK corresponding to the data may be configured to be transmitted in an (i+x)th TTI (slot, mini-slot, or subframe) (e.g., the interval x may be predefined, for example, x=1, 2, 4, or 8). The UCI may comprise at least one of periodic and/or SP CSIs. The CSIs may comprise one or more values indicating at least one of CQI, PMI, RI, etc. A TTI (e.g., slot, mini-slot, or subframe), in which the UCI may be transmitted, may be determined, based on a period and/or an offset semi-statically configured by higher layer signaling, for example, if the UCI is periodic and/or semi-persistent.

Based on the type of UCI, the wireless device may determine a channel allocation for UCI piggybacking on a PUSCH. The wireless device may allocate and transmit the UCI to the PUCCH or PUSCH through the channel allocation procedure.

One or more uplink power control parameters may be predefined and/or semi-statically configured for a transmission of SP CSI on a PUSCH. $P_{O\_PUSCH,f,c}(i)$ and $\alpha_{f,c}(i)$ for the transmission of SP CSI (or UCI) may be predefined and/or semi-statically configured for a carrier f of a cell c, where $J \in \{0, 1, 2, \ldots, J-1\} = S_J$, $P_{O\_PUSCH,f,c}(j_{SPCSI})$ and $\alpha_{f,c}(j_{SPCSI})$ (where $j_{SPCSI} \in S_J$) may be for the transmission of SP CSI (or UCI) on PUSCH. $P_{O\_PUSCH,f,c}(j_{data})$ and $\alpha_{f,c}(j\ data)$ (where $j_{data} \in S_J$) may be for the transmission of data on a PUSCH. $P_{O\_PUSCH,f,c}(J)$ and $\alpha_{f,c}(i)$ values may be provided by a set of higher layer parameters (e.g., p0-pusch-alpha-set) and a respective index by higher layer parameter (e.g., p0alphasetindex) for the carrier f of the cell c. The size of the set may be J–2 and may be indicated by higher layer parameter (e.g., num-p0-alpha-sets).

One or more uplink power control parameters may be predefined and/or semi-statically configured for a transmission of SP CSI on a PUCCH (or PUSCH). $P_{O\_PUCCH,f,c}(q_u)$ for the transmission of SP CSI (or UCI) may be predefined and/or semi-statically configured for a carrier f of a cell c. $P_{O\_PUCCH,f,c}(q_u)$ may comprise $P_{O\_UE\_PUCCH}(q_u)$ for $0 \leq q_u < Q_u$. $P_{O\_PUCCH,f,c}(q_{SPCSI})$ (and/or $P_{O\_UE\_PUCCH}(q_{SPCSI})$) may be for the transmission of SP CSI (or UCI) on a PUCCH, where $0 \leq q_{SPCSI} < Q_u$, $P_{O\_PUCCH,f,c}(q_{SPCSI})$ (and/or $P_{O\_UE\_PUCCH}(q_{SPCSI})$) may be provided by a set of higher layer parameters (e.g., P0-PUCCH). $Q_u$ may be a size for a set of $P_{O\_UE\_PUCCH}(q_u)$ values provided by higher layer parameter num-p0-pucch. The set of $P_{O\_UE\_PUCCH}(q_u)$ values may be provided by higher layer parameter p0-pucch-set.

One or more values of uplink power control parameters (e.g., $P_{O\_PUSCH,f,c}(j_{SPCSI})$, $\alpha_{f,c}(j_{SPCSI})$, $P_{O\_PUCCH,f,c}(q_{SPCSI})$, and/or $P_{O\_UE\_PUCCH}(q_{SPCSI})$ for SP CSI may be semi-statically configured based on one or more requirements and/or channel condition of a UCI (e.g., SP CSI) transmission, for example, in terms of reliability (BLER, SNIR, SNR, etc.), number of bits transmitted in UCI, latency, etc.

The wireless device may need to determine which one of one or more values to be used for uplink transmit power of the UCI transmission, for example, if a UCI comprising at least one SP CSI report is transmitted on a PUSCH. The UCI comprising at least one SP CSI scheduled on a PUCCH may be piggybacked on a PUSCH. The UCI comprising at least one SP CSI scheduled on a PUSCH may be piggybacked on a PUSCH. The UCI may be transmitted with data. The UCI may be transmitted without data.

A selection of one or more wrong values for uplink transmit power may result in miscalculation of required uplink transmit power (e.g., link budget surplus/deficit). For example, the wireless device may consume more power and/or the wireless device may perform a retransmission.

At least one value of uplink transmit power component for SP CSI on PUSCH may be used, for example, if a UCI comprising at least one SP CSI report is transmitted via a PUSCH. The at least one value may be semi-statically one SP CSI. The wireless device may determine uplink transmit power based on at least one value of uplink transmit power components semi-statically configured (or pre-defined) for SP CSI. The wireless device may select $P_{O\_PUSCH,f,c}(j_{SPCSI})$ and/or $\alpha_{f,c}(j_{SPCSI})$ for $P_{O\_PUSCH,f,c}(j)$ and/or $\alpha_{f,c}(j)$ in the uplink transmit power (e.g., $P_{PUSCH,f,c}(i, j, q_d, l)$) of the transmission of UCI via a PUSCH on a carrier f of a cell c. A wireless device may determine the PUSCH transmission power $P_{PUSCH,f,c}(i, j_{SPCSI}, q_d, l)$ in a PUSCH transmission period i as $$P_{PUSCH,f,c}(i, j_{SPCSI}, q_d, l) = \begin{cases} P_{CMAX,f,c}(i), \\ P_{O\_PUSCH,f,c}(j_{SPCSI}) + 10\log_{10}(2^\mu \cdot M_{RB,f,c}^{PUSCH}(i)) + \alpha_{f,c}(j_{SPCSI}) \cdot PL_{f,c}(q_d) + \Delta_{TF,f,c}(i) + f_{f,c}(i, l) \end{cases} \text{[dBm]}$$

configured based on one or more requirement of UCI transmission. The selection of the at least one value for the UCI transmission via a PUSCH may guarantee the one or more requirement of a UCI transmission. The at least one value may be larger than the one for a data transmission. Selecting the at least one value for the UCI transmission via PUSCH may increase the likelihood of success of the UCI transmission (e.g., high SNR/SINR, and/or low BLER). The at least one value may be independently selected regardless of whether the UCI is transmitted via PUSCH with data or not. The at least one value may be $P_{O\_PUSCH,f,c}(j_{SPCSI})$ and/or $\alpha_{f,c}(j_{SPCSI})$. The wireless device may determine an uplink transmit power based on the at least one value, for example, if the UCI is transmitted with data (e.g., UL SCH data) via a PUSCH (e.g., piggybacking on the PUSCH). The wireless device may determine an uplink transmit power based on the at least one value, for example, if the UCI is transmitted without data (e.g., UL SCH data) via a PUSCH.

A wireless device may determine whether at least one value of an uplink transmit power component for SP CSI on a PUSCH is used, depending on whether the UCI is transmitted with data or not, for example, if a UCI comprising at least one SP CSI report is transmitted via a PUSCH (e.g., piggyback on the PUSCH). The at least one value may be at least one of $P_{O\_PUSCH,f,c}(j)$ and/or $\alpha_{f,c}(j)$ (e.g., $P_{O\_PUSCH,f,c}(j_{SPCSI})$ and/or $\alpha_{f,c}(j_{SPCSI})$. The at least one value may be semi-statically configured for a transmission of a UCI with- (where $j_{SPCSI} \in \{0, 1, 2, \ldots, J-1\} = S_J$), for example, if the wireless device transmits at least one SP CSI via a PUSCH on the carrier f of the cell C using SP CSI parameter set configuration with index $j_{SPCSI}$ and PUSCH power control adjustment state with index l.

The at least one SP CSI report may be transmitted with data via a PUSCH. The at least one SP CSI report may be transmitted, for example, after or in response to receiving a DCI indicating an activation of at least one SP CSI setting associated with the at least one SP CSI report. The at least one SP CSI report may be transmitted, for example, after or in response to receiving a MAC CE indicating an activation of at least one SP CSI setting. The wireless device may transmit the at least one SP CSI report with data via a PUSCH, for example, if the at least one SP CSI report (e.g., scheduled to transmit via a PUSCH or PUCCH) is piggy-backed on a PUSCH with a data transmission. The wireless device may determine uplink transmit power based on at least one value of uplink transmit power components semi-statically configured (or predefined) for the data transmission. The wireless device may select $P_{O\_PUSCH,f,c}(j_{data})$ and/or $\alpha_{f,c}(j_{data})$ for $P_{O\_PUSCH,f,c}(j)$ and/or $\alpha_{f,c}(j)$ in the uplink transmit power (e.g., $P_{PUSCH,f,c}(i, j, q_d, l)$) of the transmission of a UCI via a PUSCH on a carrier f of a cell c. A wireless device may determine the PUSCH transmission power $P_{PUSCH,f,c}(i, j_{data}, q_d, l)$ in PUSCH transmission period i as $$P_{PUSCH,f,c}(i, j_{data}, q_d, l) = \begin{cases} P_{CMAX,f,c}(i), \\ P_{O\_PUSCH,f,c}(j_{data}) + 10\log_{10}(2^\mu \cdot M_{RB,f,c}^{PUSCH}(i)) + \alpha_{f,c}(j_{data}) \cdot PL_{f,c}(q_d) + \Delta_{TF,f,c}(i) + f_{f,c}(i, l) \end{cases} \text{[dBm]}$$

out data (e.g., UL SCH data) via a PUSCH. The number of bits in the UCI may be small, for example, in comparison with the number of bits in UL SCH data. The transmission of the UCI without data may need a larger (or smaller) transmit power, for example, if the uplink transmit power depends on the number of bits to be transmitted. The at least one value (e.g., $P_{O\_PUSCH,f,c}(j_{SPCSI})$ and/or $\alpha_{f,c}(j_{SPCSI})$) may be used to increase (or decrease) transmit power for the transmission of the UCI without data.

The at least one SP CSI report may be transmitted without data via a PUSCH, for example, after or in response to receiving a DCI indicating an activation of at least one SP CSI setting associated with the at least one SP CSI report. The wireless device may transmit the at least one SP CSI report without data via a PUSCH, for example, if there is no uplink grant scheduled with the transmission of the at least (where $j_{data} \in \{0, 1, 2, \ldots, J-1\} = S_J$), for example, if the wireless device transmits at least one SP CSI via a PUSCH (e.g., piggybacked on the PUSCH) on a carrier f of a cell c using parameter set configuration with index $j_{data}$ and PUSCH power control adjustment state with index l.

Figures 35A, 35B:
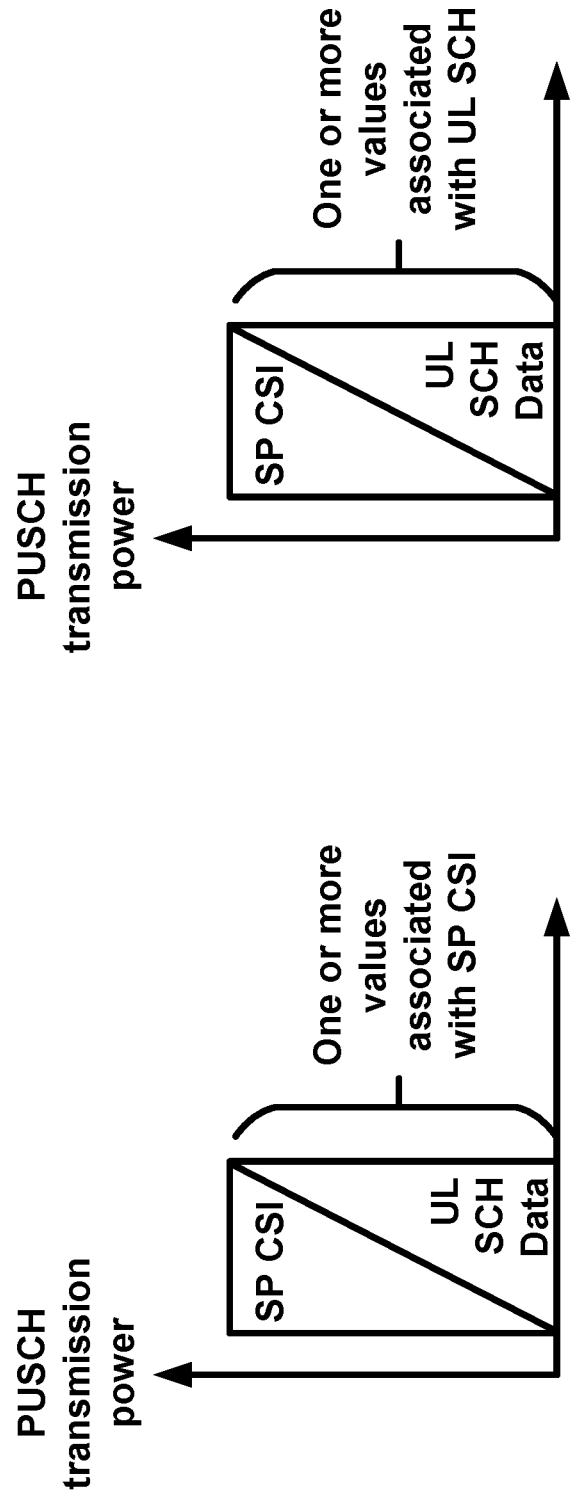
FIG. 35A and FIG. 35B show examples of selecting power control parameter values.

FIG. 35A shows an example of uplink transmit power that is based on one or more values associated with SP CSI. FIG. 35B shows an example of uplink transmit power that is based on one or more values associated with data (e.g., UL SCH data). In FIG. 35A and FIG. 35B, a UCI comprising at least one SP CSI may be piggybacked (e.g., multiplexed) on a PUSCH carrying UL SCH data.

A wireless device may receive, from a base station, at least one message comprising at least one of: at least one first parameter to determine a first power value; at least one second parameter to determine a second power value; a third parameter indicating a first allowed power value for a cell;

and/or at least one second parameter indicating at least one configuration parameter of at least one SP CSI report. The wireless device may receive one or more first DCIs indicating an activation of one or more transmissions of the at least one SP CSI report, via a PUSCH of the cell. The one or more transmissions may comprise a first SP CSI transmission in a first time occupancy of the PUSCH of the cell. The wireless device may determine a first transmission power of the first SP CSI transmission in the first time occupancy of the PUSCH. The first transmission power may be based on a first target received power, for example, if a second transmission of at least one transport block (TB) in a second time occupancy of the PUSCH of the cell is overlapped with at least a portion of the first time occupancy. The first transmission power may be based on a second target received power, for example, if no TB is transmitted in a second time occupancy of the PUSCH that is overlapping with at least a portion of the first time occupancy of the PUSCH. The wireless device may transmit the first SP CSI based on the first transmission power. The first power value may indicate the first target received power. The first power value may indicate the second target received power. The overlapped portion in time axis may be at least one OFDM symbol. The overlapped portion in time axis may be at least a portion of one OFDM symbol. The overlapped portion (e.g., in time axis) may be at least one slot (e.g., mini-slot, or subframe). The overlapped portion (e.g., in time axis) may be at least a portion of one slot (e.g., mini-slot, or subframe).

A base station (e.g., a gNB) may configure a wireless device (e.g., a UE) with at least one SP CSI setting and may transmit a DCI scrambled by an RNTI for SP CSI (e.g., SP CSI RNTI), or a MAC CE, that indicates an activation of at least one SP CSI setting (e.g., activation of SP CSI reporting). The wireless device may transmit a first UCI comprising at least one SP CSI report in a first time occupancy of the physical channel (TTI, slot, mini-slot, or subframe) via a PUSCH or PUCCH. The at least one SP CSI is associated with the at least one SP CSI setting. The first UCI may be transmitted via a PUSCH, for example, if the at least one SP CSI setting is activated by a DCI. The first UCI may be transmitted via a PUCCH, for example, if the at least one SP CSI setting is activated by a MAC CE.

The wireless device may transmit the first UCI, via a PUSCH, without data (e.g. UL-SCH data), for example, if there is no uplink grant for the PUSCH in a second time occupancy of the physical channel (TTI, slot, mini-slot, or subframe). The first time occupancy scheduled to carry at least one SP CSI report may not be overlapped in at least a first portion of the second time occupancy, the first time occupancy may not start within a first time interval after the scheduled termination of the second time occupancy, or the second time occupancy may not start within a first time interval after the scheduled termination of the first time occupancy.

The wireless device may transmit the first UCI with data (e.g. UL-SCH data), for example, if the wireless device has the data with an uplink grant (e.g., dynamic, configured, and/or semi-persistent grant) to transmit via a PUSCH in a third time occupancy of the physical channel (TTI, slot, mini-slot, or subframe). The first time occupancy may be overlapped in at least a first portion of the third time occupancy, the first time occupancy may start within a first time interval after the scheduled termination of the third time occupancy, or the third time occupancy may start within the first time interval after the scheduled termination of the first time occupancy. The first portion and/or the first time interval may be predefined, for example, in terms of several microseconds or milliseconds, at least one OFDM symbol, one or more OFDM symbols, a portion of one OFDM symbol, and/or one or more TTIs (e.g., slots, mini-slot, or subframe).

A wireless device may transmit, via a PUSCH, a UCI in parallel with data (e.g., UL SCH). The UCI may comprise at least one SP CSI report. The wireless device may receive a DCI that indicates an activation of at least one SP CSI setting. The wireless device may transmit at least one SP CSI report associated with the at least one SP CSI setting via a time occupancy of PUSCH indicated by the at least one SP CSI setting, for example, after or in response to receiving the DCI.

The wireless device may not suffer from a performance loss, for example, if the UCI is transmitted with data in parallel. The performance loss may be associated with, for example, peak-to-average power (PAPR) ratio, inter-modulation distortion (IMD), out-of-band (OOB) leakage, and/or reduction in power capability (cubic metric (CM) problem). The wireless device may transmit the UCI with a waveform robust to the performance loss. For example, the waveform may be DFT spread OFDM, Filter Back Multi Carrier, Generalized FDM, Universally Filtered OFDM, Filtered OFDM, Single Carrier OFDM, and/or CP-OFDM. The wireless device may have filtering and/or windowing process for the waveform, for example, to reduce the performance loss.

The wireless device may determine the PUSCH transmission power $P_{PUSCH,f,c}(i, j_{SPCSI}, q_d, l)$ for SP CSI and the PUSCH transmission power $P_{PUSCH,f,c}(i, j_{data}, q_d, l)$ for data in PUSCH transmission period i as $$P_{PUSCH,f,c}(i, j_{SPCSI}, q_d, l) = \begin{cases} P_{CMAX,f,c}(i), \\ P_{O\_PUSCH,f,c}(j_{SPCSI}) + 10\log_{10}\left(2^\mu \cdot M_{RB,f,c}^{PUSCH}(i)\right) + \alpha_{f,c}(j_{SPCSI}) \cdot PL_{f,c}(q_d) + \Delta_{TF,f,c}(i) + f_{f,c}(i, l) \end{cases} \text{[dBm], and}$$

$$P_{PUSCH,f,c}(i, j_{data}, q_d, l) = \begin{cases} P_{CMAX,f,c}(i), \\ P_{O\_PUSCH,f,c}(j_{data}) + 10\log_{10}\left(2^\mu \cdot M_{RB,f,c}^{PUSCH}(i)\right) + \alpha_{f,c}(j_{data}) \cdot PL_{f,c}(q_d) + \Delta_{TF,f,c}(i) + f_{f,c}(i, l) \end{cases} \text{[dBm]},$$

respectively, (where $j_{SPCSI}, j_{data} \in \{0, 1, 2, \ldots, J-1\} = S_J$ and for example, if the wireless device transmits a UCI comprising at least one SP CSI and data in parallel via a PUSCH, on a carrier f of a cell c using SP CSI parameter set configuration with index $j_{SPCSI}$, data transmission parameter set configuration with index $j_{data}$ and PUSCH power control adjustment state with index l. $P_{PUSCH,f,c}(i, j_{SPCSI}, q_d, l)$ and $P_{PUSCH,f,c}(i, j_{data}, q_d, l)$ may be $P_{PUSCH,f,c}(i,j_{SPCSI},q_d,l) = P_{O\_PUSCH,f,c}(j_{SPCSI}) + 10\log_{10}(2^\mu \cdot M_{RBf,c}^{PUSCH}(i)) + \alpha_{f,c}(j_{SPCSI}) \cdot PL_{f,c}(q_d) + \Delta_{TF,f,c}(i) + f_{f,c}(i,l)$[dBm], and $P_{PUSCH,f,c}(i,j_{data},q_d,l) = P_{O\_PUSCH,f,c}(j_{data}) + 10\log_{10}(2^\mu \cdot M_{RBf,c}^{PUSCH}(i)) + \alpha_{f,c}(j_{data}) \cdot PL_{f,c}(q_d) + \Delta_{TF,f,c}(i) + f_{f,c}(i,l)$[dBm], respectively, where $j_{SPCSI}, j_{data} \in \{0, 1, 2, \ldots, J-1\} = S_J$ and $j_{data} \neq j_{SPCSI}$.

The wireless device may determine a PUSCH transmission power required to transmit the UCI and data, for example, if the wireless device transmits a UCI comprising at least one SP CSI and data in parallel via the PUSCH. The total PUSCH transmission power may comprise $P_{PUSCH,f,c}(i, j_{SPCSI}, q_d, l)$ and $P_{PUSCH,f,c}(i, j_{data}, q_d, l)$. The total PUSCH transmission power may be a sum of linear values of $P_{PUSCH,f,c}(i, j_{SPCSI}, q_d, l)$ and $P_{PUSCH,f,c}(i, j_{data}, q_d, l)$ (e.g., a sum of $\hat{P}_{PUSCH,f,c}(i, j_{SPCSI}, q_d, l)$ and $\hat{P}_{PUSCH,f,c}(i, j_{data}, q_d, l)$). The wireless device may adjust (scale up or down, change, (re)calculate, or (re)determine) the total PUSCH transmission power such that the total PUSCH transmission power is smaller than the allowed power value, for example, if the total PUSCH transmission power exceeds (or higher than or equal to) an allowed power value on a carrier f of the cell c (e.g., $P_{CMAX,f,c}(i)$ and/or a linear value of $P_{CMAX,f,c}(i)$ ($\hat{P}_{CMAX,f,c}(i)$). The wireless device may adjust (e.g., scale) $\hat{P}_{PUSCH,f,c}(i, j_{SPCSI}, q_d, l)$ with a first scaling value and $\hat{P}_{PUSCH,f,c}(i, j_{data}, q_d, l)$ with a second scaling value. The first and second scaling values may be predefined and/or semi-statically configured. The first scaling value may be equal to the second scaling value. The wireless device may adjust (e.g., scale) $\hat{P}_{PUSCH,f,c}(i, j_{SPCSI}, q_d, l)$ and $\hat{P}_{PUSCH,f,c}(i, j_{data}, q_d, l)$ such that $\Sigma_{j \in \{j_{SPCSI}, j_{data}\}} \omega_j \hat{P}_{PUSCH,f,c}(i, j, q_d, l) \leq \hat{P}_{CMAX,f,c}(i)$ where $0 \leq \omega_j \leq 1$ is a scaling value for index j.

Figure 36:
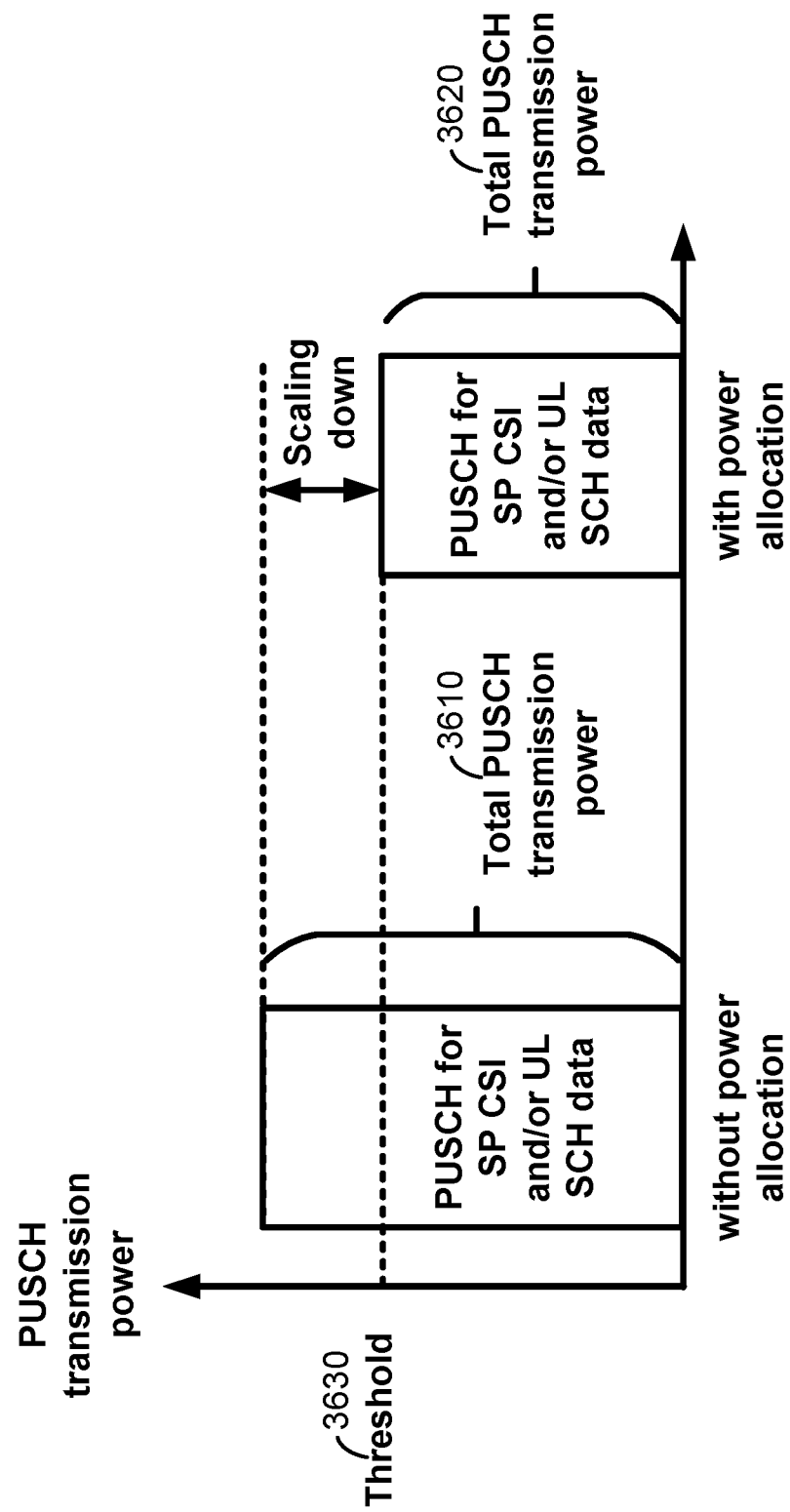
FIG. 36 shows an example of transmit power scaling.

FIG. 36 shows an example of the total PUSCH transmission power adjusting (e.g., scaling down) in a cell. A threshold 3630 shown in FIG. 36 may be the allowed power value configured with a wireless device for the cell. The wireless device may successfully transmit SP CSI and UL SCH data, for example, if the wireless device adjusts (e.g., scales down) the total PUSCH transmission power 3610 to a reduced total PUSCH transmission power 3620. The adjusting (e.g., scaling) of total PUSCH transmission power may not affect the reception of the PUSCH at a base station, for example, if a difference between the total PUSCH transmission power and the allowed power value (e.g., a threshold 3630) is small. The parallel transmission of control data (e.g., SP CSI report) and data (e.g., UL SCH data) may be beneficial, for example, if the difference between the total PUSCH transmission power and the allowed power value is small. The wireless device may drop one of control data (e.g., SP CSI report) and data (e.g., UL SCH data), for example, if the total PUSCH transmission power is higher than the allowed power value. The wireless device and the base station may need to schedule the one of control data (e.g., SP CSI report) and data (e.g., UL SCH data), which may cause a longer latency. It may reduce the latency, for example, if the wireless device transmits SP CSI and UL SCH data in parallel.

The wireless device may receive, from a base station, at least one message comprising at least one of: a first parameter indicating a first allowed power value for a cell and/or at least one second parameter indicating at least one configuration parameter of at least one SP CSI report. The wireless device may receive one or more first DCIs indicating an activation of transmissions of the at least one SP CSI report, via a PUSCH of the cell. The transmissions comprise a first SP CSI transmission in a first time occupancy of the PUSCH. The wireless device may receive one or more second DCIs indicating an uplink radio resource assignment for a second transmission of at least one TB, via the PUSCH of the cell, in a second time occupancy of the PUSCH. The second time occupancy may at least partially overlap with the first time occupancy in time axis. The wireless device may determine a first transmission power of the first SP CSI transmission in the first time occupancy and a second transmission power of the second transmission. The wireless device may adjust (e.g., scale down, change, etc.) a transmission power of a sum of the first transmission and the second transmission to be lower than the first allowed power value. The wireless device may transmit, with the transmission power, the at least one SP CSI report in the first time occupancy and the at least one TB in the second time occupancy. At least a portion of the at least one SP CSI report transmission may overlap with at least a portion of the at least one TB transmission. The transmission overlap may be at least one OFDM symbol in time axis. The transmission overlap may be at least one slot in time axis. The transmission overlap may be at least one subframe in time axis.

The base station may fail to detect and/or decode the control data (e.g. SP CSI) and data (e.g., UL SCH data), for example, if the wireless device scale down the total PUSCH transmission power to adjust the total PUSCH transmission power value to be lower than the allowed power value. The scaled total PUSCH transmission power may not allocate enough transmit power to the control data and/or data, for example, if a difference between the total PUSCH transmission power and the allowed power value is greater than a threshold. Insufficient transmit power may result in detection and/or decoding failure at the base station. The insufficient transmit power may cause the base station to request one or more retransmissions that may cause a longer latency (delay). The wireless device may have first data (e.g., control data and/or URLLC data) that may require high reliability and low latency. Scaling down the total PUSCH transmission power may not be desirable, for example, if the wireless device schedules to transmit the first data.

A wireless device may drop and/or scale down at least one first PUSCH transmission to adjust the total PUSCH transmission power to be lower than the allowed power value, for example, if total PUSCH transmission power exceeds the allowed power value of a cell. The dropping and/or scaling down the at least one first PUSCH transmission may provide flexibility in DL and/or UL scheduling (e.g., the base station and the wireless device may schedule one or more data packets depending on its requirements), for example, if total PUSCH transmission power exceeds the allowed power value. The dropping and/or scaling down the at least one first PUSCH transmission may satisfy one or more service requirements (reliability, and/or latency) for at least one second PUSCH transmission. The at least one second PUSCH transmission may be data transmission requiring high reliability and/or low latency (e.g., URLLC data transmission). The at least one second PUSCH transmission may be control data (e.g., periodic/aperiodic, and/or SP CSI) transmission that may be associated with scheduling of one or more subsequent transmissions and/or DL/UL interference management. The at least one first PUSCH transmission is for a CSI report, for example, if the wireless device transmits the CSI report periodically. The dropping of one CSI report may not significantly degrade the network performance and/or aperiodic CSI and/or SP CSI may compensate the loss of the one CSI report, for example, if the base station is configured to receive the CSI report periodically.

The wireless device may prioritize the one or more PUSCH transmissions, for example, overlapped in at least a portion of time in a cell and may drop (and/or scale a power of) at least one of the one or more PUSCH transmissions based on the priorities of the one or more PUSCH transmissions, for example, if the wireless device have one or more PUSCH transmissions to be transmitted in parallel to a base station via the cell. The wireless device may drop (and/or scale power of) at least one first PUSCH transmission of the one or more PUSCH transmission, for example, if the total PUSCH transmission power for transmitting the one or more PUSCH transmissions exceeds the allowed power value of the cell. The at least one first PUSCH transmission may have a lower priority than at least one second PUSCH transmission of the one or more PUSCH transmission. The wireless device may drop (and/or scale a power of) the at least one second PUSCH transmission, for example, if the total PUSCH transmission power before the dropping (and/or scaling down a power of) the at least one first PUSCH transmission exceeds the allowed power value. The wireless device may continue to drop (and/or scale down power of) at least one of the one or more PUSCH transmissions based on the priorities until the adjusted total PUSCH transmission power is lower than (or equal to) the allowed power value.

The data (e.g., UL SCH data) transmission may have a higher priority than the SP CSI transmission. The data may carry URLLC traffic that may require low latency. The wireless device may drop the SP CSI transmission, for example, after or in response to determining that the total PUSCH transmission power of a cell is higher than the allowed power value of the cell (e.g., $\hat{P}_{CMAX,f,c}(i)$) and that the data transmission is prioritized over the SP CSI transmission. The wireless device may drop the SP CSI transmission scheduled on a PUSCH, for example, if the total PUSCH transmission power is higher than the allowed power value. $\hat{P}_{PUSCH,f,c}(i, j_{data}, q_d, l)$ may be higher than the allowed power value or $P_{PUSCH,f,c}(i, j_{data}, q_d, l)$ may be lower than the allowed power value. The wireless device may drop the SP CSI transmission scheduled on a PUSCH, for example, if the PUSCH transmission power for data, $\hat{P}_{PUSCH,f,c}(i, j_{data}, q_d, l)$, is larger (or higher) than the allowed power value. The wireless device may scale down $\hat{P}_{PUSCH,f,c}(i, j_{data}, q_d, l)$ such that $\hat{P}_{PUSCH,f,c}(i, j_{data}, q_d, l)$ is lower than the allowed power value, for example, after or in response to dropping the SP CSI transmission.

Figures 37A, 37B:
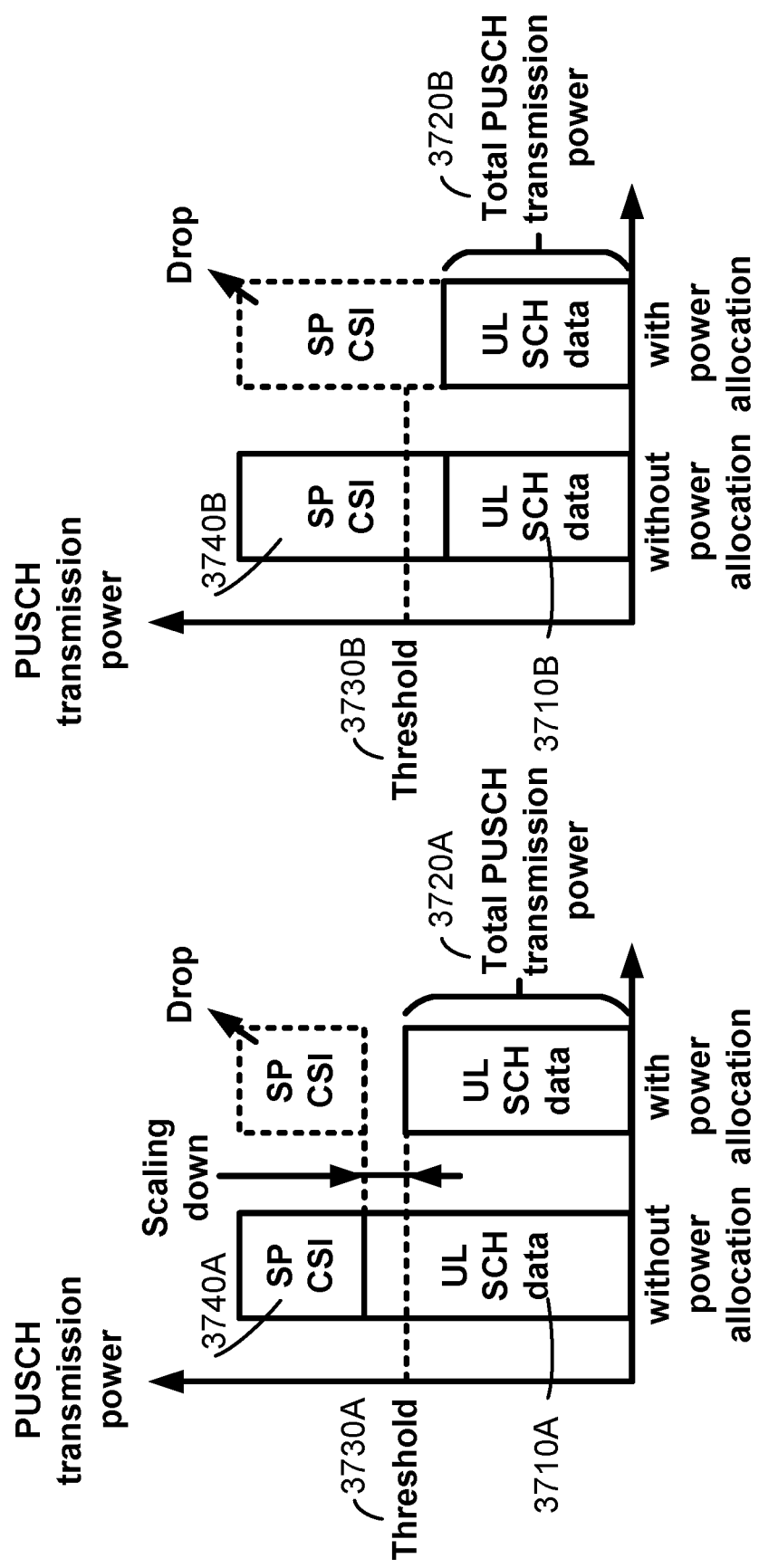
FIG. 37A and FIG. 37B show example power allocations.

FIG. 37A shows an example of power allocation based on determining that the PUSCH transmission power for data is higher than the allowed power value. For example, the PUSCH transmission power 3710A for UL SCH data is higher than the allowed power value (e.g., a threshold 3730A). The PUSCH transmission power 3710A for UL SCH data may be scaled down to the total PUSCH transmission power 3720A. The scheduled SP CSI transmission may be dropped. For example, the SP CSI transmission power 3740A may be scaled down to zero and be dropped.

FIG. 37B shows an example of power allocation based on determining that the PUSCH transmission power for data is lower than the allowed power value. For example, the PUSCH transmission power 3710B for UL SCH data is lower than the allowed power value (e.g., a threshold 3730B). The PUSCH transmission power 3710B for UL SCH data may not be scaled down. The scheduled SP CSI transmission may be dropped. For example, the SP CSI transmission power 3740B may be scaled down to zero and be dropped. The PUSCH transmission power 3710B may be the total PUSCH transmission power 3720B after the power allocation.

The wireless device may use $\hat{P}_{PUSCH,f,c}(i, j_{SPCSI}, q_d, l)$ and/or $\hat{P}_{PUSCH,f,c}(i, j_{data}, q_d, l)$ adjusted by the power allocation, for example, for at least the parallel (or simultaneous) transmissions of the SP CSI and the PUSCH data during at least one of the overlapped portion, the first time occupancy, and/or the second time occupancy.

The wireless device may receive, from a base station, at least one message comprising at least one of: a first parameter indicating a first allowed power value for a cell and/or at least one second parameter indicating at least one configuration parameter of at least one SP CSI report. The wireless device may receive one or more first DCIs indicating an activation of transmissions of the at least one SP CSI report, via a PUSCH of the cell. The transmissions may comprise a first SP CSI transmission in a first time occupancy of the PUSCH. The wireless device may receive one or more second DCIs indicating an uplink radio resource assignment for a second transmission of at least one transport block (TB), via the PUSCH of the cell, in a second time occupancy of the PUSCH. The second time occupancy may overlap with the first time occupancy in at least a portion. The wireless device may determine a first transmission power of the first SP CSI transmission in the first time occupancy and a second transmission power of the second transmission. The wireless device may drop the first transmission, for example, after or in response to determining that the second transmission power exceeding the first allowed power value. The wireless device may scale down transmission power of the second transmission power to be lower than the first allowed power value. The wireless device may transmit, with the adjusted transmission power, the at least one TB at least in the overlapped portion and/or the second time occupancy. The overlapped portion may be at least one OFDM symbol in time axis. The overlapped portion may be at least one slot in time axis. The overlapped portion may be at least one subframe in time axis.

The wireless device may receive, from a base station, at least one message comprising at least one of: a first parameter indicating a first allowed power value for a cell and/or at least one second parameter indicating at least one configuration parameter of at least one SP CSI report. The wireless device may receive one or more first DCIs indicating an activation of transmissions of the at least one SP CSI report, via a PUSCH of the cell. The transmissions may comprise a first SP CSI transmission in a first time occupancy of the PUSCH. The wireless device may receive one or more second DCIs indicating an uplink radio resource assignment for a second transmission of at least one transport block (TB), via the PUSCH of the cell, in a second time occupancy of the PUSCH. The second time occupancy may overlap with the first time occupancy in at least a portion. The wireless device may determine a first transmission power of the first SP CSI transmission in the first time occupancy and a second transmission power of the second transmission. The wireless device may drop the first transmission, for example, after or in response to determining that a sum of the first transmission power and the second transmission power exceeds the first allowed power value. The second transmission power may be lower than the first allowed power value. The wireless device may transmit, with the second transmission power, the at least one TB at least in the overlapped portion and/or the first time occupancy. The overlapped portion may be at least one OFDM symbol in time axis. The overlapped portion may be at least one slot in time axis. The overlapped portion may be at least one subframe in time axis.

The data (e.g., UL SCH data) transmission may have a higher priority than the SP CSI transmission. The data may carry URLLC traffic that may require low latency. The wireless device may scale down (or up) the PUSCH transmission power for SP CSI, for example, after or in response to determining that the total PUSCH transmission power is higher than the allowed power value (e.g., $\hat{P}_{CMAX,f,c}(i)$) and that the data transmission is prioritized over the SP CSI transmission. The wireless device may scale up or down the PUSCH transmission power for SP CSI such that the total PUSCH transmission power is smaller than the allowed power value, for example, if the PUSCH transmission power for data, $\hat{P}_{PUSCH,f,c}(i, j_{data}, q_d, l)$, is smaller (or lower) than the allowed power value.

Figure 38:
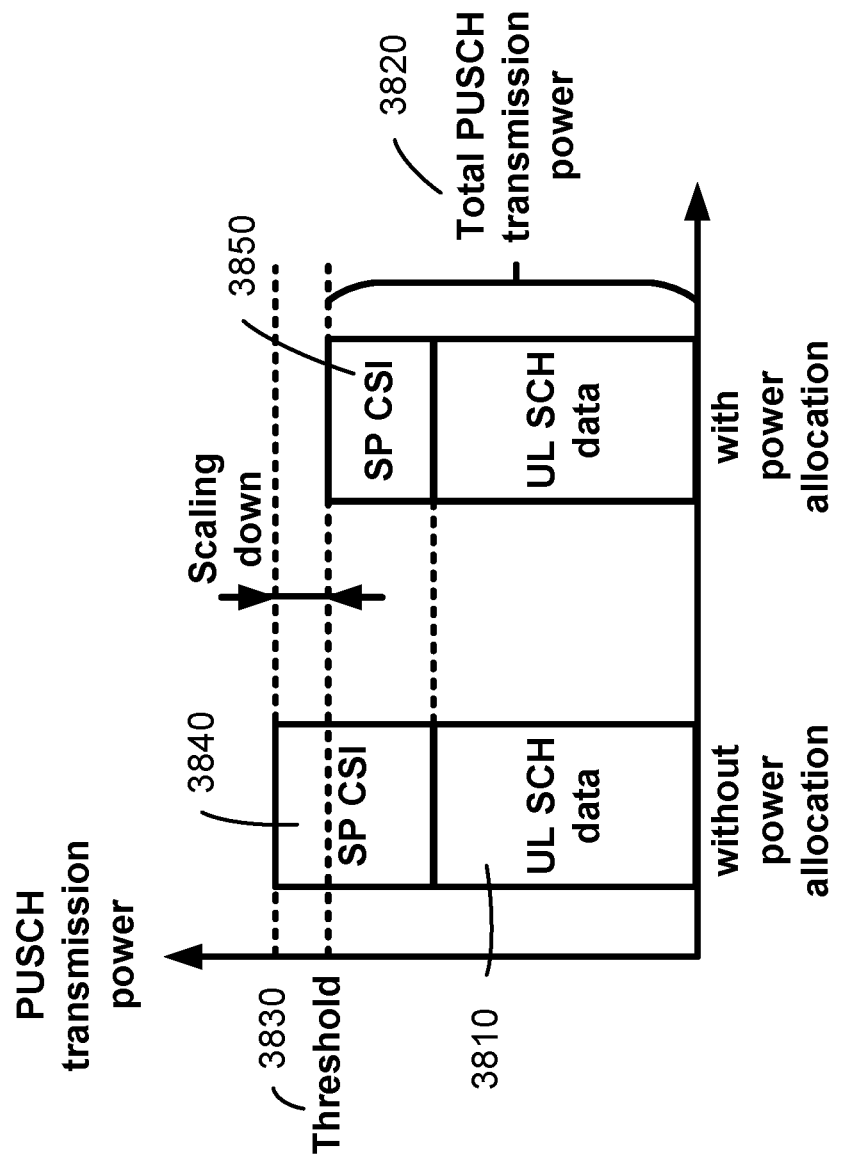
FIG. 38 shows an example power allocation based on a power scaling.

FIG. 38 shows an example of power allocation in a cell. The wireless device may use $\hat{P}_{PUSCH,f,c}(i, j_{SPCSI}, q_d, l)$ and/or $\hat{P}_{PUSCH,f,c}(i, j_{data}, q_d, l)$ adjusted by the power allocation during at least overlapped portion, the first time occupancy, and/or the second time occupancy. The wireless device may determine that a sum of UL SCH data transmission power 3810 and SP CSI transmission power 3840 exceeds an allowed power value (e.g., a threshold 3830). The wireless device may determine that the UL SCH data transmission is prioritized over the SP CSI transmission. The wireless device may determine that the UL SCH data transmission power 3810 does not exceed the allowed power value. The wireless device may determine to scale down the SP CSI transmission power 3840 to the reduced SP CSI transmission power 3850, for example, based on a difference between the allowed power value and the UL SCH data transmission power 3810. The wireless device may determine the reduced SP CSI transmission power 3850 such that the allowed power value is greater than or equal to total PUSCH transmission power 3820 (e.g., a sum of the reduced SP CSI transmission power 3850 and the UL SCH data transmission power 3810). The wireless device may transmit, to the cell (or to a base station via the cell), at least one SP CSI report using $\hat{P}_{PUSCH,f,c}(i, j_{SPCSI}, q_d, l)$ amd data using $\hat{P}_{PUSCH,f,c}(i, j_{data}, q_d, l)$ during at least overlapped portion.

The wireless device may receive, from a base station, at least one message comprising at least one of: a first parameter indicating a first allowed power value for a cell and/or at least one second parameter indicating at least one configuration parameter of at least one SP CSI report. The wireless device may receive one or more first DCIs indicating an activation of transmissions of the at least one SP CSI report, via a PUSCH of the cell. The transmissions may comprise a first SP CSI transmission in a first time occupancy of the PUSCH. The wireless device may receive one or more second DCIs indicating an uplink radio resource assignment for a second transmission of at least one transport block (TB), via the PUSCH of the cell, in a second time occupancy of the PUSCH. The second time occupancy may overlap with the first time occupancy in at least a portion. The wireless device may determine a first transmission power of the first SP CSI transmission in the first time occupancy and a second transmission power of the second transmission. The wireless device may scale down a transmission power of the first transmission power, for example, after or in response to determining that a sum of the first transmission power and the second transmission power exceeds the first allowed power value. The second transmission power may be lower than the first allowed power value. The wireless device may transmit the at least one SP CSI report, based on the first transmission power, at least in the overlapped portion and/or the first time occupancy. The wireless device may transmit the at least one TB based on the transmission power at least in the overlapped portion and/or the second time occupancy. The transmission power may be lower than the first allowed power value. The overlapped portion may be at least one OFDM symbol (e.g., in time axis). The overlapped portion may be at least one slot in time axis. The portion may be at least one subframe (e.g., in time axis).

The data (e.g., UL SCH data) transmission may have a lower priority than the SP CSI transmission. For example, a downlink and/or uplink scheduling may depend on the control data (e.g., SP CSI) that the wireless device transmits. Unsuccessful reception and/or detection of the control data may negatively affect the downlink and/or uplink scheduling (e.g., longer latency). The wireless device may drop the data transmission, for example, after or in response to determining that the total PUSCH transmission power is higher than the allowed power value (e.g., $P_{CMAX,f,c}(i)$), and that the SP CSI transmission is prioritized over the data transmission. The wireless device may drop the data transmission scheduled on a PUSCH, for example, if the total PUSCH transmission power is higher than the allowed power value. $\hat{P}_{PUSCH,f,c}(i, j_{SPCSI}, q_d, l)$ may be higher than the allowed power value or $\hat{P}_{PUSCH,f,c}(i, j_{SPCSI}, q_d, l)$ may be lower than the allowed power value. The wireless device may drop the data transmission scheduled on PUSCH, for example, if the PUSCH transmission power for SP CSI, $\hat{P}_{PUSCH,f,c}(i, j_{SPCSI}, q_d, l)$, is larger (or higher) than the allowed power value. The wireless device may scale down $\hat{P}_{PUSCH,f,c}(i, j_{SPCSI}, q_d, l)$ such that $\hat{P}_{PUSCH,f,c}(i, j_{SPCSI}, q_d, l)$ is lower than the allowed power value, for example, based on or in response to determining to drop the data transmission.

Figure 39:
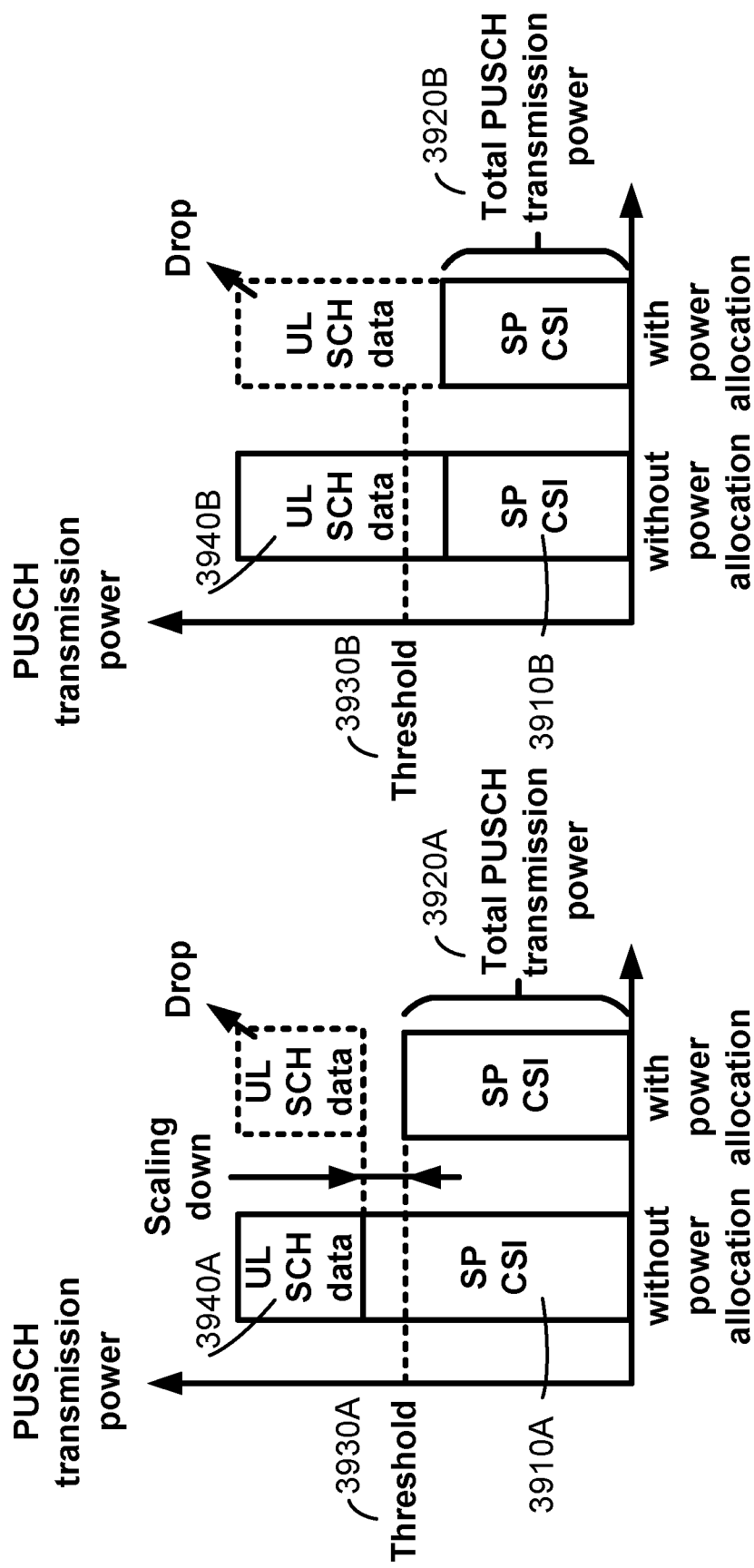
FIG. 39A and FIG. 39B show example power allocations.

FIG. 39A shows an example of power allocation based on determining that the PUSCH transmission power for SP CSI is higher than the allowed power value. For example, the SP CSI transmission power 3910A is higher than the allowed power value (e.g., a threshold 3930A) of a cell. The SP CSI transmission power 3910A may be scaled down to the total PUSCH transmission power 3920A of the cell. The PUSCH transmission 3940A scheduled on the cell for UL SCH data may be dropped. For example, the PUSCH transmission power 3940A scheduled on the cell for the UL SCH data may be scaled down to zero and be dropped.

FIG. 39B shows an example of power allocation based on determining that the PUSCH transmission power for SP CSI is lower than the allowed power value of a cell. For example, the SP CSI transmission power 3910B may be lower than the allowed power value (e.g., a threshold 3930B) of the cell. The SP CSI transmission power 3910B may not be scaled down. The PUSCH transmission scheduled on the cell for UL SCH data may be dropped. For example, the PUSCH transmission power 3940B for the UL SCH data may be scaled down to zero and be dropped. The SP CSI transmission power 3910B may be the total PUSCH transmission power 3920B after the power allocation.

The wireless device may use $\hat{P}_{PUSCH,f,c}(i, j_{SPCSI}, q_d, l)$ and/or $\hat{P}_{PUSCH,f,c}(i, j_{data}, q_d, l)$ adjusted by the power allocation during at least one of the overlapped portion, the first time occupancy, and/or the second time occupancy in time axis.

The wireless device may receive, from a base station, at least one message comprising at least one of: a first parameter indicating a first allowed power value for a cell and/or at least one second parameter indicating at least one configuration parameter of at least one SP CSI report. The wireless device may receive one or more first DCIs indicating an activation of transmissions of the at least one SP CSI report, via a PUSCH of the cell. The transmissions may comprise a first SP CSI transmission in a first time occupancy of the PUSCH. The wireless device may receive one or more second DCIs indicating an uplink radio resource assignment for a second transmission of at least one transport block (TB), via the PUSCH of the cell, in a second time occupancy of the PUSCH. The second time occupancy may overlap with the first time occupancy in at least a portion. The wireless device may determine a first transmission power of the first SP CSI transmission in the first time occupancy and second transmission power of the second transmission. The wireless device may drop the second transmission, for example, based on or in response to determining that the first transmission power exceeds the first allowed power value. The wireless device may scale down transmission power of the first transmission power to be lower than the first allowed power value. The wireless device may transmit, with the transmission power, the at least one SP CSI report at least in the overlapped portion and/or the first time occupancy. The overlapped portion may be at least one OFDM symbol in time axis. The overlapped portion may be at least one slot in time axis. The overlapped portion may be at least one subframe in time axis.

The wireless device may drop the second transmission, for example, based on or in response to determining that a sum of the first transmission power and the second transmission power exceeds the first allowed power value. The first transmission power may be lower than the first allowed power value. The wireless device may transmit, to the cell and with the first transmission power, the at least one SP CSI report at least in the overlapped portion and/or the first time occupancy.

The data (e.g., UL SCH data) transmission may have a lower priority than the SP CSI transmission. A downlink and/or uplink scheduling may depend on the control data (e.g., SP CSI) that the wireless device transmits. The unsuccessful reception and/or detection of the control data may negatively affect the downlink and/or uplink scheduling (e.g., longer latency). The wireless device may scale down (or up) the PUSCH transmission power for data, for example, based on or in response to determining that the total PUSCH transmission power is higher than the allowed power value (e.g., $\hat{P}_{CMAX,f,c}(i)$) and that the SP CSI transmission is prioritized over the data transmission. The wireless device may scale up or down the PUSCH transmission power for SP CSI such that the total PUSCH transmission power is smaller than the allowed power value, for example, if the PUSCH transmission power for SP CSI, $\hat{P}_{PUSCH,f,c}(i, j_{SPCSI}, q_d, l)$, is smaller (or lower) than the allowed power value.

Figure 40:
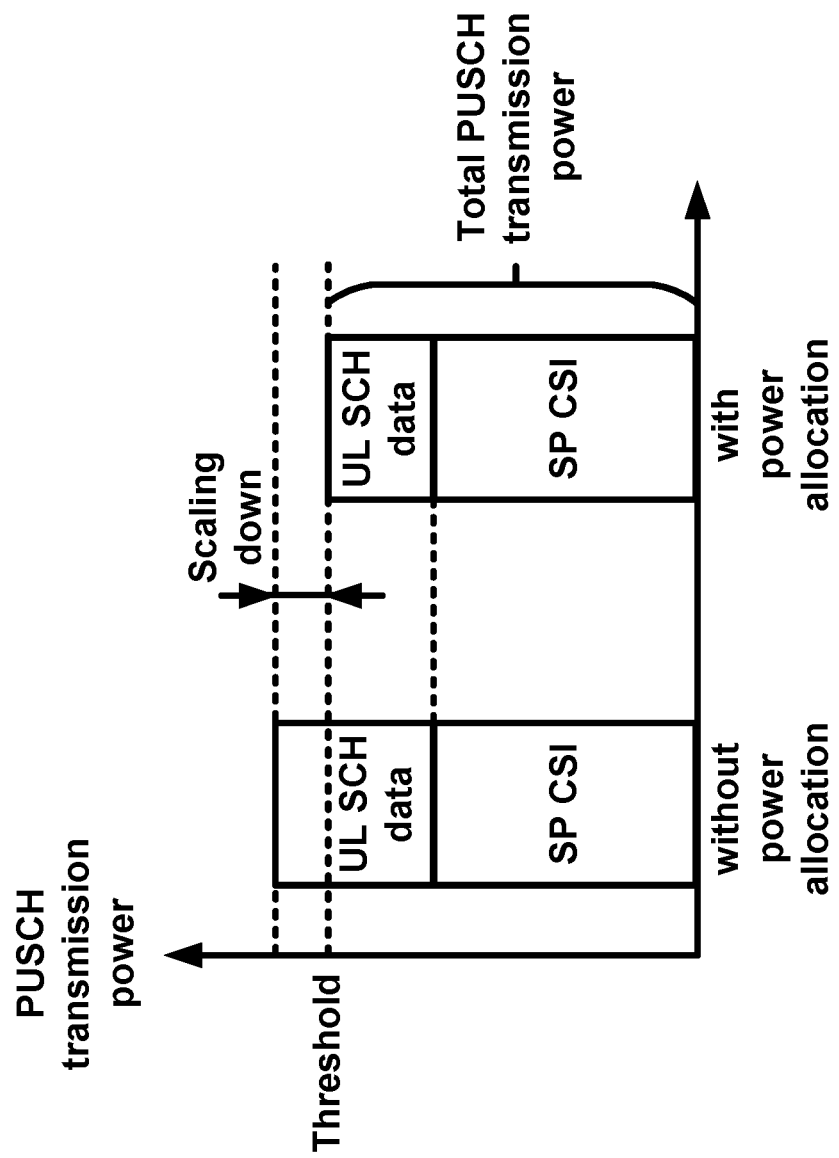
FIG. 40 shows an example power allocation based on a power scaling.

FIG. 40 shows an example of power allocation. The wireless device may use $\hat{P}_{PUSCH,f,c}(i, j_{SPCSI}, q_d, l)$ and/or $\hat{P}_{PUSCH,f,c}(i, j_{data}, q_d, l)$ adjusted by the power allocation during at least one of the overlapped portion, the first time occupancy, and/or the second time occupancy.

The wireless device may receive, from a base station, at least one message comprising at least one of: a first parameter indicating a first allowed power value for a cell and/or at least one second parameter indicating at least one configuration parameter of at least one SP-CSI report. The wireless device may receive one or more first DCIs indicating an activation of transmissions of the at least one SP CSI report, via a PUSCH of the cell. The transmissions may comprise a first SP CSI transmission in a first time occupancy of the PUSCH. The wireless device may receive one or more second DCIs indicating an uplink radio resource assignment for a second transmission of at least one TB, via the PUSCH of the cell, in a second time occupancy of the PUSCH. The second time occupancy may overlap with the first time occupancy in at least a portion. The wireless device may determine a first transmission power of the first SP CSI transmission in the first time occupancy and second transmission power of the second transmission. The wireless device may scale down the transmission power of the second transmission power, for example, based on or in response to determining that a sum of the first transmission power and the second transmission power exceeds the first allowed power value. The first transmission power may be lower than the first allowed power value. The wireless device may transmit the at least one SP CSI report based on the first transmission power at least in the overlapped portion and/or the first time occupancy. The wireless device may transmit the at least one TB based on the transmission power at least in the overlapped portion and/or the second time occupancy. The transmission power may be lower than the first allowed power value. The overlapped portion may be at least one OFDM symbol in time axis. The portion may be at least one slot in time axis. The overlapped portion may be at least one subframe (e.g., in time axis).

Figure 41:
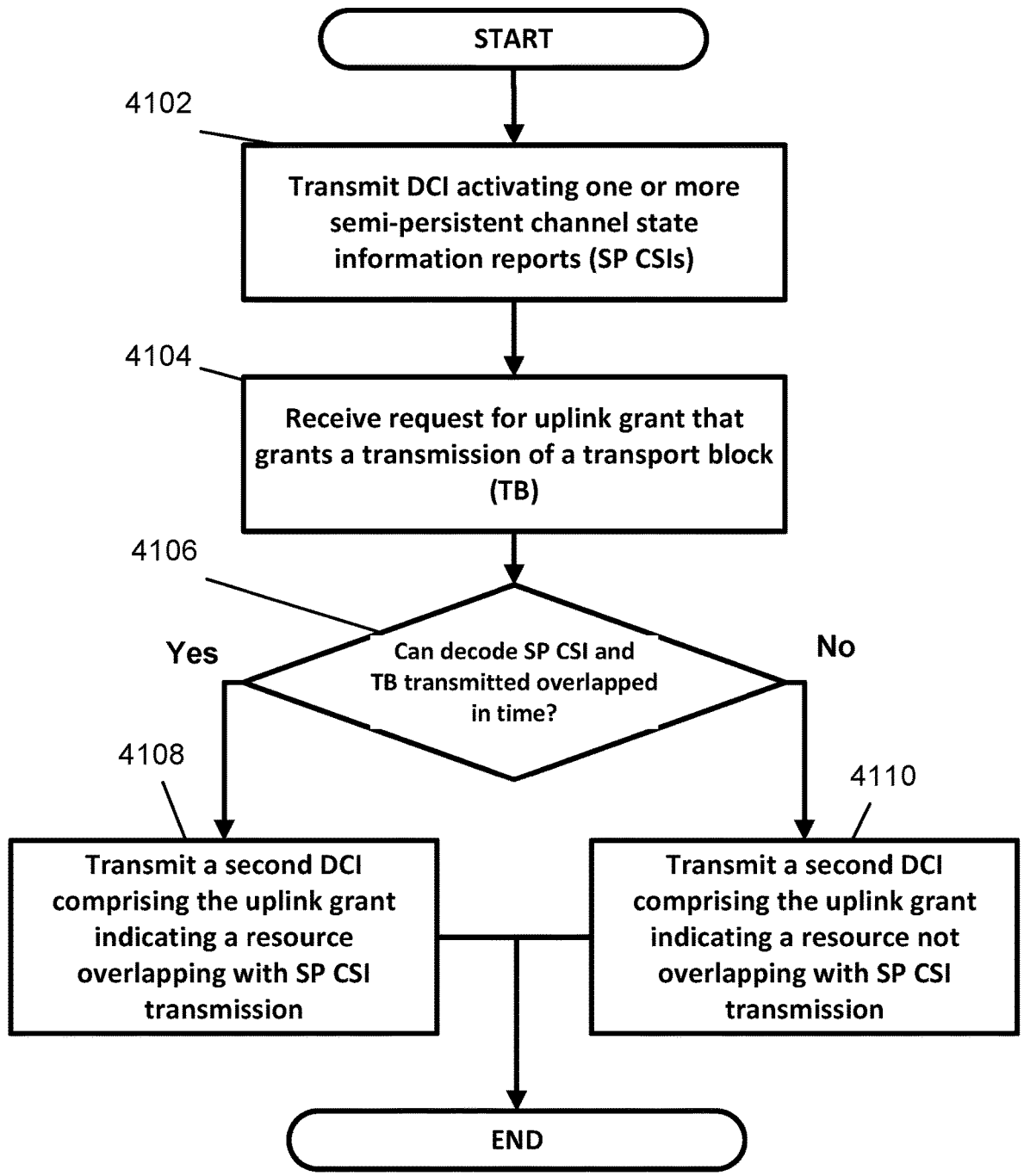
FIG. 41 shows an example of an uplink grant procedure that may be performed by a base station.

FIG. 41 shows an example of an uplink grant procedure that may be performed by a base station. At step 4102, the base station may transmit, to a wireless device, a DCI activating one or more SP CSI reports for a cell. For the activation of SP CSI (e.g., activation of SP CSI reporting) for a wireless device, the base station may determine one or more uplink resources of the cell for receiving the one or more SP CSI reports. For example, the base station may indicate one or more PUSCH channels in one or more time/frequency resources of the cell in which the one or more SP CSI reports can be included.

At step 4104, the base station may receive, from the wireless device, a request for an uplink grant that grants a transmission of one or more TBs. For example, the wireless device may determine to transmit the one or more TBs (e.g., UL SCH data) to the base station (e.g., via the cell) and generate the request for the uplink grant that may indicate the amount of data of the one or more TBs. The base station may determine one or more PUSCH resources in which the wireless device may transmit the one or more TBs.

At step 4106, the base station may determine whether the base station is able to decode the received SP CSI and the one or more TBs that are overlapped in time. The base station may determine whether the wireless device is able to transmit, to the cell, the SP CSI and the one or more TBs simultaneously. If yes, the base station may perform step 4108. If no, the base station may perform step 4110.

At step 4108, the base station may transmit, to the wireless device, a second DCI comprising an uplink grant that indicates one or more resources overlapping with SP CSI transmission resource(s) in a PUSCH of a cell. The base station may transmit, to the wireless device, one or more power control parameters such that the wireless device may determine priority between the SP CSI transmission to the cell and the TB transmission to the cell, determine whether to scale down transmission power of at least one of the SP CSI transmission and the TB transmission, and/or determine whether to drop at least one of the SP CSI transmission and the TB transmission. At step 4110, the base station may transmit, to the wireless device, a second DCI comprising an uplink grant for a cell that indicates one or more resources not overlapping with SP CSI transmission resource(s) of the cell. The transmission power for each of the SP CSI transmission and the TB transmission may be determined based on an allowed power value for an uplink transmission (e.g., $\hat{P}_{CMAX,f,c}$), for example, if the one or more resources for the TB transmission does not overlap with SP CSI transmission resource(s) in a PUSCH of a cell.

Figure 42:
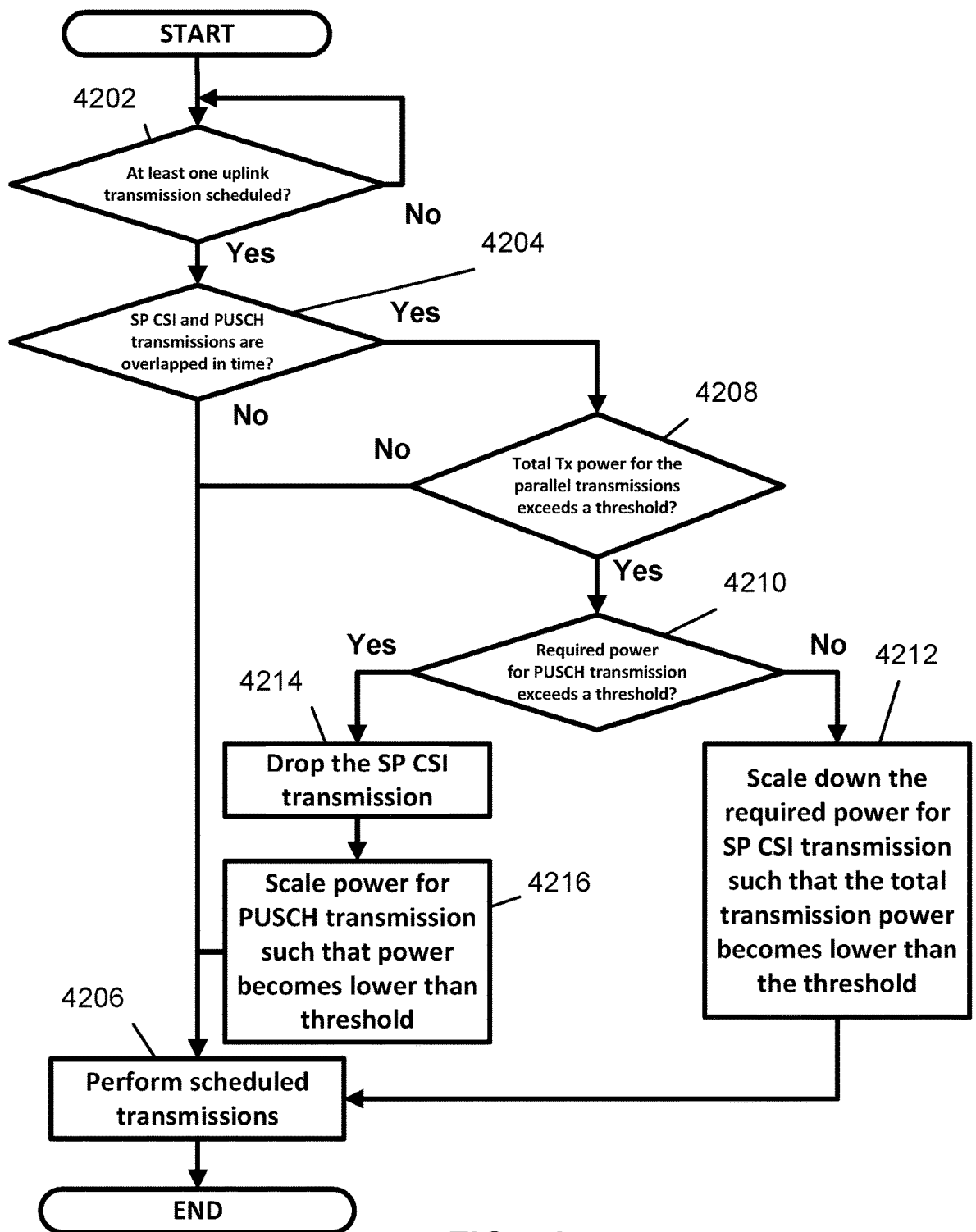
FIG. 42 shows an example of an uplink power control procedure that may be performed by a wireless device.

FIG. 42 shows an example of an uplink power control procedure that may be performed by a wireless device. At step 4202, the wireless device may determine at least one uplink data (e.g., one or more TBs, UL SCH data, etc.) transmission is scheduled. The wireless device may determine, based on an uplink grant received from a base station, one or more uplink resources for the at least one uplink data transmission. At step 4204, the wireless device may determine whether the SP CSI transmission and the uplink data transmission are overlapped in time. At step 4206, the wireless device may perform the scheduled transmissions, for example, if the SP CSI transmission and the uplink data transmission are not overlapped in time.

At step 4208, the wireless device may determine whether total transmission power for the parallel transmissions to a cell exceeds a threshold, for example, if the SP CSI transmission and the uplink data transmission are overlapped in time. The wireless device may perform step 4206, for example, if the total transmission power for the parallel transmissions to the cell does not exceed the threshold. At step 4210, the wireless device may determine whether the required power for the uplink data transmission exceeds the threshold, for example, if the total transmission power for the parallel transmissions to the cell exceeds the threshold. At step 4212, the wireless device may scale down the required power for the SP CSI transmission such that the changed total transmission power of the SP CSI and uplink data transmissions is lower than the threshold, for example, if the required power for the uplink data transmission to the cell does not exceed the threshold.

At step 4214, the wireless device may drop the SP CSI transmission, for example, if the required power for the uplink data transmission to the cell exceeds the threshold. At step 4216, the wireless device may scale down the transmission power for the uplink data transmission to the cell such that the changed transmission power for the uplink data transmission to the cell is lower than the threshold. The wireless device may perform the transmissions of the SP CSI and the uplink data after step 4216.

A base station may send, to a wireless device, at least one message indicating an allowed power value for a cell. For example, the at least one message (e.g., at least one RRC message) may comprise one or more power control parameters (e.g., uplink power control parameters). A first power control parameter may indicate the allowed power value. The at least one message may comprise a first RNTI and a second RNTI. The at least one message may comprise configuration parameters associated with one or more SP CSI reports. The configuration parameters may comprise a reporting configuration of the one or more SP CSI reports and a resource configuration of the one or more SP CSI reports. The base station may send, to the wireless device, a first control message (e.g., a DCI or a MAC CE) indicating an activation of one or more SP CSI reports (e.g., activation of SP CSI reporting). The first control message may be scrambled based on the first RNTI. The wireless device may validate, at least based on a first field (e.g., an HARQ process number field) and a second field (e.g., a redundancy version field) in a DCI of the first control message, a message format that indicates the activation. The wireless device may validate the message format based on the first field indicating a first value and the second field indicating a second value. The first value and/or the second value may be predefined (e.g., in the base station and/or the wireless device). A first transmission of the one or more SP CSI reports may be scheduled for an uplink resource (e.g., an uplink carrier, an uplink channel, etc.) of the cell. The base station may send, to the wireless device, a second control message (e.g., a PDCCH comprising a DCI) indicating an uplink grant of a second transmission for the uplink resource. The second control message may be scrambled based on the second RNTI. The uplink resource may comprise one or more uplink shared channel (e.g., PUSCH) resources, of the cell, for which the first transmission and the second transmission are scheduled. The wireless device may determine, based on one or more configuration parameters of the at least one message, one or more uplink channel resources comprising the uplink resource. The wireless device may schedule, based on the one or more uplink channel resources, the first transmission for the uplink resource. The wireless device may schedule, based on the uplink grant, the second transmission for the uplink resource. The first transmission may at least partially overlap in time with the second transmission. The overlapped portion may comprise a period of time (e.g., at least one OFDM symbol, at least one slot, etc.). The wireless device may determine a combined transmission power comprising a first transmission power of the first transmission and a second transmission power of the second transmission, for example, based on the one or more power control parameters. The wireless device may adjust (e.g., drop or scale down) one or more of the first transmission power or the second transmission power. The adjusting may be at least based on the combined transmission power (e.g., a sum of the first transmission power and the second transmission power) exceeding the allowed power value. The adjusting may be based on determining that the first transmission at least partially overlaps in time with the second transmission. The adjusting may be at least based on determining that the second transmission power is less than the allowed power value. The wireless device may drop the first transmission, for example, if the wireless device determines that the second transmission power exceeds the allowed power value. The wireless device may scale down the first transmission power, for example, if the wireless device determines that the second transmission power is less than the allowed power value. The wireless device may send, via the uplink resource and during a time period in which the first transmission at least partially overlaps in time with the second transmission, at least one of the one or more SP CSI reports using the adjusted first transmission power and at least one transport block using the second transmission power. A sum of the adjusted first transmission power and the second transmission power may be less than or equal to the allowed power value. The base station may send, to the wireless device, a third control message (e.g., a DCI or a MAC CE) indicating a deactivation of one or more SP CSI reports (e.g., deactivation of SP CSI reporting). The wireless device may validate, based on a plurality of fields of the third control message, a message format that indicates the deactivation.

A base station may send, to a wireless device, at least one message. The at least one message may comprise power control parameters comprising an allowed power value for a cell. The at least one message may comprise configuration parameters associated with one or more SP CSI reports. The base station may send, to the wireless device, a first control message indicating an activation of one or more SP CSI reports (e.g., activation of SP CSI reporting). The wireless device may determine, based on at least one of the configuration parameters and the first control message, a first uplink resource for a first transmission of at least one of the one or more SP CSI reports. The wireless device may determine, based on an uplink grant, a second uplink resource for a second transmission of a transport block. The wireless device may adjust one or more of: a first transmission power of the first transmission or a second transmission power of the second transmission. The adjusting may be at least based on a combined transmission power, comprising the first transmission power and the second transmission power, exceeding the allowed power value. The adjusting may be at least based on a time proximity between the first uplink resource and the second uplink resource. The wireless device may send, via at least a portion of the second uplink resource and based on the adjusting, one or more of: the transport block, or the at least one of the one or more SP CSI reports. The wireless device may adjust the first transmission power, for example, if the wireless device determines that the second transmission power is less than the allowed power value. The wireless device may drop the first transmission and adjust the second transmission power, for example, if the wireless device determines that the second transmission power exceeds the allowed power value.

Figure 43:
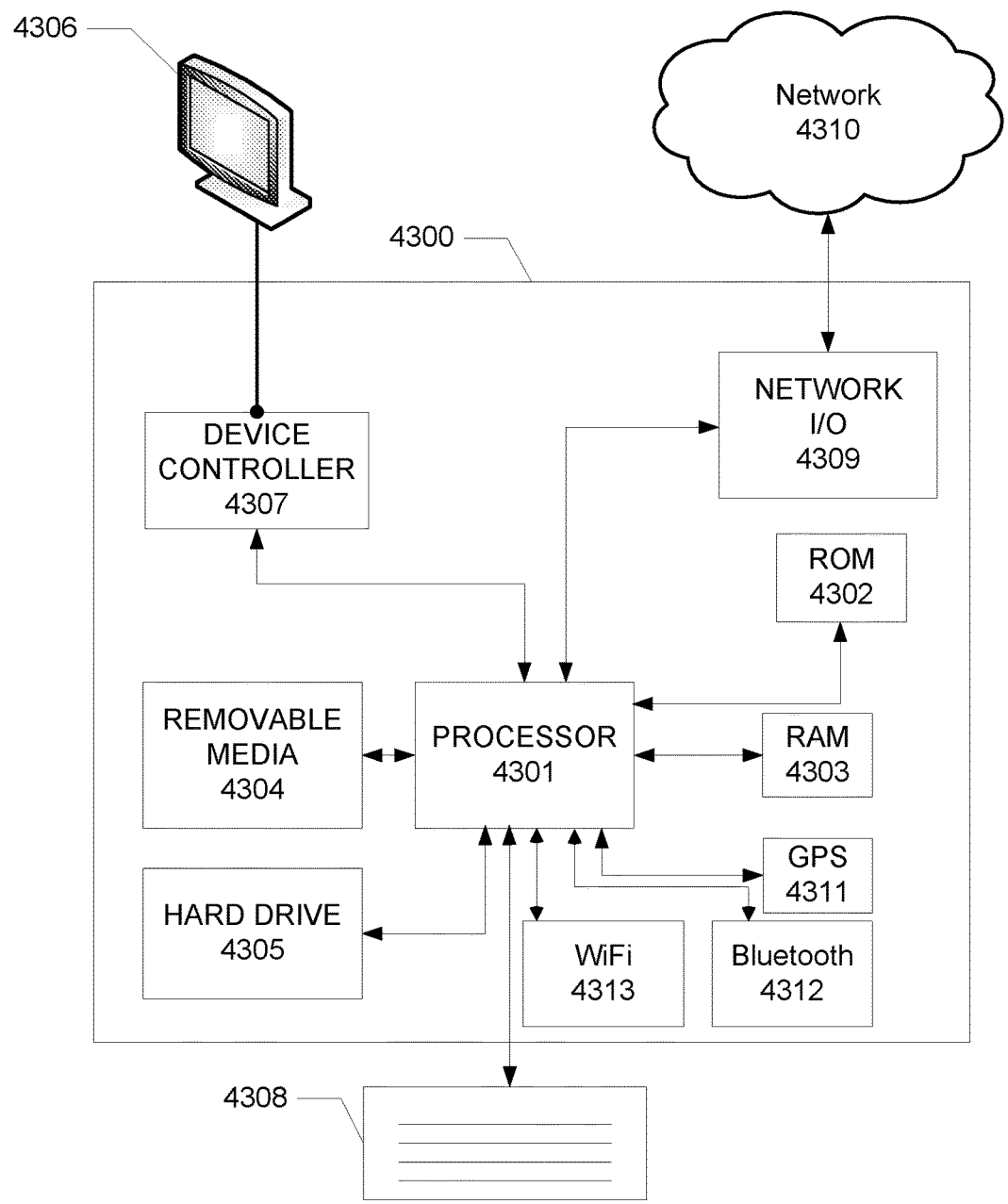
FIG. 43 shows example elements of a computing device that may be used to implement any of the various devices described herein.

FIG. 43 shows general hardware elements that may be used to implement any of the various computing devices discussed herein, including, for example, the base station 401, the wireless device 406, or any other base station, wireless device, or computing device described herein. The computing device 4300 may include one or more processors 4301, which may execute instructions stored in the random access memory (RAM) 4303, the removable media 4304 (such as a Universal Serial Bus (USB) drive, compact disk (CD) or digital versatile disk (DVD), or floppy disk drive), or any other desired storage medium. Instructions may also be stored in an attached (or internal) hard drive 4305. The computing device 4300 may also include a security processor (not shown), which may execute instructions of one or more computer programs to monitor the processes executing on the processor 4301 and any process that requests access to any hardware and/or software components of the computing device 4300 (e.g., ROM 4302, RAM 4303, the removable media 4304, the hard drive 4305, the device controller 4307, a network interface 4309, a GPS 4311, a Bluetooth interface 4312, a WiFi interface 4313, etc.). The computing device 4300 may include one or more output devices, such as the display 4306 (e.g., a screen, a display device, a monitor, a television, etc.), and may include one or more output device controllers 4307, such as a video processor. There may also be one or more user input devices 4308, such as a remote control, keyboard, mouse, touch screen, microphone, etc. The computing device 4300 may also include one or more network interfaces, such as a network interface 4309, which may be a wired interface, a wireless interface, or a combination of the two. The network interface 4309 may provide an interface for the computing device 4300 to communicate with a network 4310 (e.g., a RAN, or any other network). The network interface 4309 may include a modem (e.g., a cable modem), and the external network 4310 may include communication links, an external network, an in-home network, a provider's wireless, coaxial, fiber, or hybrid fiber/coaxial distribution system (e.g., a DOCSIS network), or any other desired network. Additionally, the computing device 4300 may include a location-detecting device, such as a global positioning system (GPS) microprocessor 4311, which may be configured to receive and process global positioning signals and determine, with possible assistance from an external server and antenna, a geographic position of the computing device 4300.

The example in FIG. 43 is a hardware configuration, although the components shown may be implemented as software as well. Modifications may be made to add, remove, combine, divide, etc. components of the computing device 4300 as desired. Additionally, the components may be implemented using basic computing devices and components, and the same components (e.g., processor 4301, ROM storage 4302, display 4306, etc.) may be used to implement any of the other computing devices and components described herein. For example, the various components described herein may be implemented using computing devices having components such as a processor executing computer-executable instructions stored on a computer-readable medium, as shown in FIG. 43. Some or all of the entities described herein may be software based, and may co-exist in a common physical platform (e.g., a requesting entity may be a separate software process and program from a dependent entity, both of which may be executed as software on a common computing device).

One or more features of the disclosure may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a UE, a base station, and the like) to enable operation of multi-carrier communications described herein. The device, or one or more devices such as in a system, may include one or more processors, memory, interfaces, and/or the like. Other examples may comprise communication networks comprising devices such as base stations, wireless devices or user equipment (UE), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
   receiving, by a wireless device, first downlink control information (DCI) indicating activation of semi-persistent channel state information (SP CSI) reporting;
   receiving second DCI indicating an uplink grant of a scheduled transmission of at least one transport block; and
   based on the uplink grant and based on a determination that the scheduled transmission of the at least one transport block overlaps in time with a scheduled transmission of at least one SP CSI report:
      dropping the scheduled transmission of the at least one SP CSI report; and
      transmitting the at least one transport block via at least one resource indicated by the uplink grant.

2. The method of claim 1, wherein the dropping the scheduled transmission and the transmitting the at least one transport block are further based on at least one of:
   the at least one transport block comprising ultra-reliable low-latency communication (URLLC) data; or
   a physical uplink shared channel (PUSCH) transmission power that is greater than an allowed power value.

3. The method of claim 1, further comprising validating a format of the first DCI at least based on:
   a first field of the first DCI; and
   a second field of the first DCI.

4. The method of claim 1, further comprising validating the activation of SP CSI reporting, wherein the validating is based on:
   a first field, of the first DCI, being equal to a first value; and
   a second field, of the first DCI, being equal to a second value.

5. The method of claim 4, wherein the first field comprises a hybrid automatic repeat request process number field.

6. The method of claim 4, wherein the second field comprises a redundancy version field.

7. The method of claim 1, wherein the scheduled transmission of the at least one transport block is via a first uplink shared channel of a cell, and
   wherein the scheduled transmission of the at least one SP CSI report is via a second uplink shared channel of the cell.

8. The method of claim 1, wherein a time period in which the scheduled transmission of the at least one transport block and the scheduled transmission of the at least one SP CSI report are overlapped comprises at least one of:
   an orthogonal frequency-division multiplexing symbol;
   a slot; or
   a subframe.

9. The method of claim 1, further comprising receiving third DCI indicating deactivation of SP CSI reporting.

10. The method of claim 1, further comprising after the dropping the scheduled transmission, transmitting at least one SP CSI report.

11. The method of claim 1, wherein the uplink grant comprises at least one of:
    a first time occupancy associated with the scheduled transmission of the at least one SP CSI report; or
    a second time occupancy associated with the scheduled transmission of the at least one transport block.

12. A method comprising:
    sending, by a base station, first downlink control information (DCI) indicating activation of semi-persistent channel state information (SP CSI) reporting;
    sending second DCI indicating an uplink grant of a scheduled transmission of at least one transport block; and
    based on the uplink grant and based on an overlap in time between the scheduled transmission of the at least one transport block and a scheduled transmission of at least one SP CSI report, receiving, via at least one resource indicated by the uplink grant and instead of the at least one SP CSI report, the at least one transport block.

13. The method of claim 12, wherein the receiving the at least one transport block is based on at least one of:
    the at least one transport block comprising ultra-reliable low-latency communication (URLLC) data; or
    a physical uplink shared channel (PUSCH) transmission power that is greater than an allowed power value.

14. The method of claim 12, wherein the scheduled transmission of the at least one transport block is via a first uplink shared channel of a cell, and
    wherein the scheduled transmission of the at least one SP CSI report is via a second uplink shared channel of the cell.

15. The method of claim 12, wherein the overlap in time comprises at least one of:
    an orthogonal frequency-division multiplexing symbol;
    a slot; or
    a subframe.

16. The method of claim 12, further comprising sending third DCI indicating deactivation of SP CSI reporting.

17. The method of claim 12, further comprising:
    after the receiving the scheduled transmission of the at least one transport block, receiving at least one SP CSI report.

18. The method of claim 12, wherein the uplink grant comprises at least one of:
    a first time occupancy associated with the scheduled transmission of the at least one SP CSI report; or a second time occupancy associated with the scheduled transmission of the at least one transport block.

19. A wireless device comprising:
one or more processors; and
memory storing instructions that, when executed by the one or more processors, cause the wireless device to:
receive first downlink control information (DCI) indicating activation of semi-persistent channel state information (SP CSI) reporting;
receive second DCI indicating an uplink grant of a scheduled transmission of at least one transport block; and
based on the uplink grant and based on a determination that the scheduled transmission of the at least one transport block overlaps in time with a scheduled transmission of at least one SP CSI report:
drop the scheduled transmission of the at least one SP CSI report; and
send the at least one transport block via at least one resource indicated by the uplink grant.

20. The wireless device of claim 19, wherein instructions, when executed by the one or more processors, cause the wireless device to drop the scheduled transmission and transmit the at least one transport block further based on at least one of:
the at least one transport block comprising ultra-reliable low-latency communication (URLLC) data; or
a physical uplink shared channel (PUSCH) transmission power that is greater than an allowed power value.

21. The wireless device of claim 19, wherein the instructions, when executed by the one or more processors, cause the wireless device to validate a format of the first DCI at least based on:
a first field of the first DCI; and
a second field of the first DCI.

22. The wireless device of claim 19, wherein the instructions, when executed by the one or more processors, cause the wireless device to validate the activation of SP CSI reporting, wherein validating the activation of SP CSI reporting is based on:
a first field, of the first DCI, being equal to a first value; and
a second field, of the first DCI, being equal to a second value.

23. The wireless device of claim 22, wherein the first field comprises a hybrid automatic repeat request process number field.

24. The wireless device of claim 22, wherein the second field comprises a redundancy version field.

25. The wireless device of claim 19, wherein the scheduled transmission of the at least one transport block is via a first uplink shared channel of a cell, and
wherein the scheduled transmission of at least one SP CSI report is via a second uplink shared channel of the cell.

26. The wireless device of claim 19, wherein a time period in which the scheduled transmission of the at least one transport block and the scheduled transmission of at least one SP CSI report are overlapped comprises at least one of:
an orthogonal frequency-division multiplexing symbol;
a slot; or
a subframe.

27. The wireless device of claim 19, wherein the instructions, when executed by the one or more processors, cause the wireless device to receive third DCI indicating deactivation of SP CSI reporting.

28. The wireless device of claim 19, wherein the instructions, when executed by the one or more processors, cause the wireless device to:
after dropping the scheduled transmission of the at least one SP CSI report, transmit at least one SP CSI report.

29. The wireless device of claim 19, wherein the uplink grant comprises at least one of:
a first time occupancy associated with the scheduled transmission of the at least one SP CSI report; or
a second time occupancy associated with the scheduled transmission of the at least one transport block.

30. A base station comprising:
one or more processors; and
memory storing instructions that, when executed by the one or more processors, cause the base station to:
send first downlink control information (DCI) indicating activation of semi-persistent channel state information (SP CSI) reporting;
send second DCI indicating an uplink grant of a scheduled transmission of at least one transport block; and
based on the uplink grant and based on an overlap in time between the scheduled transmission of the at least one transport block and a scheduled transmission of at least one SP CSI report, receive, via at least one resource indicated by the uplink grant and instead of the at least one SP CSI report, the at least one transport block.

31. The base station of claim 30, wherein the instructions, when executed by the one or more processors, cause the base station to receive the at least one transport block further based on at least one of:
the at least one transport block comprising ultra-reliable low-latency communication (URLLC) data; or
a physical uplink shared channel (PUSCH) transmission power that is greater than an allowed power value.

32. The base station of claim 30, wherein the scheduled transmission of the at least one transport block is via a first uplink shared channel of a cell, and
wherein the scheduled transmission of at least one SP CSI report is via a second uplink shared channel of the cell.

33. The base station of claim 30, wherein the overlap in time comprises at least one of:
an orthogonal frequency-division multiplexing symbol;
a slot; or
a subframe.

34. The base station of claim 30, wherein the instructions, when executed by the one or more processors, cause the base station to send third DCI indicating deactivation of SP CSI reporting.

35. The base station of claim 30, wherein the instructions, when executed by the one or more processors, cause the base station to:
after receiving the scheduled transmission of the at least one transport block, receive at least one SP CSI report.

36. The base station of claim 30, wherein the uplink grant comprises at least one of:
a first time occupancy associated with the scheduled transmission of the at least one SP CSI report; or
a second time occupancy associated with the scheduled transmission of the at least one transport block.

37. A non-transitory computer-readable medium storing instructions that, when executed, cause:
receiving first downlink control information (DCI) indicating activation of semi-persistent channel state information (SP CSI) reporting;

receiving second DCI indicating an uplink grant of a scheduled transmission of at least one transport block; and based on the uplink grant and based on a determination that the scheduled transmission of the at least one transport block overlaps in time with a scheduled transmission of at least one SP CSI report:
  dropping the scheduled transmission of the at least one SP CSI report; and
  transmitting the at least one transport block via at least one resource indicated by the uplink grant.

38. The non-transitory computer-readable medium of claim 37, wherein the instructions, when executed, further cause validating a format of the first DCI at least based on:
  a first field of the first DCI; and
  a second field of the first DCI.

39. The non-transitory computer-readable medium of claim 37, wherein the instructions, when executed, further cause validating the activation of SP CSI reporting, wherein the validating is based on:
  a first field, of the first DCI, being equal to a first value; and
  a second field, of the first DCI, being equal to a second value.

40. The non-transitory computer-readable medium of claim 37, wherein the instructions, when executed, further cause receiving third DCI indicating deactivation of SP CSI reporting.

41. The non-transitory computer-readable medium of claim 37, wherein the instructions, when executed, further cause, after the dropping the scheduled transmission, transmitting at least one SP CSI report.

42. A non-transitory computer-readable medium storing instructions that, when executed, cause:
  sending first downlink control information (DCI) indicating activation of semi-persistent channel state information (SP CSI) reporting;
  sending second DCI indicating an uplink grant of a scheduled transmission of at least one transport block; and
  based on the uplink grant and based on an overlap in time between the scheduled transmission of the at least one transport block and a scheduled transmission of at least one SP CSI report, receiving, via at least one resource indicated by the uplink grant and instead of the at least one SP CSI report, the at least one transport block.

43. The non-transitory computer-readable medium of claim 42, wherein the instructions, when executed, further cause sending third DCI indicating deactivation of SP CSI reporting.

44. The non-transitory computer-readable medium of claim 42, wherein the instructions, when executed, further cause, after the receiving the scheduled transmission of the at least one transport block, receiving at least one SP CSI report.

45. A system comprising:
  a wireless device; and
  a base station;
    wherein the wireless device is configured to:
      receive first downlink control information (DCI) indicating activation of semi-persistent channel state information (SP CSI) reporting;
      receive second DCI indicating an uplink grant of a scheduled transmission of at least one transport block; and
      based on the uplink grant and based on a determination that the scheduled transmission of the at least one transport block overlaps in time with a scheduled transmission of at least one SP CSI report:
        drop the scheduled transmission of the at least one SP CSI report; and
        send the at least one transport block via at least one resource indicated by the uplink grant; and
    wherein the base station is configured to send the first DCI indicating the activation of semi-persistent channel state information (SP CSI) reporting.

46. The system of claim 45, wherein the wireless device is further configured to receive third DCI indicating deactivation of SP CSI reporting.

47. The system of claim 45, wherein the wireless device is further configured to, after dropping the scheduled transmission of the at least one SP CSI report, transmit at least one SP CSI report.

* * * * *

UNITED STATES PATENT AND TRADEMARK OFFICE
CERTIFICATE OF CORRECTION

| | | |
|---|---|---|
| PATENT NO. | : 12,177,788 B2 | Page 1 of 1 |
| APPLICATION NO. | : 18/453013 | |
| DATED | : December 24, 2024 | |
| INVENTOR(S) | : Hyoungsuk Jeon et al. | |

It is certified that error appears in the above-identified patent and that said Letters Patent is hereby corrected as shown below:

On the Title Page

Under item (*) Notice, should read:
The patent is subject to a terminal disclaimer.

Signed and Sealed this
Fifth Day of August, 2025

Coke Morgan Stewart
*Acting Director of the United States Patent and Trademark Office*